US012443208B2

(12) United States Patent
Biang et al.

(10) Patent No.: US 12,443,208 B2
(45) Date of Patent: Oct. 14, 2025

(54) CONTROL ZONE DEVICES, SYSTEMS AND METHODS

(71) Applicant: Rain Bird Corporation, Azusa, CA (US)

(72) Inventors: Brian Allen Biang, Tucson, AZ (US); Mark Murphy Ensworth, Orange, CA (US); Michael Joseph Millius, Vail, AZ (US); Kevin Mark Irwin, Tucson, AZ (US); Riccardo J. Tresso, Oro Valley, AZ (US)

(73) Assignee: Rain Bird Corporation, Azusa, CA (US)

( * ) Notice: Subject to any disclaimer, the term of this patent is extended or adjusted under 35 U.S.C. 154(b) by 33 days.

(21) Appl. No.: 18/166,170

(22) Filed: Feb. 8, 2023

(65) Prior Publication Data

US 2024/0264615 A1 Aug. 8, 2024

(51) Int. Cl.
*G05D 16/06* (2006.01)
*B01D 37/04* (2006.01)

(52) U.S. Cl.
CPC ....... *G05D 16/0641* (2013.01); *B01D 37/046* (2013.01)

(58) Field of Classification Search
CPC ........... G05D 16/0641; G05D 16/2093; G05D 16/2095; G05D 16/20; B01D 37/046; F16K 31/365
See application file for complete search history.

(56) References Cited

U.S. PATENT DOCUMENTS

| 483,552 | A | 10/1892 | Goodell |
| 1,035,225 | A | 8/1912 | Nuebling |
| 1,145,222 | A | 7/1915 | Wilkinson |

(Continued)

FOREIGN PATENT DOCUMENTS

| CN | 1816735 | 8/2006 |
| EP | 0188131 | 7/1986 |

(Continued)

OTHER PUBLICATIONS

U.S. Appl. No. 15/792,273, filed Oct. 24, 2017, Kirk Andrew Allen.

(Continued)

*Primary Examiner* — Jessica Cahill
(74) *Attorney, Agent, or Firm* — Fitch, Even, Tabin & Flannery, LLP

(57) ABSTRACT

Control zone devices that integrate a valve, filter, and pressure regulator within a single device are provided. Specifically, the control zone devices include a main body having a base portion with an inlet passage and an outlet passage attachable to a conduit and a body portion extending from the base portion having an interior for receiving a filter. The control zone devices further include a valve body including a solenoid bowl for attaching a solenoid and an interface cap for removably coupling the valve body to the main body of the control zone device and forming an interface between the valve body and the main body to operate the valve. The control zone devices also include a pressure regulator. In some configurations, the pressure regulator is positioned in a vent flow path of the valve body downstream of the solenoid for regulating pressure at the valve.

21 Claims, 79 Drawing Sheets

(56) References Cited

U.S. PATENT DOCUMENTS

| | | | | |
|---|---|---|---|---|
| 1,972,054 | A | 8/1934 | Moller | |
| 2,519,805 | A | 8/1950 | Wilkins | |
| 2,674,880 | A | 4/1954 | Broderson | |
| 2,929,248 | A | 3/1960 | Sprenkle | |
| 2,981,240 | A | 4/1961 | Nelson | |
| 3,049,009 | A | 8/1962 | McCall | |
| 3,071,160 | A | 1/1963 | Weichbrod | |
| 3,076,335 | A | 2/1963 | Rosaen | |
| 3,076,336 | A | 2/1963 | Rosaen | |
| 3,085,423 | A | 4/1963 | Champion | |
| 3,186,597 | A | 6/1965 | Henderson | |
| 3,204,659 | A | 9/1965 | Richards | |
| 3,212,685 | A | 10/1965 | Richard | |
| 3,260,110 | A | 7/1966 | Lutz | |
| 3,354,718 | A | 11/1967 | Boutillon | |
| 3,357,255 | A | 12/1967 | Reynolds | |
| 3,472,072 | A | 10/1969 | Kunstadt | |
| 3,530,705 | A | 9/1970 | Lathrop | |
| 3,623,776 | A | 11/1971 | Wellman | |
| 3,641,817 | A | 2/1972 | Dory | |
| 3,667,495 | A | 6/1972 | Schuler | |
| 3,709,037 | A | 1/1973 | Abbotts | |
| 3,711,689 | A | 1/1973 | Park | |
| 3,721,116 | A | 3/1973 | Brachet | |
| 3,721,505 | A | 3/1973 | Garnett | |
| 3,723,987 | A | 3/1973 | Barone, Jr. | |
| 3,733,898 | A | 5/1973 | Yamamoto | |
| 3,748,837 | A | 7/1973 | Billeter | |
| 3,757,577 | A | 9/1973 | Bozek | |
| 3,759,099 | A | 9/1973 | McGregor | |
| 3,789,664 | A | 2/1974 | Bozek | |
| 3,801,239 | A | 4/1974 | Larson | |
| 3,807,220 | A | 4/1974 | Ottenstein | |
| 3,812,715 | A | 5/1974 | Whalen | |
| 3,822,591 | A | 7/1974 | Li | |
| 3,842,671 | A | 10/1974 | Frizelle | |
| 3,853,144 | A | 12/1974 | Whelan | |
| 3,857,277 | A | 12/1974 | Moore | |
| 3,874,235 | A | 4/1975 | Sanden | |
| 3,882,723 | A | 5/1975 | Wickham | |
| 3,945,686 | A | 3/1976 | Orzel | |
| 3,948,083 | A | 4/1976 | Wickham | |
| 3,948,285 | A | 4/1976 | Flynn | |
| 3,955,415 | A | 5/1976 | Sharon | |
| 3,975,943 | A | 8/1976 | Brachet | |
| 3,978,880 | A | 9/1976 | Crown | |
| 3,979,955 | A | 9/1976 | Schulte | |
| 3,987,662 | A | 10/1976 | Hara | |
| 3,990,299 | A | 11/1976 | Coffman | |
| 4,080,997 | A | 3/1978 | Biornstad | |
| 4,089,215 | A | 5/1978 | Chapin | |
| 4,195,518 | A | 4/1980 | Fees | |
| 4,226,259 | A * | 10/1980 | Szekely | F16K 31/365 |
| | | | | 251/30.02 |
| 4,248,099 | A | 2/1981 | Allen, Jr. | |
| 4,250,553 | A | 2/1981 | Sebens | |
| 4,254,664 | A | 3/1981 | Graham | |
| 4,282,761 | A | 8/1981 | Rosaen | |
| 4,292,853 | A | 10/1981 | Williams | |
| 4,305,281 | A | 12/1981 | Lee | |
| 4,308,746 | A | 1/1982 | Covington | |
| 4,311,170 | A | 1/1982 | Dolan | |
| 4,337,786 | A | 7/1982 | Myers | |
| 4,361,030 | A | 11/1982 | Heide | |
| 4,361,280 | A | 11/1982 | Rosenberg | |
| 4,368,646 | A | 1/1983 | Rogg | |
| 4,388,835 | A | 6/1983 | Rosaen | |
| 4,389,901 | A | 6/1983 | Lake | |
| 4,440,028 | A | 4/1984 | Ramlow | |
| 4,501,158 | A | 2/1985 | Pelikan | |
| 4,501,972 | A | 2/1985 | Foerster, Jr. | |
| 4,518,955 | A | 5/1985 | Meyer | |
| 4,530,463 | A | 7/1985 | Hiniker | |
| 4,548,076 | A | 10/1985 | Haake | |
| 4,581,946 | A | 4/1986 | Kanayama | |
| 4,590,805 | A | 5/1986 | Baird | |
| 4,619,139 | A | 10/1986 | Rosaen | |
| 4,630,486 | A | 12/1986 | Miles | |
| 4,630,488 | A | 12/1986 | Marlier | |
| 4,635,485 | A | 1/1987 | Lew | |
| 4,637,547 | A | 1/1987 | Hiniker | |
| 4,643,213 | A | 2/1987 | Mirel | |
| 4,651,286 | A | 3/1987 | Fukai | |
| 4,724,706 | A | 2/1988 | Stiever | |
| 4,729,106 | A | 3/1988 | Rush | |
| 4,730,637 | A | 3/1988 | White | |
| 4,790,195 | A | 12/1988 | Feller | |
| 4,797,666 | A | 1/1989 | Baxter | |
| 4,805,862 | A | 2/1989 | Wissman | |
| 4,838,310 | A | 6/1989 | Scott | |
| 4,840,072 | A | 6/1989 | Cuthbert | |
| 4,840,195 | A * | 6/1989 | Zabrenski | G05D 16/10 |
| | | | | 137/557 |
| 4,859,157 | A | 8/1989 | Adler | |
| 4,867,198 | A | 9/1989 | Faust | |
| 4,870,859 | A | 10/1989 | Twerdochlib | |
| 4,888,706 | A | 12/1989 | Rush | |
| 4,898,205 | A | 2/1990 | Ross | |
| 4,913,352 | A | 4/1990 | Witty | |
| 4,936,151 | A | 6/1990 | Tokio | |
| 4,945,771 | A | 8/1990 | Ogden | |
| 4,962,666 | A | 10/1990 | Adney | |
| 4,986,133 | A | 1/1991 | Lake | |
| 4,987,914 | A | 1/1991 | Adney | |
| 4,991,436 | A | 2/1991 | Roling | |
| 5,000,031 | A | 3/1991 | Potvin | |
| 5,004,014 | A | 4/1991 | Bender | |
| 5,007,453 | A | 4/1991 | Berkowitz | |
| 5,014,543 | A | 5/1991 | Franklin | |
| 5,018,386 | A | 5/1991 | Zeoli | |
| 5,038,268 | A | 8/1991 | Krause | |
| 5,040,409 | A | 8/1991 | Kiewit | |
| 5,046,353 | A | 9/1991 | Thompson | |
| 5,048,755 | A | 9/1991 | Dodds | |
| 5,052,212 | A | 10/1991 | Cohrs | |
| 5,056,554 | A | 10/1991 | White | |
| 5,062,442 | A | 11/1991 | Stenstrom | |
| 5,072,621 | A | 12/1991 | Hasselmann | |
| 5,085,076 | A | 2/1992 | Engelmann | |
| 5,086,806 | A | 2/1992 | Engler | |
| 5,097,861 | A | 3/1992 | Hopkins | |
| 5,099,698 | A | 3/1992 | Kath | |
| 5,137,556 | A | 8/1992 | Koulogeorgas | |
| 5,138,888 | A | 8/1992 | Walmer | |
| 5,158,207 | A | 10/1992 | Van Daele | |
| 5,228,469 | A | 7/1993 | Otten | |
| 5,230,366 | A | 7/1993 | Marandi | |
| 5,251,653 | A | 10/1993 | Tucker | |
| 5,257,646 | A | 11/1993 | Meyer | |
| 5,261,268 | A | 11/1993 | Namba | |
| 5,272,646 | A | 12/1993 | Farmer | |
| 5,287,884 | A | 2/1994 | Cohen | |
| 5,303,738 | A | 4/1994 | Chang | |
| 5,315,862 | A | 5/1994 | Hasselmann | |
| 5,337,615 | A | 8/1994 | Goss | |
| 5,377,529 | A | 1/1995 | Boyd | |
| 5,383,338 | A | 1/1995 | Bowsky | |
| 5,415,041 | A | 5/1995 | Foran, Jr. | |
| 5,419,203 | A | 5/1995 | Carmichael | |
| 5,438,862 | A | 8/1995 | Keating | |
| 5,456,285 | A | 10/1995 | Lee | |
| 5,483,838 | A | 1/1996 | Holden | |
| 5,494,070 | A | 2/1996 | Hilton | |
| 5,509,407 | A | 4/1996 | Schuler | |
| 5,515,734 | A | 5/1996 | Malminen | |
| 5,540,107 | A | 7/1996 | Silverman | |
| 5,544,533 | A | 8/1996 | Sugi | |
| 5,546,801 | A | 8/1996 | Swinson | |
| 5,554,805 | A | 9/1996 | Bahrton | |
| 5,560,542 | A | 10/1996 | Reid | |
| 5,568,825 | A | 10/1996 | Faulk | |
| 5,586,050 | A | 12/1996 | Makel | |
| 5,590,686 | A | 1/1997 | Prendergast | |
| 5,596,152 | A | 1/1997 | Bergervoet | |

(56) References Cited

U.S. PATENT DOCUMENTS

| | | |
|---|---|---|
| 5,612,890 A | 3/1997 | Strasser |
| 5,616,830 A | 4/1997 | Wodeslavsky |
| 5,636,653 A | 6/1997 | Titus |
| 5,637,789 A | 6/1997 | Lawson |
| 5,642,861 A | 7/1997 | Ogi |
| 5,645,264 A | 7/1997 | Kah |
| 5,650,564 A | 7/1997 | Wodeslavsky |
| 5,655,561 A | 8/1997 | Wendel |
| 5,655,568 A | 8/1997 | Bhargava |
| 5,677,501 A | 10/1997 | Kawaguchi |
| 5,698,793 A | 12/1997 | Carmichael |
| 5,708,195 A | 1/1998 | Kurisu |
| 5,713,729 A | 2/1998 | Hong |
| 5,717,137 A | 2/1998 | Singleterry |
| 5,739,420 A | 4/1998 | Peterson |
| 5,746,413 A | 5/1998 | Goloff |
| 5,769,108 A | 6/1998 | Proudman |
| 5,771,920 A | 6/1998 | Jewett |
| 5,779,148 A | 7/1998 | Saarem |
| 5,806,558 A | 9/1998 | Greverath |
| 5,814,735 A | 9/1998 | Kurisaki |
| 5,816,246 A | 10/1998 | Mirza |
| 5,820,715 A | 10/1998 | Singleterry |
| 5,831,176 A | 11/1998 | Morgenthale |
| 5,838,258 A | 11/1998 | Saar |
| 5,853,026 A | 12/1998 | Wlodarczyk |
| 5,875,815 A | 3/1999 | Ungerecht |
| 5,877,417 A | 3/1999 | Arvidson |
| 5,880,378 A | 3/1999 | Behring, II |
| 5,881,757 A | 3/1999 | Kuster |
| 5,884,649 A | 3/1999 | Proudman |
| 5,890,515 A | 4/1999 | Spiess |
| 5,902,927 A | 5/1999 | Titus |
| 5,911,238 A | 6/1999 | Bump |
| 5,913,236 A | 6/1999 | Wodeslavsky |
| 5,918,268 A | 6/1999 | Lukas |
| 5,918,271 A | 6/1999 | McGuigan |
| 5,937,908 A | 8/1999 | Inoshiri |
| 5,938,372 A | 8/1999 | Lichfield |
| 5,944,048 A | 8/1999 | Bump |
| 5,950,667 A | 9/1999 | Nicewonger |
| 5,970,801 A | 10/1999 | Ciobanu |
| 5,971,011 A | 10/1999 | Price |
| 5,975,126 A | 11/1999 | Bump |
| 5,979,863 A * | 11/1999 | Lousberg ............... F16K 31/402 |
| | | 251/30.05 |
| 5,986,573 A | 11/1999 | Franklin |
| 5,992,218 A | 11/1999 | Tryba |
| 5,992,465 A | 11/1999 | Jansen |
| 6,003,549 A | 12/1999 | Delcroix |
| 6,019,003 A | 2/2000 | Wieder |
| 6,026,838 A | 2/2000 | Nicewonger |
| 6,032,540 A | 3/2000 | Hawkins |
| 6,032,541 A | 3/2000 | Haak |
| 6,041,801 A | 3/2000 | Gray |
| 6,041,807 A | 3/2000 | Honaga |
| 6,065,941 A | 5/2000 | Gray |
| 6,076,542 A | 6/2000 | Titus |
| 6,079,263 A | 6/2000 | Beddies |
| 6,079,279 A | 6/2000 | Bussow |
| 6,106,705 A | 8/2000 | Giordano |
| 6,112,579 A | 9/2000 | Tryba |
| 6,119,528 A | 9/2000 | Genack |
| 6,128,946 A | 10/2000 | Leon |
| 6,134,949 A | 10/2000 | Leon |
| 6,139,727 A | 10/2000 | Lockwood |
| 6,161,100 A | 12/2000 | Saar |
| 6,170,508 B1 | 1/2001 | Faust |
| 6,202,679 B1 | 3/2001 | Titus |
| 6,202,683 B1 | 3/2001 | Smith |
| 6,209,576 B1 | 4/2001 | Davis |
| 6,213,986 B1 | 4/2001 | Darling |
| 6,216,727 B1 | 4/2001 | Genova |
| 6,237,618 B1 | 5/2001 | Kushner |
| 6,240,336 B1 | 5/2001 | Brundisini |
| 6,240,950 B1 | 6/2001 | Harris |
| 6,244,844 B1 | 6/2001 | Diaz |
| 6,250,151 B1 | 6/2001 | Tingleff |
| 6,267,006 B1 | 7/2001 | Bugli |
| 6,284,129 B1 | 9/2001 | Giordano |
| 6,296,227 B1 | 10/2001 | Burcham |
| 6,302,146 B1 | 10/2001 | Mchugh |
| 6,314,795 B1 | 11/2001 | Ingham |
| 6,317,051 B1 | 11/2001 | Cohen |
| 6,323,774 B1 | 11/2001 | Mitchell |
| 6,328,053 B1 | 12/2001 | Slaydon |
| 6,336,361 B1 | 1/2002 | Uramachi |
| 6,341,622 B1 | 1/2002 | Mchugh |
| 6,343,614 B1 | 2/2002 | Gray |
| 6,345,541 B1 | 2/2002 | Hendey |
| 6,377,190 B1 | 4/2002 | Saar |
| D458,554 S | 6/2002 | Jolly |
| 6,402,048 B1 | 6/2002 | Collins |
| 6,460,563 B2 | 10/2002 | Olson |
| 6,460,565 B1 | 10/2002 | Titus |
| 6,485,263 B1 | 11/2002 | Bryant |
| 6,489,895 B1 | 12/2002 | Apelman |
| 6,491,062 B1 | 12/2002 | Croft |
| 6,502,451 B1 | 1/2003 | Fourie |
| 6,502,602 B1 | 1/2003 | Stroup |
| 6,513,375 B2 | 2/2003 | Uramachi |
| 6,513,542 B1 | 2/2003 | Hsieh |
| 6,517,707 B2 | 2/2003 | Giordano |
| 6,520,003 B1 | 2/2003 | Fox |
| 6,520,747 B2 | 2/2003 | Gray |
| 6,530,262 B1 | 3/2003 | Esser |
| 6,535,827 B1 | 3/2003 | Lestina |
| 6,539,814 B1 | 4/2003 | Popp |
| 6,552,647 B1 | 4/2003 | Thiessen |
| 6,558,078 B2 | 5/2003 | Sowry |
| 6,568,416 B2 | 5/2003 | Tucker |
| 6,575,307 B2 | 6/2003 | Lockwood |
| 6,591,694 B2 | 7/2003 | Tsai |
| 6,626,042 B2 | 9/2003 | Havlena |
| 6,627,077 B2 | 9/2003 | Fritsch |
| 6,648,240 B2 | 11/2003 | Simmons |
| 6,654,697 B1 | 11/2003 | Eryurek |
| 6,666,384 B2 | 12/2003 | Prandi |
| 6,688,535 B2 | 2/2004 | Collins |
| 6,691,924 B1 | 2/2004 | Vestergaard |
| 6,694,824 B2 | 2/2004 | Shinmura |
| 6,705,489 B2 | 3/2004 | Henry |
| 6,729,182 B2 | 5/2004 | Uramachi |
| 6,749,136 B1 | 6/2004 | Wilson |
| 6,755,210 B2 | 6/2004 | Suzuki |
| 6,758,104 B2 | 7/2004 | Leys |
| 6,766,835 B1 | 7/2004 | Fima |
| 6,782,311 B2 | 8/2004 | Barlow |
| 6,792,799 B2 | 9/2004 | Ford |
| 6,796,173 B1 | 9/2004 | Lajoie |
| 6,807,855 B2 | 10/2004 | Stroup |
| 6,810,910 B2 | 11/2004 | Mchugh |
| 6,812,848 B2 | 11/2004 | Candela |
| 6,819,292 B2 | 11/2004 | Winter |
| 6,830,064 B2 | 12/2004 | Ji |
| 6,832,625 B2 | 12/2004 | Ford |
| 6,834,662 B1 | 12/2004 | Olson |
| 6,842,706 B1 | 1/2005 | Baraty |
| 6,845,886 B2 | 1/2005 | Henry |
| 6,857,308 B2 | 2/2005 | Johnson |
| 6,874,534 B2 | 4/2005 | Diana |
| 6,892,113 B1 | 5/2005 | Addink |
| 6,895,995 B2 | 5/2005 | Kirkman |
| 6,907,383 B2 | 6/2005 | Eryurek |
| 6,920,778 B2 | 7/2005 | Koike |
| 6,923,205 B2 | 8/2005 | Callies |
| 6,926,821 B2 | 8/2005 | Giordano |
| 6,931,305 B2 | 8/2005 | Sherwood |
| 6,939,470 B2 | 9/2005 | Baarman |
| 6,954,178 B2 | 10/2005 | Winter |
| 6,957,157 B2 | 10/2005 | Lander |
| 6,959,611 B2 | 11/2005 | Schehl |
| 6,963,808 B1 | 11/2005 | Addink |
| 6,968,856 B1 | 11/2005 | Goza |

(56) References Cited

U.S. PATENT DOCUMENTS

| | | |
|---|---|---|
| 6,970,808 B2 | 11/2005 | Abhulimen |
| 6,971,625 B2 | 12/2005 | Szymaszek |
| 6,973,373 B2 | 12/2005 | Gray |
| 6,973,705 B2 | 12/2005 | Leys |
| 6,973,827 B2 | 12/2005 | Koike |
| 6,983,761 B2 | 1/2006 | Henley |
| 6,988,419 B2 | 1/2006 | Muller |
| 7,004,677 B1 | 2/2006 | Ericksen |
| 7,011,254 B2 | 3/2006 | Thornton |
| 7,028,533 B2 | 4/2006 | Koike |
| 7,030,767 B2 | 4/2006 | Candela |
| 7,032,435 B2 | 4/2006 | Hassenflug |
| 7,032,610 B2 | 4/2006 | Matsuo |
| 7,050,887 B2 | 5/2006 | Alvarez |
| 7,069,944 B2 | 7/2006 | Morikawa |
| 7,097,113 B2 | 8/2006 | Ivans |
| 7,107,128 B2 | 9/2006 | Laverdiere |
| 7,114,516 B2 | 10/2006 | Ito |
| 7,121,477 B1 | 10/2006 | Noelke |
| 7,126,551 B2 | 10/2006 | Winter |
| 7,130,750 B1 | 10/2006 | Stevens |
| 7,143,992 B2 | 12/2006 | Sassone |
| 7,150,201 B2 | 12/2006 | Tison |
| 7,159,612 B2 | 1/2007 | Henley |
| 7,174,771 B2 | 2/2007 | Cooper |
| 7,174,772 B2 | 2/2007 | Sacca |
| 7,185,548 B2 | 3/2007 | Penlerick |
| 7,191,955 B2 | 3/2007 | Ivans |
| 7,193,233 B2 | 3/2007 | Smith |
| 7,201,180 B2 | 4/2007 | Ephrat |
| 7,218,237 B2 | 5/2007 | Kates |
| 7,228,726 B2 | 6/2007 | Kates |
| 7,233,252 B1 | 6/2007 | Hardin |
| 7,240,693 B2 | 7/2007 | Knop |
| 7,254,518 B2 | 8/2007 | Eryurek |
| 7,287,434 B2 | 10/2007 | Tison |
| 7,290,680 B2 | 11/2007 | Henry |
| 7,293,721 B2 | 11/2007 | Roberts |
| 7,306,008 B2 | 12/2007 | Tornay |
| 7,308,824 B2 | 12/2007 | Trescott |
| 7,311,005 B2 | 12/2007 | Wiesinger |
| 7,317,971 B2 | 1/2008 | Laverdiere |
| 7,322,231 B2 | 1/2008 | Trygg |
| 7,330,796 B2 | 2/2008 | Addink |
| 7,334,455 B2 | 2/2008 | Yanagi |
| 7,343,795 B2 | 3/2008 | Winter |
| 7,346,434 B2 | 3/2008 | Goza |
| 7,349,763 B2 | 3/2008 | Ivans |
| 7,349,813 B2 | 3/2008 | Gutierrez |
| 7,360,413 B2 | 4/2008 | Jeffries |
| 7,366,625 B1 | 4/2008 | Augenstein |
| 7,377,184 B1 | 5/2008 | Schlachter |
| 7,383,721 B2 | 6/2008 | Parsons |
| 7,392,817 B2 | 7/2008 | Burlage |
| 7,395,708 B2 | 7/2008 | Kirchner |
| 7,401,622 B2 | 7/2008 | Ungerecht |
| 7,404,686 B2 | 7/2008 | Volum |
| 7,412,876 B2 | 8/2008 | Kates |
| 7,418,976 B2 | 9/2008 | Henley |
| 7,438,083 B2 | 10/2008 | Feith |
| 7,444,886 B2 | 11/2008 | Furkert |
| 7,451,777 B2 | 11/2008 | Burlage |
| 7,454,984 B1 | 11/2008 | Ross |
| 7,458,521 B2 | 12/2008 | Ivans |
| 7,475,863 B2 | 1/2009 | Donovan |
| 7,480,544 B2 | 1/2009 | Wang |
| 7,491,320 B2 | 2/2009 | Gross |
| 7,494,070 B2 | 2/2009 | Collins |
| 7,536,900 B2 | 5/2009 | Nakamura |
| 7,546,181 B2 | 6/2009 | Vidovich |
| 7,546,778 B2 | 6/2009 | Amante |
| 7,549,348 B2 | 6/2009 | Brown |
| 7,549,439 B2 | 6/2009 | Kimura |
| 7,561,057 B2 | 7/2009 | Kates |
| 7,574,896 B1 | 8/2009 | Cooper |
| 7,583,198 B2 | 9/2009 | Kates |
| 7,596,429 B2 | 9/2009 | Cardinal |
| 7,596,458 B2 | 9/2009 | Lander |
| 7,617,992 B2 | 11/2009 | Ivans |
| 7,628,910 B2 | 12/2009 | Lockwood |
| 7,637,152 B2 | 12/2009 | Ushigusa |
| 7,658,105 B2 | 2/2010 | Holz |
| 7,668,670 B2 | 2/2010 | Lander |
| 7,669,461 B2 | 3/2010 | Kates |
| 7,669,594 B2 | 3/2010 | Downie |
| 7,681,807 B2 | 3/2010 | Gregory |
| 7,685,866 B2 | 3/2010 | Bierbaum |
| 7,693,606 B2 | 4/2010 | Ahmad |
| 7,694,934 B2 | 4/2010 | Irwin |
| 7,708,206 B2 | 5/2010 | Ivans |
| 7,711,454 B2 | 5/2010 | Addink |
| 7,711,651 B2 | 5/2010 | Baraty |
| 7,723,860 B2 | 5/2010 | Nagler |
| 7,729,993 B2 | 6/2010 | Baraty |
| 7,742,862 B2 | 6/2010 | Anderson |
| 7,774,282 B2 | 8/2010 | Baraty |
| 7,779,852 B2 | 8/2010 | Burlage |
| 7,806,382 B1 * | 10/2010 | Palumbo ............ G05D 16/2095 251/30.01 |
| 7,819,020 B2 | 10/2010 | Jacobi |
| 7,822,511 B2 | 10/2010 | Ivans |
| 7,841,229 B2 | 11/2010 | Ridgway |
| 7,852,487 B2 | 12/2010 | Rembe |
| 7,856,864 B2 | 12/2010 | Mcewan |
| 7,861,740 B2 | 1/2011 | Phallen |
| 7,891,246 B2 | 2/2011 | Lander |
| 7,891,370 B1 | 2/2011 | Stange |
| 7,899,580 B2 | 3/2011 | Cardinal |
| 7,900,647 B2 | 3/2011 | Tornay |
| 7,920,983 B1 | 4/2011 | Peleg |
| 7,926,746 B2 | 4/2011 | Melton |
| 7,930,069 B2 | 4/2011 | Savelle |
| 7,930,085 B2 | 4/2011 | Anderson |
| 7,940,189 B2 | 5/2011 | Brown |
| 7,944,363 B2 | 5/2011 | Kim |
| 7,949,495 B2 | 5/2011 | Wiklund |
| 7,966,099 B2 | 6/2011 | Fima |
| 7,969,318 B2 | 6/2011 | White |
| 7,970,494 B2 | 6/2011 | Fima |
| 7,994,927 B2 | 8/2011 | Atassi |
| 8,020,585 B2 | 9/2011 | Shock |
| 8,072,340 B2 | 12/2011 | Yukawa |
| 8,082,066 B2 | 12/2011 | Laverdiere |
| 8,104,340 B2 | 1/2012 | Speldrich |
| 8,109,131 B2 | 2/2012 | Winter |
| 8,113,225 B2 | 2/2012 | Funari |
| 8,130,107 B2 | 3/2012 | Meyer |
| 8,145,359 B2 | 3/2012 | Addink |
| RE43,334 E | 5/2012 | Simmons |
| 8,172,200 B2 | 5/2012 | Kroemmer |
| 8,174,398 B2 | 5/2012 | Wien |
| 8,175,752 B2 | 5/2012 | Deivasigamani |
| 8,187,471 B2 | 5/2012 | Lockwood |
| 8,193,942 B2 | 6/2012 | White |
| 8,205,508 B2 | 6/2012 | Healey |
| 8,205,632 B2 | 6/2012 | Fishwick |
| 8,256,304 B2 | 9/2012 | Therrian |
| 8,256,744 B2 | 9/2012 | Tanikawa |
| 8,265,887 B2 | 9/2012 | Itou |
| 8,271,143 B2 | 9/2012 | Deivasigamani |
| 8,297,312 B2 | 10/2012 | Tai |
| 8,301,309 B1 | 10/2012 | Woytoxitz |
| 8,308,857 B2 | 11/2012 | Couillard |
| 8,316,695 B2 | 11/2012 | Jarvie |
| 8,322,684 B2 | 12/2012 | Otsuka |
| 8,332,130 B2 | 12/2012 | Stretch |
| 8,336,544 B2 | 12/2012 | Downie |
| 8,353,221 B2 | 1/2013 | Schmid |
| 8,365,753 B2 | 2/2013 | Dana |
| 8,380,448 B2 | 2/2013 | Franklin |
| 8,413,681 B2 * | 4/2013 | Schmuckle ............ F16L 27/093 137/614.19 |
| 8,434,634 B2 | 5/2013 | Bork |
| 8,439,068 B2 | 5/2013 | Croibier |

(56) References Cited

U.S. PATENT DOCUMENTS

| | | |
|---|---|---|
| 8,439,282 B2 | 5/2013 | Allen |
| 8,441,361 B2 | 5/2013 | McAlister |
| 8,443,822 B2 | 5/2013 | Ivans |
| 8,443,823 B1 | 5/2013 | Prager |
| 8,457,908 B2 | 6/2013 | Patel |
| 8,464,582 B2 | 6/2013 | Roux |
| 8,498,523 B2 | 7/2013 | Deivasigamani |
| 8,499,616 B2 | 8/2013 | Stoner |
| 8,504,318 B2 | 8/2013 | Mendelson |
| 8,517,051 B2 | 8/2013 | Fazekas |
| 8,531,303 B2 | 9/2013 | Pham |
| 8,534,467 B2 | 9/2013 | Haas |
| 8,548,632 B1 | 10/2013 | Porter |
| 8,561,636 B2 | 10/2013 | Eithun |
| 8,590,395 B2 | 11/2013 | Ge |
| 8,600,569 B2 | 12/2013 | Woytowitz |
| 8,606,413 B2 | 12/2013 | Picton |
| 8,607,645 B2 | 12/2013 | Laubach |
| 8,616,234 B2 | 12/2013 | Ringer |
| 8,618,941 B2 | 12/2013 | Javey |
| 8,649,907 B2 | 2/2014 | Ersavas |
| 8,662,005 B2 | 3/2014 | Chen |
| 8,666,683 B2 | 3/2014 | Rogers |
| 8,667,978 B2 | 3/2014 | Ford |
| 8,668,830 B2 | 3/2014 | Soecknick |
| 8,717,183 B2 | 5/2014 | Pal |
| 8,719,187 B2 | 5/2014 | Milanes Garcia-Moreno |
| 8,720,481 B2 | 5/2014 | Guy |
| 8,727,604 B2 | 5/2014 | Compton |
| 8,733,397 B2 | 5/2014 | Otsuka |
| 8,749,393 B1 | 6/2014 | Tollefson |
| 8,756,022 B2 | 6/2014 | Franklin |
| 8,793,024 B1 | 7/2014 | Woytowitz |
| 8,800,384 B2 | 8/2014 | Wootten |
| 8,800,473 B1 | 8/2014 | Deverse |
| 8,816,866 B2 | 8/2014 | Day |
| 8,831,024 B2 | 9/2014 | Robinson |
| 8,833,384 B2 | 9/2014 | Burt |
| 8,833,390 B2 | 9/2014 | Ball |
| 8,833,405 B2 | 9/2014 | Phallen |
| 8,833,672 B2 | 9/2014 | Skripkar |
| 8,834,134 B2 | 9/2014 | Baker |
| 8,839,821 B2 | 9/2014 | Pinkerton |
| 8,844,835 B2 | 9/2014 | Ford |
| 8,849,461 B2 | 9/2014 | Ersavas |
| 8,850,871 B2 | 10/2014 | Schaefer |
| 8,850,872 B2 | 10/2014 | Jarvie |
| 8,857,466 B1 | 10/2014 | Wilson |
| 8,866,634 B2 | 10/2014 | Williamson |
| 8,888,711 B2 | 11/2014 | Allum |
| 8,905,062 B2 | 12/2014 | Menet |
| 8,910,887 B2 | 12/2014 | Helmsderfer |
| 8,918,293 B2 | 12/2014 | Carmichael |
| 8,919,678 B2 | 12/2014 | Beer |
| 8,931,330 B2 | 1/2015 | Lucente |
| 8,948,979 B2 | 2/2015 | Malsam |
| 8,950,249 B2 | 2/2015 | Stoner |
| 8,965,584 B2 | 2/2015 | Deivasigamani |
| 9,004,097 B2 | 4/2015 | Crawford |
| 9,010,360 B1 | 4/2015 | Older |
| 9,019,120 B2 | 4/2015 | Broniak |
| 9,021,854 B2 | 5/2015 | Godel |
| 9,032,998 B2 | 5/2015 | O'Brien |
| 9,037,422 B2 | 5/2015 | McHugh |
| 9,062,895 B2 | 6/2015 | Deivasigamani |
| 9,081,389 B2 | 7/2015 | Foster |
| 9,120,116 B2 | 9/2015 | Gorman |
| 9,140,255 B2 | 9/2015 | Wetherill |
| 9,140,377 B2 | 9/2015 | Becker |
| 9,146,172 B2 | 9/2015 | Trescott |
| 9,151,022 B2 | 10/2015 | Patel |
| 9,157,540 B2 | 10/2015 | Larsen |
| 9,207,143 B2 | 12/2015 | Franklin |
| 9,222,490 B2 | 12/2015 | Fishwick |
| 9,222,848 B2 | 12/2015 | Cho |
| 9,234,679 B2 | 1/2016 | Deivasigamani |
| 9,239,059 B2 | 1/2016 | Locke |
| 9,241,451 B2 | 1/2016 | Ersavas |
| 9,244,449 B2 | 1/2016 | Tennyson |
| 9,250,105 B2 | 2/2016 | Patel |
| 9,258,952 B2 | 2/2016 | Walker |
| 9,261,218 B2 | 2/2016 | Cheatham |
| 9,265,204 B2 | 2/2016 | Younis |
| 9,275,536 B2 | 3/2016 | Wetherill |
| 9,291,520 B2 | 3/2016 | Fleury |
| 9,296,004 B1 | 3/2016 | Clark |
| 9,297,150 B2 | 3/2016 | Klicpera |
| 9,297,467 B1 | 3/2016 | Goseco |
| 9,298,191 B2 | 3/2016 | Meyer |
| 9,322,682 B2 | 4/2016 | White |
| 9,354,095 B2 | 5/2016 | Sorenson |
| 9,366,595 B2 | 6/2016 | Bourgeois |
| 9,375,166 B2 | 6/2016 | Allum |
| 9,393,586 B2 | 7/2016 | Donner |
| 9,410,636 B2 | 8/2016 | Older |
| 9,439,365 B2 | 9/2016 | Lo |
| 9,470,562 B2 | 10/2016 | Frisch |
| 9,476,517 B2 | 10/2016 | Gomes, II |
| 9,494,249 B2 | 11/2016 | Mccraven |
| 9,494,480 B2 | 11/2016 | Klicpera |
| 9,506,785 B2 | 11/2016 | Turk |
| 9,512,946 B2 | 12/2016 | Karasawa |
| 9,541,107 B2 | 1/2017 | Sawchuk |
| 9,574,923 B2 | 2/2017 | Williamson |
| 9,597,699 B2 | 3/2017 | Helmsderfer |
| 9,668,432 B2 | 6/2017 | Roess |
| 9,699,974 B2 | 7/2017 | Clark |
| 9,700,903 B2 | 7/2017 | Kawamori |
| 9,713,438 B2 | 7/2017 | Allum |
| 9,724,708 B2 | 8/2017 | Helmsderfer |
| 9,749,792 B2 | 8/2017 | Klicpera |
| 9,772,045 B2 | 9/2017 | Dietel |
| 9,781,886 B1 | 10/2017 | Wangsgaard |
| 9,795,094 B2 | 10/2017 | Roess |
| 9,805,588 B2 | 10/2017 | Gritzo |
| 9,821,335 B2 | 11/2017 | Burrous |
| 9,832,939 B2 | 12/2017 | Russell |
| 9,835,266 B2 | 12/2017 | Picht |
| 9,847,265 B2 | 12/2017 | Donner |
| 9,857,805 B2 | 1/2018 | Halimi |
| 9,909,680 B2 | 3/2018 | Mccraven |
| 9,950,285 B2 | 4/2018 | Yoshida |
| 10,039,240 B2 | 8/2018 | Darnold |
| 10,119,537 B2 | 11/2018 | Wetherill |
| 10,300,903 B2 | 5/2019 | Stiatti |
| 10,309,432 B2 | 6/2019 | Reckner |
| 10,473,494 B2 | 11/2019 | Allen |
| 10,612,682 B1 | 4/2020 | Moore |
| 10,634,538 B2 | 4/2020 | Allen |
| 10,648,842 B2 | 5/2020 | Croteau |
| 10,655,999 B2 | 5/2020 | Ball |
| 10,662,907 B2 | 5/2020 | Dirnberger |
| 10,662,936 B2 | 5/2020 | Ham |
| 10,663,984 B2 | 5/2020 | Kilcran |
| 10,719,089 B2 | 7/2020 | Imsland |
| 10,758,923 B1 | 9/2020 | Oman |
| 10,782,163 B2 | 9/2020 | Vromans |
| 10,830,632 B2 | 11/2020 | Elliott |
| 10,871,240 B2 | 12/2020 | McCraven |
| 10,906,052 B2 | 2/2021 | Greenwood |
| 10,939,626 B2 | 3/2021 | Kremicki |
| 10,955,270 B2 | 3/2021 | Al-Ali |
| 10,980,120 B2 | 4/2021 | Kwak |
| 11,015,967 B2 | 5/2021 | Ball |
| 11,118,953 B2 | 9/2021 | Croteau |
| 11,126,208 B2 | 9/2021 | Nelson |
| 11,126,209 B1 | 9/2021 | Weingarten |
| 11,224,830 B2 | 1/2022 | Wildermuth |
| 11,281,241 B2 | 3/2022 | Weingarten |
| 11,281,242 B2 | 3/2022 | Weingarten |
| 11,338,226 B2 | 5/2022 | Dieker |
| 11,391,392 B2 | 7/2022 | Niess |
| 11,408,515 B2 | 8/2022 | Greenwood |
| 11,458,942 B2 | 10/2022 | Schulz |

(56) References Cited

U.S. PATENT DOCUMENTS

| | | |
|---|---|---|
| 11,511,290 B2 | 11/2022 | Greenwood |
| 11,649,895 B2 | 5/2023 | Arno |
| 11,662,242 B2 | 5/2023 | Allen |
| 11,827,530 B2 | 11/2023 | Itai |
| 2001/0049563 A1 | 12/2001 | Addink |
| 2002/0002425 A1 | 1/2002 | Dossey |
| 2002/0010516 A1 | 1/2002 | Addink |
| 2002/0059836 A1 | 5/2002 | Dodsworth |
| 2002/0092926 A1 | 7/2002 | Thornton |
| 2002/0144952 A1 | 10/2002 | Saxton |
| 2003/0047008 A1 | 3/2003 | Gopalakrishnan |
| 2003/0109964 A1 | 6/2003 | Addink |
| 2003/0111178 A1 | 6/2003 | Morita |
| 2003/0179102 A1 | 9/2003 | Barnes |
| 2003/0182022 A1 | 9/2003 | Addink |
| 2003/0183018 A1 | 10/2003 | Addink |
| 2003/0197617 A1 | 10/2003 | Berger |
| 2004/0015270 A1 | 1/2004 | Addink |
| 2004/0073524 A1 | 4/2004 | Smith |
| 2004/0128034 A1 | 7/2004 | Lenker |
| 2004/0206405 A1 | 10/2004 | Smith |
| 2004/0217041 A1 | 11/2004 | Baarman |
| 2004/0217189 A1 | 11/2004 | Regli |
| 2005/0011554 A1 | 1/2005 | Davila |
| 2005/0028609 A1 | 2/2005 | Langemann |
| 2005/0039546 A1 | 2/2005 | Payne |
| 2005/0067049 A1 | 3/2005 | Fima |
| 2005/0126635 A1 | 6/2005 | Addink |
| 2005/0166666 A1 | 8/2005 | Tsukagoshi |
| 2005/0195078 A1 | 9/2005 | Basinger |
| 2005/0199842 A1 | 9/2005 | Parsons |
| 2005/0211608 A1 | 9/2005 | Lockwood |
| 2005/0224118 A1 | 10/2005 | Tornay |
| 2005/0229716 A1 | 10/2005 | Unsworth |
| 2005/0230650 A1 | 10/2005 | Peterson |
| 2005/0235306 A1 | 10/2005 | Fima |
| 2005/0279169 A1 | 12/2005 | Lander |
| 2006/0005620 A1 | 1/2006 | Koike |
| 2006/0027267 A1 | 2/2006 | Fritze |
| 2006/0030990 A1 | 2/2006 | Anderson |
| 2006/0086833 A1 | 4/2006 | Roberts |
| 2006/0102236 A1 | 5/2006 | Phillips |
| 2006/0137419 A1 | 6/2006 | Mizohata |
| 2006/0157580 A1 | 7/2006 | Regli |
| 2006/0168611 A1 | 7/2006 | Fima |
| 2006/0174707 A1 | 8/2006 | Zhang |
| 2006/0196212 A1 | 9/2006 | Jenkins |
| 2006/0202051 A1 | 9/2006 | Parsons |
| 2006/0248934 A9 | 11/2006 | Mizohata |
| 2006/0260691 A1 | 11/2006 | Davidoff |
| 2006/0267758 A1 | 11/2006 | Barth |
| 2006/0272704 A1 | 12/2006 | Fima |
| 2006/0272830 A1 | 12/2006 | Fima |
| 2007/0026216 A1 | 2/2007 | Weingartner |
| 2007/0068225 A1 | 3/2007 | Brown |
| 2007/0095400 A1 | 5/2007 | Bergquist |
| 2007/0119974 A1 | 5/2007 | Johnson |
| 2007/0130317 A1 | 6/2007 | Lander |
| 2007/0138319 A1 | 6/2007 | Thornton |
| 2007/0193334 A1 | 8/2007 | Hays |
| 2007/0194150 A1 | 8/2007 | Ericksen |
| 2007/0221223 A1 | 9/2007 | McDermott |
| 2007/0262168 A1 | 11/2007 | Ericksen |
| 2007/0272307 A1 | 11/2007 | Patterson |
| 2007/0284550 A1 | 12/2007 | Smith |
| 2008/0029722 A1* | 2/2008 | Irwin ................ F16K 47/023 251/45 |
| 2008/0142115 A1 | 6/2008 | Vogt |
| 2008/0143540 A1 | 6/2008 | Savla |
| 2008/0173084 A1 | 7/2008 | Wiesinger |
| 2008/0184775 A1 | 8/2008 | Yamagishi |
| 2008/0184781 A1 | 8/2008 | Mulligan |
| 2008/0185049 A1 | 8/2008 | Mulligan |
| 2008/0185050 A1 | 8/2008 | Mulligan |
| 2008/0188991 A1 | 8/2008 | Mulligan |
| 2008/0190214 A1 | 8/2008 | Ubowski |
| 2008/0230146 A1* | 9/2008 | Kastner ................ B67D 7/76 702/50 |
| 2008/0266125 A1 | 10/2008 | Windisch |
| 2008/0276722 A1 | 11/2008 | Wiedmann |
| 2008/0284175 A1 | 11/2008 | Nagler |
| 2008/0285049 A1 | 11/2008 | Rembe |
| 2008/0295895 A1 | 12/2008 | Vincent |
| 2009/0001193 A1 | 1/2009 | Parsons |
| 2009/0007968 A1 | 1/2009 | Knecht |
| 2009/0035121 A1 | 2/2009 | Watson |
| 2009/0085756 A1 | 4/2009 | Atassi |
| 2009/0091461 A1 | 4/2009 | Kim |
| 2009/0095935 A1 | 4/2009 | Wlodarczyk |
| 2009/0123340 A1 | 5/2009 | Knudsen |
| 2009/0179165 A1 | 7/2009 | Parsons |
| 2009/0194719 A1 | 8/2009 | Mulligan |
| 2009/0229675 A1 | 9/2009 | Hoskisson |
| 2009/0235992 A1 | 9/2009 | Armstrong |
| 2009/0283160 A1 | 11/2009 | Fishwick |
| 2009/0301173 A1 | 12/2009 | Lamberti |
| 2009/0320608 A1 | 12/2009 | Marcu |
| 2009/0321535 A1 | 12/2009 | Davis |
| 2010/0023170 A1 | 1/2010 | Sherwood |
| 2010/0023172 A1 | 1/2010 | Malinowski |
| 2010/0038440 A1 | 2/2010 | Ersavas |
| 2010/0045471 A1 | 2/2010 | Meyers |
| 2010/0071458 A1 | 3/2010 | Wiedenhoefer |
| 2010/0132803 A1 | 6/2010 | Fima |
| 2010/0145635 A1 | 6/2010 | Pauncz |
| 2010/0204839 A1 | 8/2010 | Behm |
| 2010/0212748 A1 | 8/2010 | Davidoff |
| 2010/0212752 A1 | 8/2010 | Fima |
| 2010/0258204 A1 | 10/2010 | Cipolla |
| 2010/0289652 A1 | 11/2010 | Javey |
| 2010/0294021 A1 | 11/2010 | Makino |
| 2010/0312438 A1 | 12/2010 | Cooley |
| 2010/0326372 A1 | 12/2010 | Kim |
| 2011/0035063 A1 | 2/2011 | Palayur |
| 2011/0050395 A1 | 3/2011 | Ervin |
| 2011/0054712 A1 | 3/2011 | Baraty |
| 2011/0073189 A1 | 3/2011 | Elbert |
| 2011/0155269 A1 | 6/2011 | Martin |
| 2011/0166714 A1 | 7/2011 | Stachnik |
| 2011/0174706 A1 | 7/2011 | Russell |
| 2011/0190947 A1 | 8/2011 | Savelle |
| 2011/0191267 A1 | 8/2011 | Savic |
| 2011/0232770 A1 | 9/2011 | Baggett |
| 2011/0302995 A1 | 12/2011 | Lebeau |
| 2011/0309274 A1 | 12/2011 | Parsons |
| 2012/0024080 A1 | 2/2012 | Carbone, II |
| 2012/0036091 A1 | 2/2012 | Cook |
| 2012/0056711 A1 | 3/2012 | Hanrahan |
| 2012/0084023 A1 | 4/2012 | Mavridoglou |
| 2012/0125452 A1 | 5/2012 | Drechsel |
| 2012/0160034 A1 | 6/2012 | Bardon |
| 2012/0191260 A1 | 7/2012 | Addink |
| 2012/0191380 A1 | 7/2012 | Winter |
| 2012/0216895 A1 | 8/2012 | Fishwick |
| 2012/0223153 A1 | 9/2012 | Helmsderfer |
| 2012/0298220 A1 | 11/2012 | Hidaka |
| 2012/0324985 A1 | 12/2012 | Gu |
| 2013/0008542 A1 | 1/2013 | Irwin |
| 2013/0037624 A1 | 2/2013 | Helmsderfer |
| 2013/0085690 A1 | 4/2013 | Fei |
| 2013/0112003 A1 | 5/2013 | Yamauchi |
| 2013/0174649 A1 | 7/2013 | Hains |
| 2013/0248023 A1 | 9/2013 | Estrada |
| 2013/0255786 A1 | 10/2013 | Nakai |
| 2013/0291974 A1 | 11/2013 | Bourgeois |
| 2013/0310992 A1 | 11/2013 | Larsen |
| 2013/0325194 A1 | 12/2013 | Brine |
| 2013/0325371 A1 | 12/2013 | Brine |
| 2013/0332397 A1 | 12/2013 | Scolnicov |
| 2013/0335218 A1 | 12/2013 | Jones |
| 2013/0341420 A1 | 12/2013 | Lister |
| 2014/0069506 A1 | 3/2014 | Helmsderfer |
| 2014/0077108 A1 | 3/2014 | Ringer |
| 2014/0109644 A1 | 4/2014 | Carbone, II |

(56) References Cited

U.S. PATENT DOCUMENTS

| | | |
|---|---|---|
| 2014/0121999 A1 | 5/2014 | Bracken |
| 2014/0129039 A1 | 5/2014 | Olive-Chahinian |
| 2014/0196802 A1 | 7/2014 | Guy |
| 2014/0222223 A1 | 8/2014 | Horton |
| 2014/0230925 A1 | 8/2014 | Halimi |
| 2014/0236868 A1 | 8/2014 | Cook |
| 2014/0245208 A1 | 8/2014 | Javey |
| 2014/0251478 A1 | 9/2014 | Dolezilek |
| 2014/0257720 A1 | 9/2014 | Smirnov |
| 2014/0261714 A1 | 9/2014 | Burt |
| 2014/0288858 A1 | 9/2014 | Franklin |
| 2014/0306828 A1 | 10/2014 | Trescott |
| 2014/0316723 A1 | 10/2014 | Rogers |
| 2014/0331745 A1 | 11/2014 | Schaefer |
| 2014/0332088 A1 | 11/2014 | Senesh |
| 2014/0338464 A1 | 11/2014 | Ball |
| 2014/0343736 A1 | 11/2014 | Meyer |
| 2014/0345516 A1 | 11/2014 | Deverse |
| 2014/0348205 A1 | 11/2014 | Shaw |
| 2014/0366612 A1 | 12/2014 | Horne |
| 2015/0002300 A1 | 1/2015 | Cho |
| 2015/0007897 A1 | 1/2015 | Valentine |
| 2015/0013220 A1 | 1/2015 | Ross |
| 2015/0045970 A1 | 2/2015 | Anderson |
| 2015/0051743 A1 | 2/2015 | Darnold |
| 2015/0069084 A1 | 3/2015 | Phallen |
| 2015/0097059 A1 | 4/2015 | Helmsderfer |
| 2015/0102136 A1 | 4/2015 | Malsam |
| 2015/0114490 A1 | 4/2015 | Carpenter |
| 2015/0122364 A1 | 5/2015 | Cheatham |
| 2015/0152861 A1 | 6/2015 | Stoner |
| 2015/0204701 A1 | 7/2015 | Klicpera |
| 2015/0206255 A1 | 7/2015 | Groeneveld |
| 2015/0211510 A1 | 7/2015 | Walsh |
| 2015/0211650 A1 | 7/2015 | Older |
| 2015/0247586 A1 | 9/2015 | Gomes, II |
| 2015/0253163 A1 | 9/2015 | Ruiz Cortez |
| 2015/0260310 A1 | 9/2015 | Bahalul |
| 2015/0286222 A1 | 10/2015 | Goldstein |
| 2015/0298145 A1 | 10/2015 | Sauser |
| 2015/0308084 A1 | 10/2015 | Thompson |
| 2015/0308089 A1 | 10/2015 | Thompson |
| 2015/0316936 A1 | 11/2015 | Mccarrick |
| 2015/0323097 A1 | 11/2015 | Stoltz |
| 2015/0323412 A1 | 11/2015 | Stoltz |
| 2015/0348395 A1 | 12/2015 | Trout |
| 2015/0355045 A1 | 12/2015 | Solomon |
| 2015/0367357 A1 | 12/2015 | Humpal |
| 2015/0367358 A1 | 12/2015 | Funseth |
| 2015/0375247 A1 | 12/2015 | Funseth |
| 2015/0376874 A1 | 12/2015 | Breedlove |
| 2015/0376875 A1 | 12/2015 | Patel |
| 2016/0011072 A1 | 1/2016 | Hale |
| 2016/0018283 A1 | 1/2016 | Fleury |
| 2016/0037736 A1 | 2/2016 | Rainone |
| 2016/0041565 A1 | 2/2016 | Edwards |
| 2016/0048135 A1 | 2/2016 | Hill |
| 2016/0050859 A1 | 2/2016 | Larsen |
| 2016/0055649 A1 | 2/2016 | Peret |
| 2016/0069772 A1 | 3/2016 | Gnoss |
| 2016/0073063 A1 | 3/2016 | Peret |
| 2016/0076909 A1 | 3/2016 | Klicpera |
| 2016/0076965 A1 | 3/2016 | Edris |
| 2016/0083937 A1 | 3/2016 | Cavarec |
| 2016/0090717 A1 | 3/2016 | Trescott |
| 2016/0113220 A1 | 4/2016 | Walker |
| 2016/0163177 A1 | 6/2016 | Klicpera |
| 2016/0197467 A1 | 7/2016 | Stepp |
| 2016/0219805 A1 | 8/2016 | Romney |
| 2016/0288156 A1 | 10/2016 | Donner |
| 2016/0345515 A1 | 12/2016 | Helmsderfer |
| 2016/0377464 A1 | 12/2016 | Adlon |
| 2017/0059075 A1 | 3/2017 | Ueno |
| 2017/0061727 A1 | 3/2017 | Savaëte |
| 2017/0204820 A1 | 7/2017 | Dirnberger |
| 2017/0259226 A1 | 9/2017 | Bayer |
| 2017/0318761 A1 | 11/2017 | Rainone |
| 2017/0333919 A1 | 11/2017 | Helmsderfer |
| 2017/0345728 A1 | 11/2017 | Donner |
| 2017/0370754 A1 | 12/2017 | Croteau |
| 2018/0017423 A1 | 1/2018 | Allen |
| 2018/0087937 A1 | 3/2018 | Al-Ali |
| 2018/0106655 A1 | 4/2018 | Kilcran |
| 2018/0136673 A1 | 5/2018 | Halimi |
| 2018/0172537 A1 | 6/2018 | Cimberio |
| 2018/0220600 A1 | 8/2018 | Russell |
| 2018/0259982 A1 | 9/2018 | Halimi |
| 2018/0274212 A1 | 9/2018 | Kuchly |
| 2018/0338435 A1 | 11/2018 | Darnold |
| 2019/0120671 A1 | 4/2019 | Allen |
| 2019/0212180 A1 | 7/2019 | Stetsenko |
| 2019/0323625 A1 | 10/2019 | Niess |
| 2020/0029515 A1 | 1/2020 | Henry |
| 2020/0200290 A1* | 6/2020 | Busch ................... F16K 35/027 |
| 2020/0209040 A1 | 7/2020 | Allen |
| 2020/0249065 A1 | 8/2020 | Allen |
| 2020/0332906 A1 | 10/2020 | Niess |
| 2021/0404572 A1 | 12/2021 | Nelson |
| 2022/0022391 A1 | 1/2022 | Gazit |
| 2022/0042833 A1 | 2/2022 | Al-Ali |
| 2022/0226851 A1 | 7/2022 | Afshar |
| 2022/0236089 A1 | 7/2022 | Allen |
| 2022/0373096 A1 | 11/2022 | Lenz |
| 2023/0182046 A1 | 6/2023 | Gilboa |
| 2024/0264615 A1 | 8/2024 | Biang |

FOREIGN PATENT DOCUMENTS

| | | |
|---|---|---|
| JP | 10206263 A | 8/1998 |
| JP | 2009063559 A | 3/2009 |
| JP | 2016017756 | 2/2016 |

OTHER PUBLICATIONS

1998 Polaris RMK 700 Fuel Cap / Gas Gauge, <https://www.ebay.com/itm/1998-POLARIS-RMK-700-Fuel-Cap-Gas-Gauge/283761973379?>, 10 pages, publicly available before Jul. 13, 2015.

Catron, M. Bezel Overview, Rain Bird®, Nov. 16, 2017, 5 pages.

Catron, Mark. Dial Artwork-International: Ted Concept #1a and #1b, Rain Bird®, Jun. 18, 2018, 2 pages.

Catron, Mark. Bezel Artwork Concepts, Rain Bird®, dated Dec. 10, 2017, 8 pages.

Catron, Mark. Bezel Artwork Concepts, Rain Bird®, dated Dec. 4, 2017, 6 pages.

Catron, Mark. Bezel Artwork Overview. Rain Bird®, dated May 25, 2018, 5 pages.

Catron, Mark. Concept 1 and Concept 2, Rain Bird®, Mar. 17, 2018, 2 pages.

Catron, Mark. Dial Artwork—Domestic: Ted Concept #1a, #1b, #2a, and #2b, Rain Bird®, Jun. 10, 2018, 4 pages.

Catron, Mark. Dial Artwork—Domestic: Ted Concept #1a, #1b, and #2, Rain Bird®, Jun. 8, 2018, 3 pages.

Catron, Mark. Dial Artwork—International and Domestic, Rain Bird®, dated Jun. 5, 2018, 2 pages.

FLOWVIS® Flow Meter, H2Flow Controls: Progress Through Innovation™, <www.h2flow.net>, 2018, 5 pages.

International Search Report and Written Opinion, International Application No. PCT/US2017/042004, dated Sep. 14, 2017, 6 pages.

Owfeel of 3 Dragonfly Toy Plastic Twisty Flying Saucers Spinning Shooter Flying Disc Toys, <https://www.amazon.com/Owfeel-Dragonfly-Spinning-Children-Randomly/dp/B00IDUPUY0>, at least prior to Jul. 13, 2017, 1 page.

Photograph of Y-pipe filter assembly, retrieved Jan. 13, 2006 from the Internet at http://www.rainbird.com/images/products/drip/control/wyefilter_bg.jpg, illustrating a commercially available embodiment prior to Aug. 2, 2004, 1 page.

Rain Bird® Catalog, Landscape Irrigation Products, 2008-2009, p. 40.

Rain Bird® Initial Concepts, Nov. 8, 2017, 1 page.

(56) References Cited

OTHER PUBLICATIONS

Rain Bird® Owner's Manual for Flow Sensors by Data Industrial, Mar. 23, 2015, 11 pages.
Rain Bird® PT3002 Flow Sensor Transmitter, Installation and Programming Instructions, 2012, 48 pages.
Rain Bird® Scale: 2-1 (200%), GPM Flow Full Indexes, at least prior to Jul. 13, 2017, p. 1.
Rain Bird® Scale: 2-1 (200%), GPM Flow, at least prior to Jul. 13, 2017, p. 1.
Rain Bird® Tech Spec, Flow Sensors—BSP: Flow Sensing for Maxicom2®, SiteControl™, IQ™ v2.0, LXD, LXME, LXMEF, <www.rainbird.com>, 2015, 5 pages.
Rain Bird® Tech Spec, Flow Sensors—NPT: Flow Sensing for Maxicom2®, SiteControl™, IQv2.0, ESP-LXD, ESP-LXMEF, <www.rainbird.com>, 2015, 5 pages.
Rain Bird® Troubleshooting Guide, FS Series Flow Sensors, 2016, 2 pages.
Rotameter, <https://en.wikipedia.org/wiki/Rotameter>, Wikipedia, at least prior to Jul. 13, 2017, 3 pages.
USPTO, U.S. Appl. No. 15/792,273; Office Action mailed Mar. 15, 2019; (pp. 1-14).
USPTO; U.S. Appl. No. 14/213,328; Notice of Allowance mailed Oct. 17, 2016.
USPTO; U.S. Appl. No. 15/649,332, filed Jul. 13, 2017, entitled "Flow Sensor".
USPTO; U.S. Appl. No. 15/649,332; Notice of Allowance mailed Mar. 10, 2020; (pp. 1-5).
USPTO; U.S. Appl. No. 15/649,332; Office Action mailed Apr. 1, 2019; (pp. 1-9).
USPTO; U.S. Appl. No. 15/649,332; Office Action mailed Aug. 20, 2019; (pp. 1-8).
USPTO; U.S. Appl. No. 15/792,273, filed Oct. 24, 2017, entitled "Flow Sensor".
USPTO; U.S. Appl. No. 16/858,159, filed Apr. 24, 2020, entitled "Flow Sensor".
USPTO; U.S. Appl. No. 16/858,159; Office Action mailed Oct. 14, 2020; (pp. 1-14).
USPTO; U.S. Appl. No. 16/729,083; Non-Final Rejection mailed Oct. 24, 2022; (pp. 1-9).
USPTO; U.S. Appl. No. 16/729,083; Notice of Allowance and Fees Due (PTOL-85) mailed Jan. 30, 2023; (pp. 1-7).
USPTO; U.S. Appl. No. 17/161,430; Final Rejection mailed Nov. 1, 2022; (pp. 1-14).
USPTO; U.S. Appl. No. 62/361,873, filed Jul. 13, 2016, entitled "Flow Sensor".
USPTO; U.S. Appl. No. 62/786,822, filed Dec. 31, 2018, entitled "Flow Sensor Gauge".
USTPO; U.S. Appl. No. 62/427,675, filed Nov. 29, 2016, entitled "Flow Sensor".
USPTO; U.S. Appl. No. 18/621,961, Application filed Mar. 29, 2024, entitled "Zone Control Devices, Systems And Methods, ".
USPTO; U.S. Appl. No. 18/621,961; Notice of Allowance and Fees Due (PTOL-85) mailed Jun. 27, 2025; (pp. 1-7).

* cited by examiner

CONTROL ZONE DEVICES, SYSTEMS AND METHODS

FIELD

The present invention relates to irrigation control zone devices, systems, and methods and, more particularly, to irrigation control zone devices, systems, and methods, that combine different control zone functions into a single unit.

BACKGROUND

Irrigation systems use a number of devices to deliver irrigation water to a terrain. Depending on the size of the terrain, an irrigation system, such as a sprinkler system, may be divided into one or more irrigation zones. When the terrain is large, multiple zones may be necessary if water pressure is not sufficient to cover the terrain in a single zone. For instance, in a typical sprinkler system, each zone includes a plurality of sprinklers controlled by a valve for that zone. Because each zone has its own valve, zoning allows more control over different areas of the terrain that may have different needs. This can increase the system's efficiency, minimize water waste, and improve plant health.

The valves for different zones are typically installed together along a manifold in a valve box that is embedded in the ground and connected to a common supply line. The box protects the valves and provides access for maintenance of any of the valves.

The valve box may also include other devices necessary for proper functioning of the sprinkler system. For instance, the valve box may include a pressure regulator for each zone. Water pressure in a supply line may vary significantly and occasionally surge. Regulating the pressure of the system ensures that pipes do not burst or that emitting devices such as sprinklers receive water from the line at a correct pressure (e.g., about 30 to 55 psi) so that the devices operate properly or do not break. The pressure regulator regulates the pressure of water in the line so that the pressure is maintained within an appropriate range.

The valve box may also include a filtering device for each zone on the manifold. Sediment or debris in irrigation water can clog a sprinkler and cause an uneven spray pattern, leakage, pressure loss, or other malfunctions. Sediment in the piping can also increase friction and decrease water pressure and flow. A filter removes the sediment and debris from the water that can disrupt the flow of water through the irrigation system.

FIG. 1 illustrates a control zone assembly 2 that may be assembled within a valve box. The control zone assembly 2 commonly includes a valve 4, a filter 6, and a pressure regulator 8 connected to one another via piping in series. Fluid flow to the zone is controlled by the opening or closing of the valve 4, which may, for example, be a solenoid valve. When the valve 4 is open, fluid flows through the piping to the filter 6, and the filtered water subsequently flows through the piping to the pressure regulator 8 which regulates the pressure of the water prior to delivering the water to the sprinklers.

Valve boxes are typically available in specific, standardized sizes. For instance, valve boxes are generally rectangular or round with dimensions ranging from about 7 inches to about 30 inches. Because space is limited in a valve box, a valve box may not easily fit a desired number of valves, pressure regulators, and filters for each of a plurality of zones and may disallow easy maintenance. For instance, the arrangement illustrated in FIG. 1, with the valve 4, filter 6, and pressure regulator 8 being separate components spaced along the pipe, takes up a large portion of space in the box. In addition, the multiple points of connection between the devices can increase the likelihood of leaks as water flows through the control zone assembly and increase the cost of installation. Further, as water flows through the numerous components and passageways, this may result in inefficiencies such as less optimal flow or pressure loss. Due to such inefficiencies a higher inlet pressure may be required in order to achieve a desired outlet pressure.

Accordingly, a control zone assembly for a valve box that is compact, provides efficient performance characteristics, and facilitates easy installation and maintenance is desirable.

DETAILED DESCRIPTION

Figure 2:
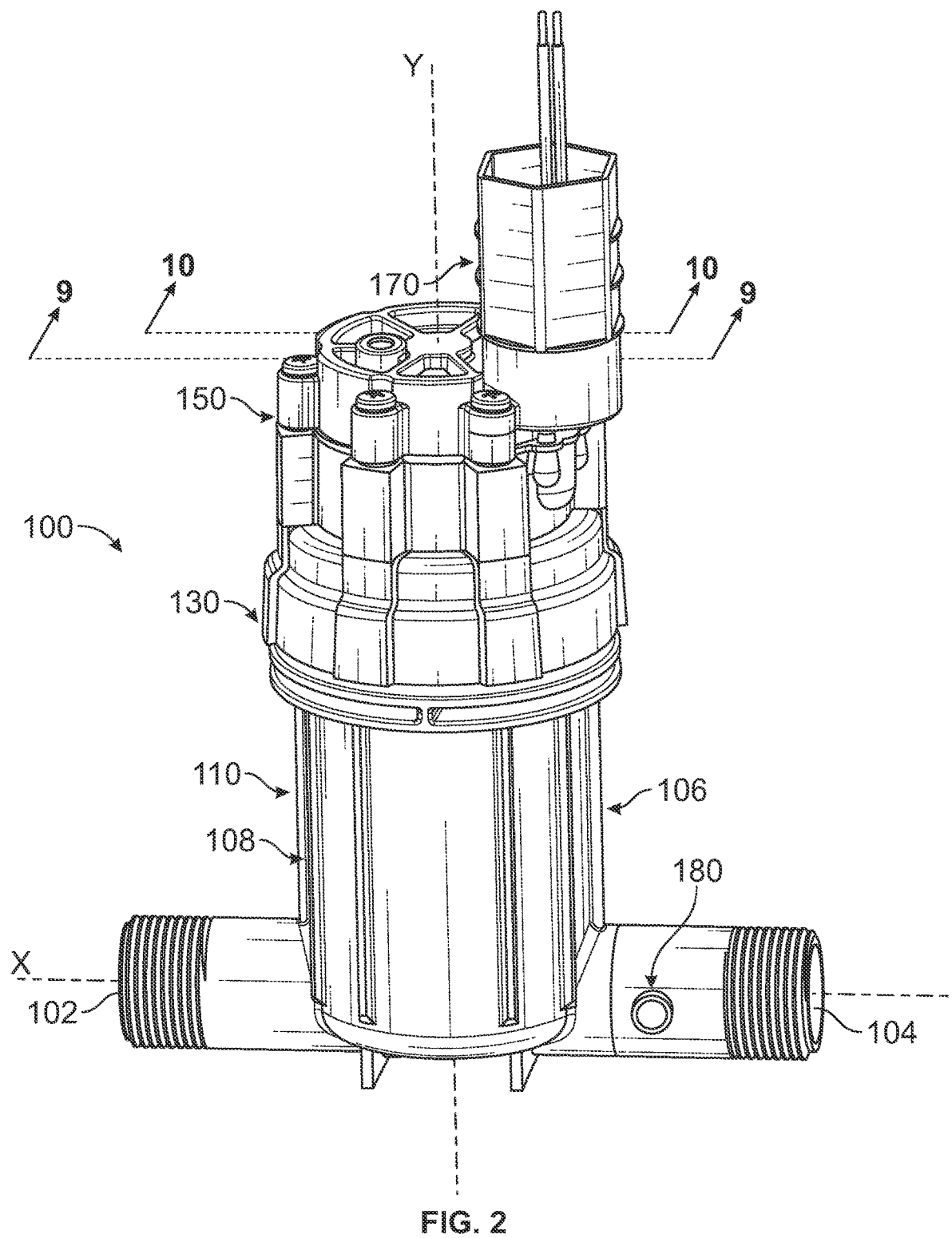
FIG. 2 is a perspective view of a control zone device.
Figure 3:
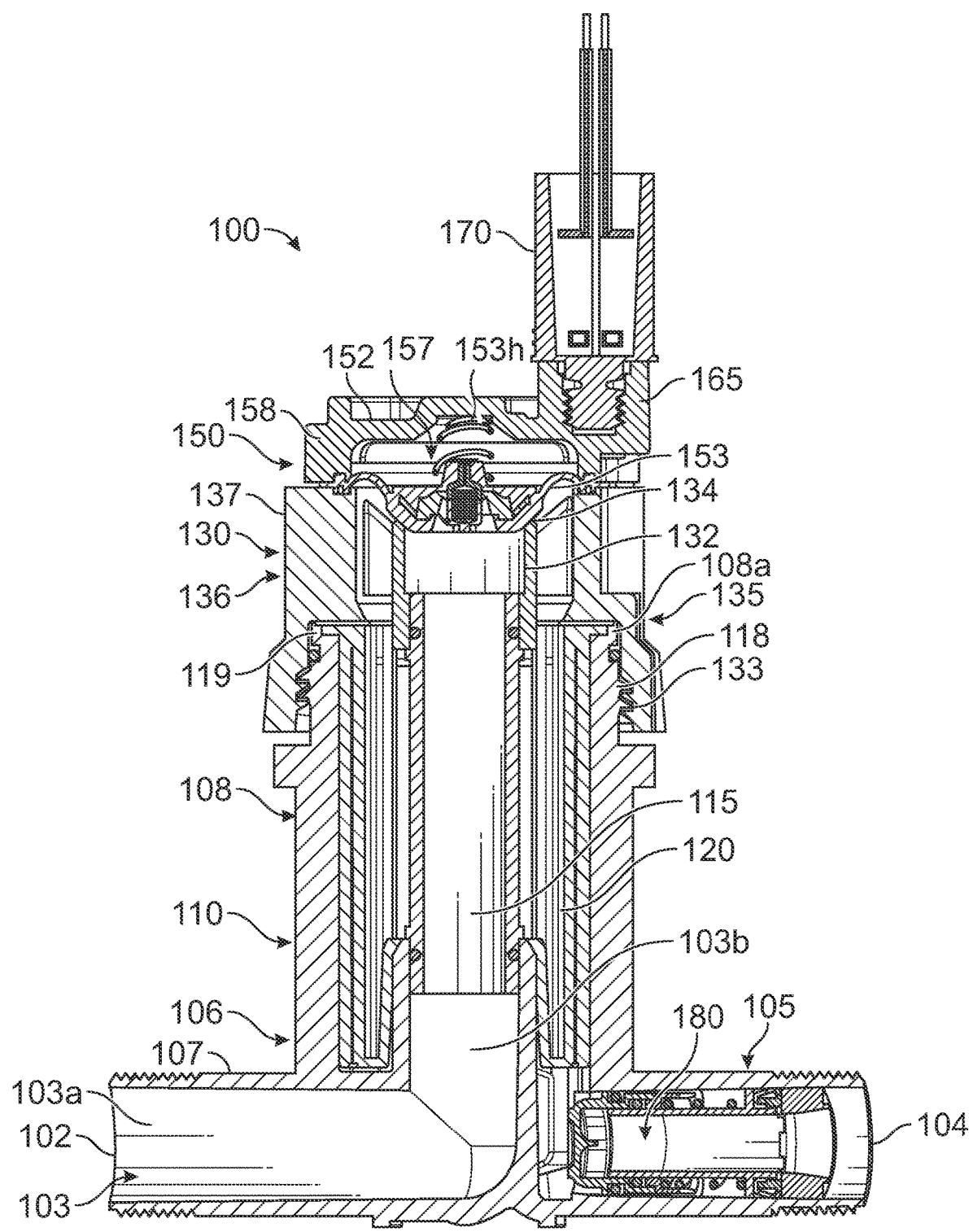
FIG. 3 is a central cross-section view of the control zone device of FIG. 2.
Figure 4:
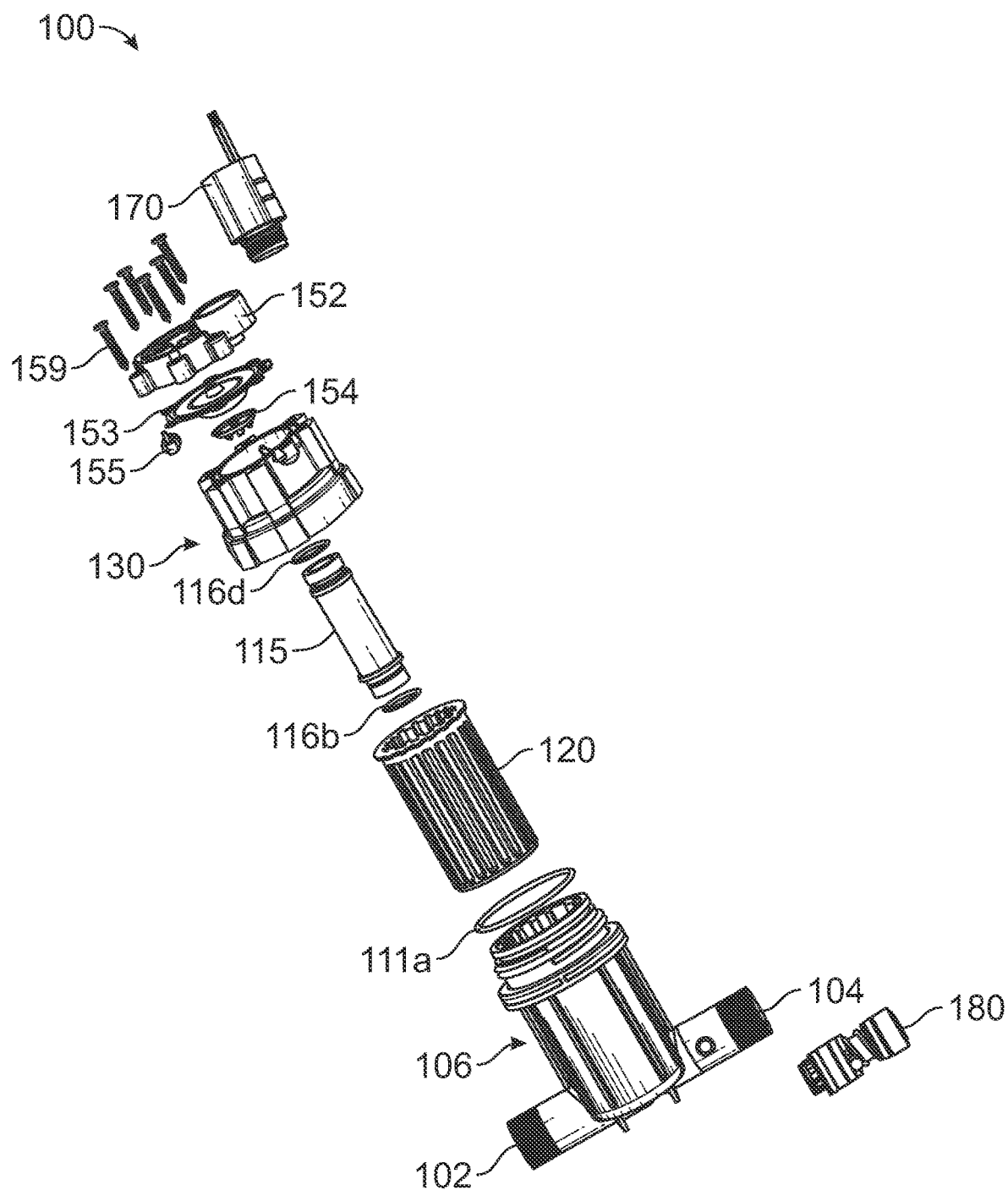
FIG. 4 is an exploded view of the control zone device of FIG. 2.

With reference to FIGS. 2-4, there is illustrated a control zone device 100. The control zone device 100 includes a main body 106, an inlet 102, an outlet 104, a filter 120, a valve 150, an interface cap 130, and a pressure regulator 180. The control device 100 is an all-in-one device that facilitates space conservation and efficient installation.

Figure 5:
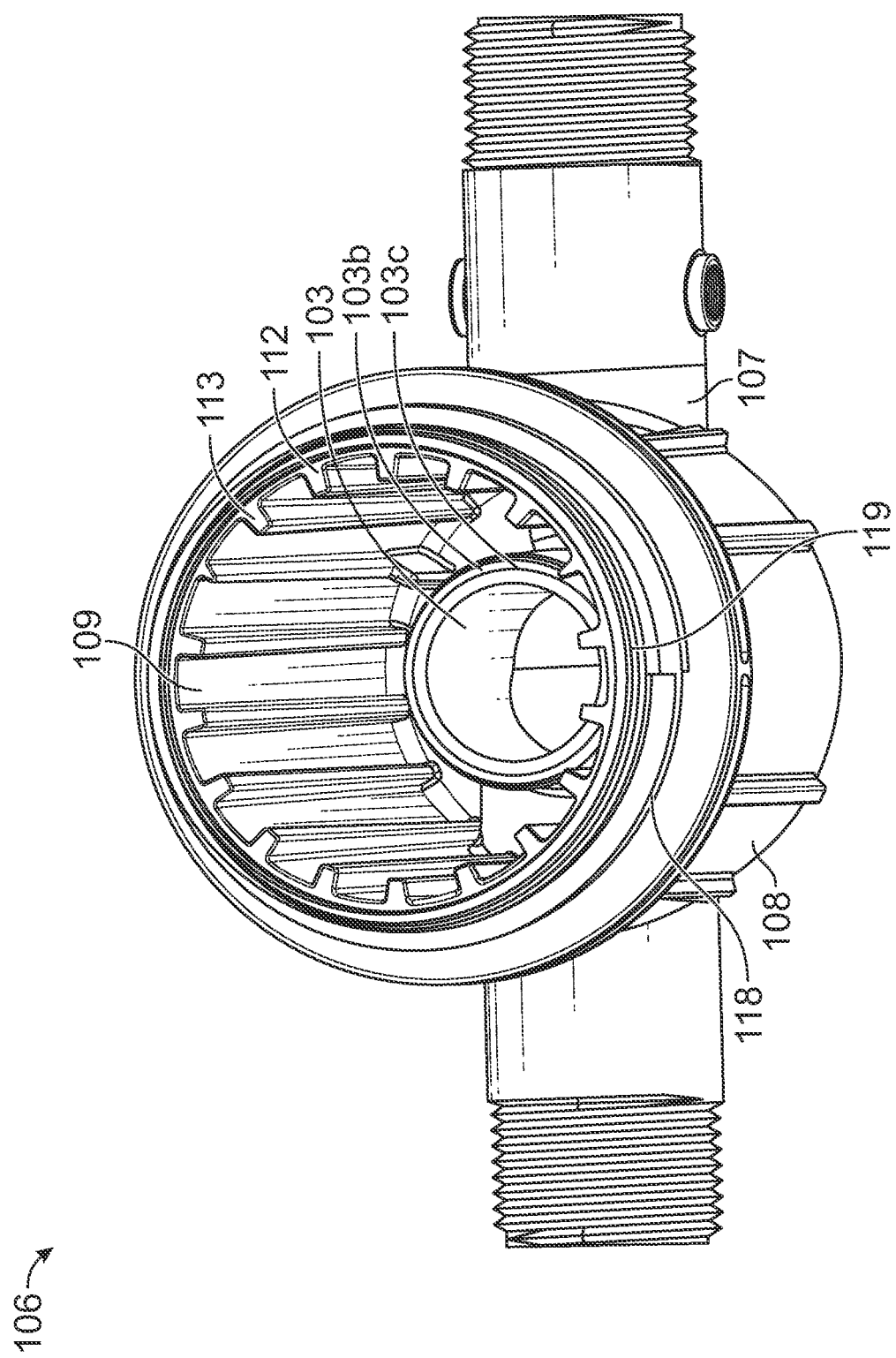
FIG. 5 is a top perspective view of a main body of the control zone device of FIG. 2.
Figure 6:
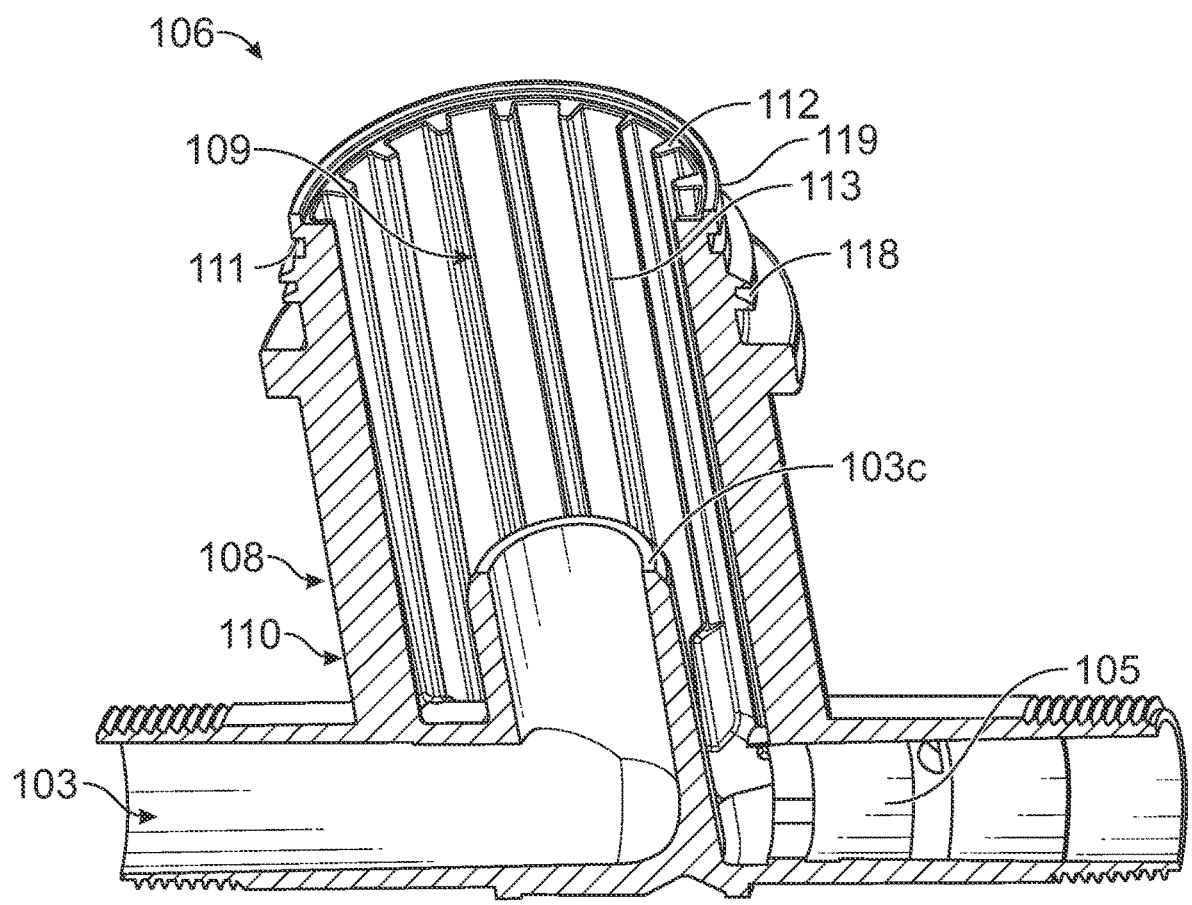
FIG. 6 is a central cross-section view of the main body of the control zone device of FIG. 2.

As shown in FIGS. 5 and 6, the main body 106 has a base portion 107 and a body portion 108 that may be formed as a single piece. The body 106 is easier to repair, manufacture, and assemble into the control zone device 100. The inlet 102 and the outlet 104 are disposed at opposite sides of the base portion 107, while the body portion 108 extends generally perpendicularly away from the base 107. The body portion 108 has a generally cylindrical shape and defines an interior chamber or cavity 109. The body portion 108 functions, in part, as a filter housing 110 for a filter 120 (e.g., a basket filter).

As illustrated in FIGS. 2-3, a valve 150, such as a solenoid valve, is stacked on an open end 108a of the body portion 108 of the main body 106. The valve 150 is removably attached to the body portion 108 via an interface cap 130. Thus, the valve 150 can be removed from the control zone device 100 in order to clean or replace the basket filter 120 or replace or conduct maintenance on the valve 150. The base portion 107 further includes a pressure regulator 180 upstream of the device outlet 104. Accordingly, water flow is controlled by a valve 150, filtered by the filter 120, and pressure regulated by the pressure regulator 180 in a single device.

At the base portion 107, the inlet 102 and the outlet 104 are configured for connection to conduits, such as those typically found in a valve box for an irrigation system. As illustrated, the inlet 102 includes external threads for cooperating with internal threads on an upstream conduit end, while the outlet 104 includes external threads for cooperating with internal threads on a downstream conduit end.

Instead of threading, other attachment methods may be used, such as gluing, clamping, or welding. In addition, the inlet 102 and outlet 104 may include internal threads instead of external threads.

The base portion 107 further defines an inlet passage 103 and an outlet passage 105. At the center of the base portion 107, the inlet passage 103 turns into the body portion 108 so that fluid passes from a lateral portion 103a of the inlet passage 103 to a longitudinal portion 103b of the inlet passage 103 that extends within the body portion 108 and filter housing 110 of the body 106. The longitudinal portion 103b is sized to receive a central flow tube 115 that delivers water from the inlet passage 103 to the valve 150. The flow tube 115 extends from the longitudinal portion 103b of the inlet passage 103 to the interface cap 130.

Figure 7:
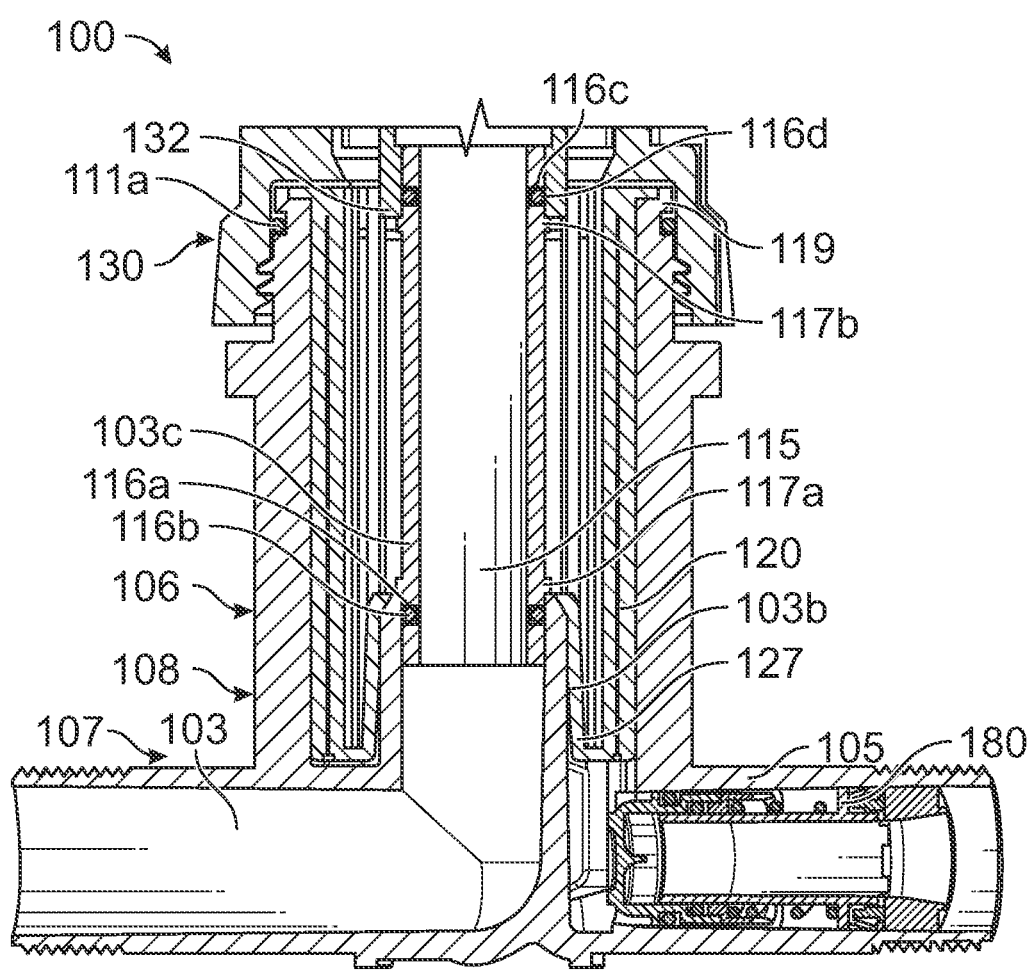
FIG. 7 is an enlarged portion of the central cross-section view of the control zone device of FIG. 2.
Figure 8:
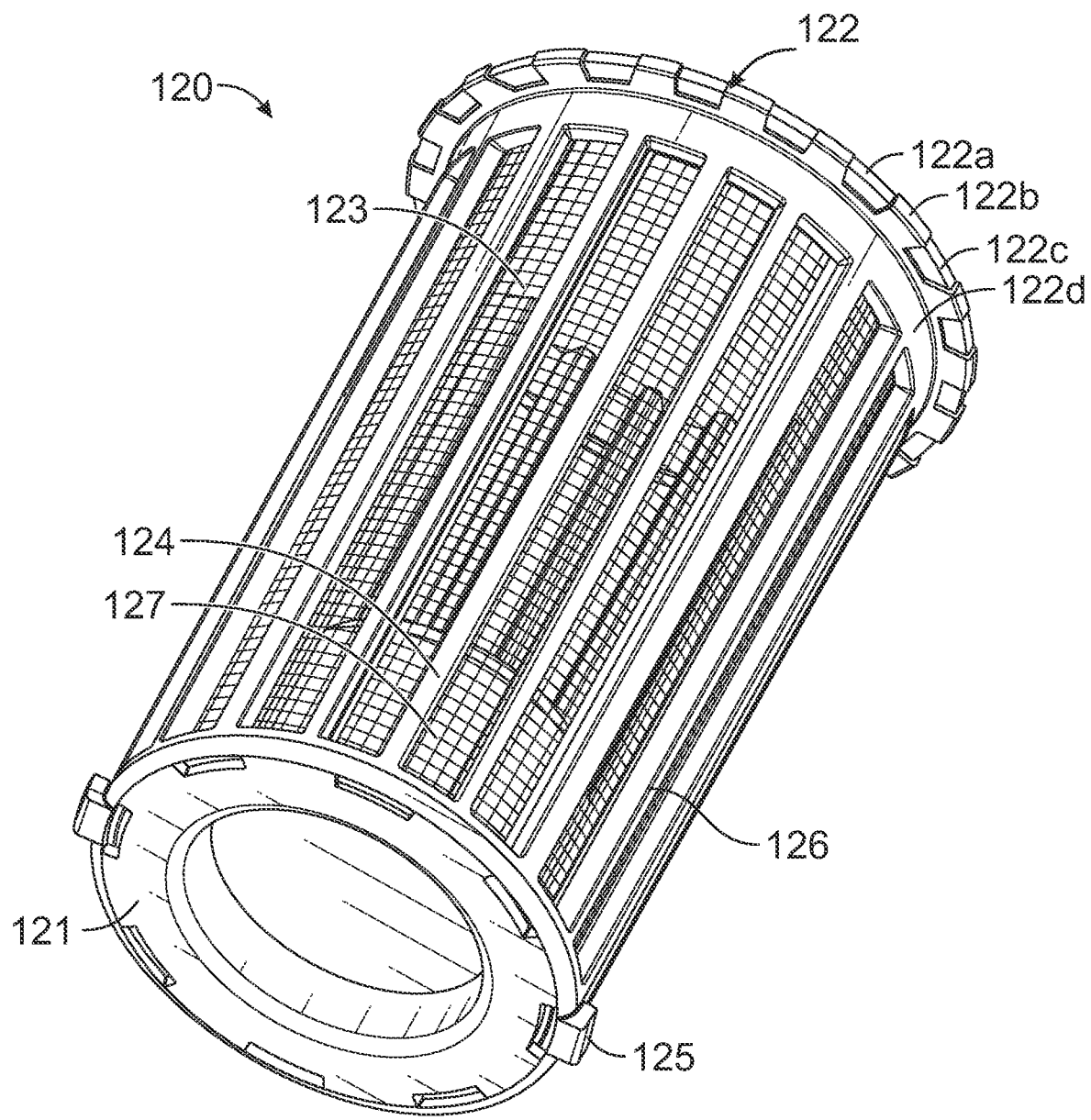
FIG. 8 is a perspective view of a filter of the control device of FIG. 2.

In the illustrated embodiment, the flow tube 115 has a first end sealingly received in the longitudinal portion 103b of the inlet passage 103, such as with a friction fit. As illustrated in FIG. 7, the first end of the flow tube 115 may alternatively or additionally include an annular o-ring groove 116a for an o-ring seal 116b that seals between the inner surface of the longitudinal portion 103b of the inlet passage 103 and the o-ring groove 116a of the flow tube 115.

The second end of flow tube 115 is sealingly received by a central inner tube 132 of the interface cap 130. For instance, the flow tube 115 and the central tube 132 may form a friction fit seal. As illustrated, the second end of the flow tube 115 may alternatively or additionally include an annular o-ring groove 116c for an o-ring seal 116d to seal between an inner surface of the central tube 132 of the interface cap 130 and the o-ring groove 116c of the flow tube 115. Alternatively, the o-ring grooves may be on the longitudinal portion 103b and central tube 132. Further, the flow tube 115 may be sealed against the longitudinal portion 103b and central inner tube 132 via a friction fit without use of any o-rings. In other configurations, the flow tube 115 may be sized to receive the longitudinal portion 103b of the inlet passage 103 and the central tube 132.

In the illustrated embodiment, the flow tube 115 is not permanently fixed to the device and simply slides in and out of the longitudinal portion 103b and central tube 132. However, by other approaches the flow tube 115 may be permanently fixed to either the longitudinal portion 103b or the central tube 132 of the interface cap 130. For instance, the parts may be welded together, or the flow tube 115 and the main body 106 or the flow tube 115 and the interface cap 130 may be a single piece.

As illustrated in FIG. 7, there may also be a projection or ledge at each end of the flow tube 115 to maintain the flow tube 115 in the correct position within the control zone device 100. For instance, a projection 117a at the first end may be an annular projection configured to abut or seat on a terminal end 103c of the longitudinal portion 103b of the inlet passage 103 so that the flow tube 115 does not slide down further into the inlet passage 103 and is maintained in the correct position. The projection 117a may also provide further sealing between the flow tube 115 and the inlet passage 103. A ledge 117b at the second end may also be an annular projection configured so that the central tube 132 of the interface cap 130 abuts or seats on the ledge 117b. The ledge 117b may also provide further sealing between the flow tube 115 and the central tube 132 and assists in maintaining the interface cap 130 in position. It also allows the interface cap 130 to press the flow tube 115 downwards to provide enhanced sealing between the projection 117a and the terminal end 103c of the inlet passage 103.

With reference to FIGS. 5-8, the body portion 108 and filter housing 110 are configured to house the filter 120. The filter 120 includes a filter body 126 with an annular base 121. The annular base 121 has tabs 125 that extend radially from the annular base 121, and each tab 125 fits between two of the ribs 113. The ribs 113 guide the filter 120 into the housing 110 and hold the filter 120 against rotational movement. An inner annular wall 127 of the filter body 126 extends into the filter from an inner edge of the annular base 121. The inner annular wall 127 has a slightly larger inner diameter than the outer diameter of the longitudinal portion 103b of the inlet passage 103 so that the inner annular wall 127 of the filter 120 slides onto the outside of the longitudinal portion 103b with a friction fit to form a seal.

The filter 120 has supports 124 extending longitudinally from the annular base 121 to a rim 122 at the other end of the filter 120. The supports 124 may be equally spaced from one another about the diameter of the annular base 121 and extend from a lower ring 122d adjacent the rim 122. The annular rim 122 includes a first radially extending flange 122a and a second radially extending flange 122b which defines notches 122c equally spaced about the perimeter of the flange 122b and flange 122a. The flange 122a allows the filter body 126 to seat on a recessed annular ledge 112 of the body portion 108 of the main body 106. The filter 120 includes a screen 123 to filter debris from the water flowing through the filter 120.

With reference to FIGS. 3 and 4, the outlet passage 105 includes a pressure regulator 180. The pressure regulator 180 adjusts the pressure of the fluid prior to being emitted from the device 100. The type of pressure regulator may be any of several pressure regulators known in the art, such as pressure regulators in which a spring is deflected by fluid backpressure to close a valve of the pressure regulator to limit the flow of fluid through the regulator. The pressure regulator 180 is preinstalled in the control zone device 100 during manufacturing. However, the pressure regulator 180 is removable for service or replacement simply by pulling it out of the outlet passage 105. Alternatively, the pressure regulator 180 may be installed during installation of the control zone device 100 on site of the irrigation system.

Figure 12:
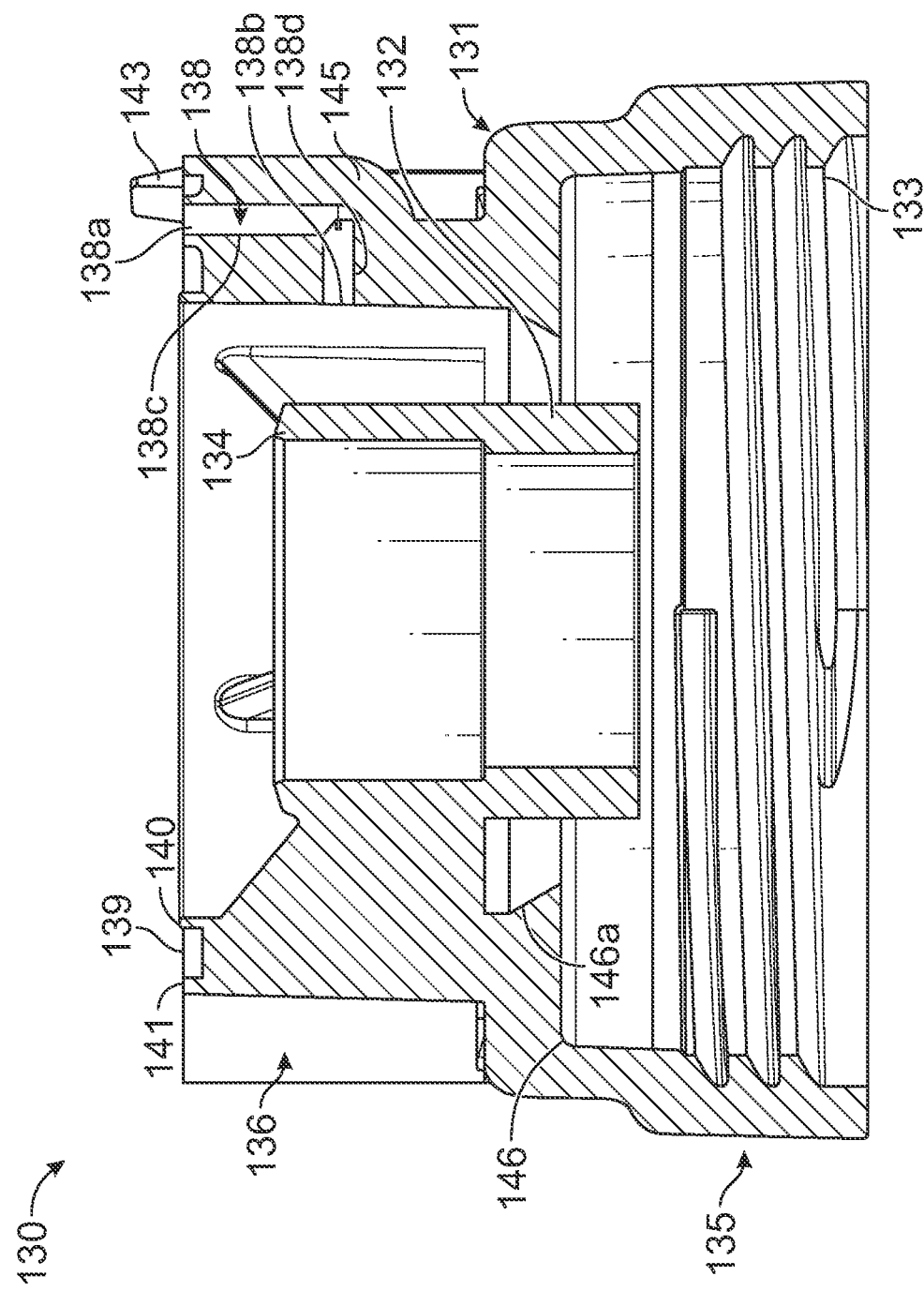
FIG. 12 is a central cross-section of the interface cap of the control zone device of FIG. 2.

With reference to FIGS. 3, 6, 9, and 10, the main body 106 includes external threading 118 at the body portion 108 for interfacing with internal threading 133 of the interface cap 130 (FIG. 12). The interface cap 130 (which may also be described as a coupling or collar) permits the valve 150 to be removably attached to the body portion 108 or the filter housing 110 of the control zone device 100. The interface cap 130 is also uniquely designed to provide an interface between the main body 106 of the device 100 and the valve 150. For example, the interface cap 130 is disposed between the valve 150 and the main body 106 and is configured to engage with the valve 150, the main body 106, and the flow tube 115 to allow the valve 150 to control flow of water from an inflow side 195 of the device 100 to an outflow side 196 of the device 100.

Figure 9:
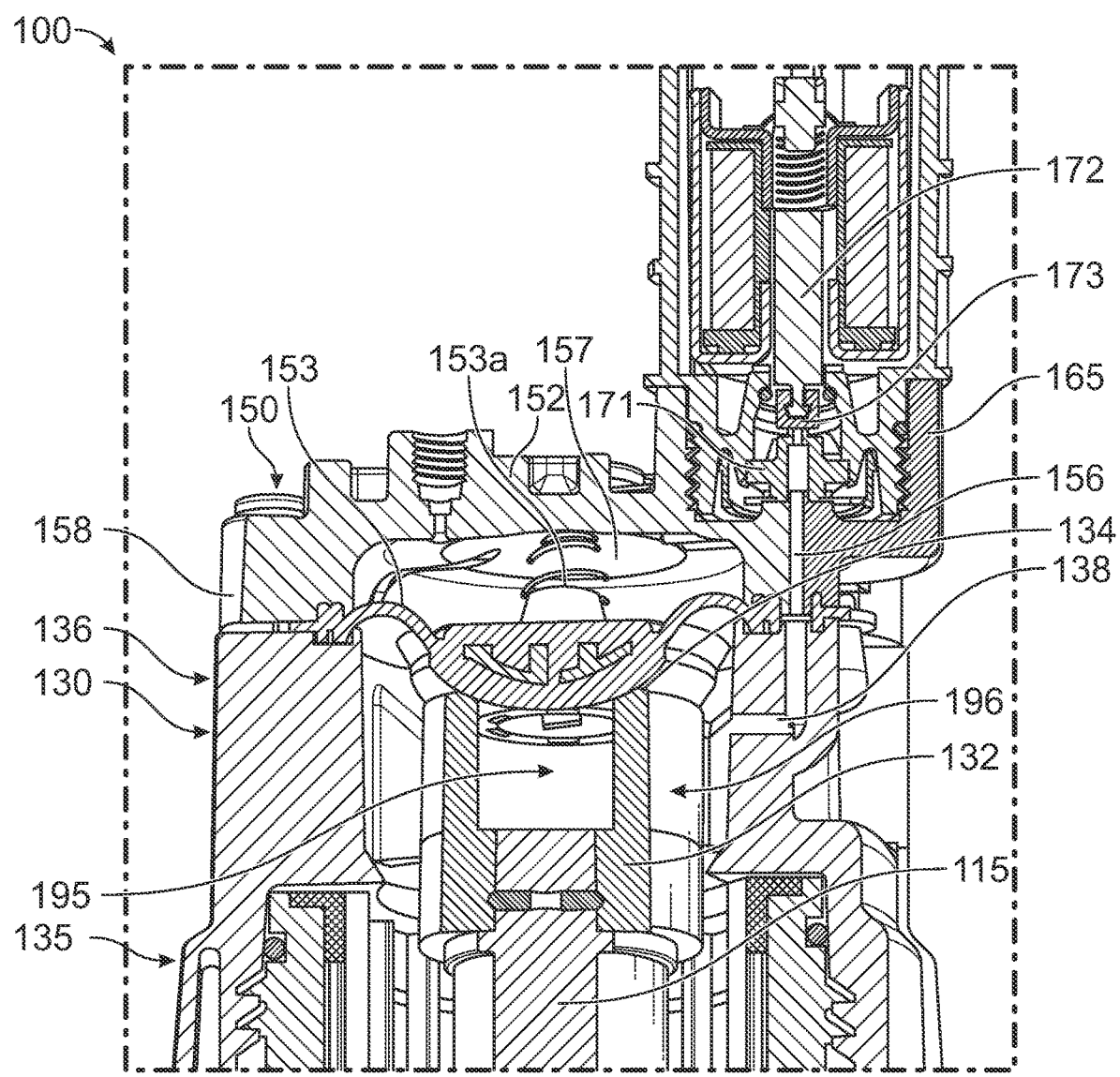
FIG. 9 is a cross-section view of the control zone device of FIG. 2 taken along section line 9-9 of FIG. 2.
Figure 10:
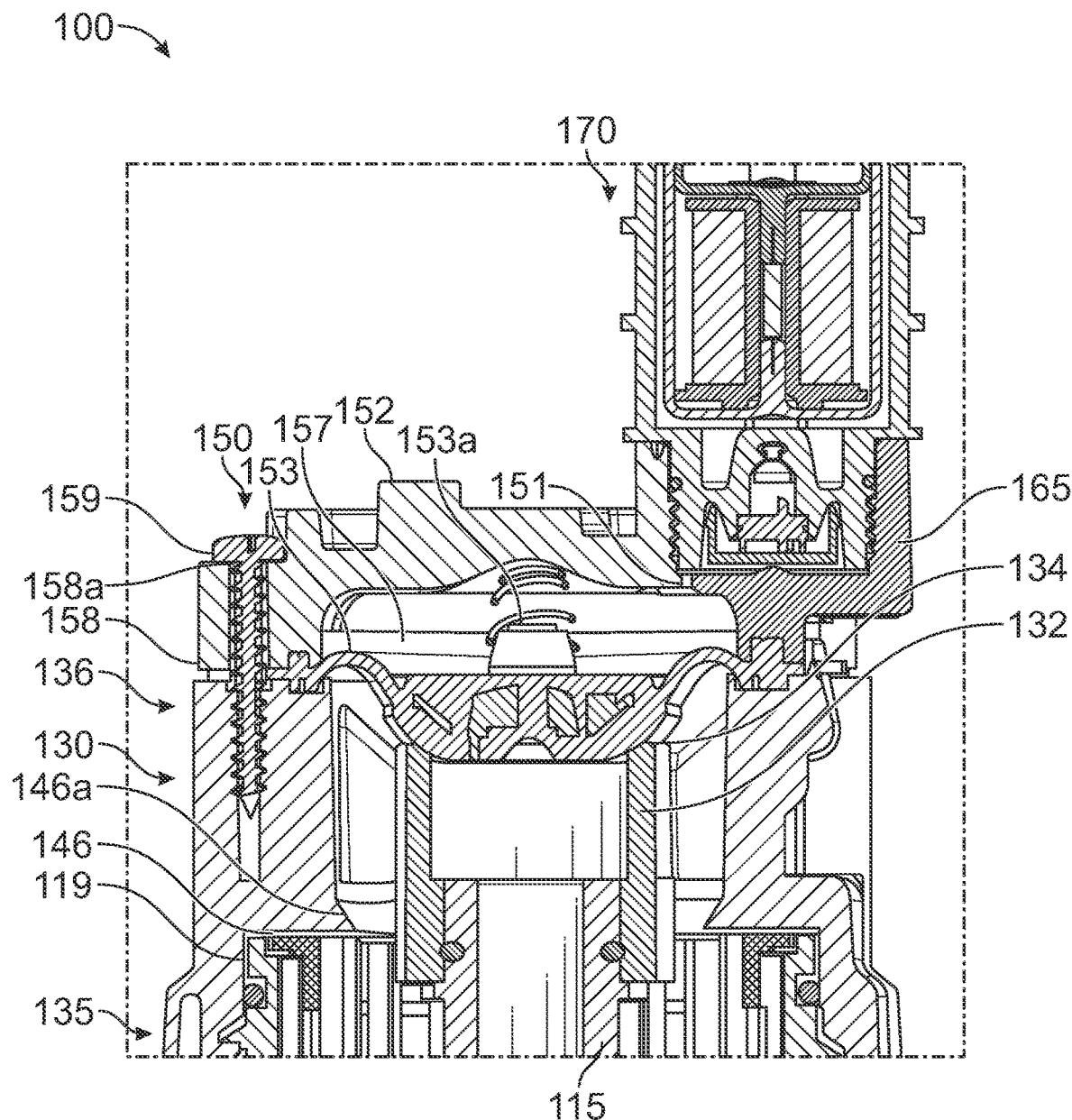
FIG. 10 is an enlarged portion of a cross-section view of the control zone device of FIG. 2 taken along section line 10-10 of FIG. 2.

With reference to FIGS. 4, 9, and 10, the valve 150 includes a valve body or bonnet 152 and a diaphragm 153. The valve body 152 and the diaphragm 153 define a pressure chamber 157. The diaphragm 153 includes a diaphragm insert 154 for support and a filter 155 for filtering water that flows into the pressure chamber 157. The diaphragm 153 defines a central passage 153a where the filter 155 attaches for fluid to pass through the diaphragm 153 to the pressure chamber 157 from the inflow side 195 of the device. In some embodiments, a spring 153h may be in the pressure chamber 157 between the bonnet 152 and the diaphragm 153. The spring 153h provides additional pressure to close the diaphragm 153 and to be overcome when the fluid pressure on the inflow side 195 opens the valve.

The valve body 152 includes a solenoid socket or solenoid bowl 165 to attach a solenoid 170 to the valve 150. The solenoid 170 controls the opening and closing of the valve 150. A vent passage includes a first segment, or pressure chamber vent passage 151, that extends from the pressure chamber 157 to the solenoid bowl 165 and a second segment, or solenoid vent passage 156, that extends from the solenoid bowl 165 to a downstream region of the valve body 152. Further details regarding the valve 150, the interface cap 130, and the main body 106 are described further below.

With reference to FIGS. 11-14, the interface cap 130 may be formed integrally as a single piece. For instance, the interface cap 130 may be manufactured through injection molding or 3D printing. By other approaches, for example as described further below with respect to control zone devices 200 and 300, an interface cap may include two pieces connected together to form the cap. In the illustrated embodiment, the interface cap 130 is a single piece having a filter portion 135 that is removably attached to the body portion 108 of the main body 106 and a valve portion 136 that is removably fixed to the valve 150.

The interface cap 130 includes a body 131 having a central opening or passage 131a. The valve portion 136 includes a plurality of radially extending ribs 137 extending about the body 131. The ribs 137 have a rectangular cross-section, though other geometries (such as rounded) are possible, and include countersunk holes 137a to receive screws or other fasteners. The ribs 137 and holes 137a are dimensioned and positioned on the cap 130 to align with corresponding bosses and holes on a bonnet of a valve. For instance, the ribs 137 align with bosses 158 around the perimeter of the bonnet 152, and the holes 137a align with holes 158a in the bosses 158 of the bonnet 152 (FIG. 10). This allows screws 159 to be inserted into the holes 158a of the bosses 158 on the bonnet 152 and into the holes 137a on the interface cap 130 to secure the bonnet 152 to the interface cap 130 at the valve portion 136. This configuration allows a user to remove the bonnet 152 from the interface cap 130 if needed for maintenance or replacement. It also allows the possibility of changing out the bonnet 152 or just the diaphragm 153 for different types of valves or diaphragm depending on desired performance.

Figure 11:
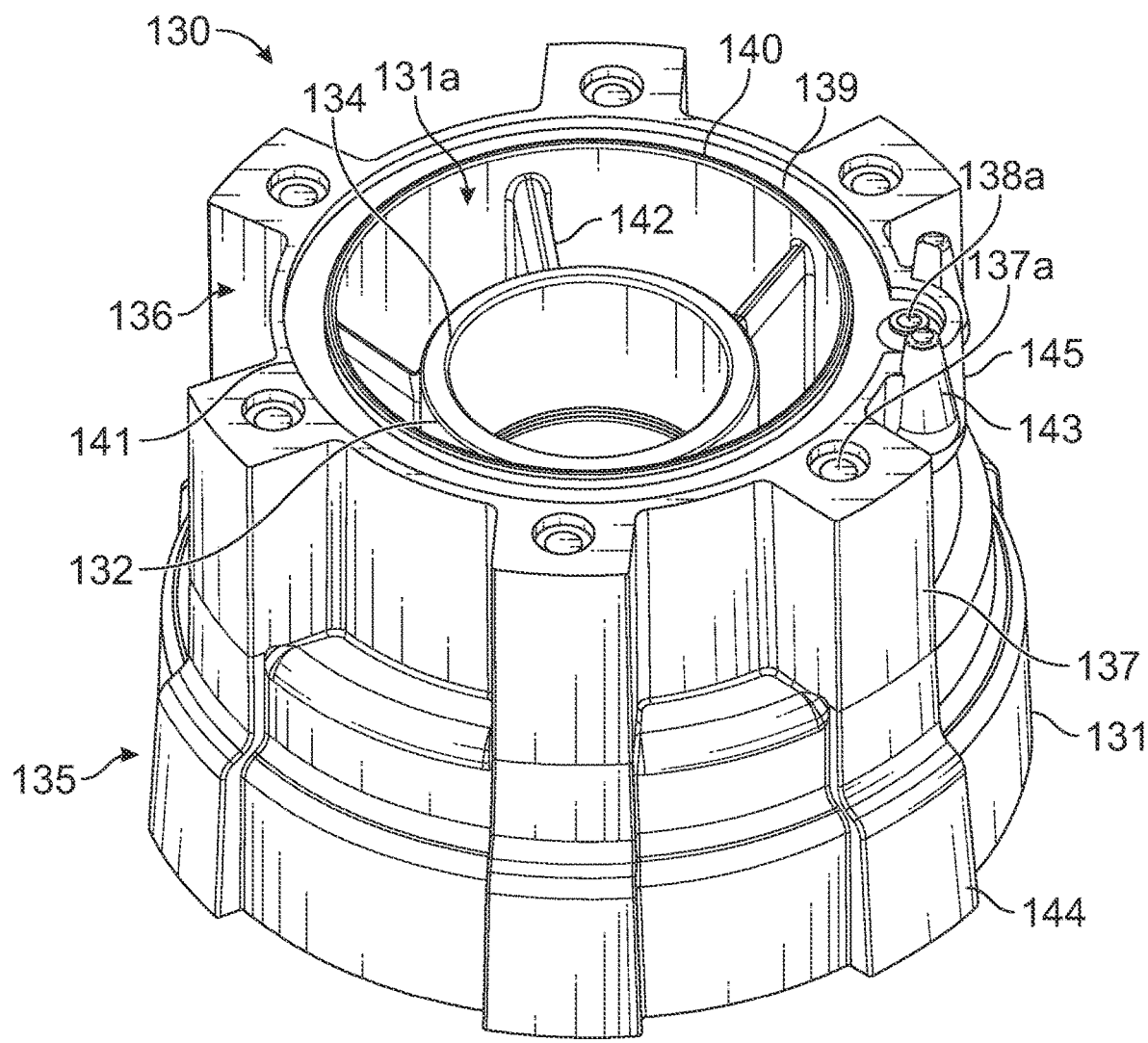
FIG. 11 is a perspective view of an interface cap of the control zone device of FIG. 2.
Figure 21A:
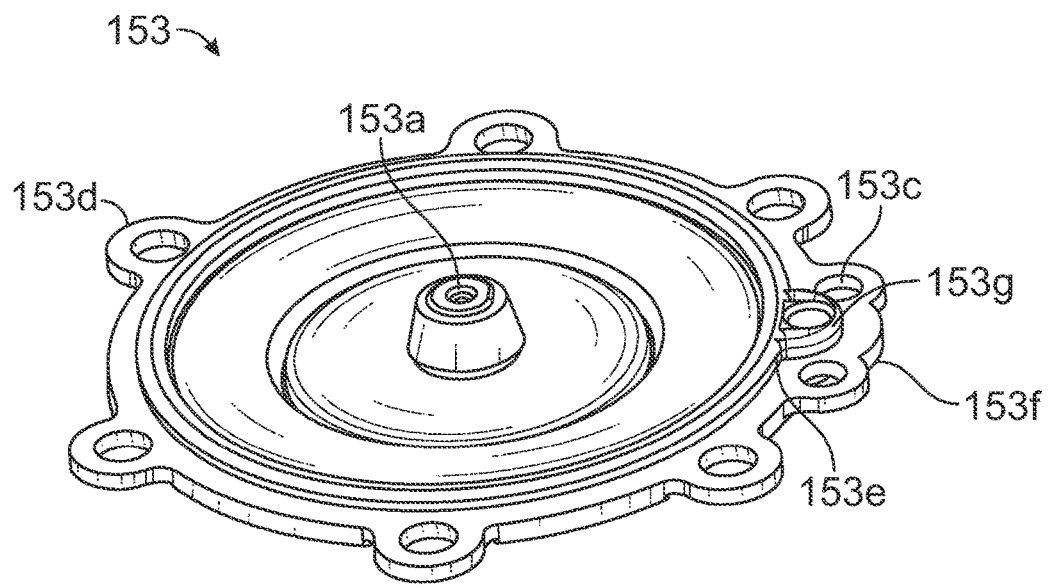
FIG. 21A is a top perspective view of the diaphragm of the control zone device of FIG. 2.

As shown in FIGS. 9-11, the central passage 131a is circular and sized to receive a substantial portion of a diaphragm 153 of the valve 150. The valve portion 136 includes a raised inner rim 140, an upstanding or raised outer rim 141, and an annular recess 139 therebetween. The raised outer rim 141 extends outwardly to form the top surfaces of the ribs 137. The annular recess 139 allows a diaphragm of a valve to be retained by the interface cap 130. For instance, a corresponding annular bead 153e or ridge about the perimeter of the diaphragm 153 (FIGS. 21A-21C) sits in the annular recess 139 of the valve portion 136.

With reference to FIGS. 11 and 12, a boss 145 extends radially outwardly from the valve portion 136. The boss 145 defines a segment of a vent passage 138 in the interface cap 130. The vent passage 138 is positioned to align with a corresponding passage on the bonnet 152 and receive vented fluid from the solenoid bowl 165 of the bonnet 152. Fluid enters the vent passage 138 through an inlet 138a, flows through the vent passage 138, and exits the vent passage 138 from an outlet 138b into a downstream portion of the central passage 131a of the interface cap 130. The interface passage 138 includes an axial segment 138c, an elbow section, and a radial segment 138d.

Where the boss 145 extends axially from the valve portion 136, the outer rim 141 and the annular recess 139 of the valve portion 136 extend radially around the inlet 138a. In addition, the inlet 138a is raised axially beyond the annular recess 139. In some embodiments, the inlet 138a is substantially level with the inner rim 140 and the outer rim 141 of the valve portion 136. The inlet 138a, the outer rim 141, and the annular recess 139 are configured to cooperate with a corresponding vent hole 153b defined by the diaphragm 153 to orient and help retain the diaphragm 153 at the inlet 138a. More specifically, a bead 153g of the diaphragm 153 surrounds a hole 153b through the diaphragm 153. The inlet 138a is received within the hole 153b of the diaphragm 153.

Figure 20:
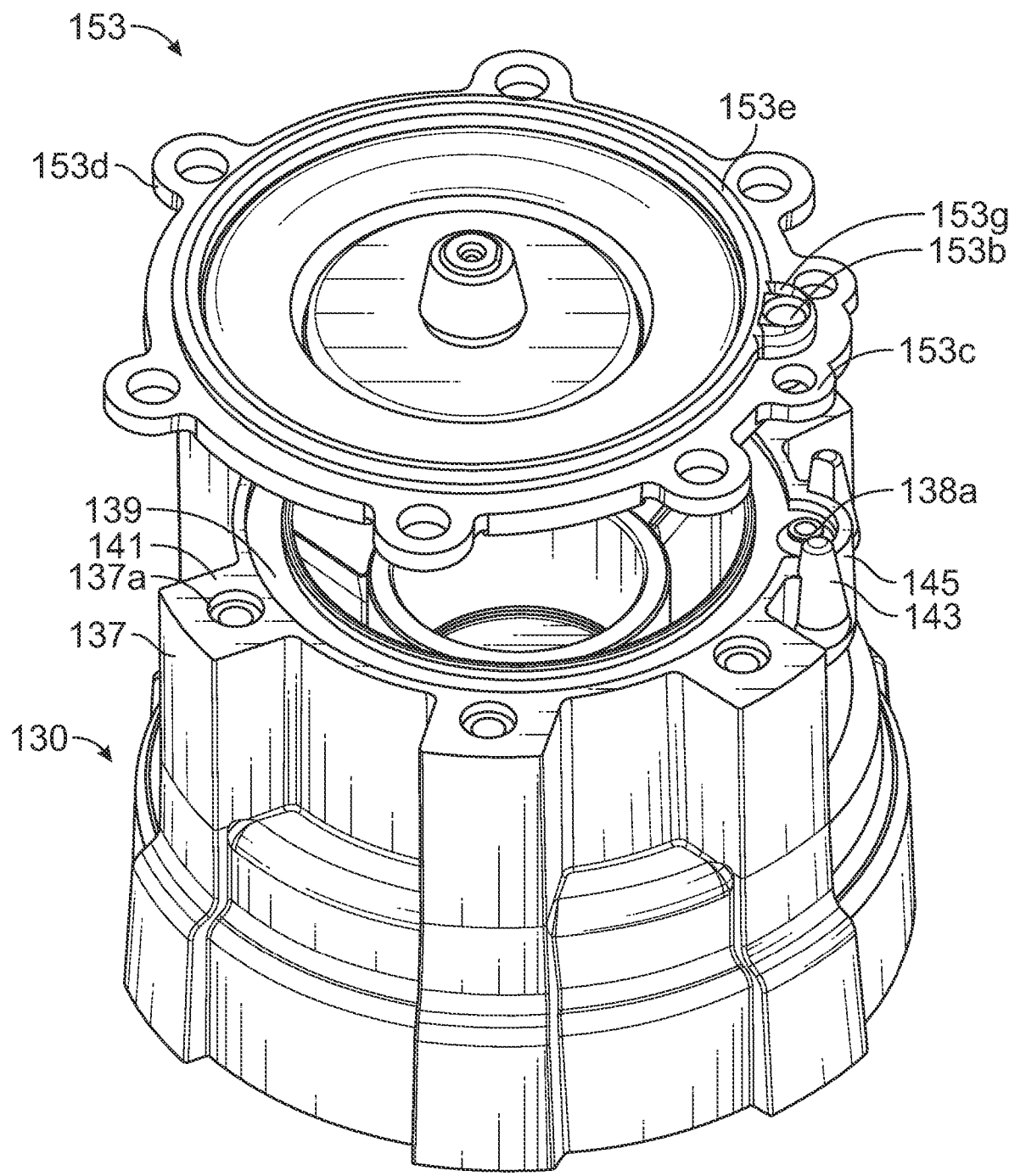
FIG. 20 is a partial exploded view of the control zone device of FIG. 2 showing the diaphragm and the interface cap.

The interface cap 130 may also include pins 143 flanking the boss 145 for locating and holding the diaphragm 153 in position with respect to the inlet 138a of the interface cap. The pins 143 have a generally conical shape and a rounded tip extending axially beyond the rim 141 of the interface cap 130. These pins 143 extend through two corresponding holes 153c of the diaphragm 153 (FIG. 20).

Figure 13:
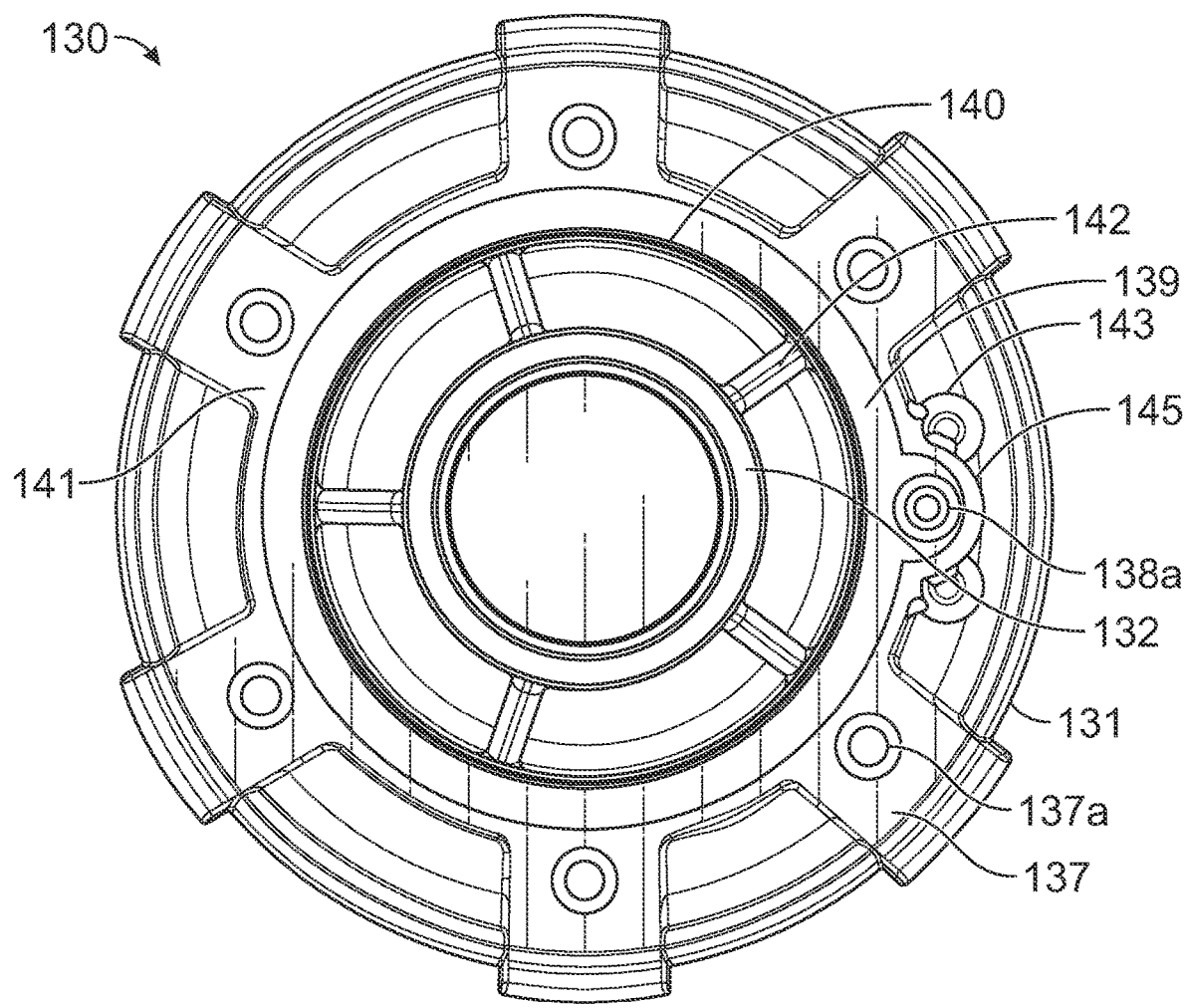
FIG. 13 is a top view of the interface cap of the control zone device of FIG. 2.

The central inner tube 132 is open on both ends and is connected to the body 131 of the interface cap 130 via a plurality of spokes 142. For instance, the illustrated embodiment includes five spokes 142 spaced equally around the central inner tube 132, as shown in FIG. 13. As mentioned above, one end of the central inner tube 132 is sized to sealingly receive an end of the flow tube 115, together forming a conduit for delivering fluid from the inlet passage 103 to the valve 150. The other end of the central inner tube 132 is the valve seat 134 of the valve 150. The diaphragm 153 of the valve 150 seats against the valve seat 134 when in a closed position and is spaced from the valve seat 134 when in an open position (as detailed more fully below).

As illustrated in FIGS. 11 and 12, the central inner tube 132 is recessed within the central opening 131a of the interface cap 130, allowing space for the diaphragm 153 to operate. The central inner tube 132 extends axially into the filter portion 135 of the interface cap 130. The central inner tube 132 may additionally have a stepped interior dividing an interior into two sections having different wall thickness and internal diameters. For instance, the inner diameter of the central inner tube 132 where the flow tube 115 is received may have a slightly smaller diameter than the inner diameter of the central inner tube 132 adjacent the valve seat 134 in order to snugly receive the flow tube 115.

The filter portion 135 of the interface cap 130 is generally cylindrical with a larger outer diameter than the valve portion 136. In addition, the central passage 131a of the interface cap 130 has a larger diameter in the filter portion 135 than in the valve portion 136. The diameter of the valve portion 136 is sized to align with the diameter of the valve body or bonnet 152 of the valve 150, while the diameter of the filter portion 135 may be sized to receive the body portion 108 of the main body 106 of the control zone device 10. Specifically, the filter portion 135 of the interface cap 130 includes internal threading 133 which cooperates with external threading 118 on the main body 106 to removably attach the interface cap 130 to the main body 106. Other attachment methods can be used between the interface cap 130 and the main body 106 besides threading. For instead, the interface cap 130 may include flanges radially extending from the perimeter of the cap 130 which align with corresponding flanges radially extending from the perimeter of the main body, the flanges including openings for receiving screws or other fasteners. A similar configuration is described further below with respect to FIGS. 62 and 63.

Figure 14:
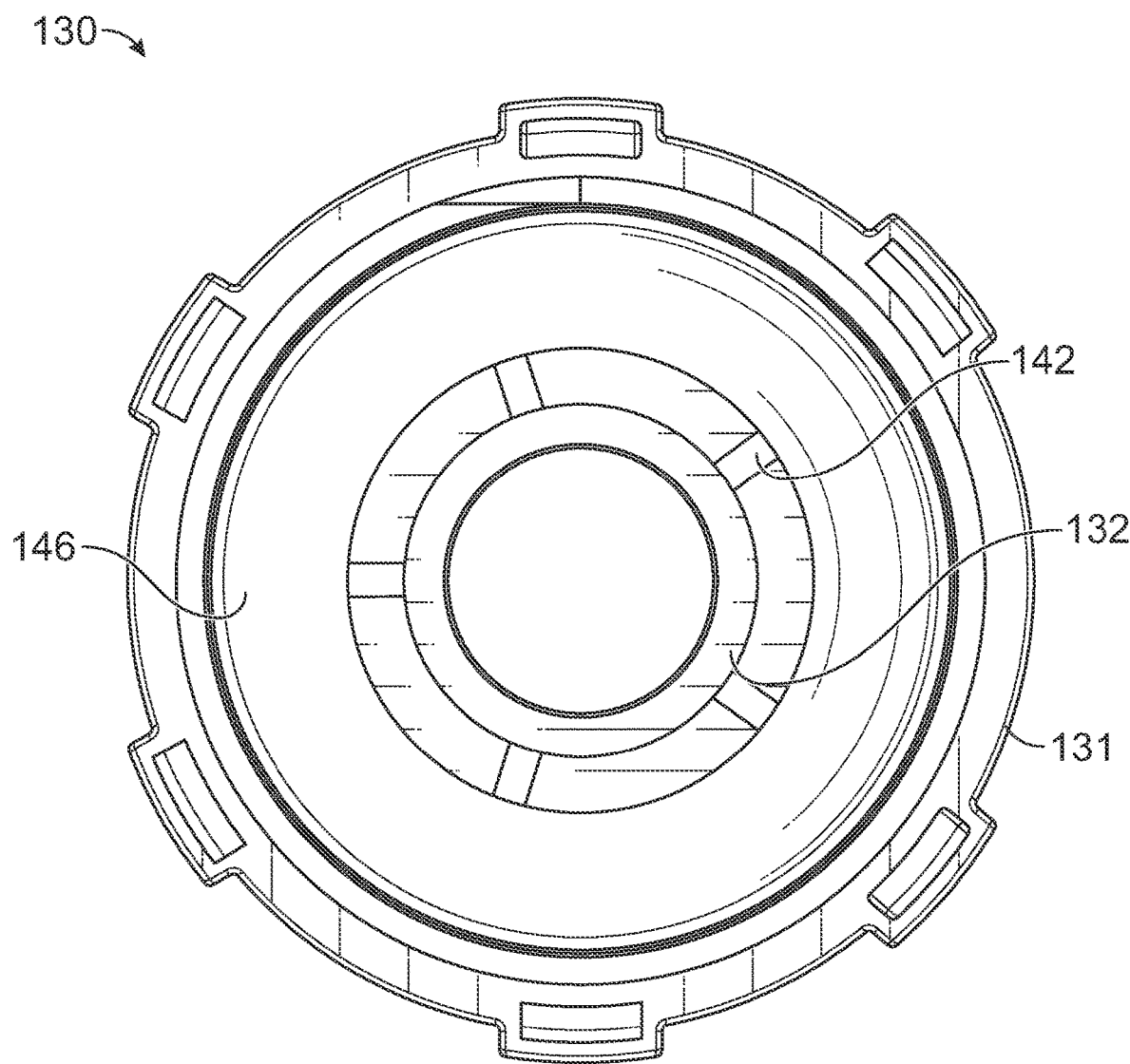
FIG. 14 is a bottom view the interface cap of the control zone device of FIG. 2.

With respect to FIGS. 12 and 14, the interface cap 130 may have a stepped outer profile, reducing the material needed to manufacture the interface cap 130. The ribs 137 on the valve portion 136 and further ribbing 144 on the filter portion 135 facilitate gripping of the interface cap 130 when attaching or removing the interface cap 130.

The stepped outer profile of the interface cap 130 forms, in part, a radial annular wall 146, forming a partial bottom to the filter portion 135 at the transition between the valve portion 136 and the filter portion 135. The radial annular wall 146 includes an inward angled surface 146a that protrudes radially inward toward the central opening 131a. The angled surface 146a funnels fluid into the filter 120. When the interface cap 130 is attached to the main body 106 of the control zone device 100, the radial annular wall 146 may seat on the rim 119 of the main body 106. Contact between the radial annular wall 146 and the rim 119 may be configured to contribute to sealing between the interface cap 130 and the main body 106. Alternatively, or additionally, the interface between the two components is sealed via an o-ring 111a fitted into an annular o-ring groove 111 just upstream of the rim 119.

Figure 16:
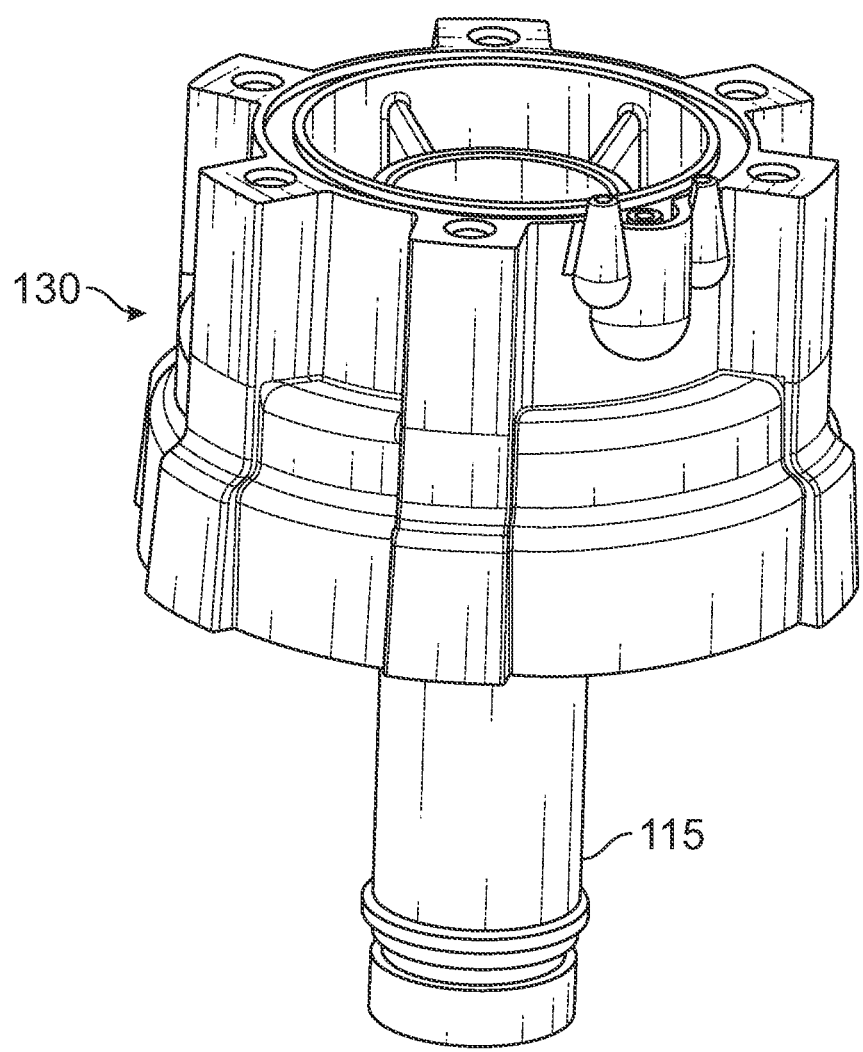
FIG. 16 is an alternative configuration of the interface cap of the control zone device of FIG. 2.
Figure 17:
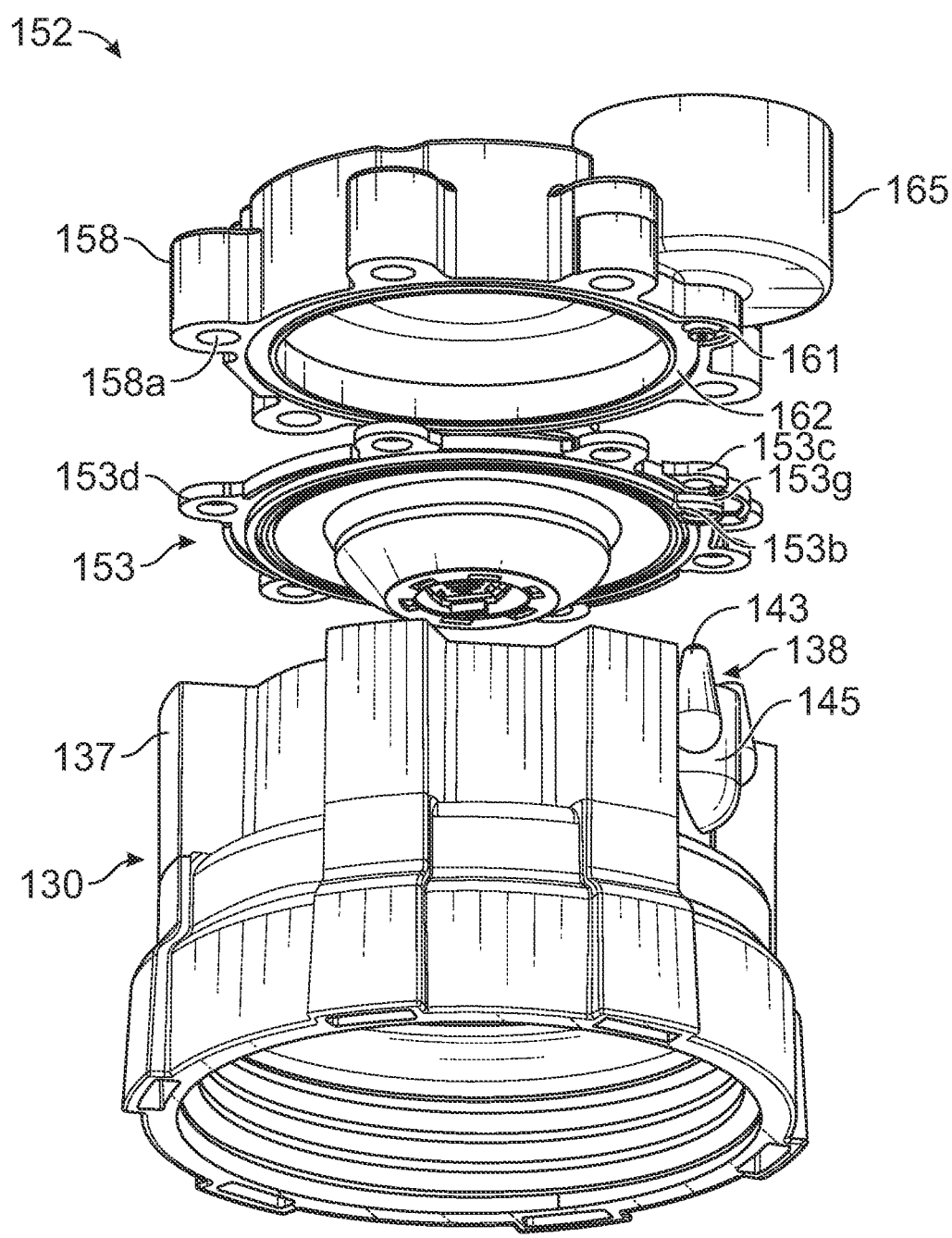
FIG. 17. is a partial exploded view of the control zone device of FIG. 2 showing the valve body, a diaphragm, and the interface cap.

As described above, the flow tube 115 is a separate piece connecting the central inner tube 132 of the interface cap 130 and the longitudinal portion 103b of the inlet passage 103 of the main body 106. Alternatively, as illustrated in FIG. 16, the interface cap 130 may include the flow tube 115 as part of the single piece construction of the interface cap 130. For instance, the flow tube 115 may be molded integrally to extend from the central inner tube 132 or may be welded to the central inner tube 132.

As noted above, the manner in which the interface cap 130 attaches to the valve 150 and the main body 106 of the control zone device 100 is advantageous. Specifically, the two different attachment mechanisms between the interface cap 130 and the valve 150 and the interface cap 130 and the main body 106 permit a compact configuration of the control zone device 100, while still enabling the interface cap 130 to be removed from the main body 106 without disturbing the valve.

Figure 15:
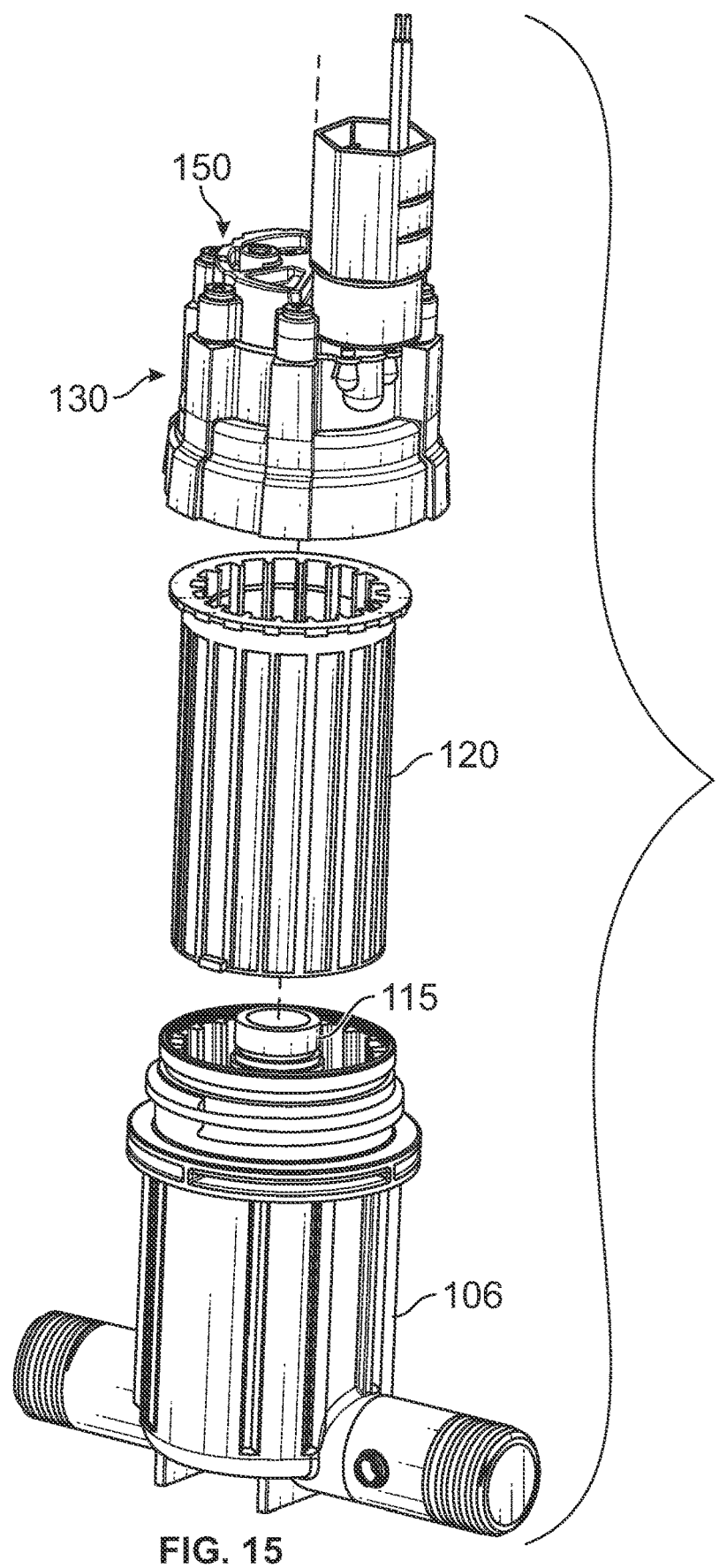
FIG. 15 is a diagrammatic illustration of the interface cap and valve body removed from the main body of the control zone device of FIG. 2 so that a filter can be removed from the control zone device.

As illustrated in FIG. 15, if a user would like to remove the filter 120 from the main body 106, for example, in order to clean or replace the filter 120, the user simply unscrews the interface cap 130 from the main body 106, while the valve 150 remains securely attached to the interface cap 130. In other words, detaching the interface cap 130 from the main body 106 does not disrupt the valve 150, leaving no need to rebuild the valve 150 each time a user cleans or replaces the filter 120. This eliminates any potential for the diaphragm to be damaged or misaligned which can negatively impact the function of the valve.

FIGS. 17-21E provide more detailed illustration of the structures of the valve bonnet 152, the diaphragm 153, and the interface cap 130. The diaphragm 153 includes a plurality of rounded tabs 153d extending radially from a perimeter of the diaphragm 153. The rounded tabs 153d define openings that align with both the openings 137a of the interface cap 130 and the openings 158a in the bosses 158 of the bonnet 152. Thus, when the bonnet 152 is screwed onto the interface cap 130, the screws 159 are driven through the bosses 158 of the bonnet 152, through the openings in the rounded tabs 153d of the diaphragm 153, and into the openings 137a in the ribs 137 of the interface cap 130 (FIG. 10). This construction fixes the perimeter of the diaphragm 153 in position so that the diaphragm 153 is securely sandwiched between the bonnet 152 and the interface cap 130.

Figure 21B:
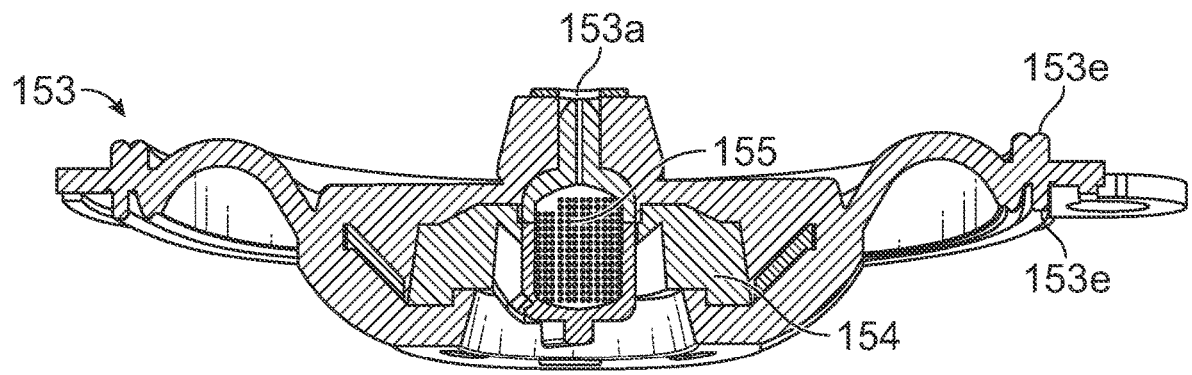
FIG. 21B is a central cross-section view of the diaphragm of the control zone device of FIG. 2.
Figure 21C:
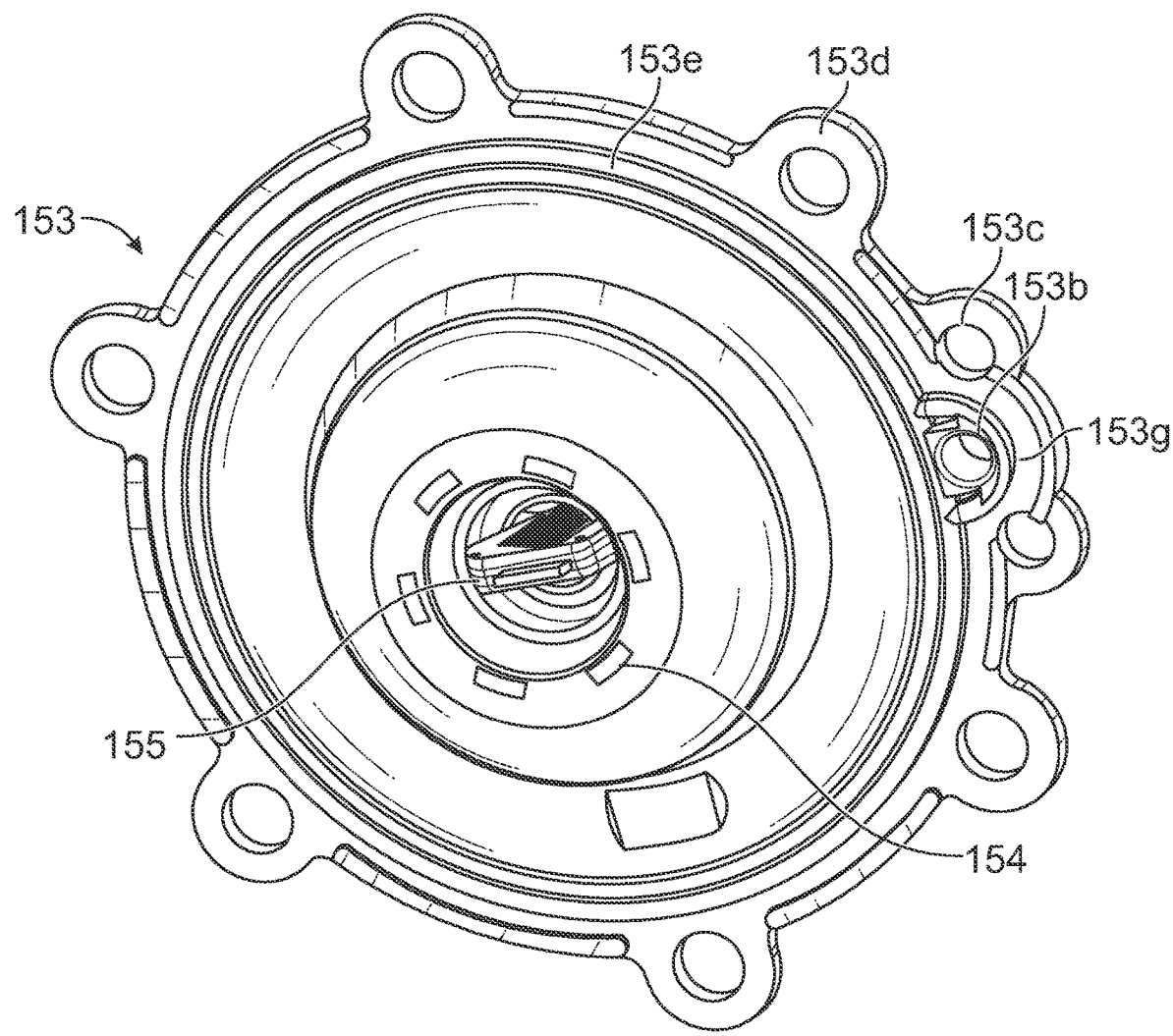
FIG. 21C is a bottom perspective view of the diaphragm of the control zone device of FIG. 2.

As noted above, the diaphragm 153 includes the annular bead 153e extending around a perimeter of the diaphragm 153 positioned inwardly from the tabs 153d. The annular bead 153e extends axially away from both sides of the diaphragm 153 (FIG. 21B). The annular bead 153e is retained by corresponding annular recesses 162, 139 of the bonnet 152 and the interface cap 130 (FIGS. 18 and 20), respectively.

The diaphragm 153 includes a vent passage tab 153f extending from the perimeter. The vent passage tab 153f includes the vent passage hole 153b and two alignment holes 153c flanking the vent passage hole 153b. As described above, the vent passage hole 153b receives and/or surrounds the vent passage inlet 138a of the interface cap 130. The annular bead 153e of the diaphragm 153 extends radially outward to form a further bead 153g that encompasses the vent passage hole 153b so that the bead 153g seats in corresponding extensions of the recesses 162, 139 of the valve body 152 and the interface cap 130.

Figure 18:
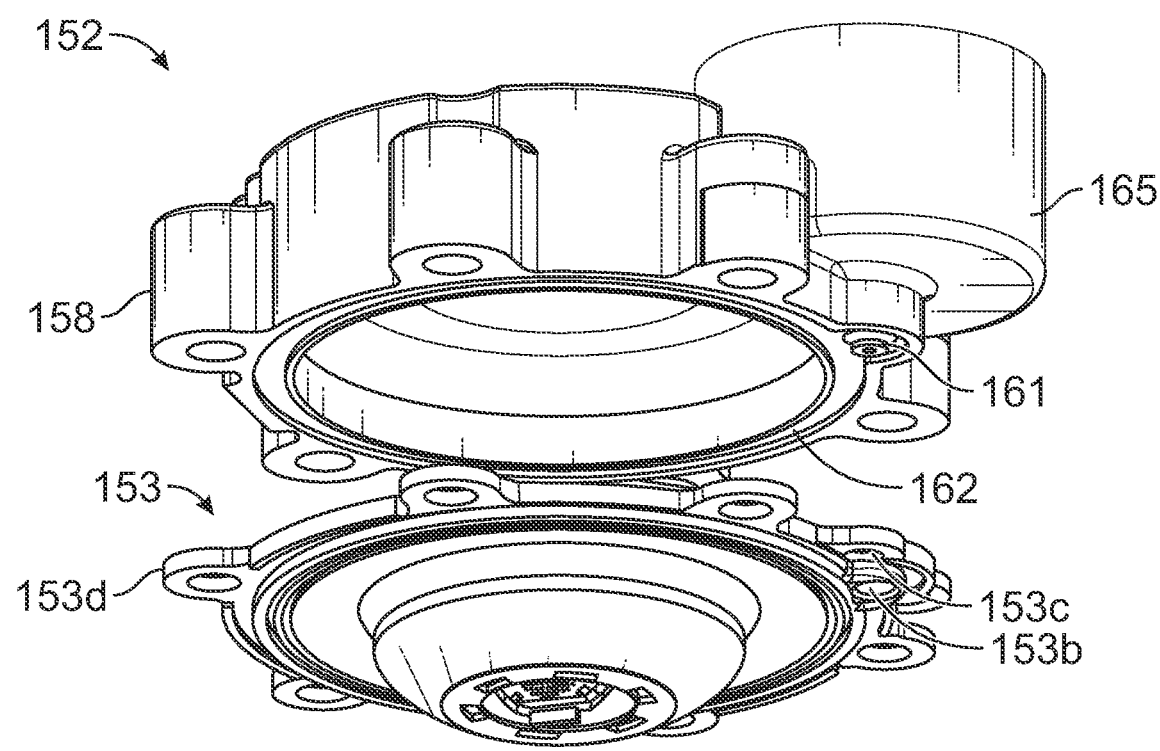
FIG. 18 is a partial exploded view of the control zone device of FIG. 2 showing the valve body and the diaphragm.
Figure 19:
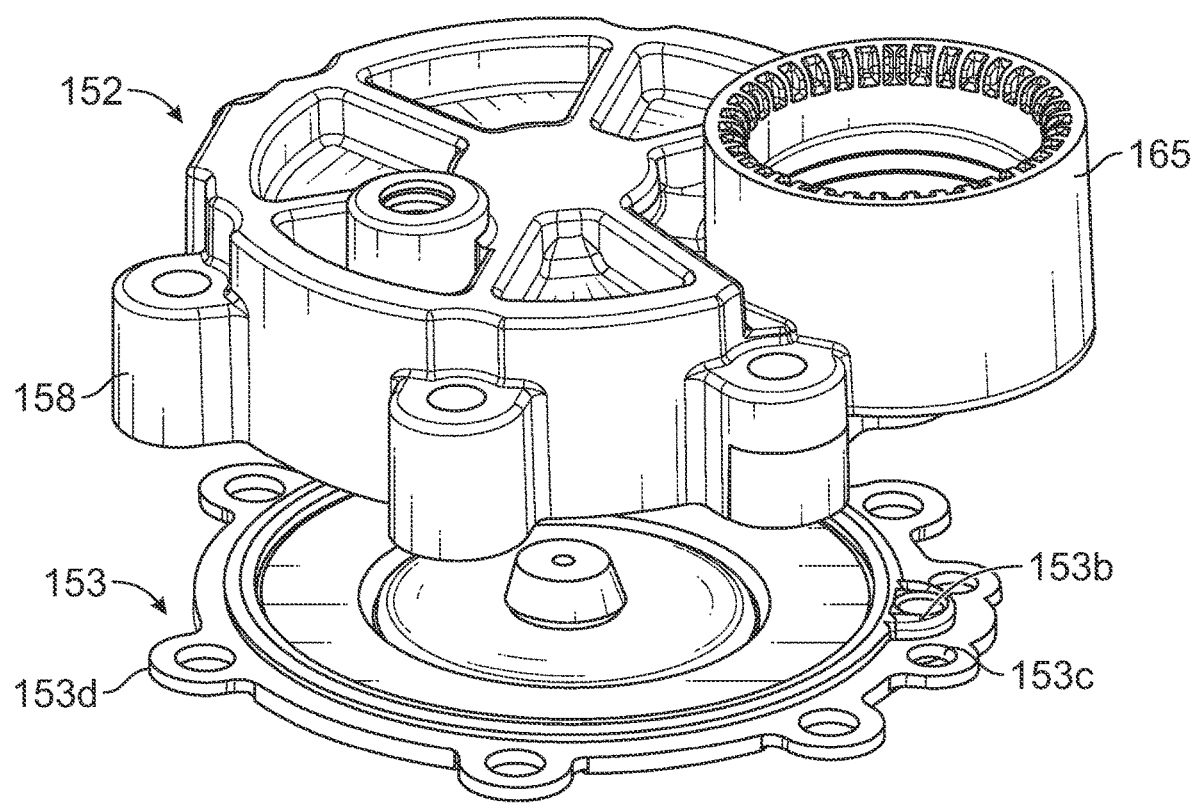
FIG. 19 is a partial exploded view of the control zone device of FIG. 2 showing an alternative view of the valve body and the diaphragm.

As shown in FIG. 18, an underside of the valve bonnet 152 includes a slightly protruding vent passage outlet 161, which is encompassed by the recess 162. Thus, when the diaphragm 153 is fixed between the bonnet 152 and the interface cap 130, the annular bead 153g at the vent passage hole 153b seats in the recesses 139 and 162 of the interface cap 130 and the bonnet 152, respectively, aligning the vent passage hole 153b with the vent passage outlet 161 and the interface cap vent passage inlet 138a so that a continuous and sealed passage is formed between the components. Specifically, when the diaphragm is in place between the interface cap 130 and the bonnet 152 and the screws 159 are torqued down, the recesses 139 and 162 compress the material (e.g., a rubber material) of the bead 153g so that it presses sealingly against the walls and ceilings of the recesses 139 and 162 and around the protruding walls of vent passage outlet 161 and interface cap vent passage inlet 138a.

Figure 21D:
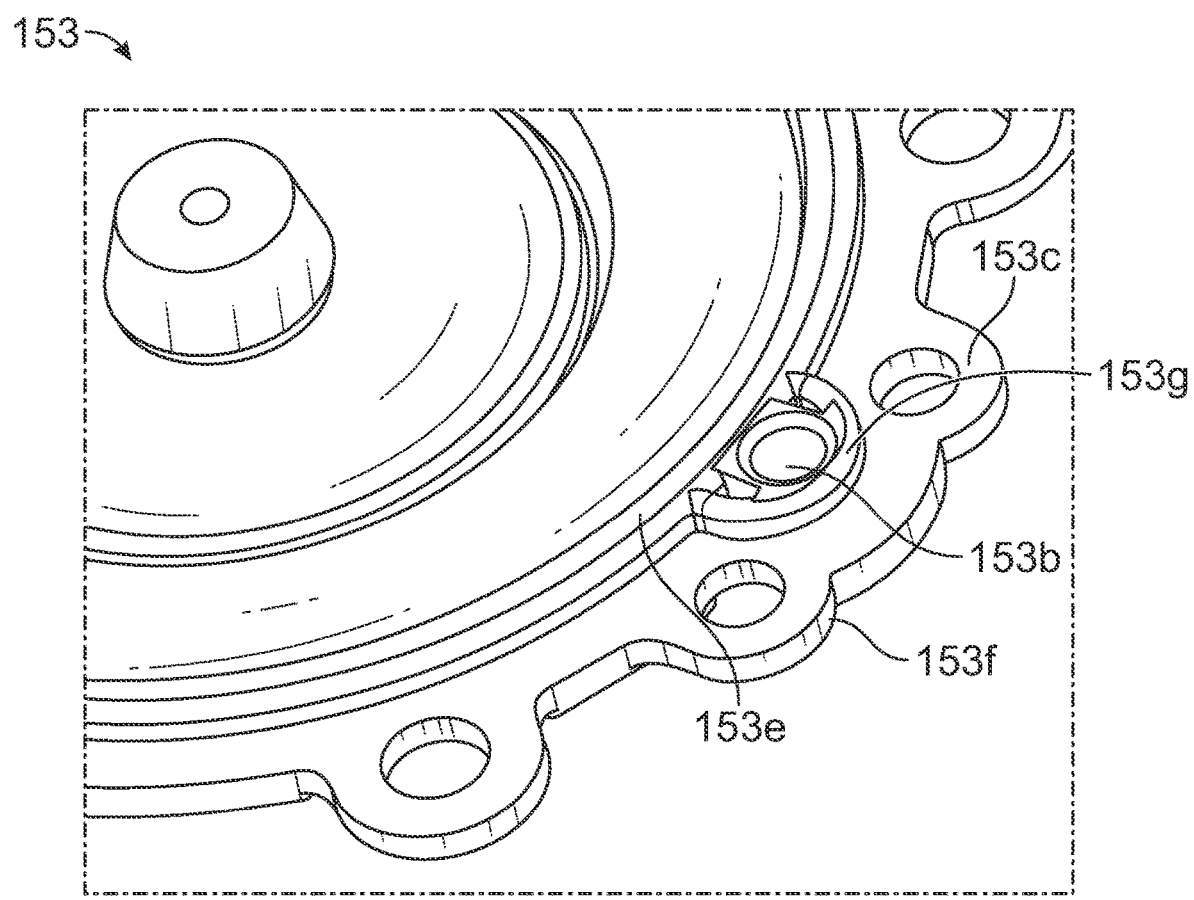
FIG. 21D is an enlarged portion of a top perspective view of the diaphragm of the control zone device of FIG. 2.
Figure 21E:
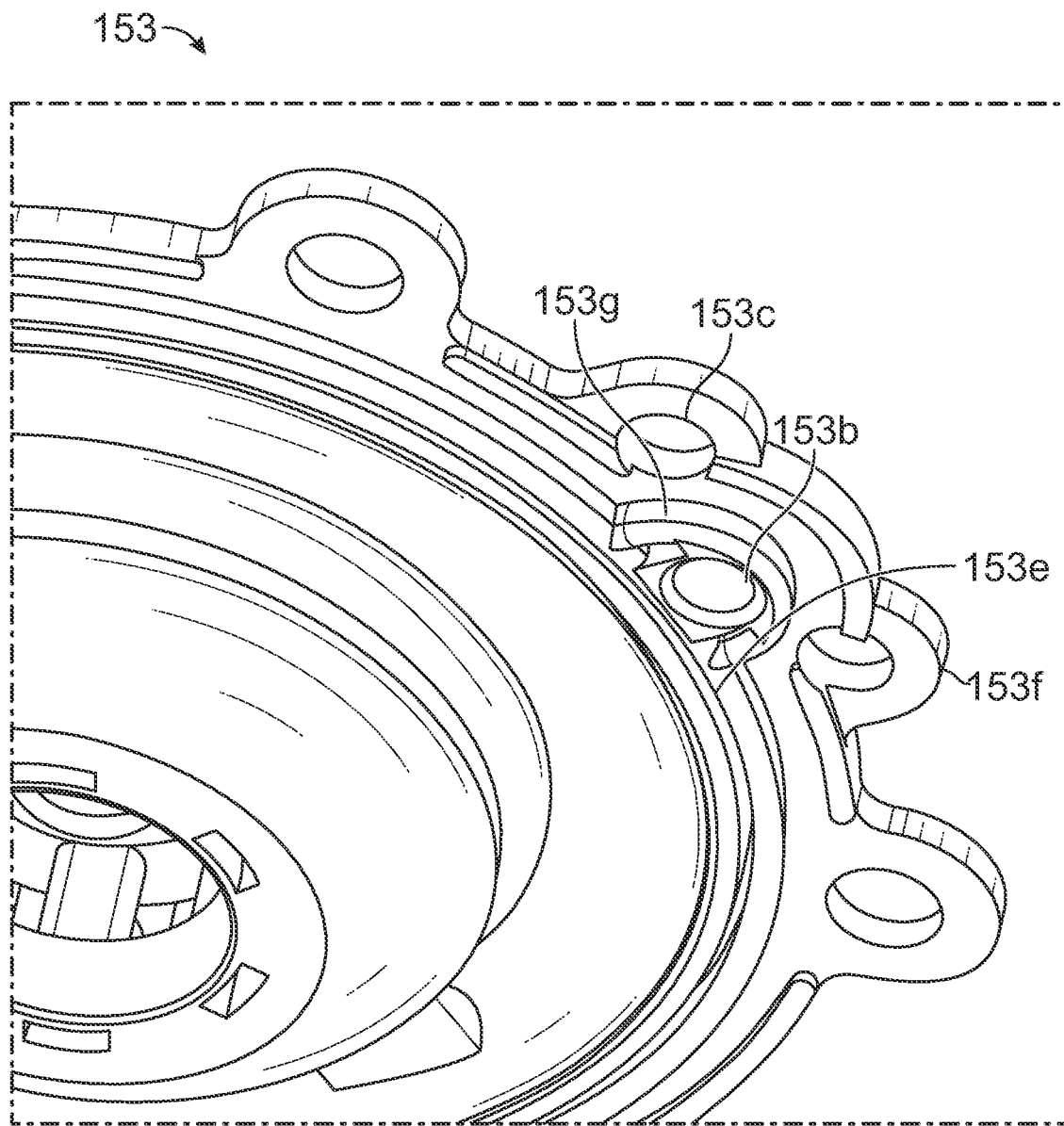
FIG. 21E is an enlarged portion of a bottom perspective view of the diaphragm of the control zone device of FIG. 2.
Figure 22:
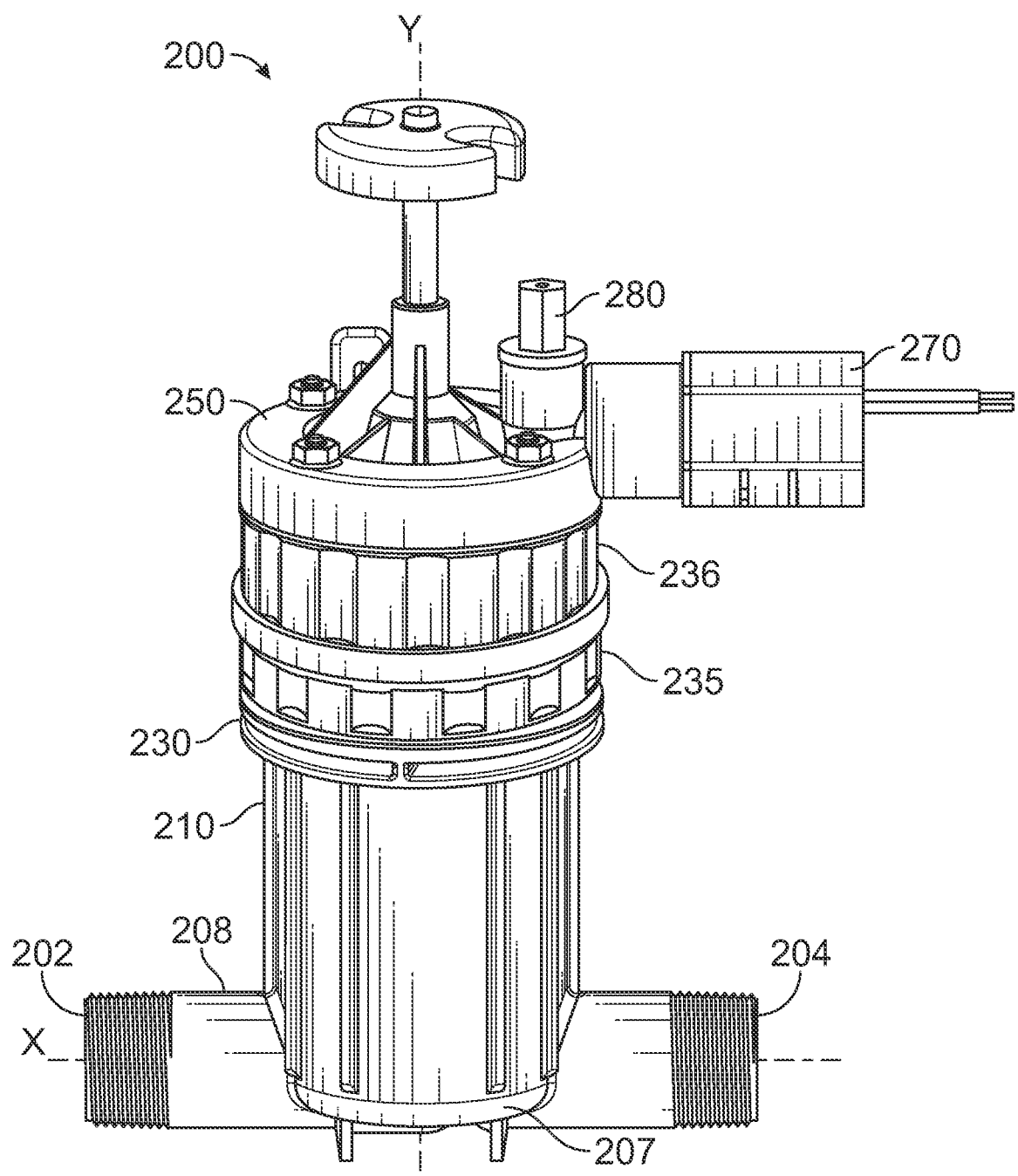
FIG. 22 is a perspective view of an alternative control zone device.
Figure 23:
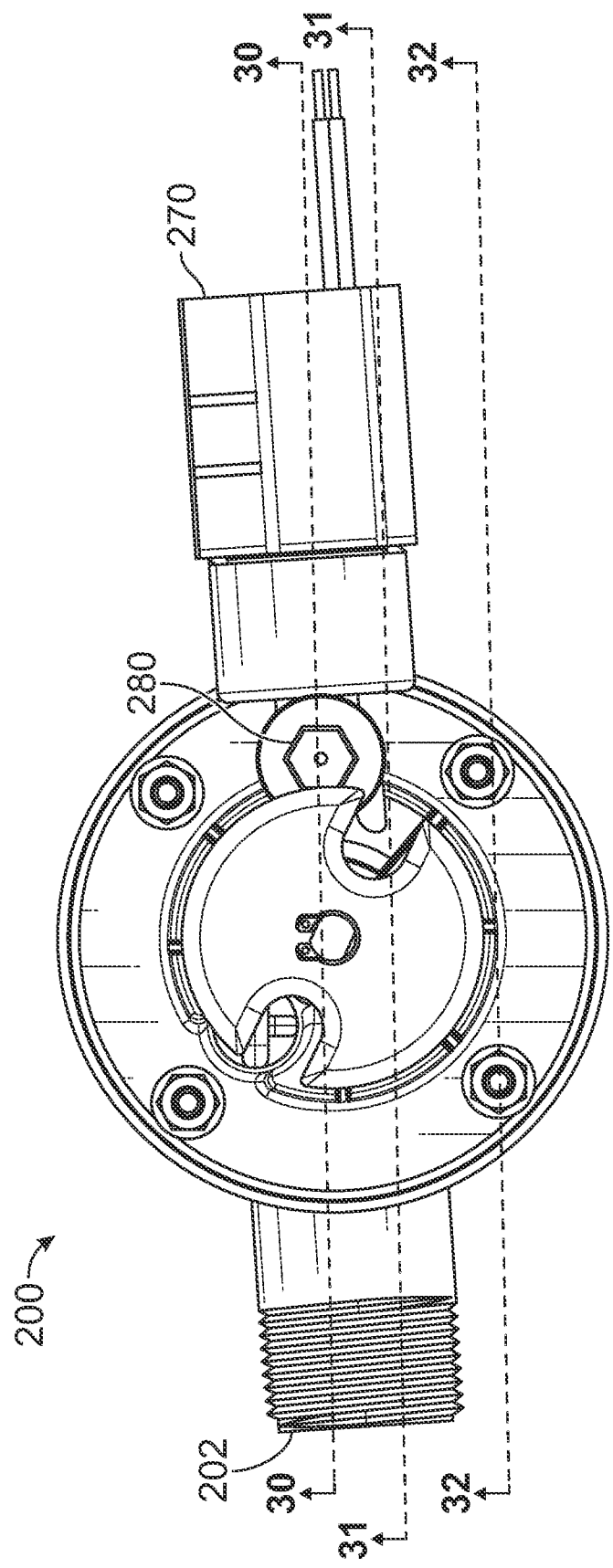
FIG. 23 is a top view of the control zone device of FIG. 22.

With references to FIGS. 21D-21E, the vent passage hole 153b may be configured to facilitate sealing of the channel formed between the solenoid vent passage outlet 161 and the interface cap vent passage inlet 138a. For instance, the vent passage opening 153b of the diaphragm may be configured so that the sides of the solenoid vent passage outlet 161 and the interface cap vent passage inlet 138a fit tightly against the annular bead 153g.

The two openings 153c flanking the vent passage opening 153b receive the pins 143 of the interface cap 130. This configuration aids in aligning the diaphragm 153 during attachment of the bonnet 152 to the interface cap 130 and maintaining the vent passage opening 153b in position during use of the device 100.

Since the control zone device 100 is a single unit, the device 100 is easily installed by connecting the inlet 102 to a water supply line, such as one coming off a multi-zone manifold, and the outlet 104 is connected to a zone conduit. After being installed, the control zone device 100 operates in the following manner. With reference to FIGS. 3 and 9, fluid from the inlet 102 flows into the inlet passage 103, the central flow tube 115, and the central inner tube 132 of the interface cap 130 to the valve 150. The inlet passage 103, the central flow tube 115, and the central inner tube 132 of the interface cap 130 constitute an inflow side 195 of the control zone device 100. When the solenoid 170 is deenergized, a plunger 172 of the solenoid 170 blocks entry of fluid into the solenoid vent passage 156 of the bonnet 152, and thus, fluid pressure builds in the pressure chamber 157 because fluid entering the pressure chamber 157 through the central orifice 153a of the diaphragm 153 from the inflow side 195 is not able to vent. The fluid pressure causes the diaphragm 153 to seat on the valve seat 134 of the central inner tube 132 of the interface cap 130, preventing fluid from passing from the inflow side 195 of the device 100 to the outflow side 196.

To open the valve 150, the solenoid 170 is energized to open the solenoid vent passage 156 to vent fluid from the pressure chamber 157 to the outflow side 196 of the control zone device 100. Once the fluid pressure in the pressure chamber 157 drops below the pressure on the inflow side 195, the fluid on the inflow side 195 raises the diaphragm 153 off the valve seat 134. The vent passage 156 opens when the plunger 172 of the solenoid 170 is lifted off a secondary valve seat 173 (e.g., on a plunger retainer 171) to allow fluid from the pressure chamber 157 to be vented. More specifically, fluid from the pressure chamber 157 flows through the solenoid vent passage 156, the solenoid vent passage outlet 161, the vent passage opening 153b of the diaphragm 153, the interface cap vent passage inlet 138a, the interface cap vent passage 138, and the interface cap vent passage outlet 138b to the outflow side 196 of the device 100. The central opening 131a of the interface cap, the cavity 109 of the main body 106 of the device 100, and the outlet passage 105 of the device 100 define the outflow side 196. When fluid from the pressure chamber 157 is vented in this manner, the diaphragm 153 lifts off the valve seat 134, allowing fluid from the inflow side 195 of the device 100 to pass the valve seat 134 and flow to the outflow side 196 of the device 100. On the outflow side 196, the fluid is filtered through the filter 120. After passing through the filter 120, the pressure regulator 180 in the outlet passage 105 regulates the pressure of the fluid before the fluid is discharged from the device 100.

Figure 26:
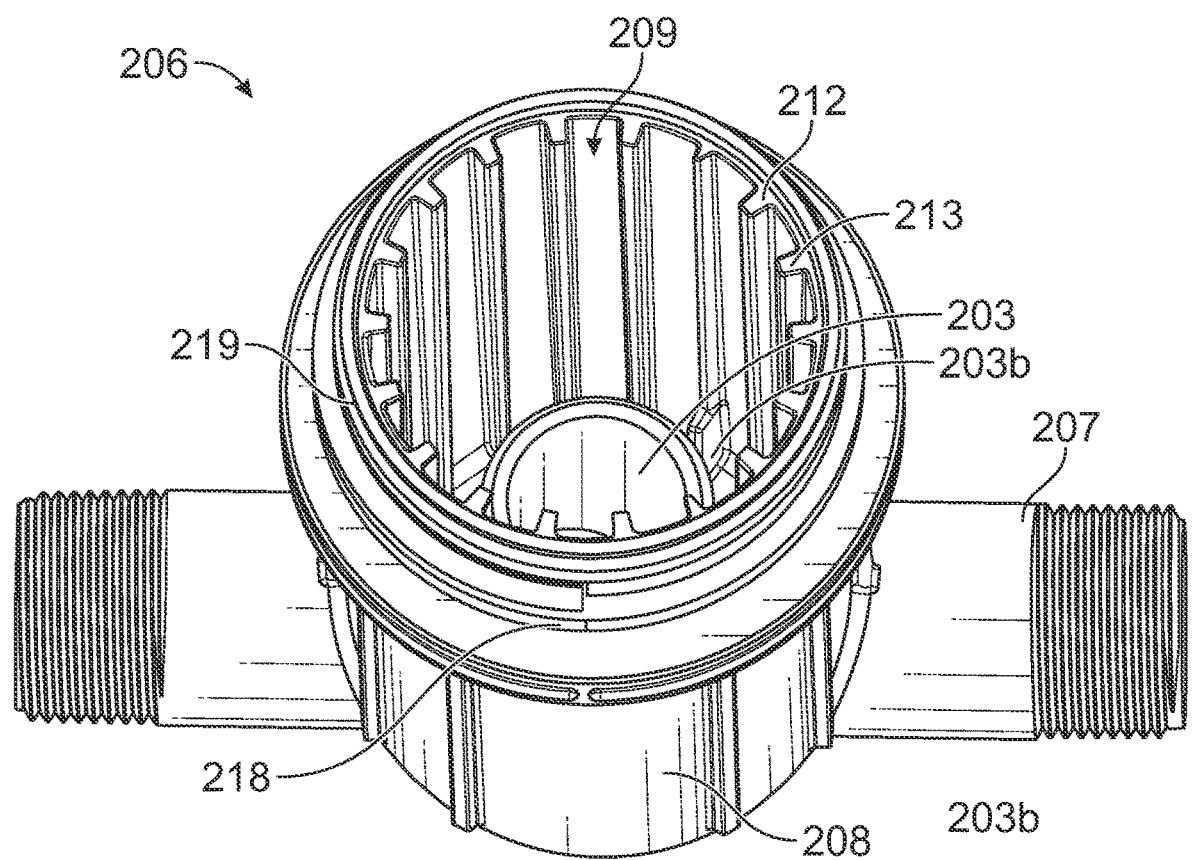
FIG. 26 is a top perspective view of a main body of the control zone device of FIG. 22.
Figure 27:
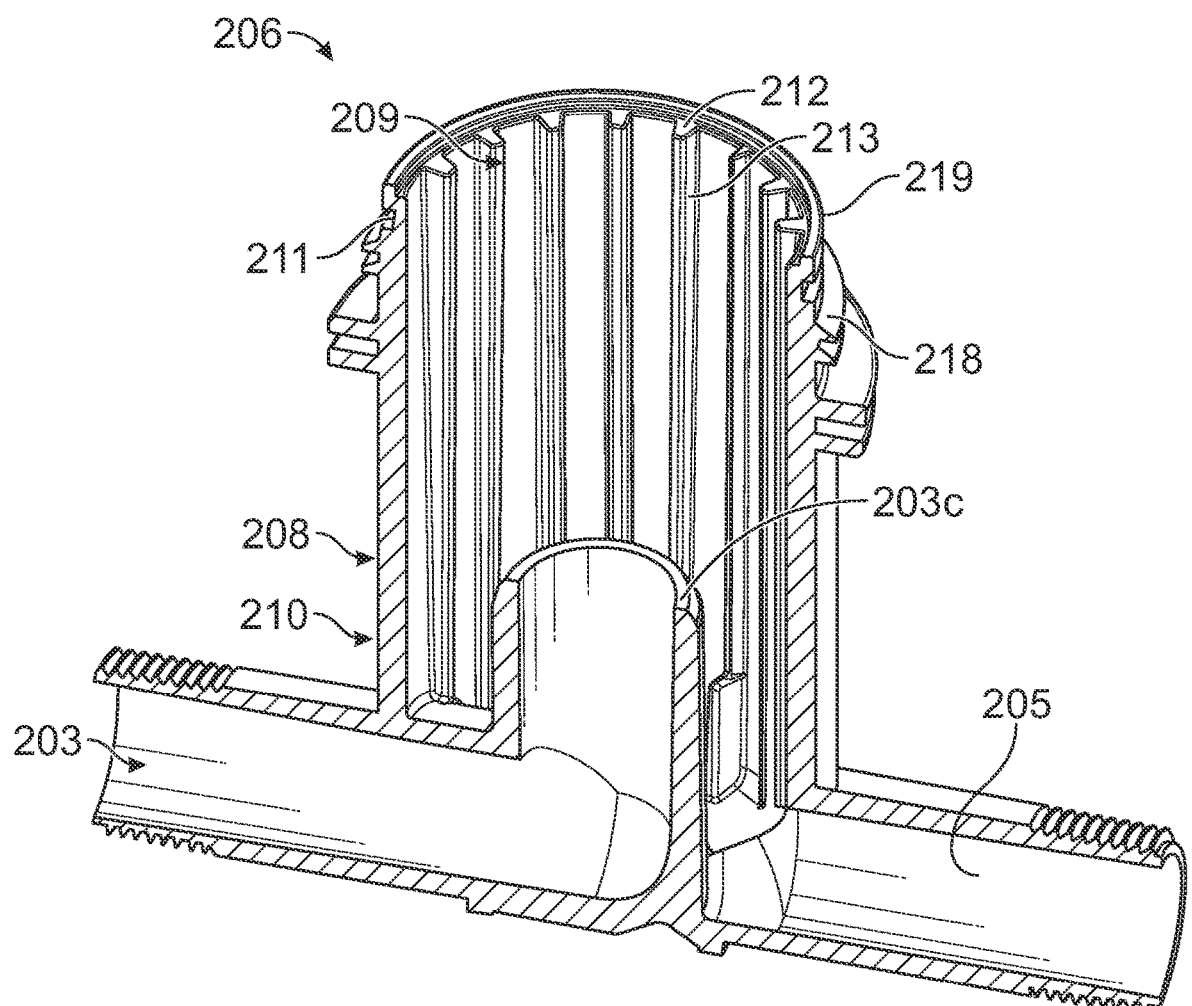
FIG. 27 is a central cross-section view of the main body of the control zone device of FIG. 22.
Figure 28:
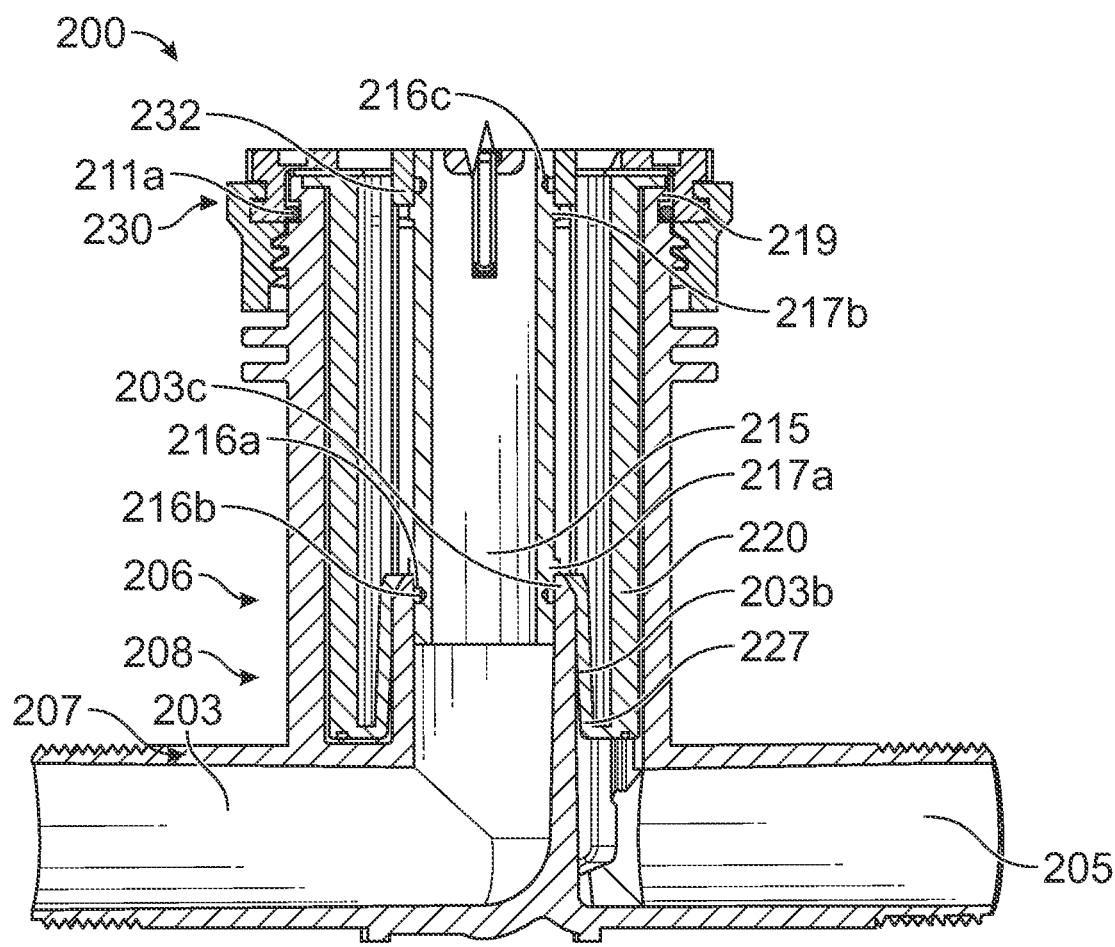
FIG. 28 is an enlarged portion of a central cross-section view of the control zone device of FIG. 22.

With reference to FIGS. 22-25 and 28, there is shown another compact control zone device 200. The device 200 is similar to device 100 with a main difference being that pressure regulation occurs though operation of a valve 250, as opposed to a separate pressure regulator in the outlet passage as in the device 100. More specifically, the control zone device 200 includes a main body 206 (FIGS. 26-27), an inlet 202, an outlet 204, a filter 220, a valve 250, an interface cap 230, and a pressure regulator 280. The pressure regulator 280 is located on a valve body or bonnet 252 of the valve 250 along a vent flow path for controlling the valve 250. Another difference is the interface cap 230 is two pieces instead of a single piece. Many of the features of the device are the same as those discussed above for the device 100. The common features may not be specifically referenced in this description of device 200 but are incorporated by reference and will be denoted with the same number except that the number will begin with a "2".

Figure 29:
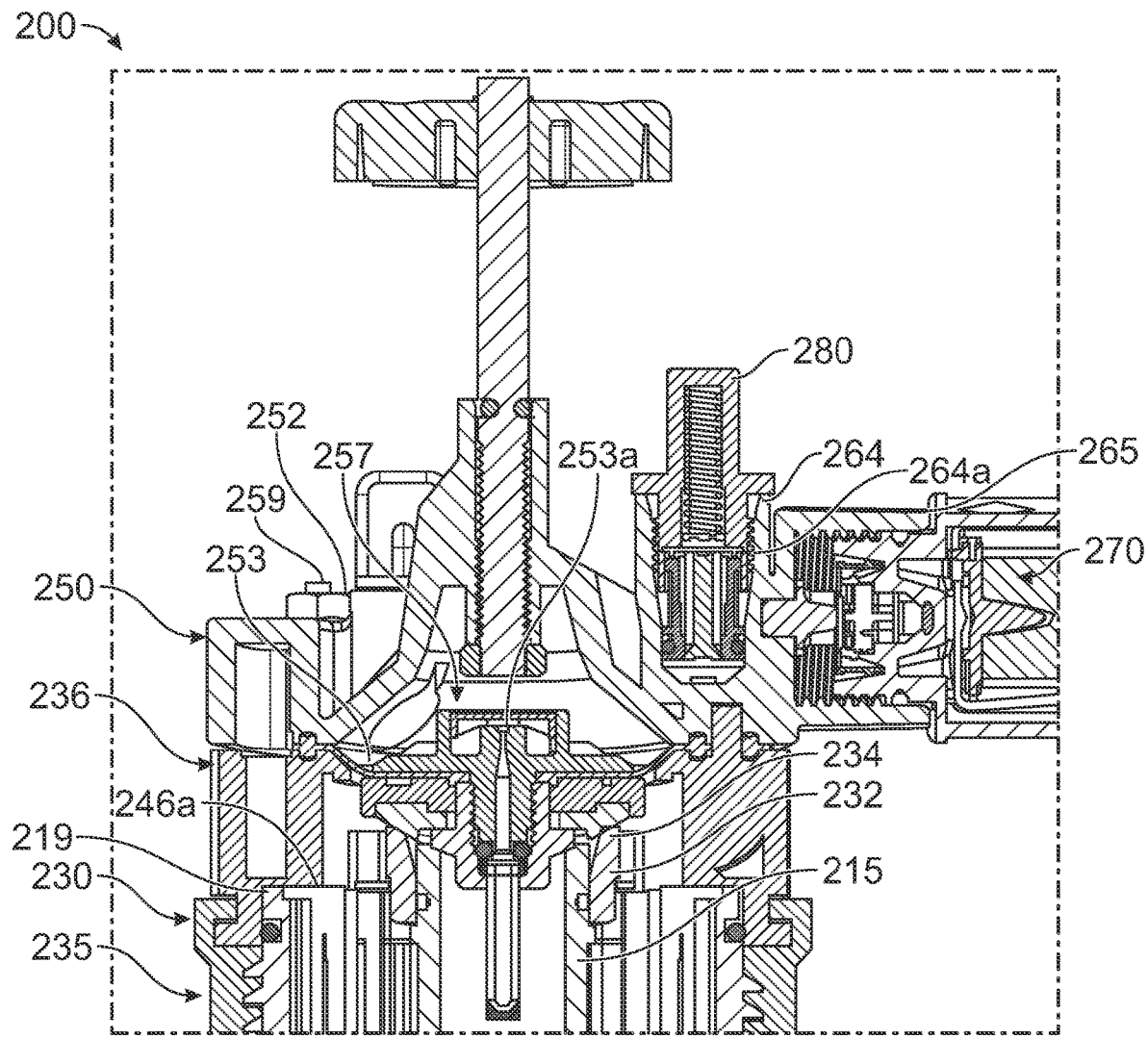
FIG. 29 is an alternative enlarged portion of a central cross-section view of the control zone device of FIG. 22.

As shown in FIG. 29, the valve body or bonnet 252 includes a solenoid socket or solenoid bowl 265 to attach a solenoid 270 to the valve 250 and a pressure regulator socket 264 to attach the pressure regulator 280 to the valve 250. The sockets 264, 265 are adjacent to one another. The pressure regulator socket 264 extends axially from the valve body 252. The solenoid bowl 265 extends radially from the valve body 252. Other configurations of the sockets are possible.

Figure 30:
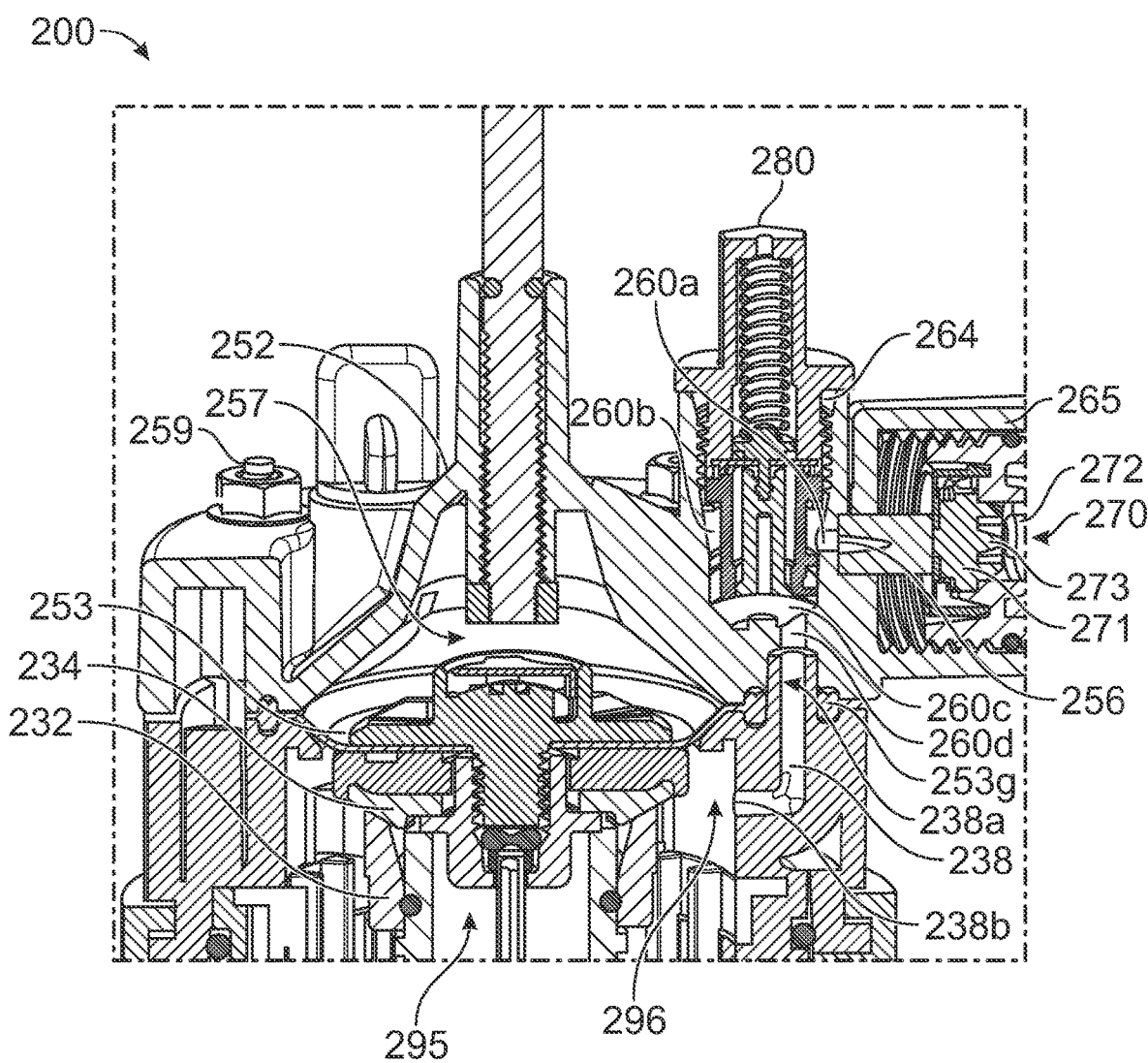
FIG. 30 is an enlarged portion of a cross-section view of the control zone device of FIG. 22 taken along section line 30-30 of FIG. 23.
Figure 31:
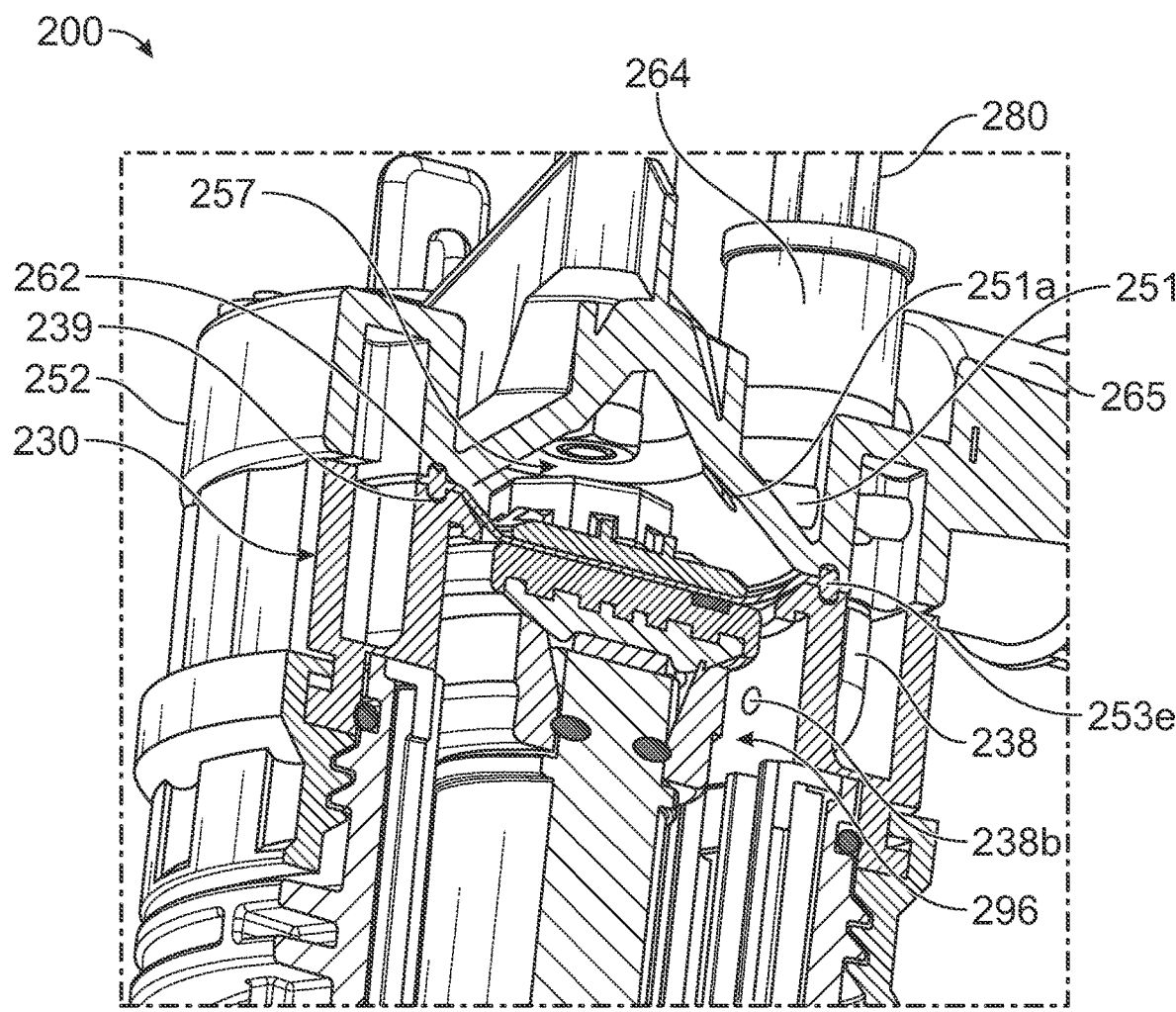
FIG. 31 is an enlarged portion of a cross-section view of the control zone device of FIG. 22 taken along section line 31-31 of FIG. 23.
Figure 39:
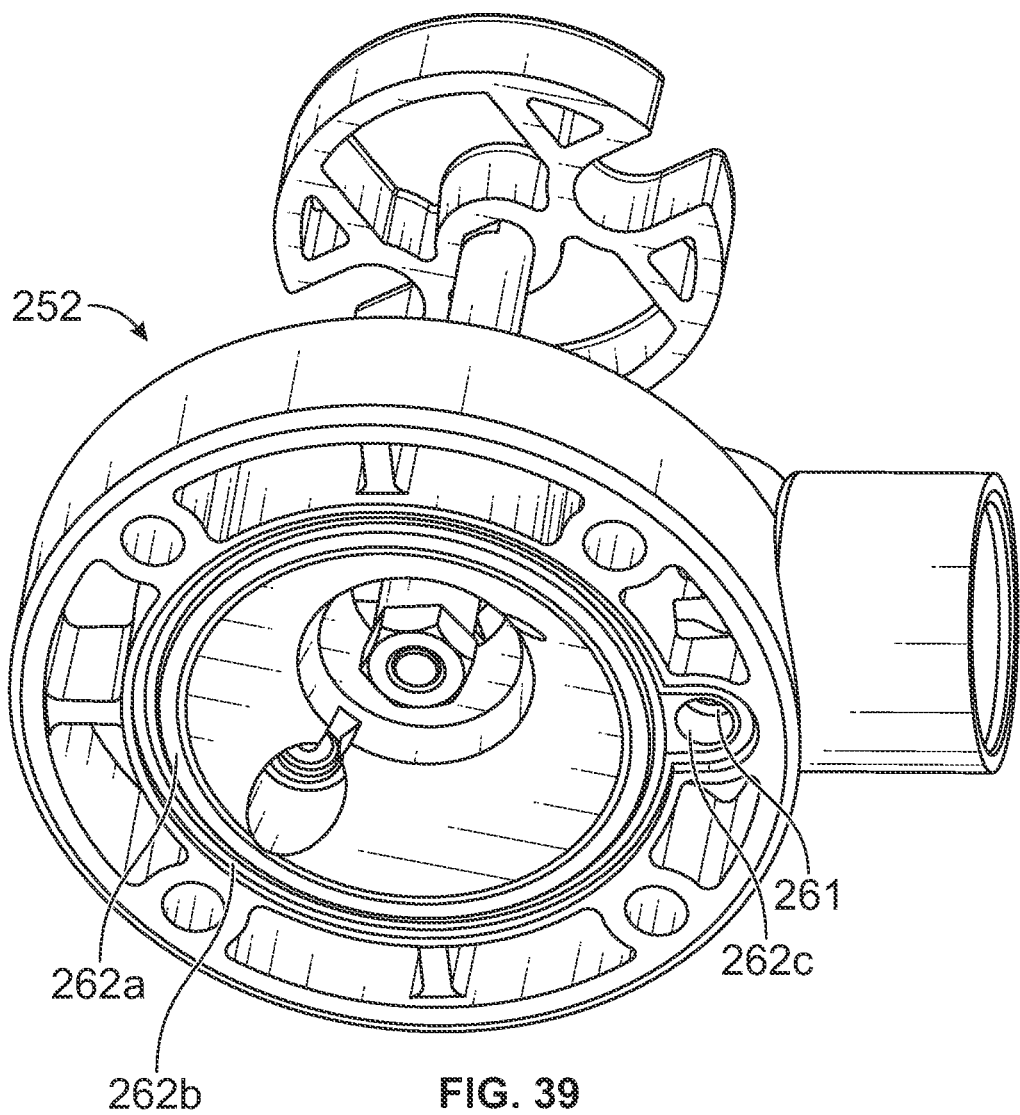
FIG. 39 is a bottom perspective view of the valve body assembly of the control zone device of FIG. 22.
Figure 40:
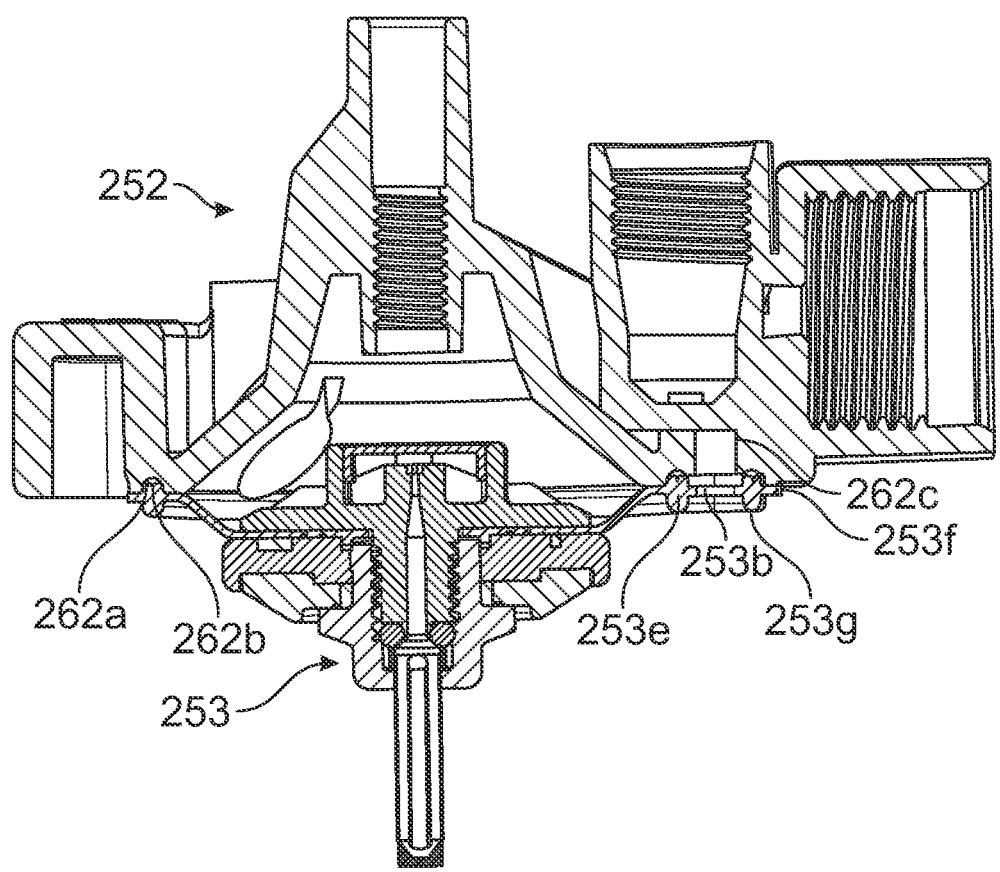
FIG. 40 is a central cross-section view of the valve body assembly and the diaphragm assembly of the control zone device of FIG. 22.
Figure 41A:
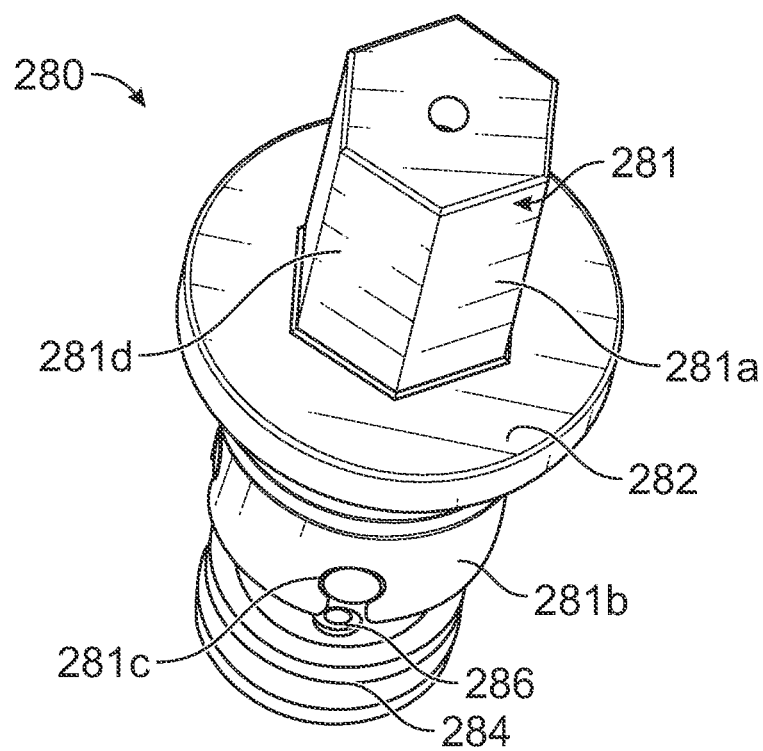
FIG. 41A is a perspective top view of a pressure regulator of the control zone device of FIG. 22.
Figure 41B:
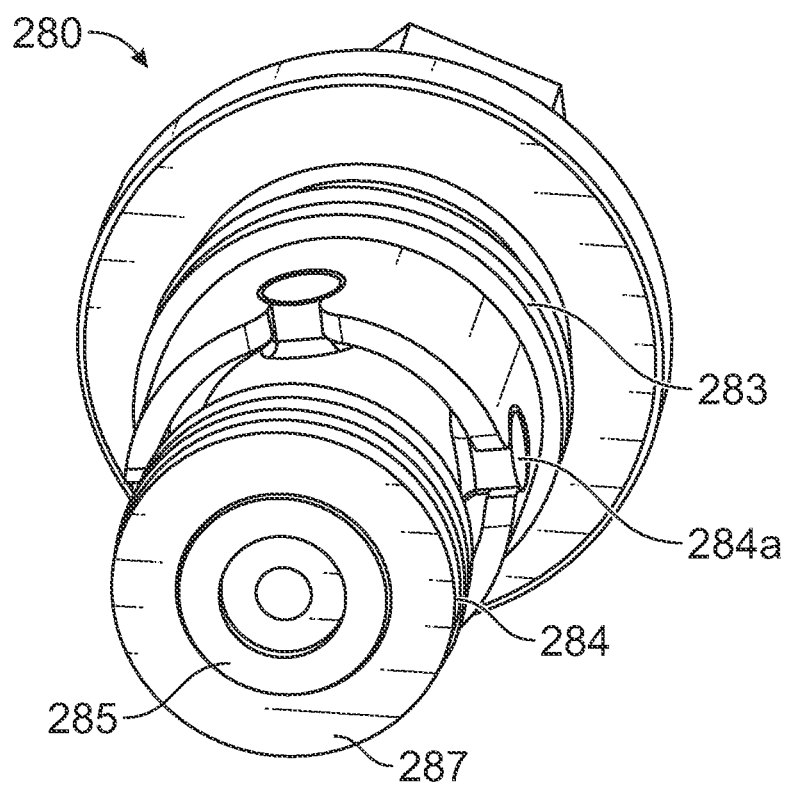
FIG. 41B is a perspective bottom view of the pressure regulator of the control zone device of FIG. 22.
Figure 41C:
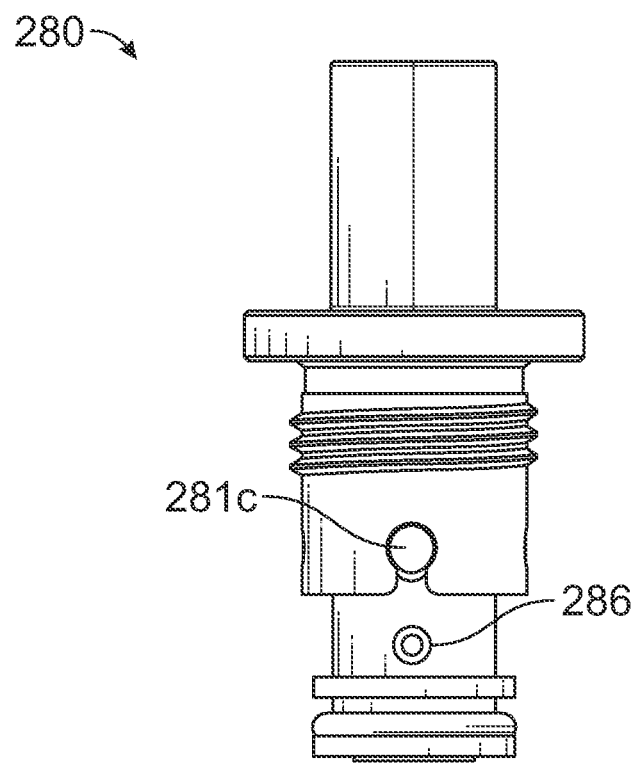
FIG. 41C is a front side elevation view of the pressure regulator of the control zone device of FIG. 22.
Figure 41D:
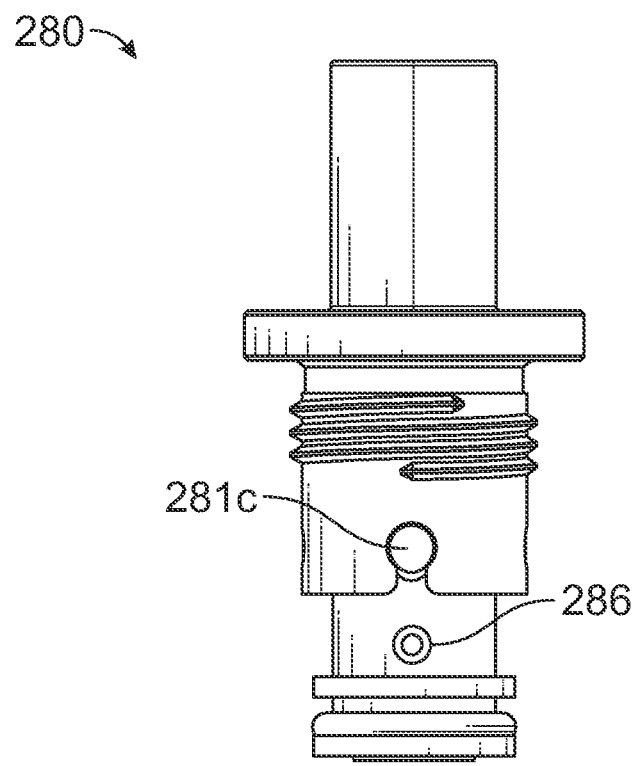
FIG. 41D is a back side elevation view of the pressure regulator of the control zone device of FIG. 22.
Figure 41E:
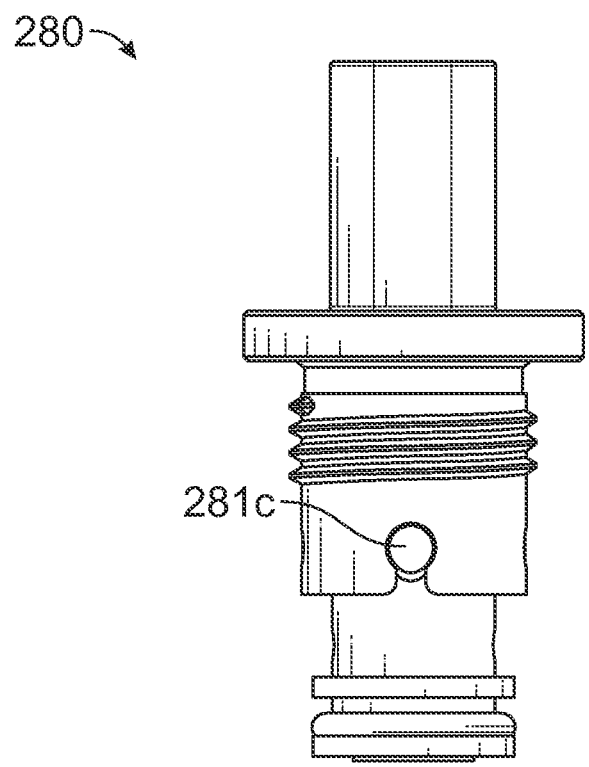
FIG. 41E is a left side elevation view of the pressure regulator of the control zone device of FIG. 22.
Figure 41F:
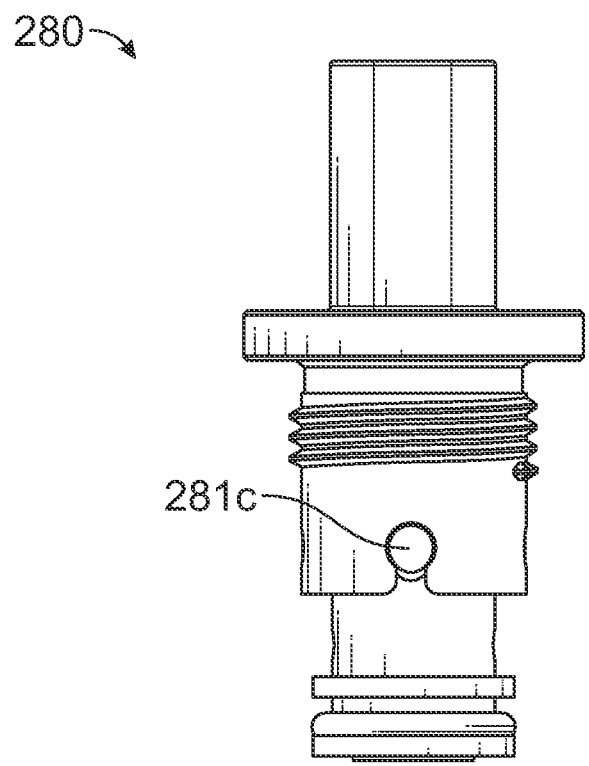
FIG. 41F is a right side elevation view of the pressure regulator of the control zone device of FIG. 22.

With reference to FIGS. 30 and 31, the solenoid 270 controls venting of the pressure chamber 257, thereby controlling opening and closing of the valve 250. A vent flow path includes a pressure chamber vent passage 251 extending from an opening 251a in the pressure chamber 257 to the solenoid bowl 265 (FIG. 31), and a solenoid vent passage 256 extending from the solenoid bowl 265 to the pressure regulator socket 264 (FIG. 30). The vent flow path also includes a pressure regulator vent passage 261 extending from an outlet opening 260d of the pressure regulator socket 264 towards a recess 262c (FIGS. 39-40) of the valve body 252 for communication with an interface cap vent passage 238. The interface cap vent passage 238 is defined in the interface cap 230.

As illustrated in FIGS. 33A-33F, the interface cap 230 (or coupling or collar) has a generally cylindrical shape defining a central passage or interior 248a for receiving, on one side, a diaphragm assembly 253 of the valve 250 and, on the other side, the main body 206 of the control zone device 200. The interface cap 230 includes an upper piece or valve cap 236 and a lower piece or filter cap 235 which are removably connectable to one another to form the interface cap 230. The filter cap 235 is configured to be removably fixed to the body portion 108 of the main body 106 while the valve cap 236 is configured to be removably fixed to the valve 250.

Figure 33A:
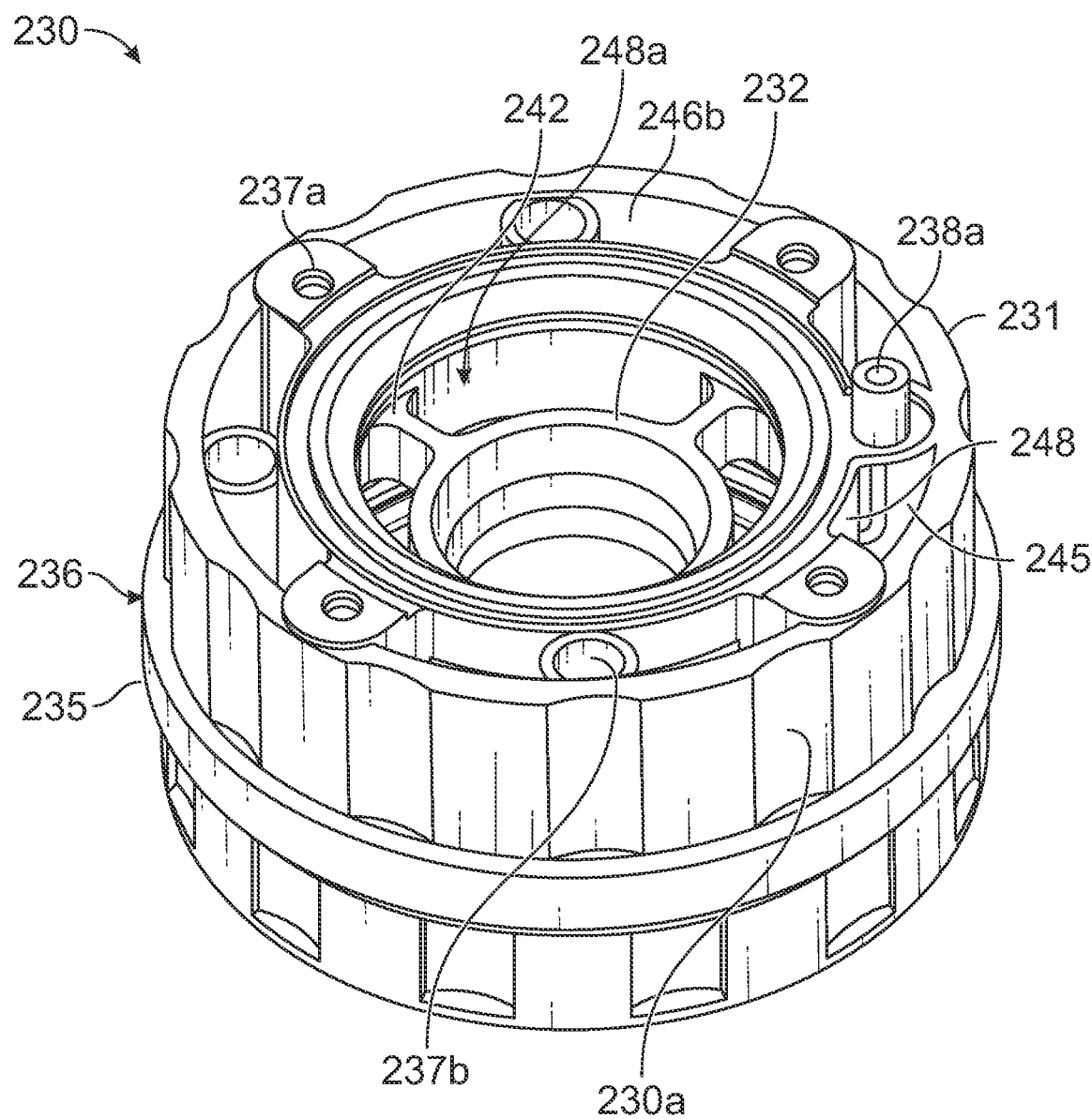
FIG. 33A is a perspective view of an interface cap of the control zone device of FIG. 22.
Figure 33B:
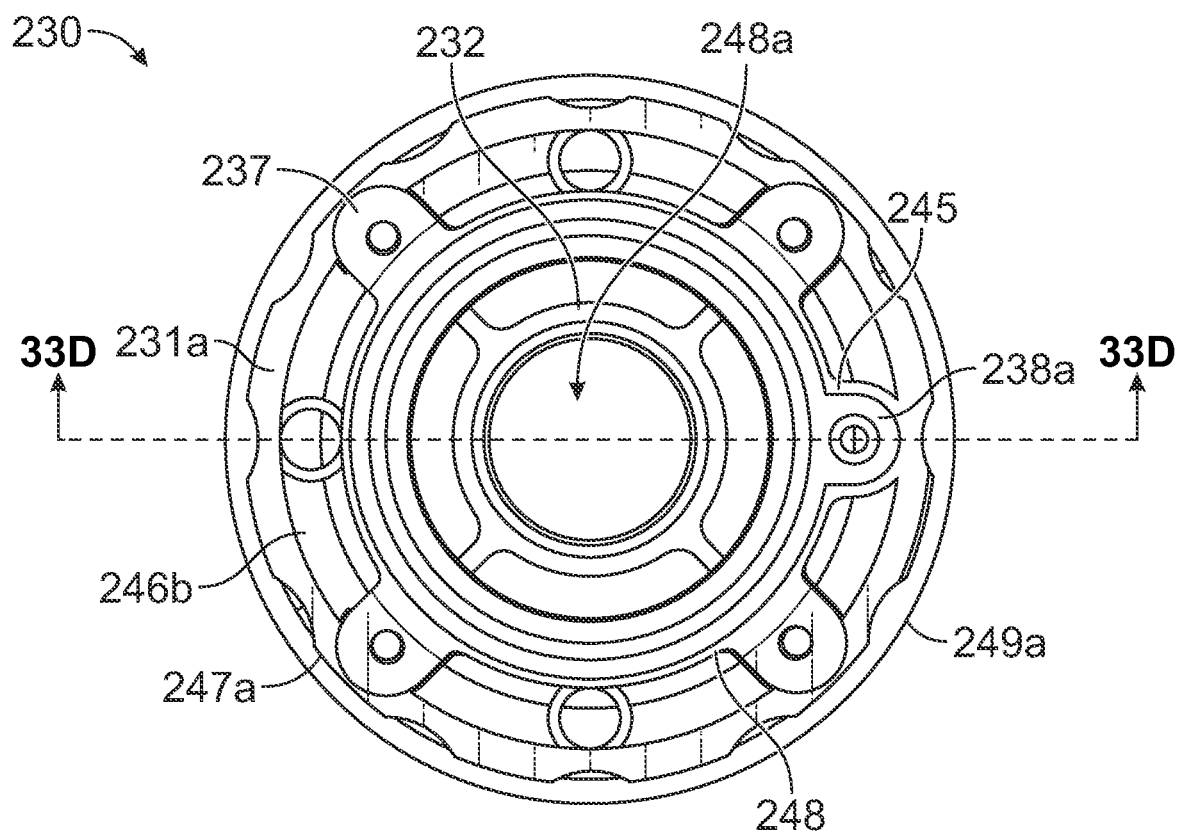
FIG. 33B is a top view of the interface cap of the control zone device of FIG. 22.
Figure 33C:
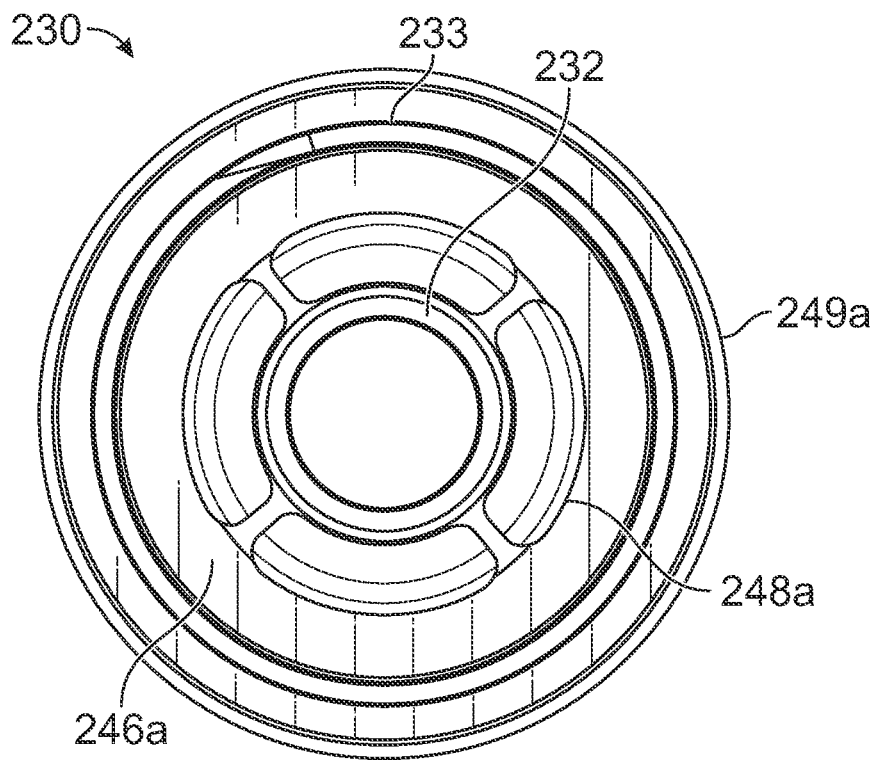
FIG. 33C is a bottom view of the interface cap of the control zone device of FIG. 22.
Figure 33D:
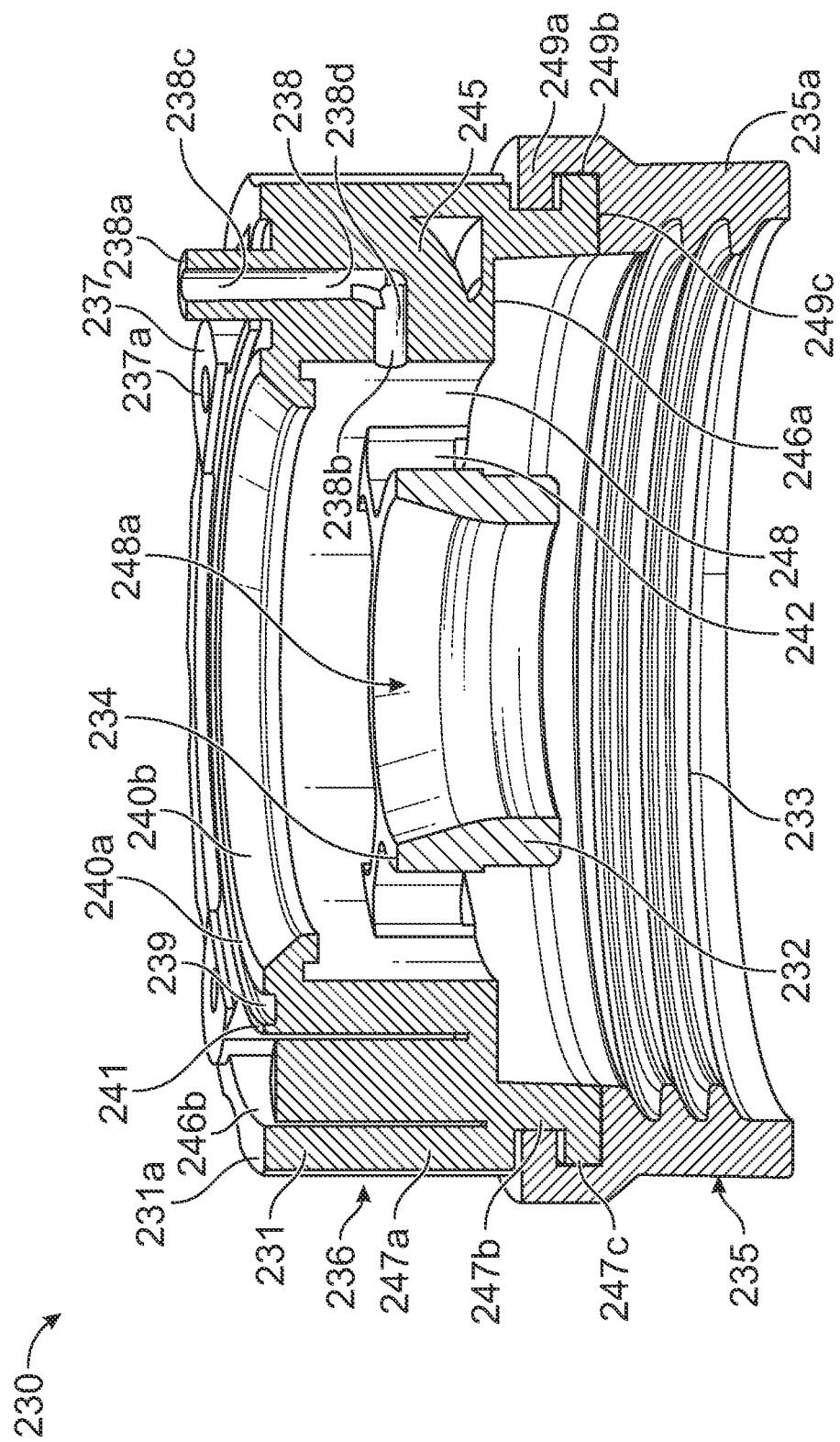
FIG. 33D is a perspective cross-section view of the interface cap of the control zone device of FIG. 22 taken along line 33D-33D of FIG. 33B.
Figure 33E:
FIG. 33E is an elevation view of the interface cap of the control zone device of FIG. 22.
Figure 33F:
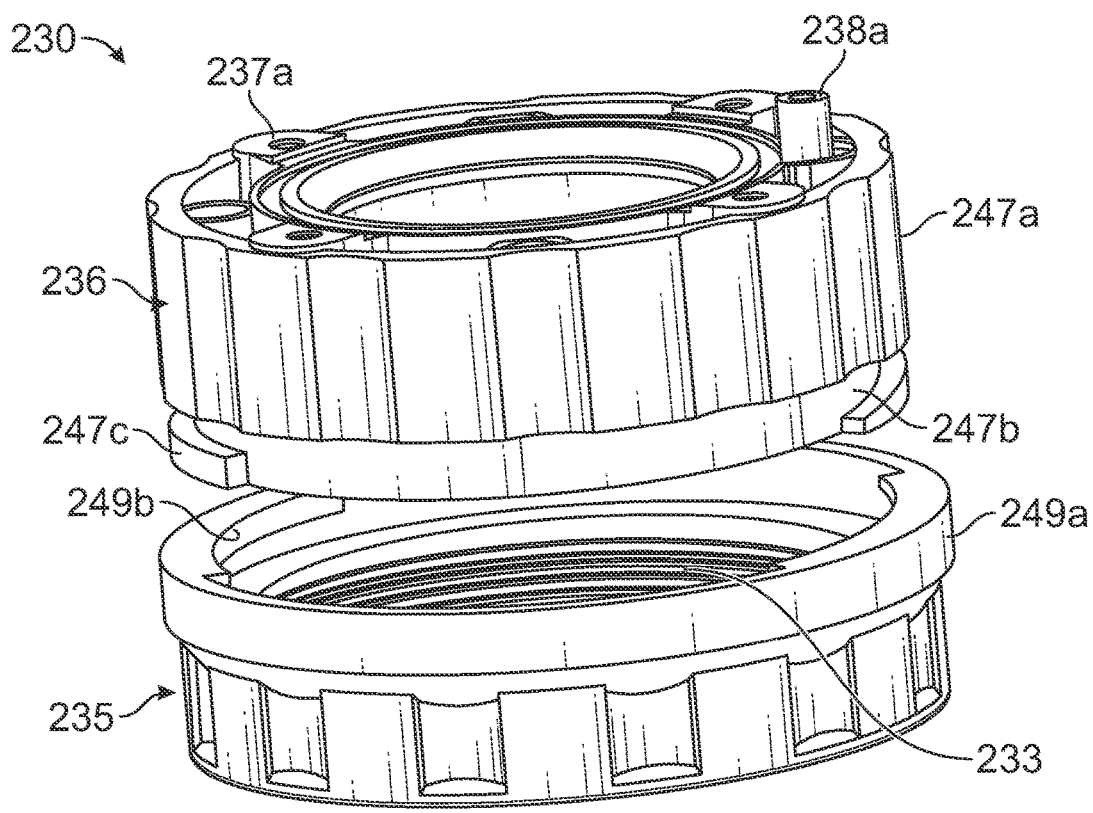
FIG. 33F is an exploded view of the interface cap of the control zone device of FIG. 22.
Figure 34A:
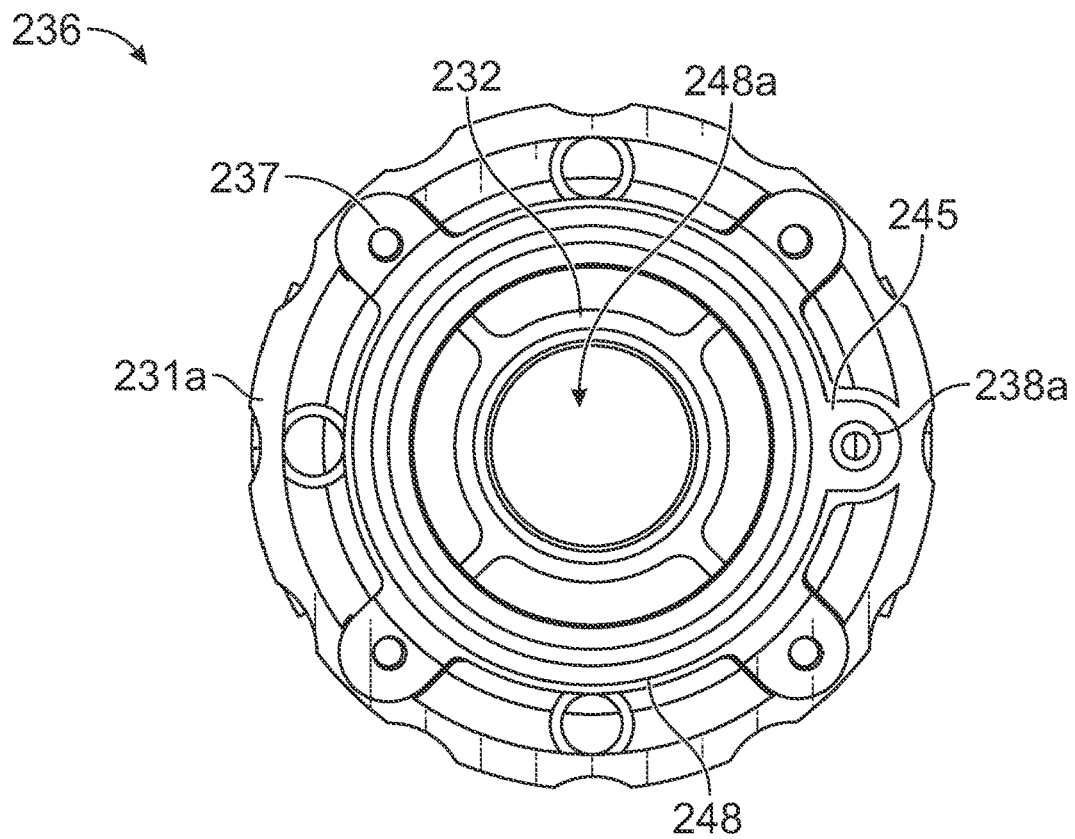
FIG. 34A is a top view of a valve cap of the interface cap of the control zone device of FIG. 22.
Figure 34B:
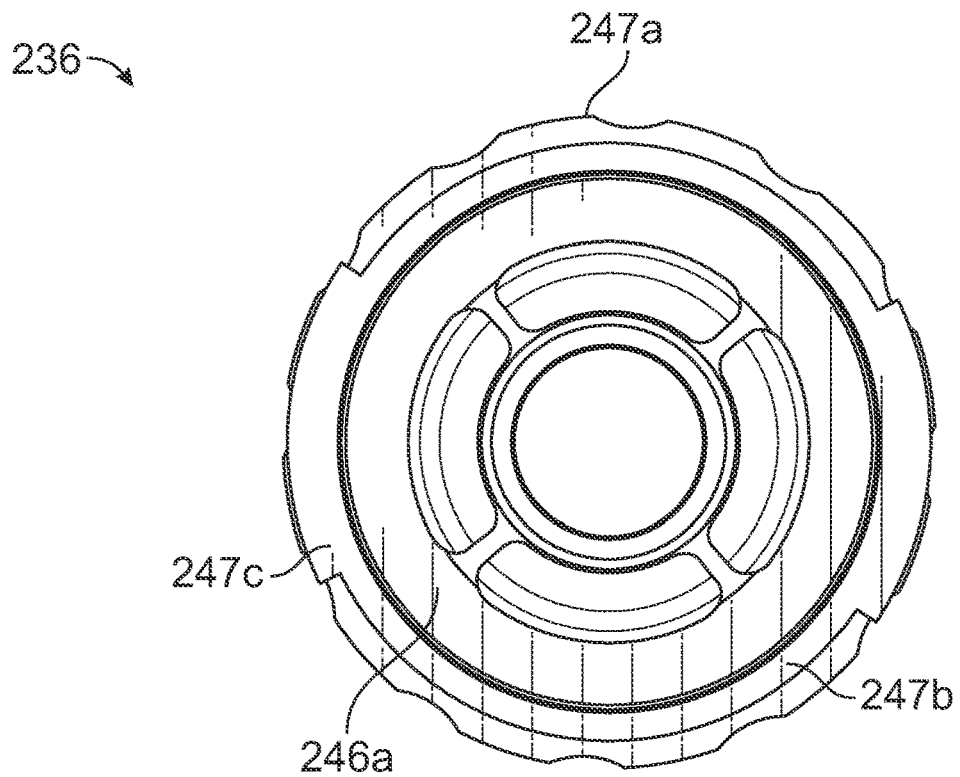
FIG. 34B is a bottom view of the valve cap of the interface cap of the control zone device of FIG. 22.
Figure 34C:
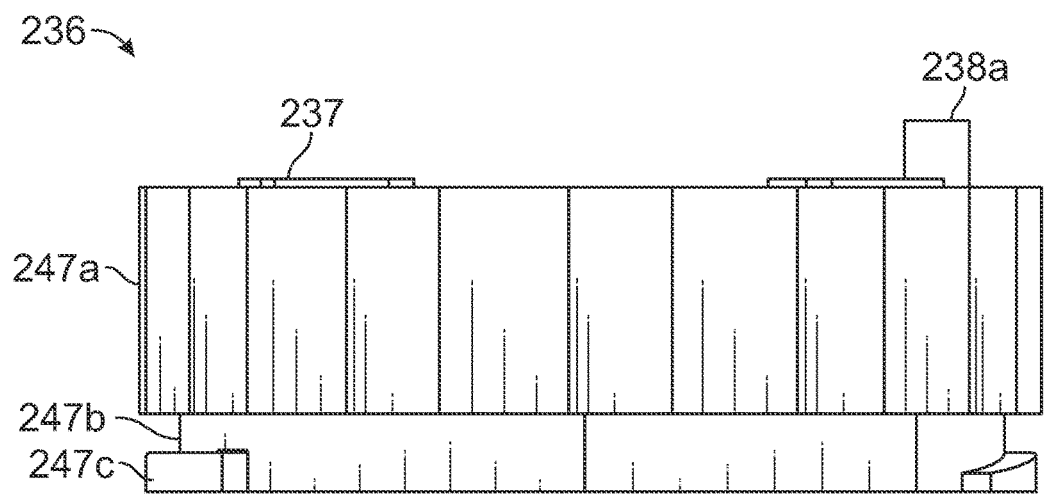
FIG. 34C is an elevation view of the valve cap of the interface cap of the control zone device of FIG. 22.
Figure 35A:
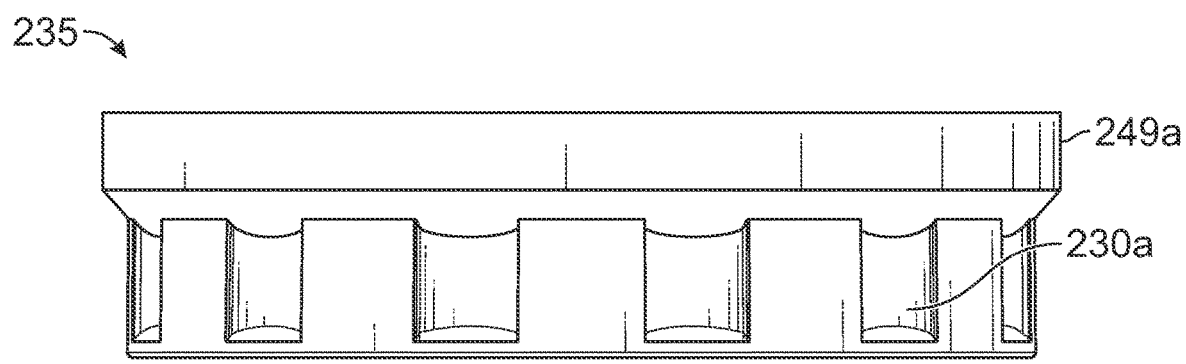
FIG. 35A is an elevation view of a filter cap of the interface cap of the control zone device of FIG. 22.
Figure 35B:
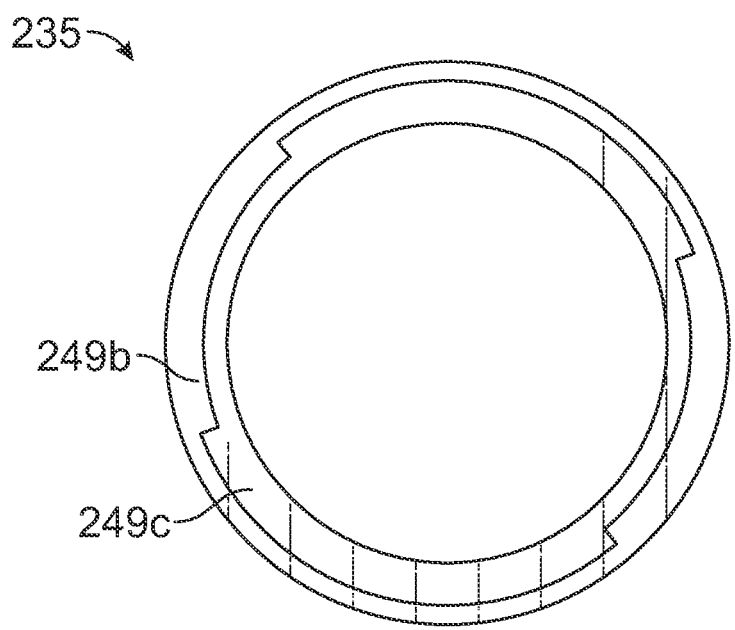
FIG. 35B is a top view of the filter cap of the interface cap of the control zone device of FIG. 22.
Figure 35C:
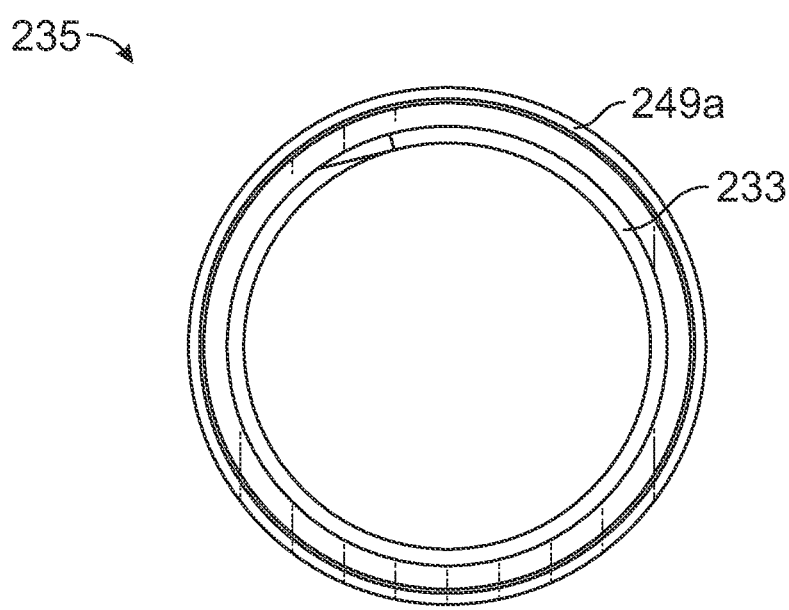
FIG. 35C is a bottom view of the filter cap of the interface cap of the control zone device of FIG. 22.

With reference to FIGS. 33F and 34C, the valve cap 236 includes a top annular portion 247a and a bottom annular portion 247b. The bottom annular portion 247b is recessed with respect to the top annular portion 247a; that is, the top annular portion 247a has a smaller outer diameter. The recess includes two external bayonet threads 247c for cooperating with two corresponding internal bayonet threads 249b on the filter cap 235 to attach the valve cap 236 and filter cap 235 together. While two bayonet threads are illustrated, other number of bayonet threads are possible, e.g., four. Both the top annular portion 247a of the valve cap 236 and the filter cap 235 include axial grooves 230a spaced around the outer periphery to facilitate gripping for turning the interface cap 230.

As illustrated in FIGS. 33A-33D and 34A-34B, the top annular portion 247a of the valve cap 236 is formed by an outer cylindrical body 231 and an inner cylindrical body 248 spaced concentrically within the outer cylindrical body 231. The outer cylindrical body 231 and the inner cylindrical body 248 are joined at the bottom by an annular floor 246a. This configuration forms an annular recess 246b between the outer cylindrical body 231 and the inner cylindrical body 248. Three different kinds of bosses 237, 237b, and 245 are disposed in the annular recess 246b, further connecting the outer cylindrical body 231 and the inner cylindrical body 248.

Figure 32:
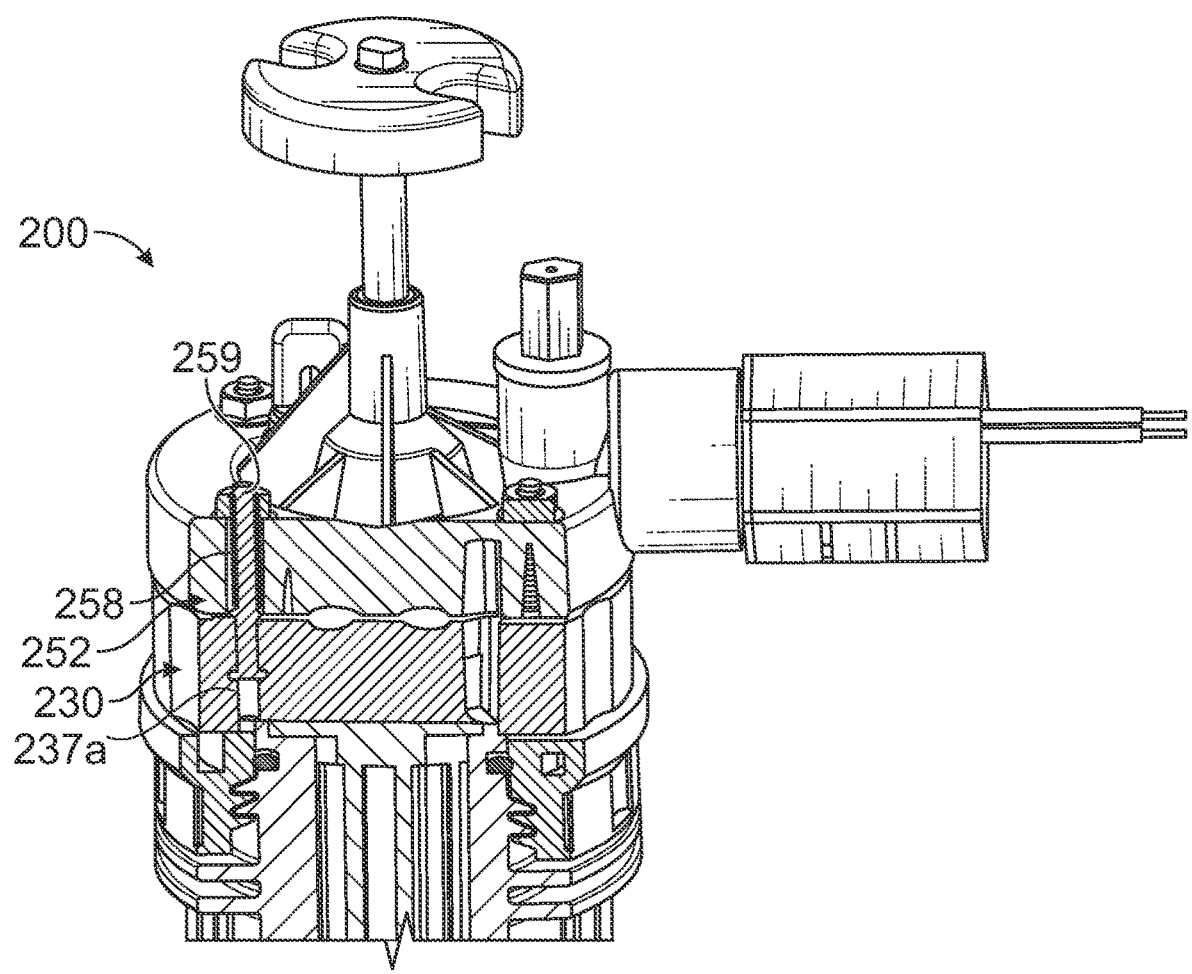
FIG. 32 is an enlarged portion of a cross-section view of the control zone device of FIG. 22 taken along section line 32-32 of FIG. 23.

The bosses 237 have a generally rounded profile and extend into the annular recess 246b. The top of each of the bosses 237 may project axially beyond an outer rim 231a of the valve cap 236. As illustrated, the interface cap 230 has four bosses 237 equally spaced around the annular recess 246b. Other numbers and geometries of the bosses 237 are also possible. The bosses 237 define passages 237a for receiving screws or bolts. The bosses 237 and the passages 237a align with corresponding passages 258 on the valve body 252 (FIG. 32). In this manner, screws or bolts 259 attach the valve body 252 to the valve cap 236 of the interface cap 230. This configuration allows a user to remove the valve 250 from the interface cap 230 for maintenance or replacement. It also allows the possibility of changing out the valve or diaphragm for different performance requirements. Also, a plurality of round bosses 237b may be spaced around the annular recess 246b, functioning as potential gate locations for injecting plastic during injection molding of the interface cap 230.

At the top portion 247a of the valve cap 236, the central passage 248a is defined by the inner cylindrical body 248. The central passage 248a is generally circular and sized to receive a substantial portion of the diaphragm 253 (FIGS. 29-30). The valve cap 236 further includes a central inner tube 232. The central inner tube 232 is supported concentrically to the inner cylindrical body 248 with a plurality of spokes 242. The illustrated embodiment includes four spokes 242 spaced around the central inner tube 232, though other numbers of spokes are possible. The purpose of the central inner tube 232 is the same as that discussed above for central inner tube 132 of device 100.

The central inner tube 232 extends axially into the interface cap 230 and at least partially into the bottom portion 247b of the valve cap 236. The central inner tube 232 may additionally have a varying internal diameter. For instance, the inner diameter of the central inner tube 232 where the flow tube 215 is received may have a smaller diameter than the inner diameter of the central inner tube 132 adjacent the valve seat 234. As illustrated, the internal diameter of the central inner tube 232 gradually widens from the inboard end of the tube 232 to the outboard end of the tube 232, with the thickness of the wall forming the central inner tube 232 thinning from the inboard end of the tube 232 to the outboard end of the tube 232 to vary the internal diameter.

Figure 38A:
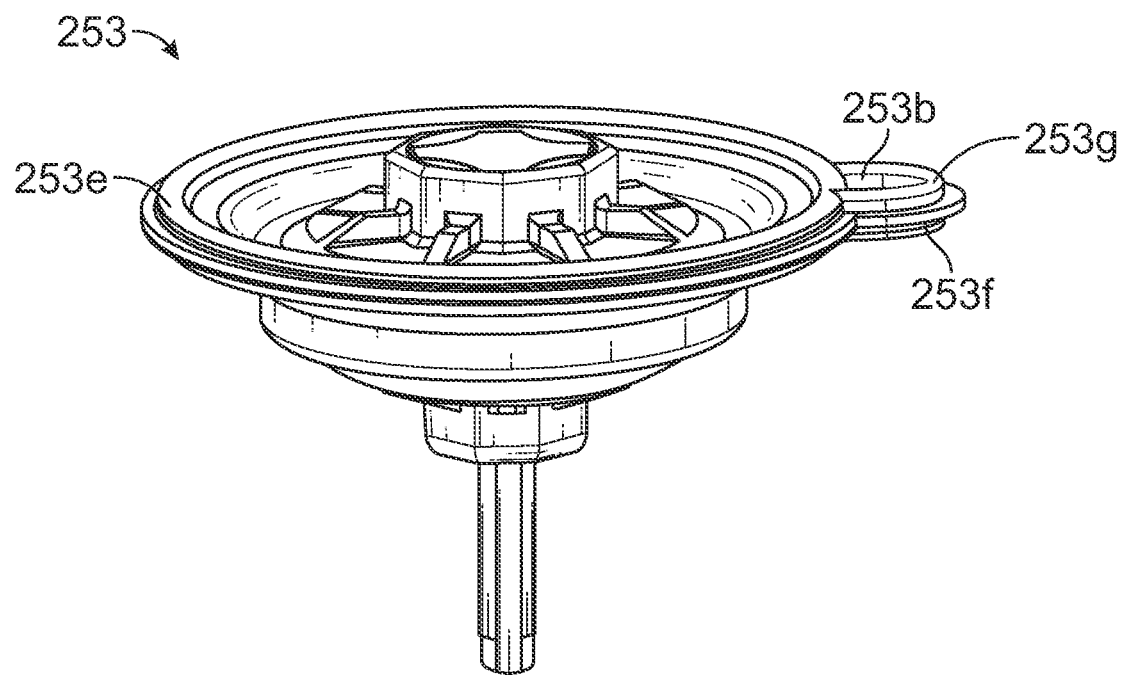
FIG. 38A is a perspective top view of a diaphragm assembly of the control zone device of FIG. 22.
Figure 38B:
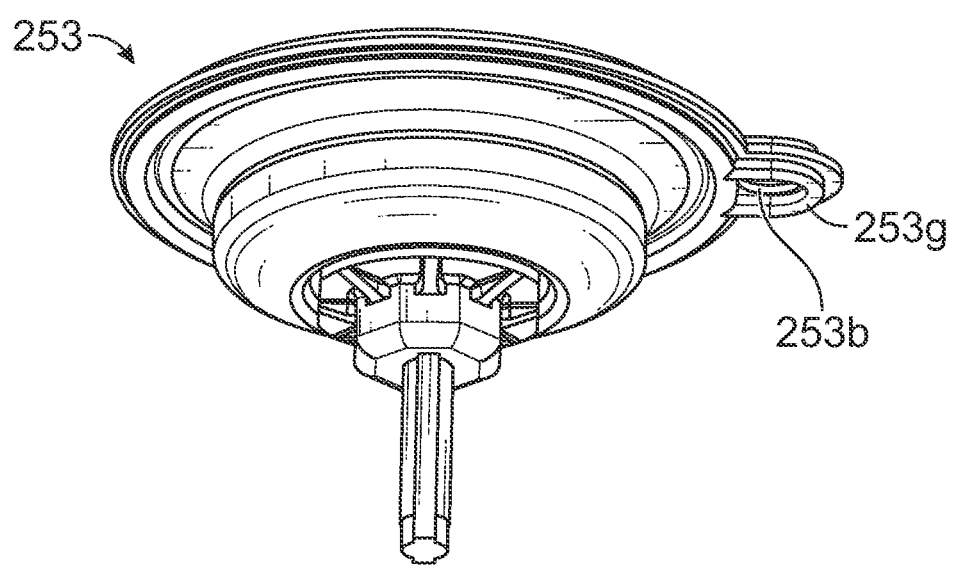
FIG. 38B is a perspective bottom view of the diaphragm assembly of the control zone device of FIG. 22.
Figure 38C:
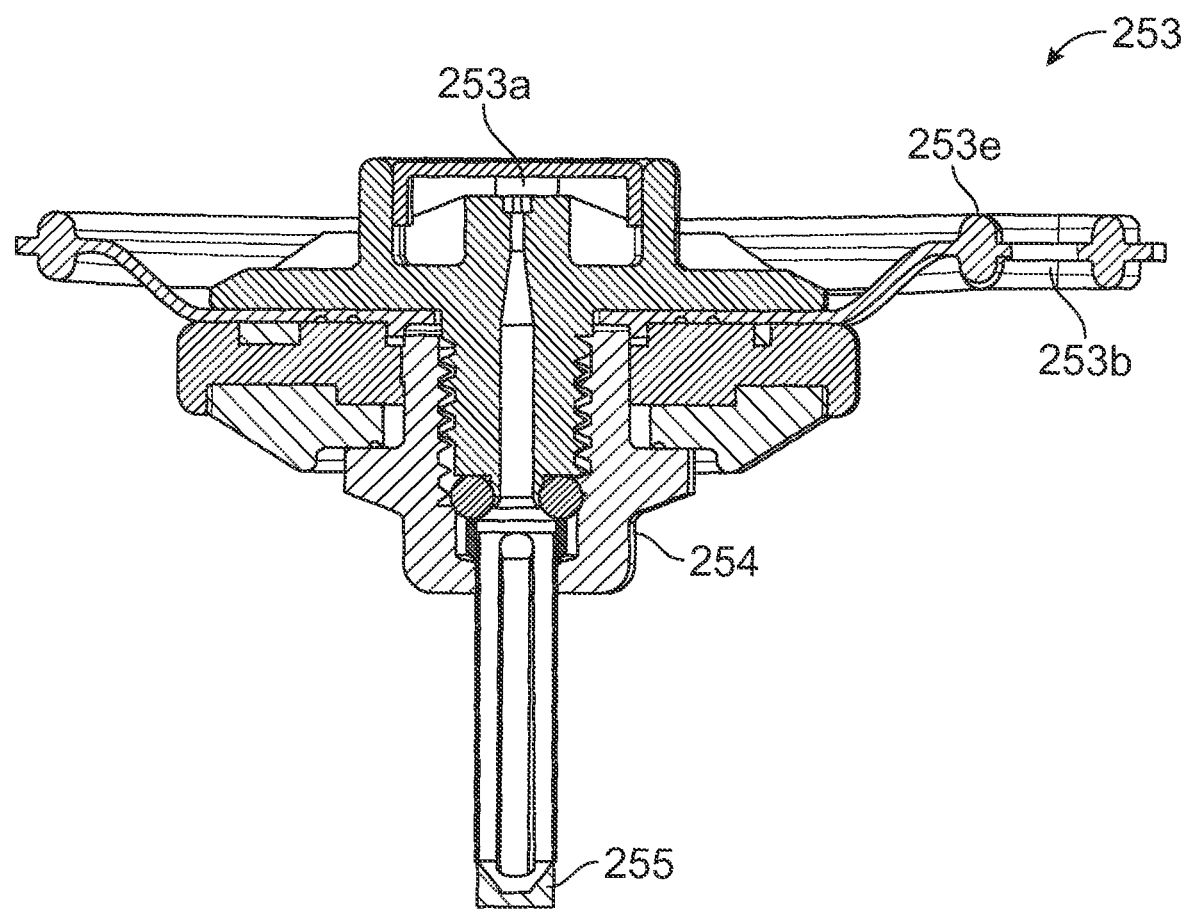
FIG. 38C is a central cross-section view of the diaphragm assembly of the control zone device of FIG. 22.

The inner cylindrical body 248 further includes an inner rib 240a, an outer rib 241, and an annular recess 239 therebetween. The inner rib 240a and the outer rib 241 may be substantially level with the outer rim 231a of the valve cap 236. The ribs 240a, 241 and the annular recess 239 cooperate to allow a diaphragm of a valve to be retained in part by the interface cap 230. For instance, a corresponding annular bead 253e about the perimeter of diaphragm 253 (FIGS. 38A-38C) seats in the annular recess 239. In addition, an angled annular surface 240b may extend radially inward into the central opening 248a from the inner rib 240a. The angled annular surface 240b supports a corresponding angled portion of the diaphragm 253.

The boss 245 is part of the interface cap vent passage 238 and projects axially and is between the inner cylindrical body 248 and the outer cylindrical body 231. The vent passage boss 245 has a tab-like outer configuration with a rounded portion housing at least a portion of the interface cap vent passage 238. The boss 245 aligns with a pressure regulator vent passage 261 (FIG. 39) and receives fluid from the valve body 252. Specifically, a tubular interface cap vent passage inlet 238a extends upwardly from the boss 245, so that the tubular interface cap vent passage is raised with respect to the rim 231a of the valve cap 236. The tubular interface cap vent passage inlet 238a is sized to provide a tight sealing fit within the recess 262c of the valve body 252 to align with and receive fluid from the pressure regulator vent passage 261.

The interface cap vent passage 238 includes an axial segment 238c extending through the boss 245 from the interface cap vent passage inlet 238a. The interface cap vent passage 238 then turns to a radial segment 238d to deliver fluid to an interface cap vent passage outlet 238b. The radial segment extends through a wall of the inner cylindrical body 248 of the valve cap 236. With this configuration, fluid is received from the valve body 252 and is vented through the vent passage 238 to the interior 248a of the interface cap 230.

The outer rib 241 and the annular recess 239 protrude radially outward to encompass the axially projecting portion of the boss 245. The annular recess 239 further encircles this portion of the boss 245.

With reference to FIGS. 33D and 38A-38C, the tubular vent passage inlet 238a portion of the boss 245, the inner rib 240a, the outer rib 241, and the annular recess 239 of the valve cap 236 cooperate with a vent passage tab 253f of the diaphragm 253 to locate the diaphragm 253 during assembly and to help retain the diaphragm 253 in position during operation. More specifically, the diaphragm 253 may have a primary annular bead 253e at the perimeter portion of the diaphragm 253 and a secondary bead 253g at the perimeter portion of the tab 253f. The tab 253f extends radially from the diaphragm 253 and defines a vent passage hole 253b inside the secondary bead 253g.

When installed, the vent passage hole 253b on the diaphragm 253 is aligned with the tubular vent passage inlet 238a of the interface cap 230. The beads 253e, 253g of the diaphragm 253 sit in the annular recess 239 of the interface cap 230. The tubular vent passage inlet 238a is sealingly received in the vent passage hole 253b and allows the diaphragm 253 to be maintained securely in position on the interface cap 230. The tubular vent passage inlet 238a also enables proper orientation of the diaphragm 253 during installation.

Figure 62:
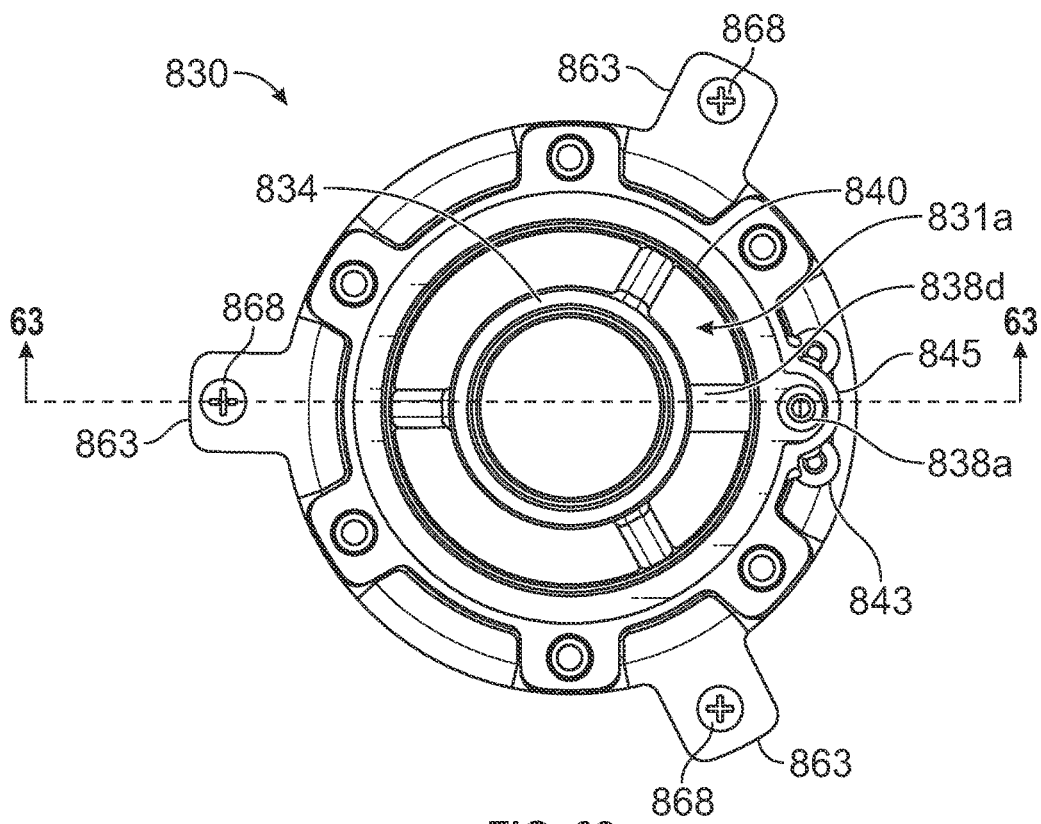
FIG. 62 is a top view of an alternative interface cap.
Figure 63:
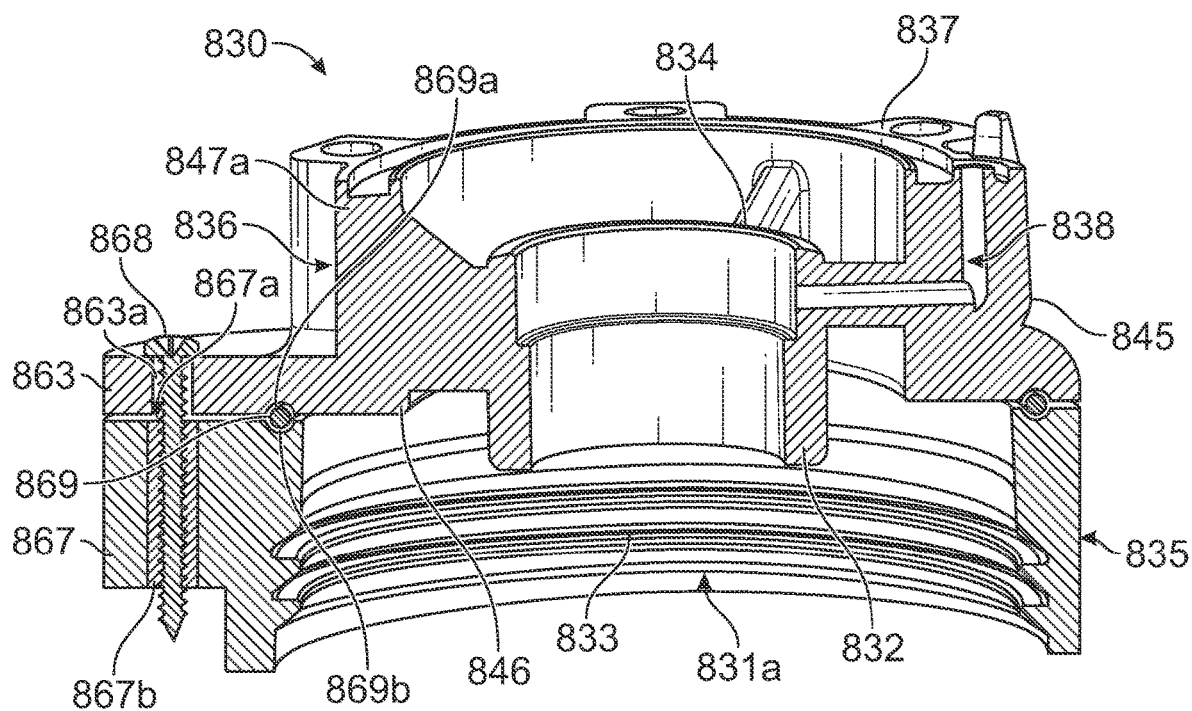
FIG. 63 is a cross-section view of the interface cap of FIG. 62 taken along section line 63-63.

As illustrated in FIGS. 33D and 35A-35C, the filter cap 235 is ring-shaped with a hollow interior. The filter cap 235 may have a diameter that is substantially similar to the valve cap 236, except that a rim portion 249a extends further radially outwards. As discussed above, the rim portion 249a includes internal bayonet threads 249b that cooperate with external bayonet threads 247c on the valve cap 236 to connect the pieces together. The bayonet threads 249b, 247c force the valve cap 236 and the filter cap 235 away from one another to increase the friction between the components to secure them against unintentional separation. Other attachment methods, such as threading, also can be used between the filter cap 235 and the valve cap 236. Another possible attachment method is illustrated in FIGS. 62 and 63 for a cap 830 and described further below.

When connected, the bayonet threads 247c of the valve cap 236 rest on an annular inner shelf 249c of the filter cap 235 adjacent the rim portion 249a, and the top annular portion 247a of the valve cap 236 rests on the rim portion 249a. Further, as shown, when the filter cap 235 and the valve cap 236 are connected together, the central passage 248a extends axially through the interface cap 230. At the filter cap 235, the central passage 248a is sized to receive the main body 206 of the control zone device 200 for attachment, as well as allow the filter 220 to be inserted into and removed from the main body 206.

The filter cap 235 also includes internal threads 233 for threading onto the main body 206. When the interface cap 230 is attached to the main body 206, the annular floor 246a of the valve cap 236 seats on the rim 219 of the main body 206 (FIG. 29). The contact between the annular floor 246a and the rim 219 of the main body 106 can contribute to sealing between the interface cap 230 and the main body 206. Alternatively, or additionally, an o-ring 211a seated in an annular o-ring groove 211 presses against the interior wall of the bottom portion 247b of the valve cap 236 to provide sealing.

Figure 37:
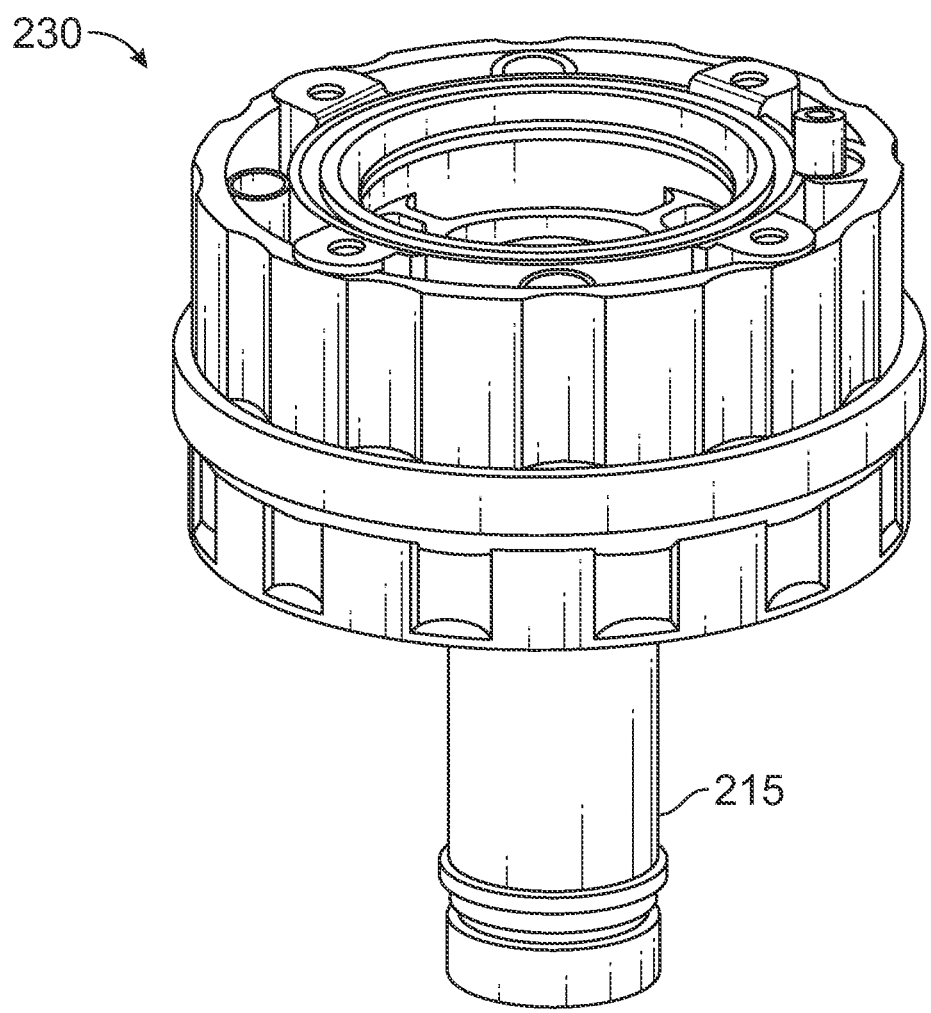
FIG. 37 is an alternative configuration of the interface cap of the control zone device of FIG. 22.

As described above, the flow tube 215 of the interface cap 230 is a separate piece connected to the central inner tube 232 of the interface cap 230 and the longitudinal portion 203b of the inlet passage 203 of the main body 206. However, as illustrated in FIG. 37, the flow tube 215 also can be a permanent part of the interface cap 230. For instance, the flow tube 215 may extend integrally from the central inner tube 232 of the valve cap 236 or may be welded to the central inner tube 232.

Figure 36:
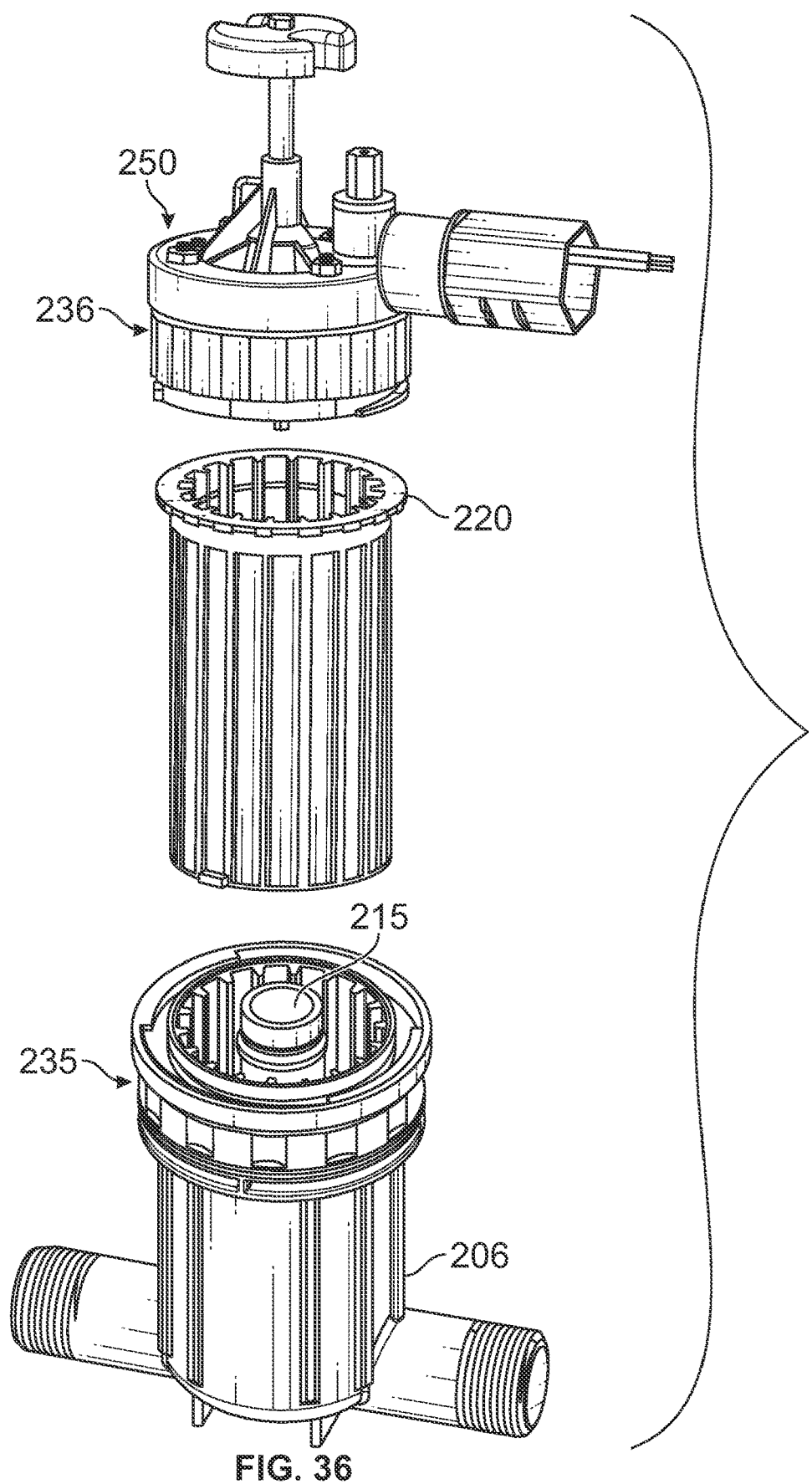
FIG. 36 is a diagrammatic illustration of the valve cap of the interface cap and a valve body assembly removed from the filter cap and main body of the control zone device of FIG. 22 so that a filter can be removed from the control zone device.

The manner in which the interface cap 230 attaches to the valve 250 and the main body 206 of the control zone device 200 is advantageous. Specifically, the different attachment mechanisms between the valve cap 236 and the filter cap 235, between the valve cap 236 and the valve 250, and between the filter cap 235 and the main body 206 permit a compact, stacked configuration of the control zone device 200, while still enabling the interface cap 230 (or the valve cap 236) to be removed from the main body 206 without disturbing the valve 250. For instance, as illustrated in FIG. 36, if a user desires to remove the filter 220 from the main body 206, in order to clean or replace the filter 220, the user simply turns the valve cap 236 a quarter to half turn to detach the valve cap 236 from the filter cap 235. As illustrated, the filter cap 235 remains on the main body 206 so that the valve cap 236 can be easily reattached.

With this configuration, the valve cap 236 detaches from the control zone device 200 with the valve 250 still attached securely to the valve cap 236. Thus, there is no need to rebuild the valve 250 on the interface cap 230 each time a user desires to clean or replace the filter 220, or otherwise access the interior of the main body 206. This prevents the possibility that the diaphragm 253 will be damaged or not aligned correctly in the device 200, which can negatively impact the function of the valve 250. It is noted that a user also can access the main body 206 by unthreading the entire interface cap 230 from the main body 206. This maneuver also does not disturb the valve.

As shown in FIGS. 38A-40, the annular bead 253e of the diaphragm 253 extends axially in both directions. The annular bead 253e seats in facing annular recesses 262a, 239 of the valve body 252 and the interface cap 230, respectively. The annular recess 262a on the underside of the valve body 252 may include an annular rib 262b that pinches down on the annular bead 253e.

The vent passage hole 253b aligns with the vent passage portions of the valve body 252 and the interface cap 230. More specifically, the vent passage hole 253b receives and/or surrounds the tubular vent passage inlet 238a. The vent passage hole 253b is further aligned with the pressure regulator vent passage 261 and the recess 262c of valve body 252. Thus, when the vent passage hole 253b is inserted around the tubular vent passage inlet 238a, the tubular vent passage inlet 238a can be subsequently inserted into the recess 262c so fluid can be communicated from the pressure regulator vent passage 261.

The secondary annular bead 253g seats in corresponding extensions of recesses 262a, 239 of the valve body 252 and the interface cap 230, respectively. As described above, the annular recess 239 of the interface cap 230 extends from the main ring around the tubular vent passage inlet 238a of the interface cap 230. The valve body 252 includes a similar structure. The underside of the valve body 252 includes an extension of the annular recess 262a that encompasses the recess 262c. Thus, when the diaphragm 253 is sandwiched between the valve body 252 and the interface cap 230, the secondary annular bead 253g is retained in the recesses 262a, 239 of the valve body 252 and the interface cap 230, respectively. So configured, the vent passage hole 253b of the diaphragm 253 permits passage of fluid through the diaphragm 253 from the pressure regulator vent passage 261 to the interface cap vent passage inlet 238a. The diaphragm 253 is further secured in position when the valve body 252 is bolted into the valve cap 236 around the perimeter of the components.

With reference to FIGS. 41A-43, there is illustrated the pressure regulator 280 for use with control zone device 200.

The pressure regulator 280 is removably threaded into the socket 264 of the bonnet 252. This enables easy removal for maintenance and/or adjustment or replacement of the pressure regulator 280, such as with pressure regulators having different operating ranges to match the design and components of the irrigation system.

Figure 44:
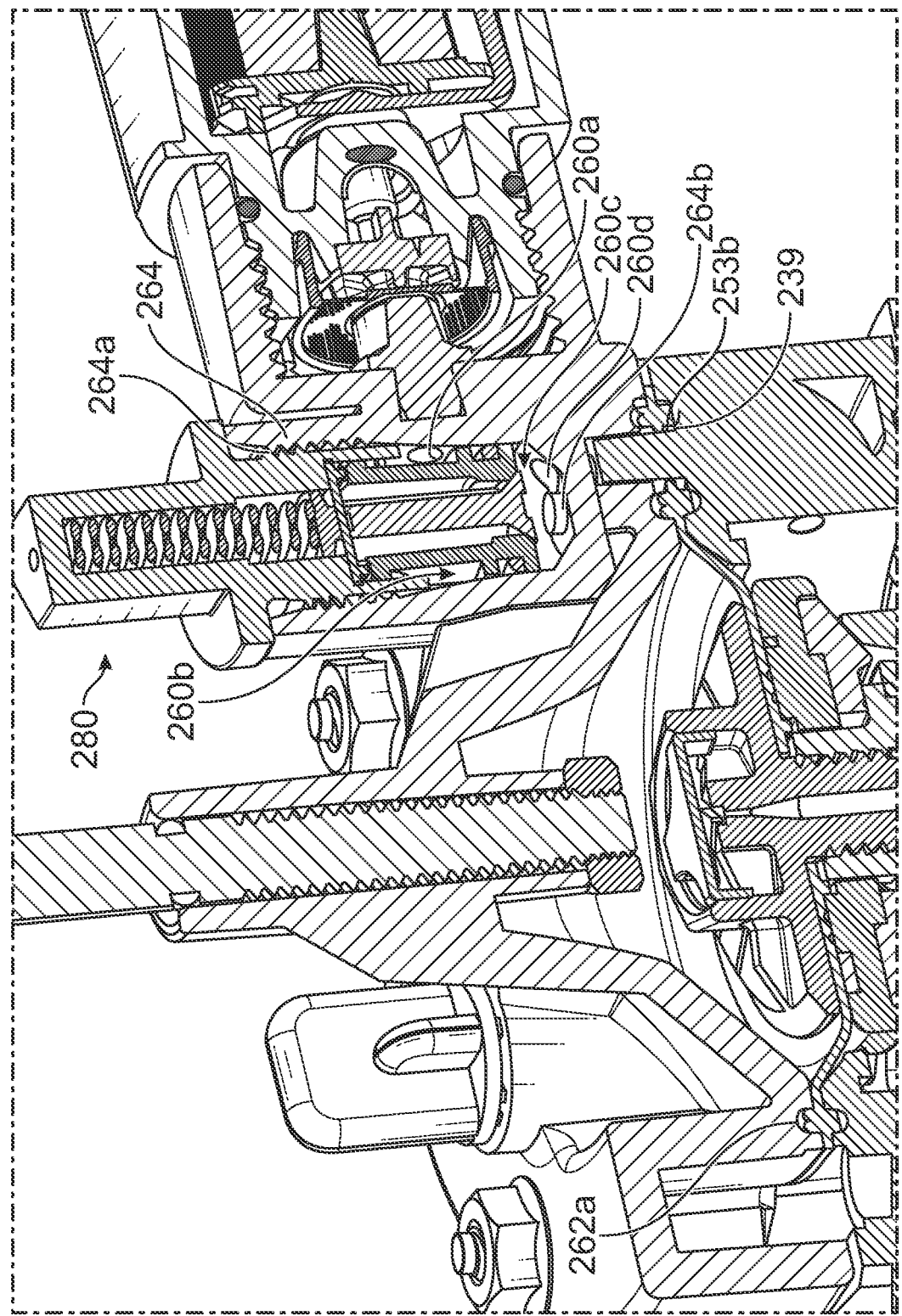
FIG. 44 is an enlarged portion of a central cross section view of the control zone device of FIG. 22.

The pressure regulator 280 includes a housing 281 having an actuator portion 281a, a base portion 281b, and a flange 282 therebetween. The base portion 281b includes external threads 283 for cooperating with internal threads 264a of the pressure regulator socket 264 (FIG. 44). The actuator portion 281a includes external flats 281d for turning the pressure regulator 280 to thread it into the pressure regulator socket 264. The flats 281d may be engaged by hand or a powered hand tool. The housing 281 defines an interior chamber 293a housing a spring 292. The flange 282 may bottom out on the socket 264 to stop further insertion into the socket 264.

The base portion 281b of the main housing 281 includes a plurality of c-shaped openings 281c that each receive a corresponding post 284a projecting from a regulator valve body 284. As illustrated, there may be four such c-shaped openings 281c and posts 284a. The regulator valve body 284 is attached to the main housing 281 by being partially received in the housing 281 and snapping the posts 284a into the openings 281c.

As illustrated in FIG. 44, an annular inlet chamber 260b is between the regulator valve body 284 and a wall defining the socket 264. The inlet chamber 260b receives fluid from a pressure regulator inlet 260a in the socket 264. Fluid from the chamber 260b flows into the pressure regulator 280 through two diametrically opposed openings 286 in the valve body 284. A socket outlet chamber 260c is downstream of the pressure regulator 280 defined between the inboard end 284b of the regulator valve body 284 and the socket 264. The socket outlet chamber 260c receives fluid from the pressure regulator 280 before the fluid exits via a pressure regulator socket outlet 260d at the bottom of the socket outlet chamber 260c.

Figure 42:
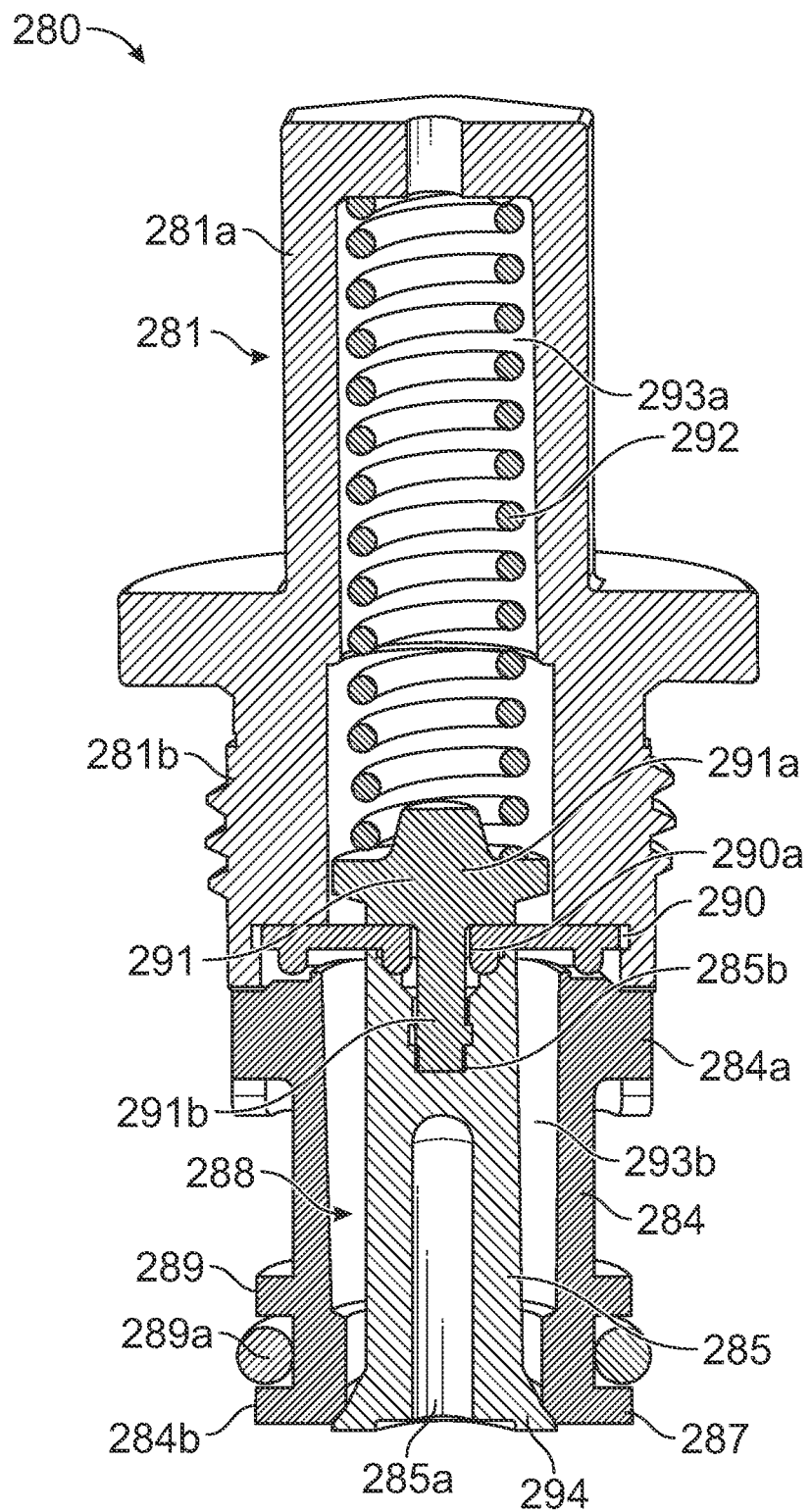
FIG. 42 is a perspective central cross-section view of the pressure regulator of the control zone device of FIG. 22.
Figure 43:
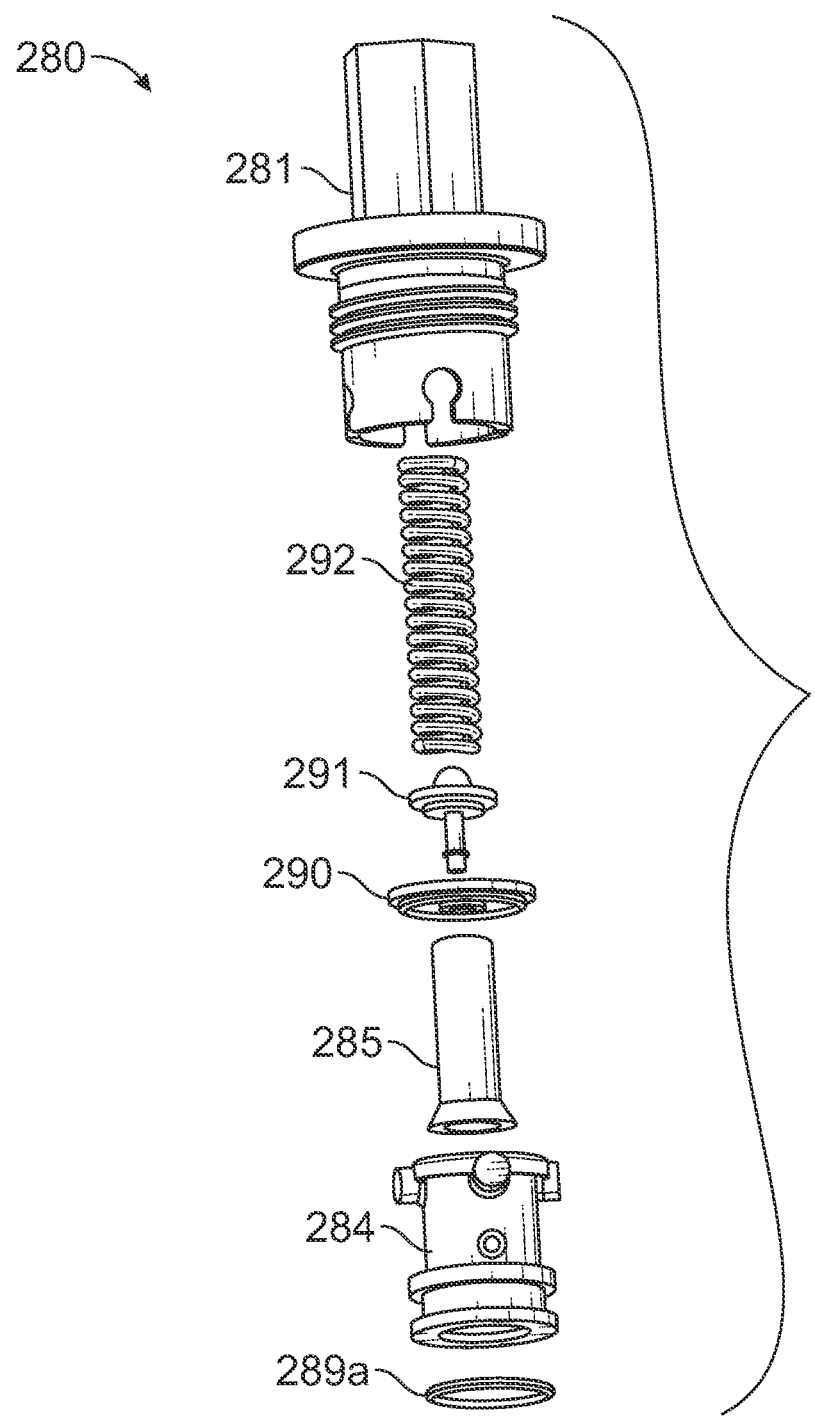
FIG. 43 is an exploded view of the pressure regulator of the control zone device of FIG. 22.

Referring to FIG. 42, the inboard end 284b of the regulator valve body 284 includes an o-ring 289a seated in an o-ring recess 289. The o-ring 289a seals the wall of the pressure regulator socket 264 with the regulator valve body 284 to prevent fluid in the socket inlet chamber 260b from leaking directly into the socket outlet chamber 260c. Thus, fluid must pass through the pressure regulator 280 to flow from the socket inlet chamber 260b to the outlet chamber 260c.

The main housing 281 and regulator valve body 284 house a pre-loaded poppet valve 285. The spring 292 is pre-set to a specific load depending on the desired pressure range for the irrigation system. The spring 292 is positioned in the main housing 281 to provide a bias towards the regulator valve body 284 and an open position for the poppet valve 285.

The poppet valve 285 is centrally disposed in an interior 293b of the regulator valve body 284 and interfaces with the spring 292 via a retainer 291. The retainer 291 cooperates with a diaphragm seal 290 that separates the interior 293a of the main housing 281 from the interior 293b of the regulator valve body 284. The retainer 291 includes an inboard end 291a configured to engage the spring 292 and an outboard post 291b that extends through an opening 290a in the diaphragm seal 290 and forms a snap fit connection in a socket 285b of the poppet valve 285.

The poppet valve 285, the diaphragm seal 290, and the regulator valve body 284 define a valve chamber 288. The openings 286 permit fluid to flow into the valve chamber 288 from the socket inlet chamber 260b. A valve seat 287 provides an opening from the valve chamber 288 of the regulator valve body 284. The poppet valve 285 operates relative to the valve seat 287 depending on the pressure of fluid in the valve chamber 288 of the regulator valve body 284.

More specifically, the poppet valve 285 includes a beveled valve face 294 (e.g., about 45°). The largest diameter portion of the valve face does not pass through the valve seat 287. The valve face 294 engages the valve seat 287 to restrict flow and moves away from the valve seat 287 varying distances to maintain a constant pressure for the downstream flow. The pressure regulator socket 264 includes a post 264b that engages the poppet valve 285 to prevent the poppet valve from blocking the pressure regulator vent passage outlet opening 260d. The poppet valve 285 further includes a central elongated opening 285a to reduce the material of the poppet valve 285 so that the thinner plastic cools faster and forms better during manufacturing. This configuration also reduces the cycle-time of the poppet valve 285 in the molded press, which reduces manufacturing costs.

The movement of the poppet valve relative to the valve seat 287 depends on the supply line pressure. For example, when the poppet valve 285 is unseated from the valve seat 287, fluid with pressure within the preset pressure range simply flows into the valve chamber 288 from the socket inlet chamber 260b, out of the valve chamber 288, and into the socket outlet chamber (or downstream pressure sensing chamber) 260c, and subsequently exits via the socket outlet 260d. On the other hand, fluid with pressure above the preset pressure range causes backpressure in the socket outlet chamber 260c that overcomes the spring force biasing the poppet valve 285 toward the open position and drives the valve face 294 of the poppet valve 285 toward the valve seat 287. This limits flow and pressure downstream of the valve 250. If the pressure is significantly higher than the thresholds set for the pressure regulator 280 (e.g., during a spike), the valve face 294 may be moved into a completely seated or nearly completely seated position on the valve seat 287 to protect the irrigation system. In other words, the spring 292 holds the poppet valve 285 open in an amount determined by the preset pressure regulator setting and the downstream pressure as sensed in the socket outlet chamber 260c. In a typical irrigation system, the relative position of the valve face 294 from the valve seat 287 is often in flux to adjust for fluctuations in the fluid supply line pressure and maintain the pressure of the fluid from the pressure regulator 280 within the preset pressure range.

The pressure regulator 280 in the vent flow path is advantageous because it enables a compact control zone device 200 more precise and efficient pressure regulation. The control zone device 200 operates in the following manner.

Figure 24:
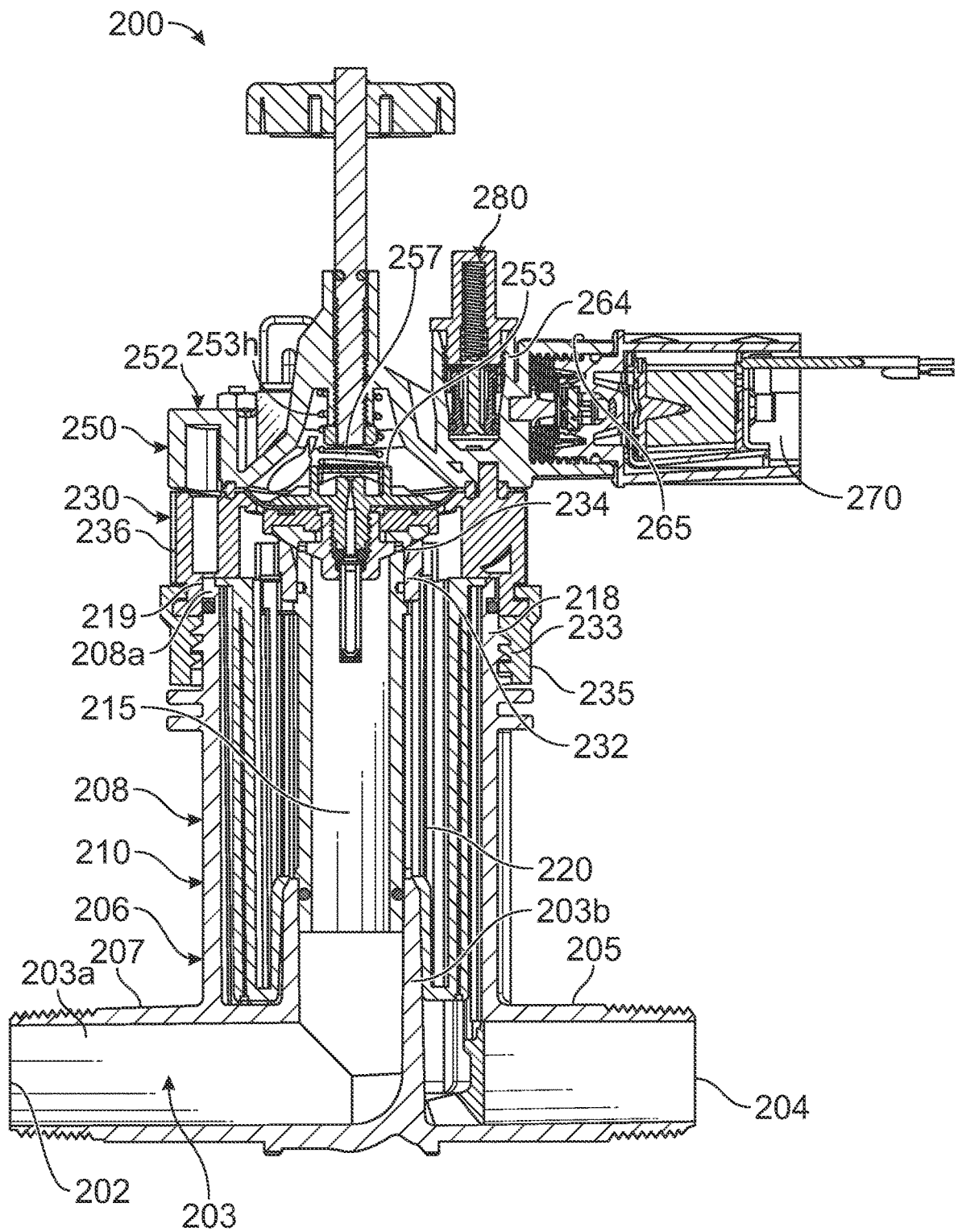
FIG. 24 is a central cross-section view of the control zone device of FIG. 22.
Figure 25:
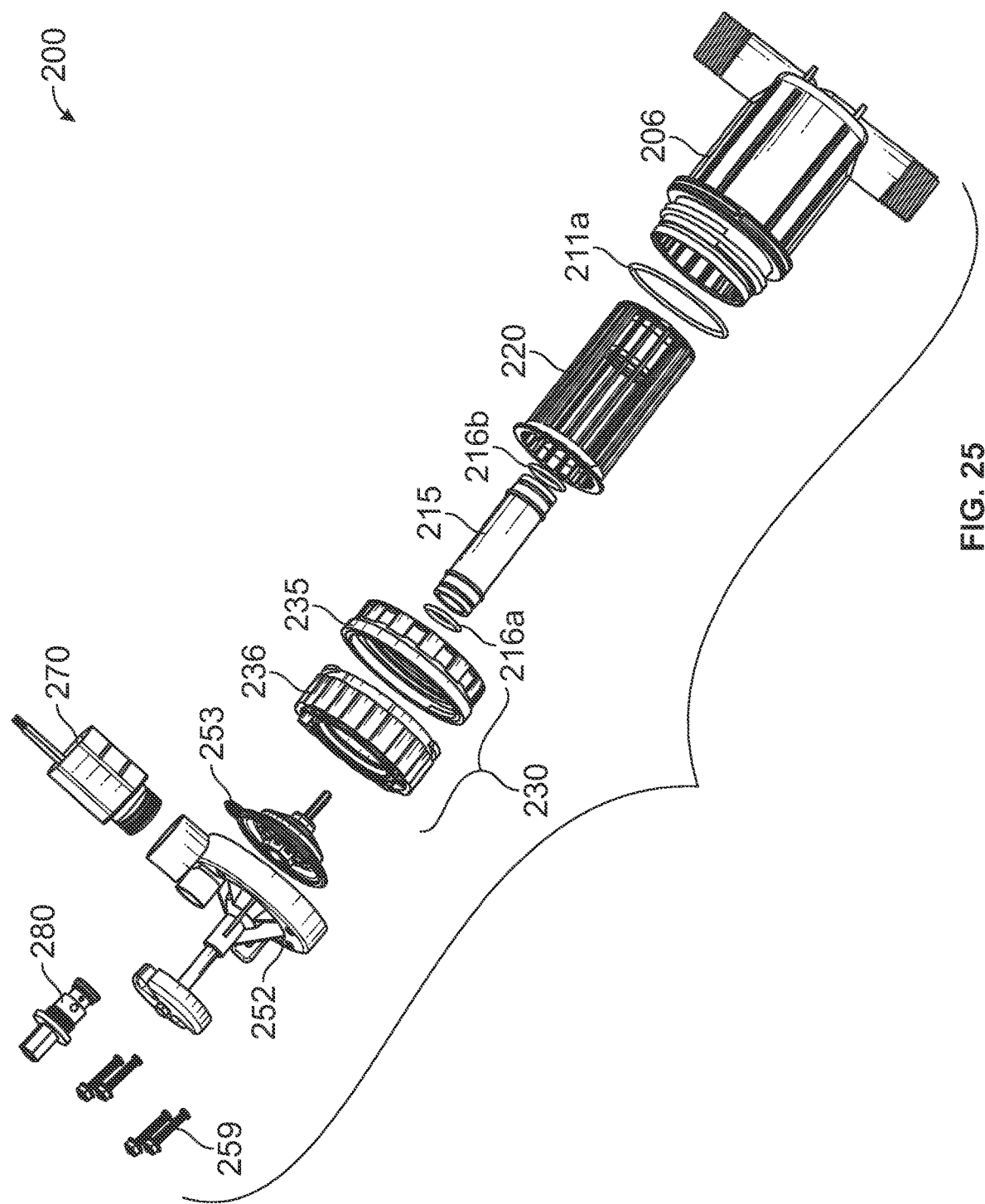
FIG. 25 is an exploded view of the control zone device of FIG. 22.

With reference to FIGS. 24 and 30, fluid from the inlet 202 flows into the inlet passage 203 and then through the central flow tube 215 and the central inner tube 232 of the interface cap 230 towards the valve seat 234. The inlet passage 203, central flow tube 215, and the central inner tube 232 of the interface cap 130 constitute the inflow side 295 of the control zone device 200.

When the solenoid 270 is not energized, a plunger 272 of the solenoid 270 blocks entry of fluid into the solenoid vent passage 256 of the valve 250. Thus, fluid that passes into the pressure chamber 257 through the central orifice 253a of the diaphragm 253 from the inflow side 295 of the control zone device 200 cannot be vented from the pressure chamber 257.

The fluid pressure builds up in the pressure chamber 257 causing the diaphragm 253 to close against the valve seat 234 on the central inner tube 232 of the interface cap 230. The fluid is blocked from passing from the inflow side 295 to the outflow side 296 of the device 200.

To open the valve 250, the solenoid 270 is energized to open the solenoid vent passage 256 to vent fluid from the pressure chamber 257 to the outflow side 296 of the control zone device 200. As a result, the fluid pressure on the inflow side 295 moves the diaphragm 253 off the valve seat 234. In some embodiments, a spring 253h may be in the pressure chamber 257 between the bonnet 252 and the diaphragm 253. The spring 253h provides additional pressure to close the diaphragm 253 and to be overcome when the fluid pressure on the inflow side 295 opens the valve. The force of the spring 253h may be coordinated with the setting of the pressure regulator 280 to ensure that the valve regulates the downstream or outflow pressure to be in the desired range.

More specifically, the plunger 272 of the solenoid 270 is moved off a secondary valve seat 273 to allow fluid, which entered the solenoid bowl 265 through the pressure chamber vent passage 251 (FIG. 31), to be vented from the solenoid bowl 265 via the solenoid vent passage 256. In the illustrated configuration, the secondary valve seat 273 is located on a plunger retainer 271 of the solenoid 270 in fluid communication with the solenoid vent passage 256; however, in other configurations the secondary valve seat can be located at the bottom of the solenoid bowl 265 or on other components within the bowl 265.

As shown in FIGS. 41A-44, after the plunger 272 is lifted from the secondary valve seat 273, the pressurized fluid from the pressure chamber 257 flows from the solenoid vent passage 256 to the pressure regulator 280. Fluid enters the pressure regulator socket inlet chamber 260b via the pressure regulator socket inlet 260a. The fluid flows into the valve chamber 288 within the regulator valve body 284 through the openings 286 in the regulator valve body 284. Depending on the pressure of the inlet fluid and the amount of backpressure in the socket outlet chamber 260c, the poppet valve 285 moves to space the valve face 294 closer or further away from the valve seat 287, increasing or decreasing a restriction on the flow of fluid out of the regulator 280 into the socket outlet chamber 260c.

Regulating the flow of fluid out of the regulator 280 into the socket outlet chamber 260c regulates the rate of flow of fluid through the vent flow path. That is, the rate at which the pressure chamber 257 is vented is adjusted by the regulator 280. This, in turn, affects the amount the diaphragm 253 is moved off the valve seat 234 of the interface cap 230, which has the effect of regulating the pressure of fluid flowing through the valve seat 234 from the inflow side 295 of the device 200 to the outflow side 296.

For example, when the supply line pressure is within the preset pressure range, the valve face 294 of the poppet valve 285 in the pressure regulator 280 is spaced from the valve seat 287 of the pressure regulator 280 so as not to have any or very limited effect on the pressure through the valve 250. More specifically, fluid flows from the pressure regulator 280 into the socket outlet chamber 260c, flows out the socket outlet 260d into the pressure regulator vent passage 261, passes into the tubular interface cap vent passage inlet 238a, flows through the interface cap vent passage 238, and passes out the interface cap vent passage outlet 238b to the depressurized outflow side 296 of the control zone device 200. The outflow side 296 is formed by the central passage 248a of the interface cap 230, the cavity 209 of the main body 206 of the device, and the outlet passage 205 of the device.

When fluid from the pressure chamber 257 is vented in this manner without the pressure regulator 280 needing to make an adjustment or restriction, the diaphragm 253 is lifted off the valve seat 234 to its full or standard extent. This allows the pressurized fluid from the inflow side 295 of the device 200 to pass the valve seat 234 and flow to the outflow side 296 of the device 200 with minimal pressure loss. On the outflow side 296, the irrigation fluid is filtered through the filter 220 as it passes downstream and leaves the device 200 through the outlet 204 for delivery to an irrigation zone at an appropriate pressure.

When the supply line pressure is above the preset pressure range, the valve face 294 of the poppet valve 285 in the pressure regulator 280 moves closer to the valve seat 287 of the pressure regulator 280 and decreases the flow of fluid from the pressure regulator 280 into the subsequent passages of the vent flow path. Though venting still occurs and the pressure chamber 257 is vented, the net balance of the fluid being vented more slowly from the pressure chamber 257 and the high-pressure inlet fluid entering the pressure chamber 257 limits the amount that the diaphragm 253 is lifted off the valve seat 234. That is, the diaphragm 253 is not opened to its full extent, limiting the flow and pressure of the fluid as it passes to the outlet side 296. The amount of restriction at the diaphragm 253 and valve seat 234 is correlated with the amount of restriction created by the pressure regulator 280. This results in the fluid flow from the device 200 being in the desired pressure range.

Regulating pressure using the valve 250 has advantages over a pressure regulator being in the conduit for delivering fluid to the irrigation system. More specifically, a pressure regulator in the conduit typically consumes space ordinarily needed for flow. Thus, the total amount of flow through the pressure regulator, and thus to the downstream system, is reduced. In other words, by regulating pressure using the vent flow path, the main flow path of the fluid is not "choked" up at a pressure regulator.

The configuration also allows for more precise and consistent pressure reduction to the preset pressure threshold because less overall pressure loss occurs compared to a pressure regulator disposed in the conduit. When a pressure regulator is in the conduit, the flow of fluid is subjected to pressure loss as it passes through the pressure regulator. On the other hand, when the pressure regulator is in the vent flow path, the entire flow of fluid is not subjected to this pressure loss.

Figure 1:
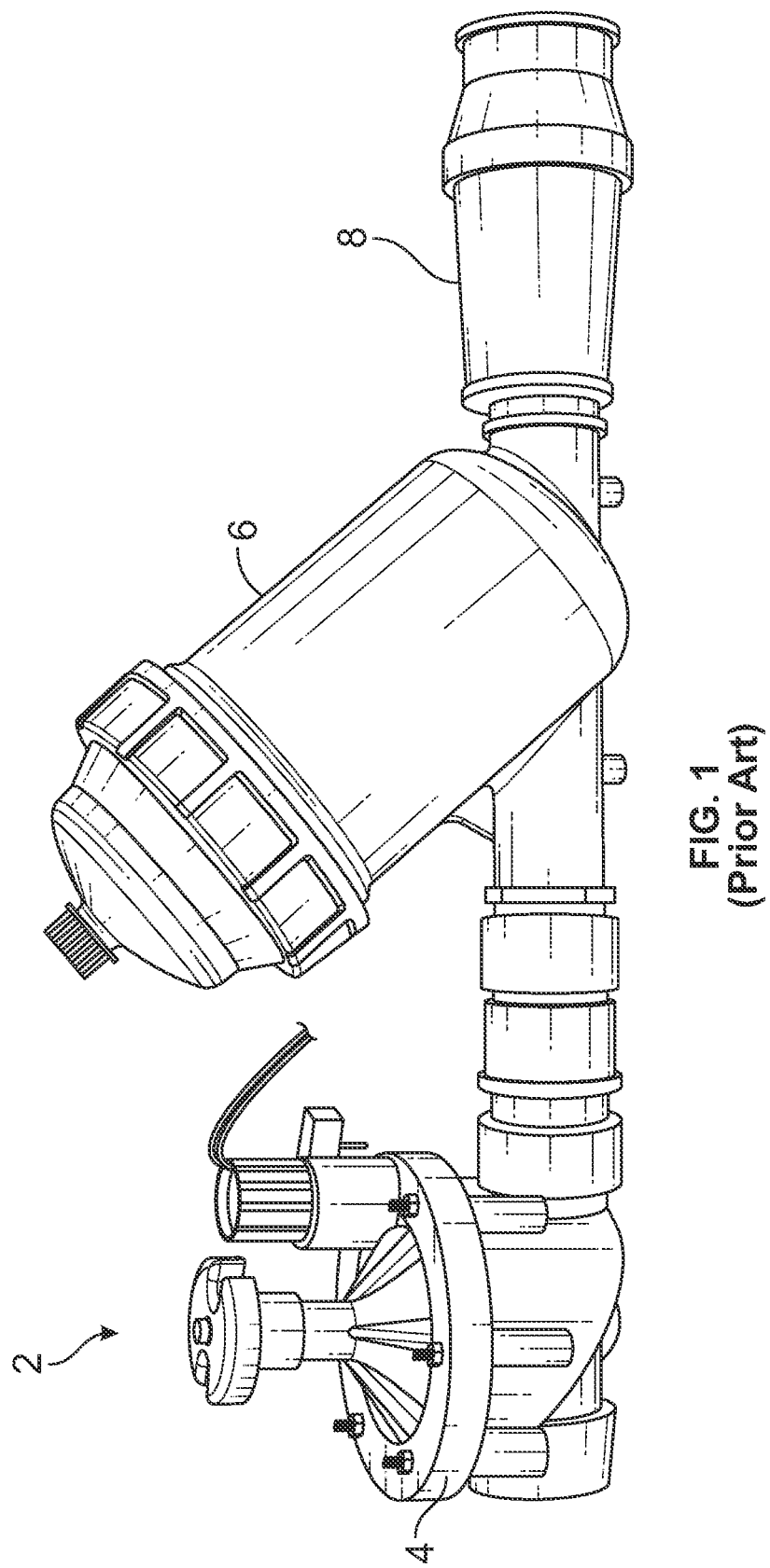
FIG. 1 is a perspective view of a known control zone assembly having a valve, filter, and pressure regulator spaced along a conduit.

More generally, the control zone device 200 having the valve, the filter, and the pressure regulator "compacted" into a single device also contributes to increased performance characteristics and efficiency of the system. For example, using multiple individual components assembled in series (e.g., see FIG. 1) can require a higher inlet pressure to achieve a desired outlet pressure. The control zone devices described herein, and particularly when the pressure regulator is located in the vent flow path, are less restrictive on the flow and result in less overall pressure loss. The effect is that a lower inlet pressure can be used and still achieve the desired outlet pressure.

With reference to FIGS. 45-48, there is shown another compact control zone device 300. The control zone device 300 includes a main body 306, an inlet 304, an outlet 302, a filter 320, a valve 350, an interface cap 330, and a pressure regulator 380. The pressure regulator 380 is located on a bonnet 352 of the valve 350 along a vent flow path for controlling the valve 350. The control zone device 300 differs primarily from the control zone device 200 with respect to the orientation of the flow through the device, the configuration of the interface cap 330, and the vent passage configurations, as described further below. Many of the features of the device 300 are the same as those discussed above for the device 200. The common features may not be specifically referenced in this description of device 300 but are incorporated by reference and will be denoted with the same number except that the number will begin with a "3".

Figure 49:
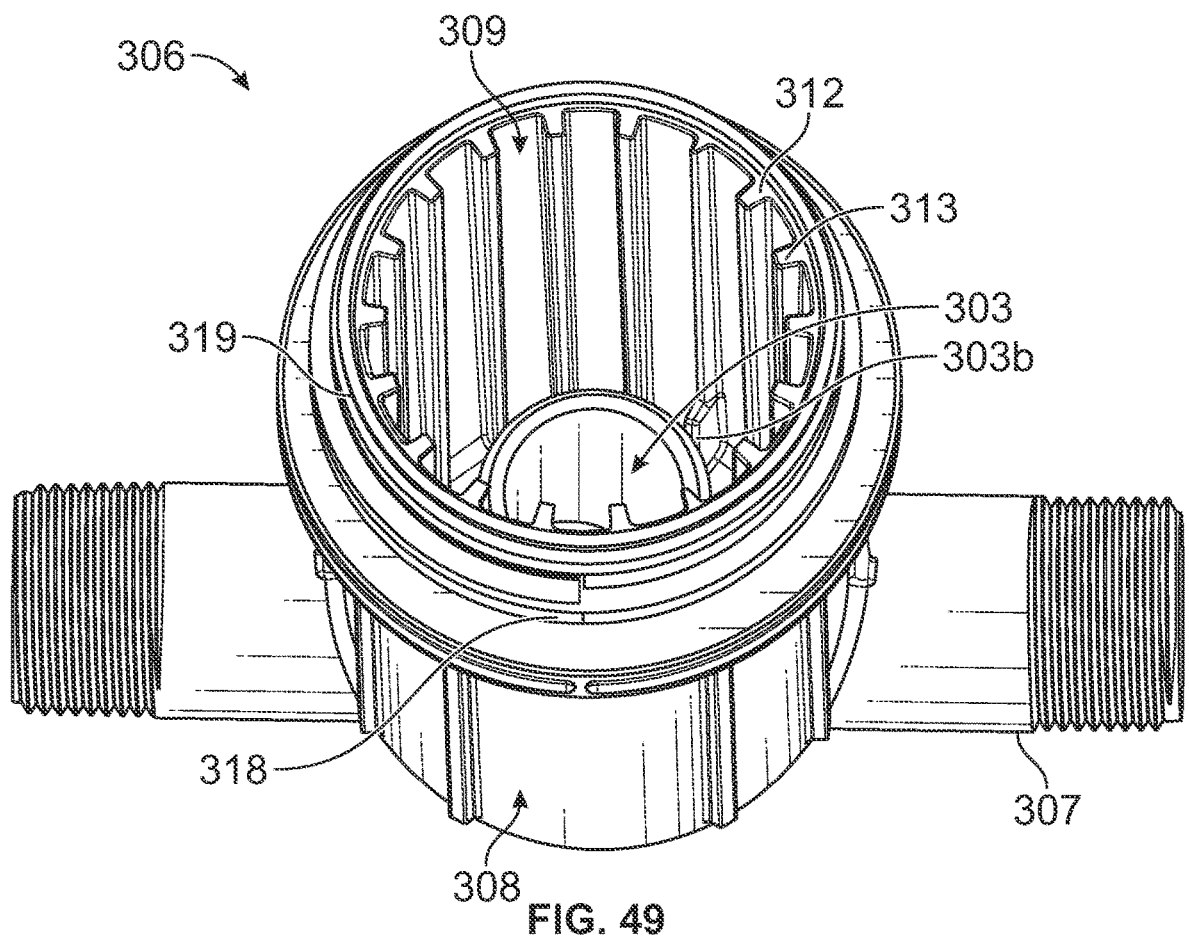
FIG. 49 is a top perspective view of a main body of the control zone device of FIG. 45.
Figure 50:
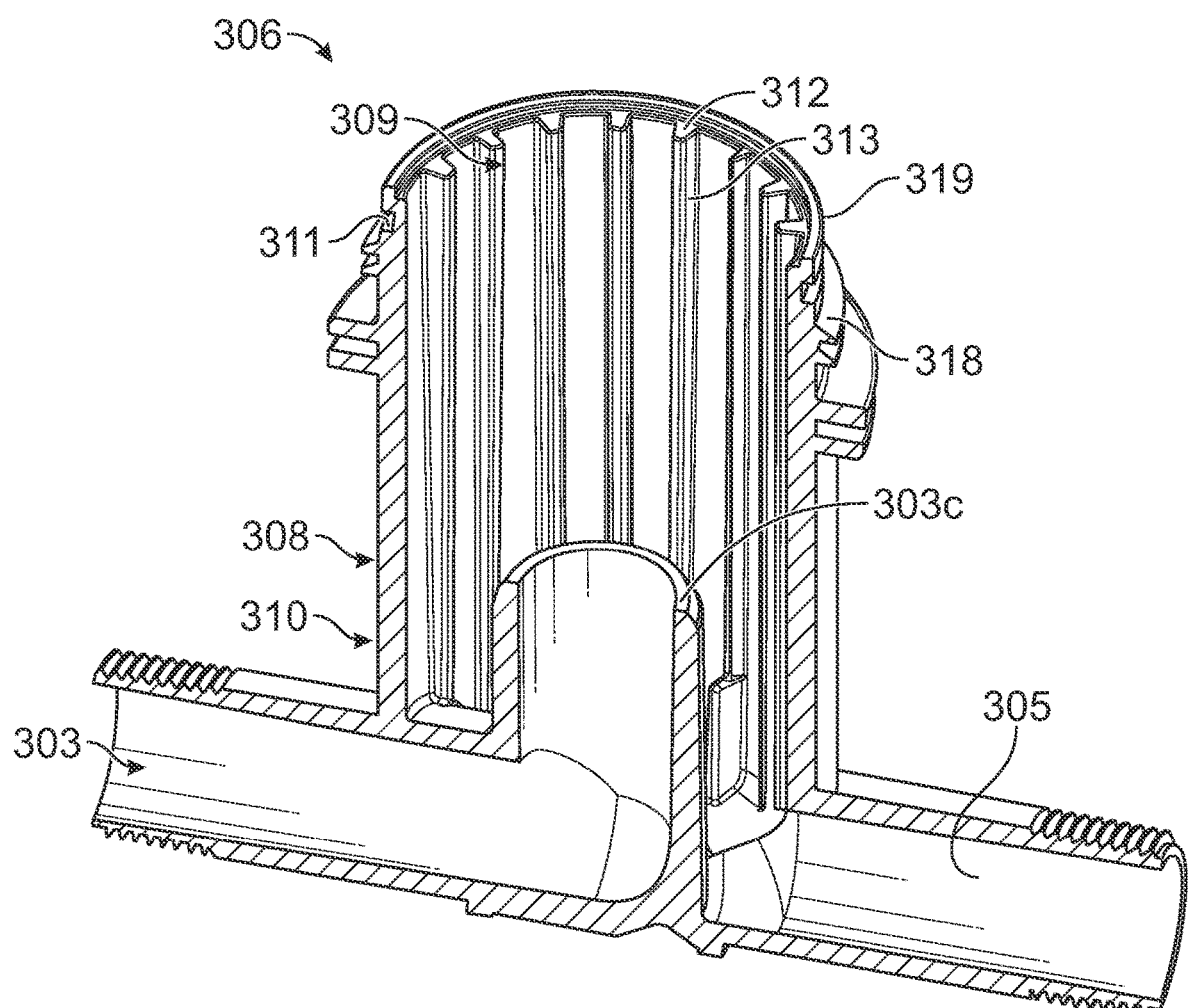
FIG. 50 is a central cross-section view of the main body of the control zone device of FIG. 45.

Generally, the main body 306 is the same as the main body 206 and will not be described in detail here. With reference to FIGS. 49-50, a difference between the main body 306 and the main body 206 is the configuration of the inlet and outlet passages. In device 300, the inlet passage 305 leads directly into the interior 309 of the main body 306. The outlet passage 303, on the other hand, turns into the upper portion 308 at the center of the base portion 307, thus having a lateral portion 303a and a longitudinal portion 303b. The longitudinal portion 303b extends axially within the interior 309 of the upper portion 308 and is attached to the central flow tube 315. The central flow tube 315 delivers fluid from the valve 350 to the outlet passage 303 when the valve 350 opens.

In the illustrated embodiment, the flow tube 315 is not permanently fixed to the device and simply slides in and out of the longitudinal portion 303b and a central inner tube 332 of the interface cap 330. However, by other approaches the flow tube 315 may be permanently fixed to either the longitudinal portion 303b or the central inner tube 332. For instance, the parts can be welded together, or the flow tube 315 and the main body 306 or the flow tube 315 and the interface cap 330 can be a single molded piece.

Figure 45:
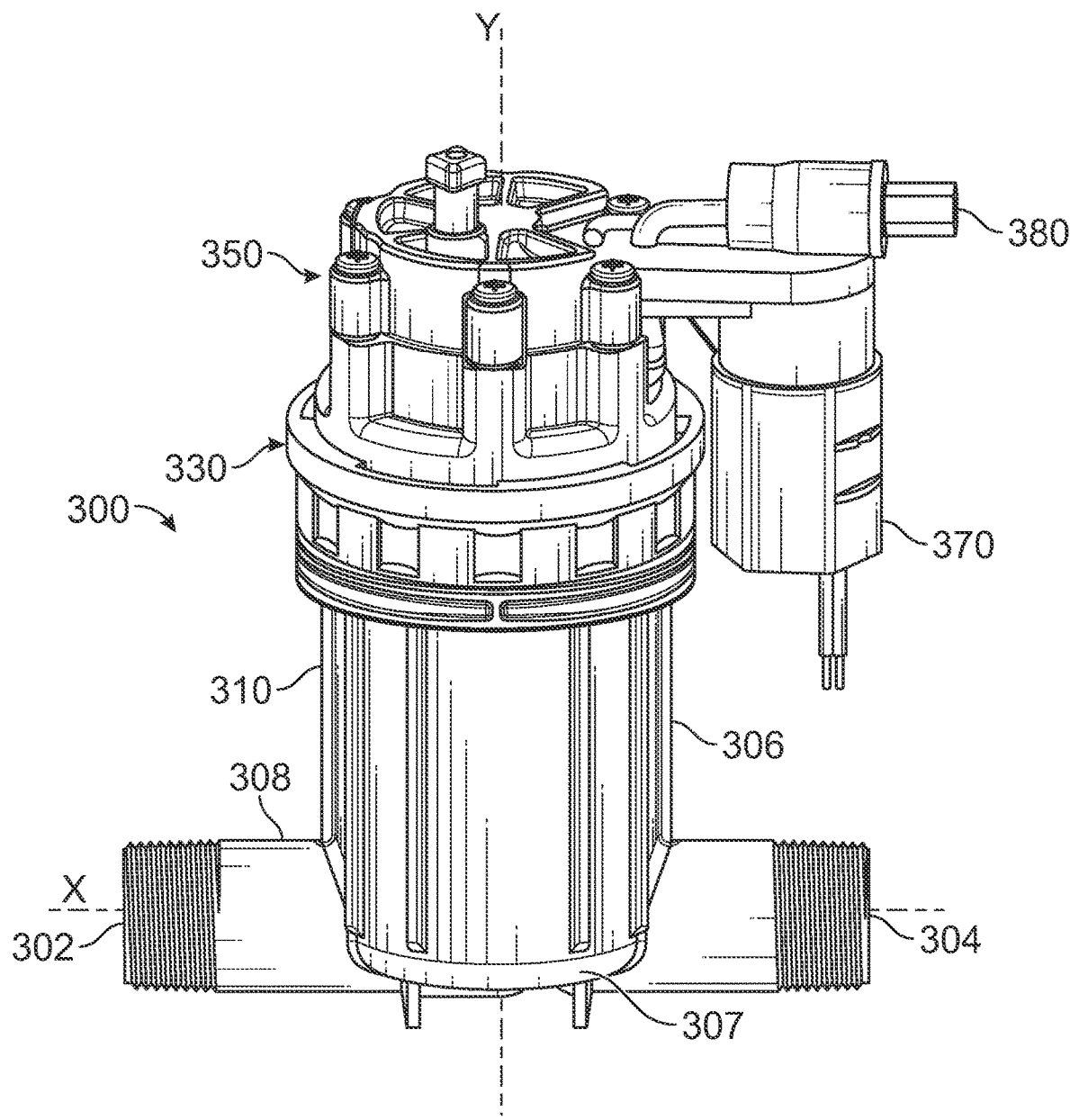
FIG. 45 is a perspective view of a further alternative control zone device.
Figure 46:
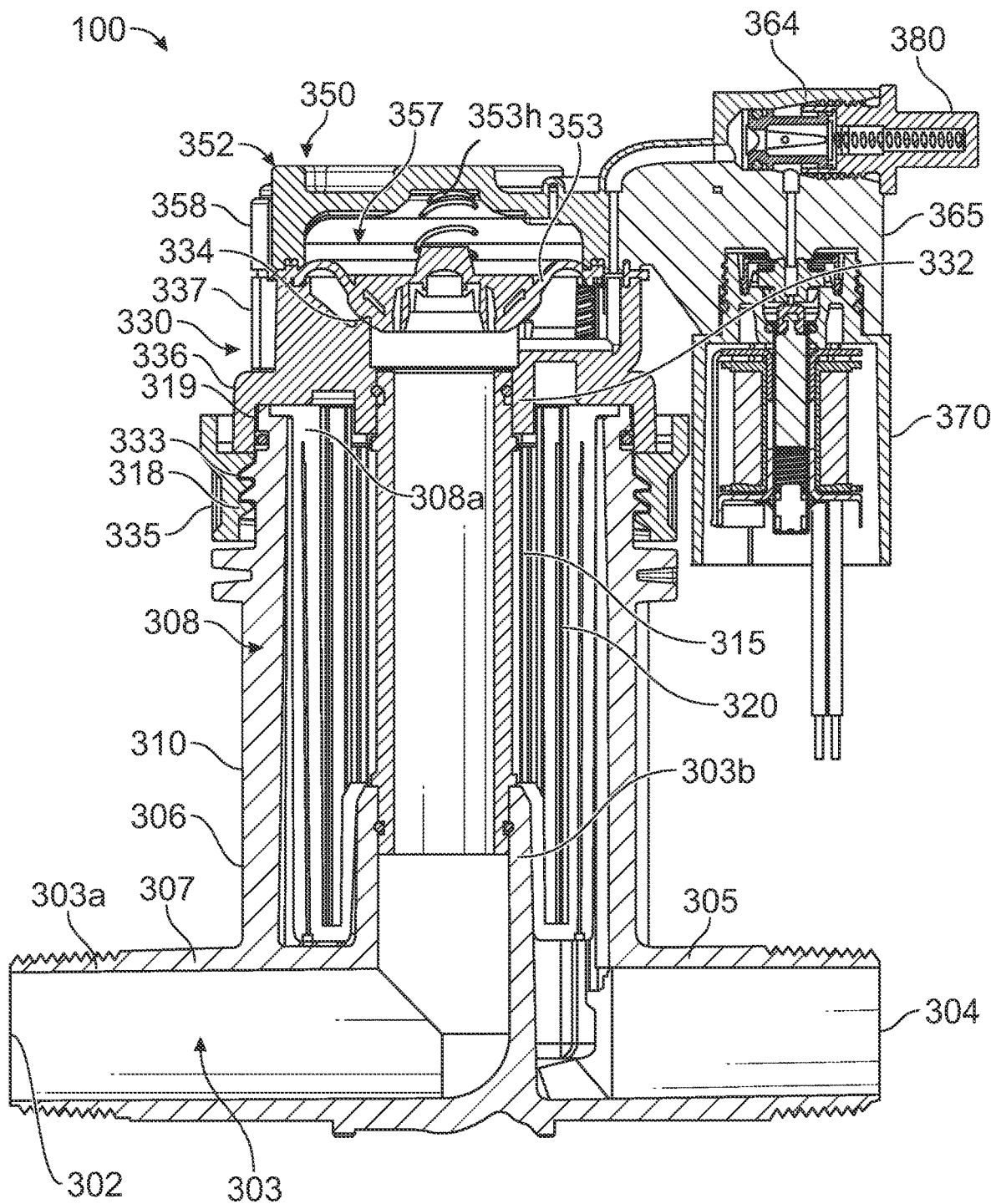
FIG. 46 is a central cross-section view of the control zone device of FIG. 45.
Figure 47:
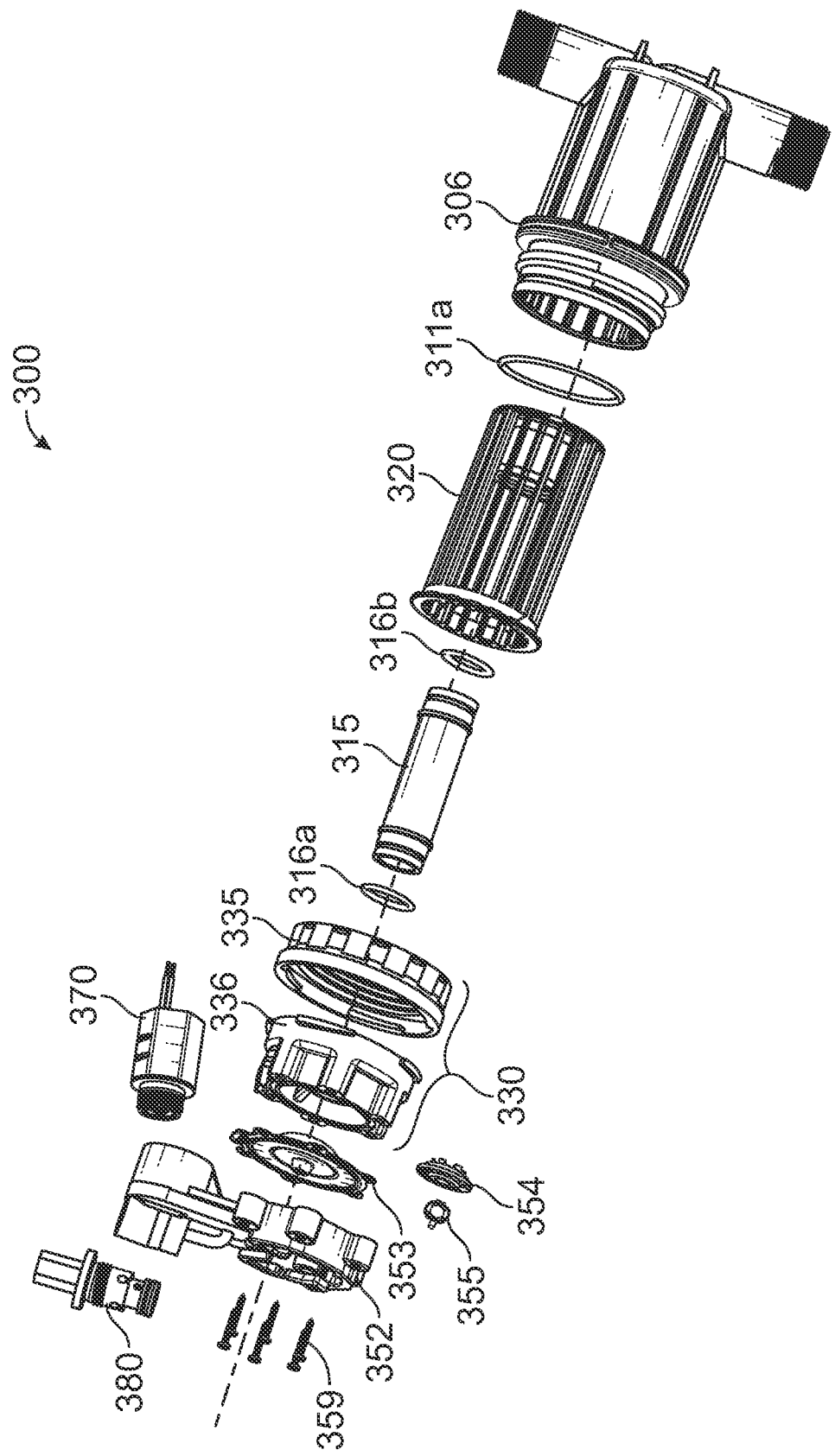
FIG. 47 is an exploded view of the control zone device of FIG. 45.
Figure 52:
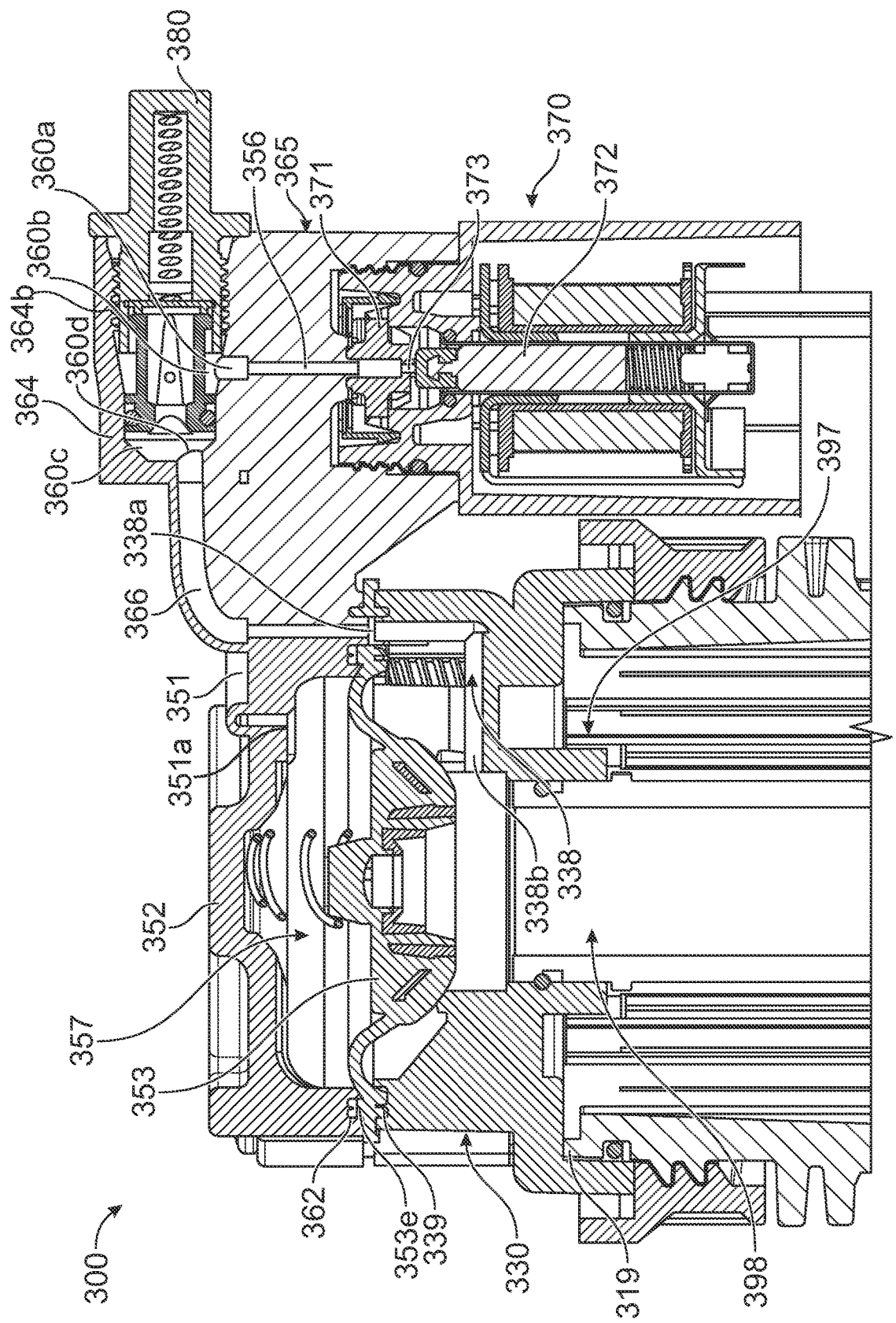
FIG. 52 is an alternative enlarged portion of a central cross-section view of the control zone device of FIG. 45.
Figure 53:
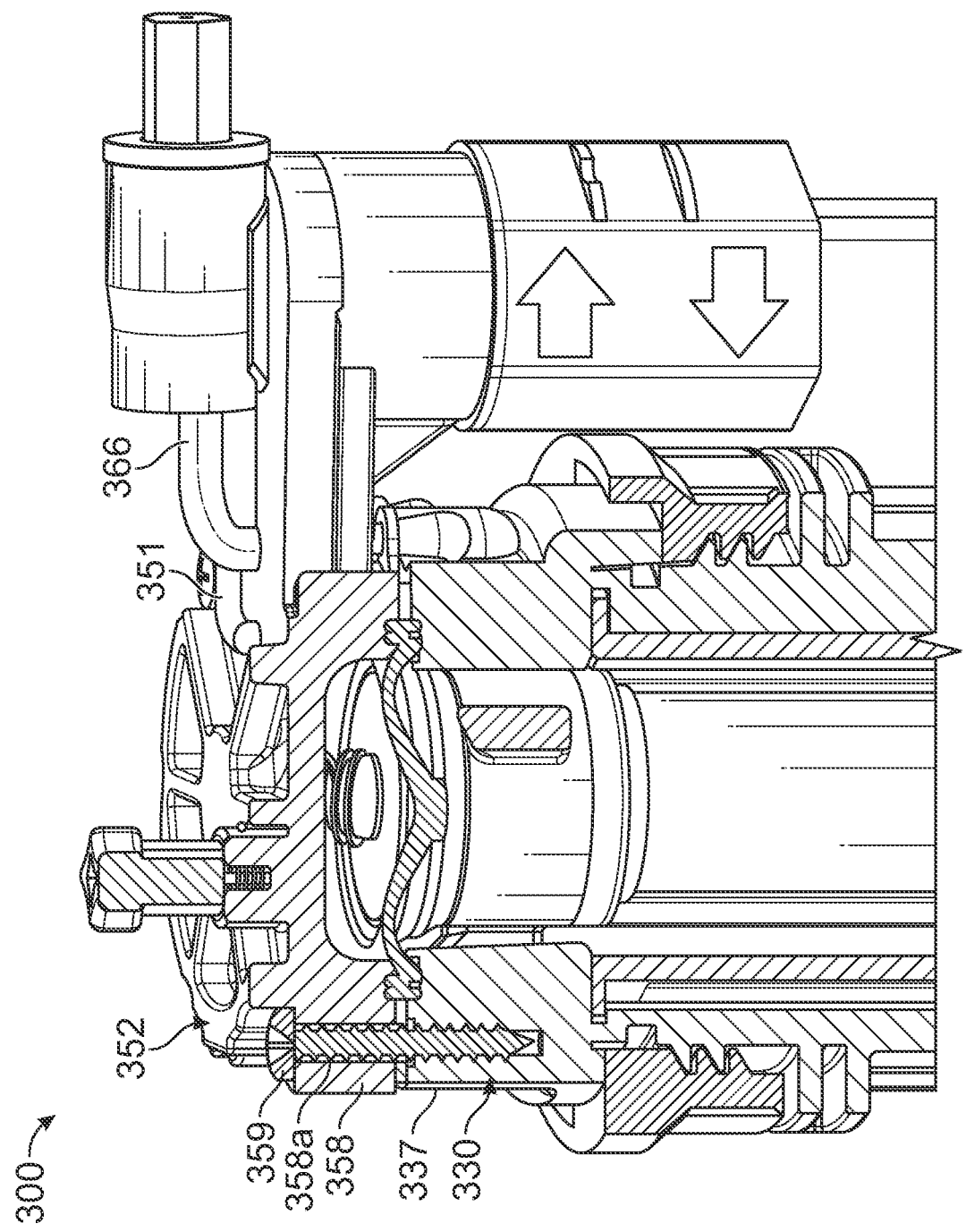
FIG. 53 is an enlarged portion of a cross-section view of the control zone device of FIG. 45 taken along section line 53-53 of FIG. 48.

With reference to FIGS. 46 and 50, the main body 306 includes external threading 318 around an open end portion of the body portion 308. The external threading 318 allows the interface cap 330 to be attached to the main body 306. The interface cap 330 (or coupling or collar) permits the valve 350 to be removably attached to the open end portion of the body portion 308 or filter housing 310. Thus, the valve 350 is removable to clean or replace the basket filter 320 or replace or conduct maintenance on the valve 350. The interface cap 330 also provides an interface between the main body 306 and the valve 350. For example, as illustrated in FIGS. 45 and 52-53, the interface cap 330 is disposed between the valve 350 and the main body 306 and engages with the valve 350, the main body 306, and the flow tube 315 to allow the valve 350 to control flow of water from an inflow side 397 to an outflow side 398 of the device 300.

It is noted that the general flow configuration of the control zone device 300 is opposite to the flow configuration of the control zone devices 100 and 200. In control zone devices 100 and 200, fluid first flows through the flow tube (e.g., 115, 215) to the valve and then, when the valve opens, back through the main body of the device and through the filter prior to flowing out the outlet. In this configuration, the main body (106, 206) is only pressurized when the valve is turned on, which lessens the load on the attachment threads (e.g., 133 and 118) attaching the interface cap and the main body when the valve is off. In control zone device 300, however, fluid first flows through the main body 306 and the filter 320, and then, when the valve 350 opens, flows through the flow tube 315 prior to flowing out the outlet 302. This configuration permits the fluid to be filtered before arriving at the valve seat, protecting the ability of the valve to close reliably.

Figure 60A:
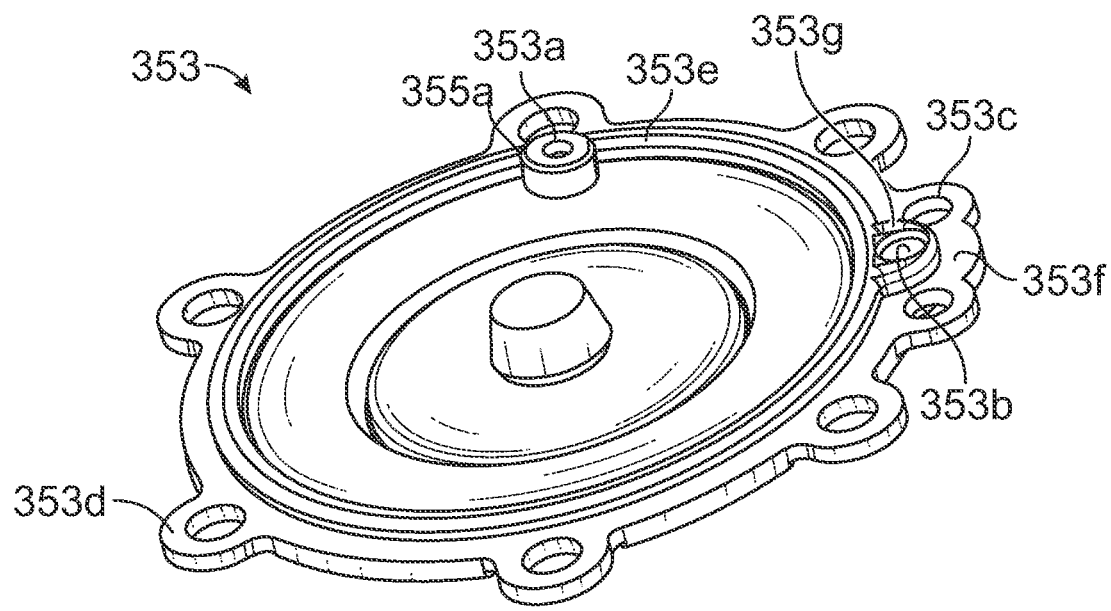
FIG. 60A is a perspective top view of a diaphragm assembly of the control zone device of FIG. 45.

The valve 350 includes a valve body or bonnet 352 and a diaphragm 353. The valve body 352 and the diaphragm 353 define a pressure chamber 357. A support insert 354 is molded into the diaphragm 353. A button filter 355 attaches to the diaphragm 353 with a stud 355a (FIG. 60A) to filter water flowing into the pressure chamber 357. The stud 355a includes an outlet 353a for the filtered fluid that is radially offset from the center of the diaphragm 353. This enables fluid to pass through the webbing of the diaphragm 353 from the inflow side 397. This configuration is referred to as a reverse flow valve. This is the opposite of the configurations of the valves 150, 250, which are forward flow valves in which fluid passes into the pressure chamber through a central hole in the diaphragm. The valve body 352 includes a solenoid socket or bowl 365 to attach a solenoid 370 to the valve 350, as well as a pressure regulator socket 364 to attach the pressure regulator 380 to the valve 350. The solenoid bowl 365 orients the solenoid 370 axially while the pressure regulator socket 364 orients the pressure regulator 280 radially. Other configurations of the sockets are contemplated.

Figure 48:
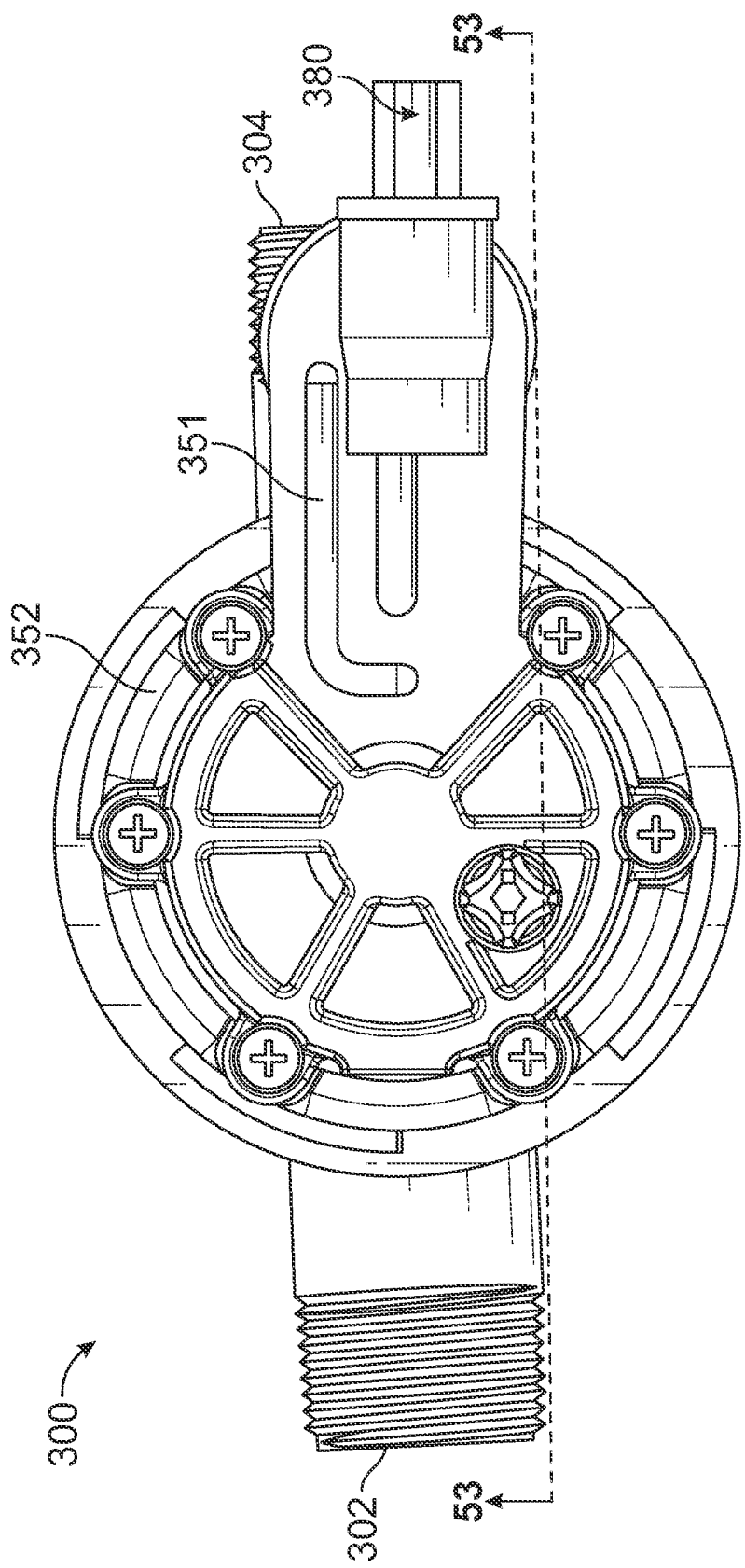
FIG. 48 is a top view of the control zone device of FIG. 45.
Figure 59:
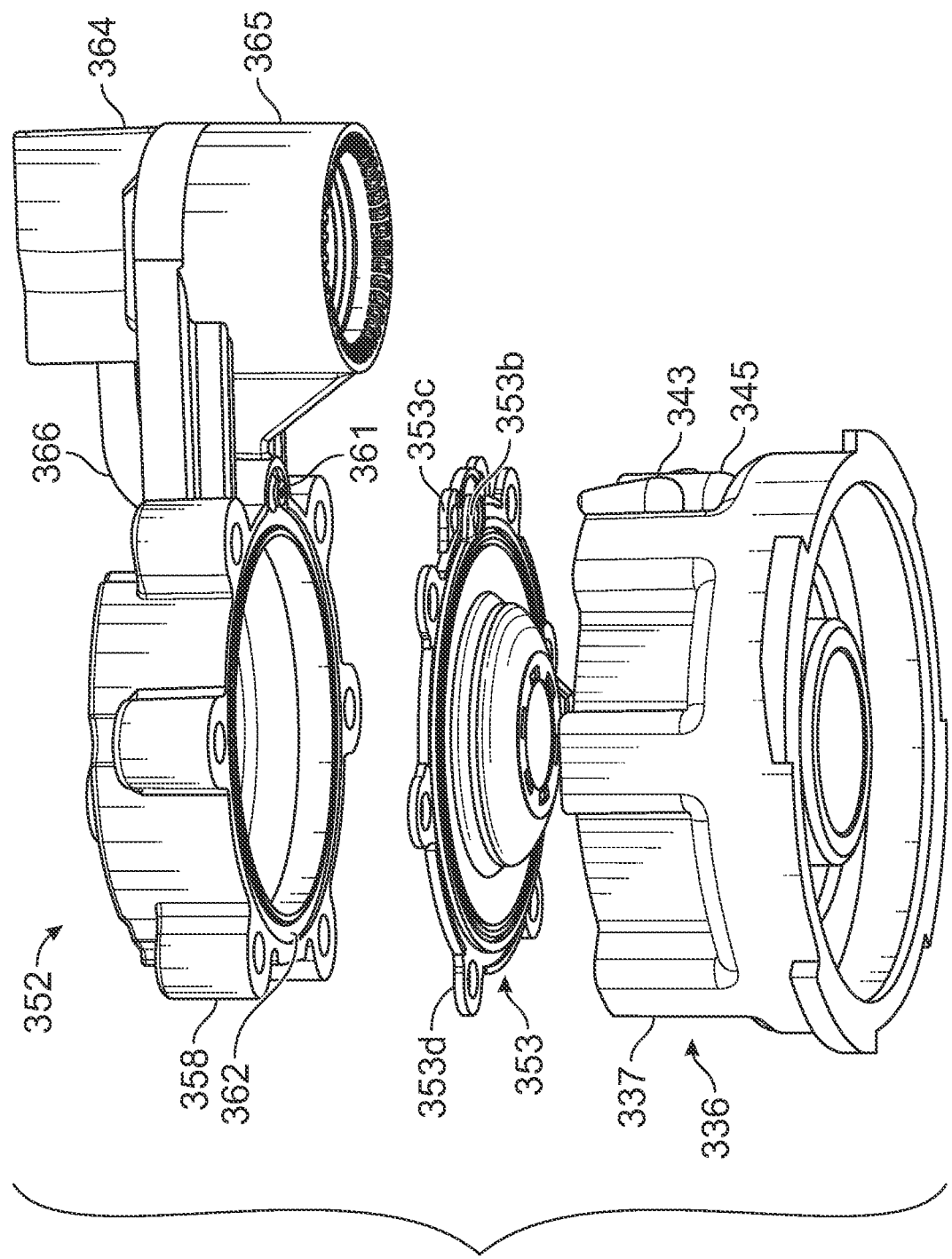
FIG. 59 is a partial exploded view of the control zone device of FIG. 45 showing the valve body, the diaphragm, and the valve cap of the interface cap.
Figure 61:
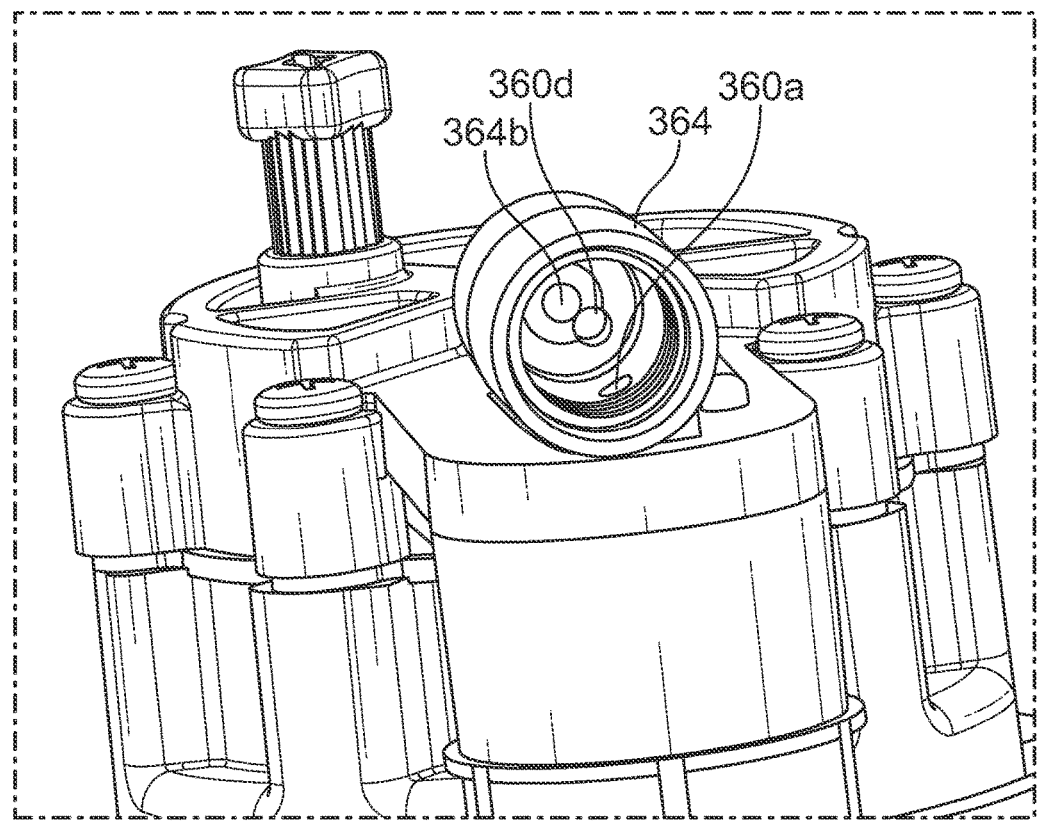
FIG. 61 is an enlarged portion of a perspective view of the control zone device of FIG. 45 with the pressure regulator removed.

The solenoid 370 controls opening and closing of the valve 350 by permitting or inhibiting venting of the pressure chamber 357. As illustrated in FIGS. 48, 52, and 61, a vent flow path includes a first segment, or pressure chamber vent passage 351, that extends from an opening 351a in the pressure chamber 357 to the solenoid bowl 365. The vent flow path includes a second segment, or solenoid vent passage 356, that extends from the solenoid bowl 365 to the pressure regulator socket 364. A third segment, or pressure regulator vent passage 366, of the vent flow path extends from the pressure regulator socket 364 through the valve body 352 to vent passage outlet 361 (FIG. 59). The pressure regulator vent passage outlet 361 communicates with an interface cap vent passage 338.

With reference to FIGS. 54A-F, the interface cap 330 has a generally cylindrical shape having a central passage 331a for receiving, on one side, the valve 350 and, on the other side, the main body 306. Like the interface cap 230, the interface cap 330 is two pieces. Specifically, the interface cap 330 includes an upper piece or valve cap 336 and a lower piece or filter cap 335, which are removably connectable to one another to form the interface cap 330. The filter cap 335 is configured to be removably coupled to the body portion 308, while the valve cap 336 is configured to be removably coupled to the valve 350.

With reference to FIGS. 53 and 55A-C, the valve cap 336 includes a top annular portion 347a and a bottom annular portion 347b. The top annular portion 347a is generally cylindrical and has a smaller diameter than the bottom annular portion 347b. A plurality of ribs 337 extend axially and project radially from the top annular portion 347a. The ribs 337 have a rectangular cross-section with rounded edges, though other geometries are possible. Each rib 337 defines a socket or passage 337a to receive a screw, bolt, or other fastener.

The ribs 337 and the sockets 337a align with the bosses 358 and the screw passages 358a on the bonnet 352. For instance, the ribs 337 align with the bosses 358 located around the perimeter of the bonnet 352. This allows screws 359 to extend through the passages 358a of the bosses 358 on the bonnet 352 and into the sockets 337a on the interface cap 330, securing the bonnet 352 to the valve cap 336 of the interface cap 330. This configuration allows a user to remove the valve 350 from the interface cap 330 if needed for maintenance or replacement. It also allows changing of the diaphragm or the whole valve.

The bottom annular portion 347b includes external bayonet threads 347c for cooperating with corresponding internal bayonet threads 349b on the filter cap 335 to attach the valve cap 336 to the filter cap 335. While four bayonet threads are illustrated, other numbers of bayonet threads are possible.

Figure 60B:
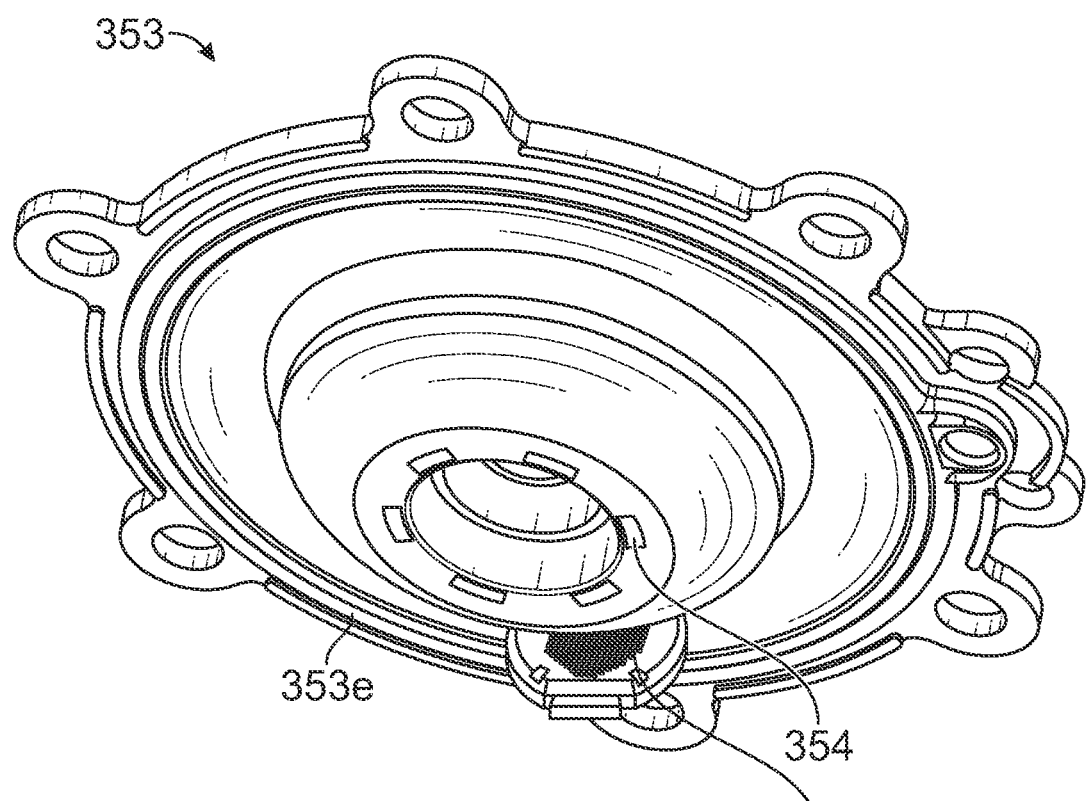
FIG. 60B is a perspective bottom view of a diaphragm assembly of the control zone device of FIG. 45.
Figure 60C:
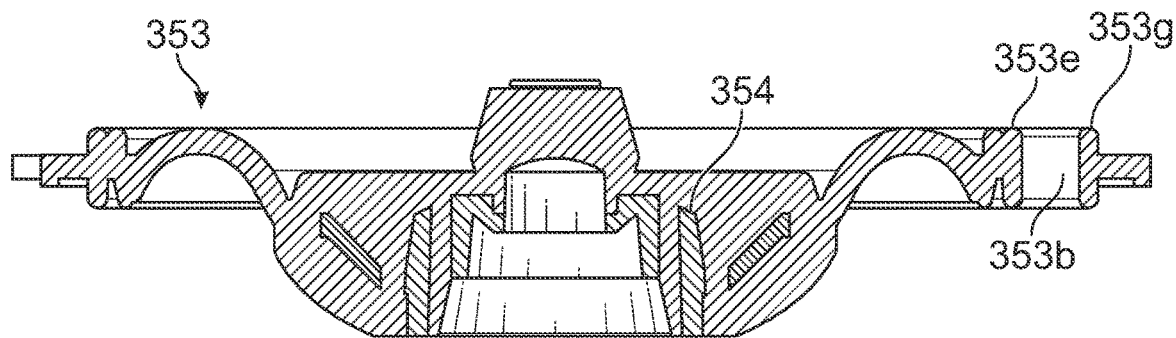
FIG. 60C is a central cross-section view of a diaphragm assembly of the control zone device of FIG. 45.

At the valve cap 336, the central passage 331a is shaped and sized to receive a substantial portion of the diaphragm 353 of the valve 350 (FIG. 52). The valve cap 336 includes an inner rim 340 and an outer rim 341 defining an annular recess 339. The outer rim 341 extends radially to form a terminal surface of the ribs 337. An annular bead 353e about a perimeter of the diaphragm 353 (FIGS. 60A-C) seats in the annular recess 339 of the valve cap 336.

The valve cap 336 further includes a central inner tube 332 that is open on both ends and is supported via a plurality of spokes 342. The spokes 342 extend from the central inner tube 332 to the body 331. One end of the central inner tube 332 sealingly receives an end of the flow tube 315, which together deliver fluid towards the outlet passage 303 when the valve 350 is open. Thus, the flow tube 315, the central inner tube 332, and the outlet passage 303 form the outflow side 398 of the device 300. An opposite end of the central inner tube 332 constitutes the valve seat 334 for the valve 350. In operation of the device 300, the diaphragm 353 of the valve 350 seats against the valve seat 334 of the interface cap 330 when in the closed position and is spaced from the valve seat 334 when in an open position.

Figure 54A:
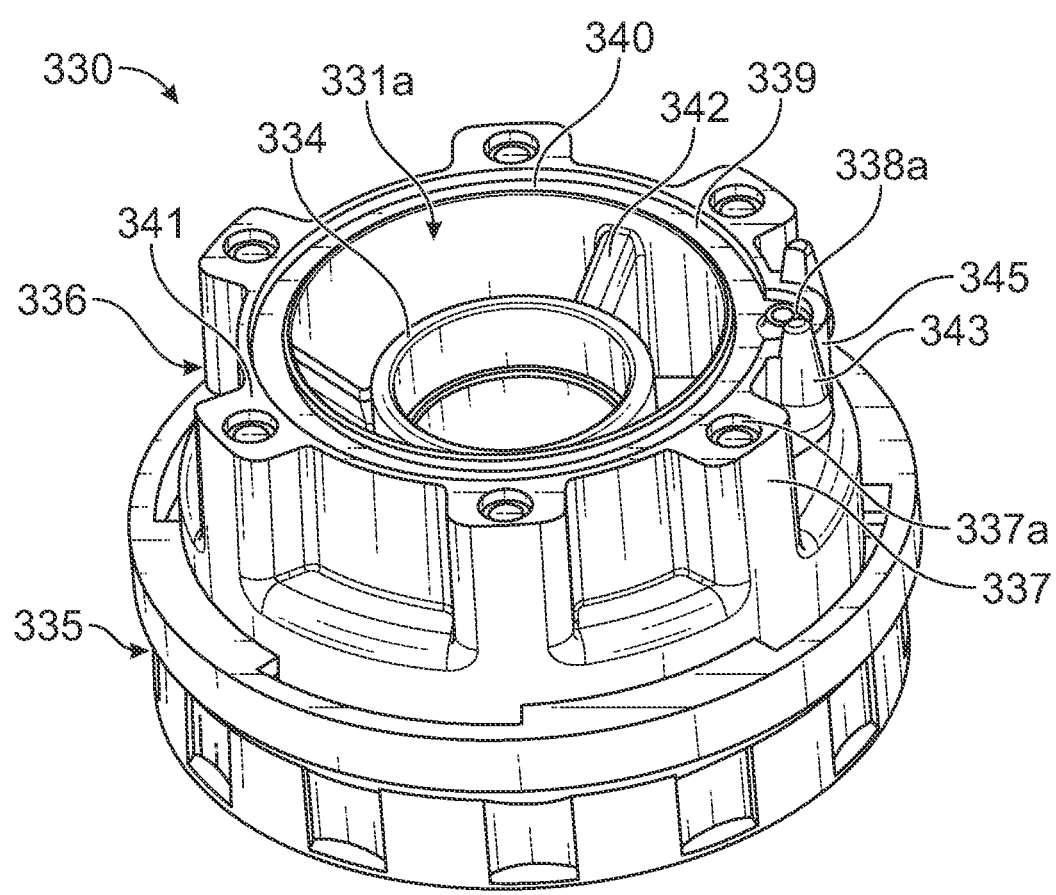
FIG. 54A is a perspective view of an interface cap of the control zone device of FIG. 45.
Figure 54B:
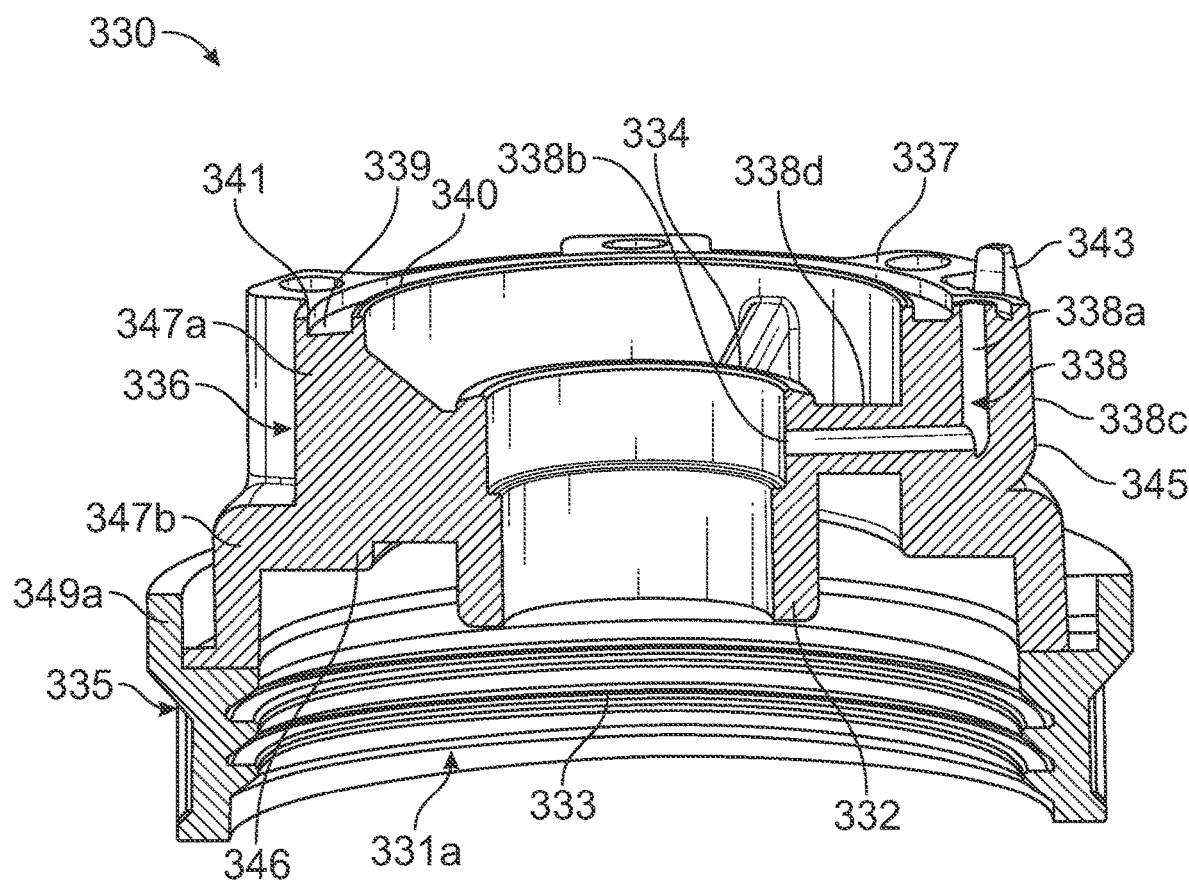
FIG. 54B is a perspective central cross-section view of the interface cap of the control zone device of FIG. 45.
Figure 54C:
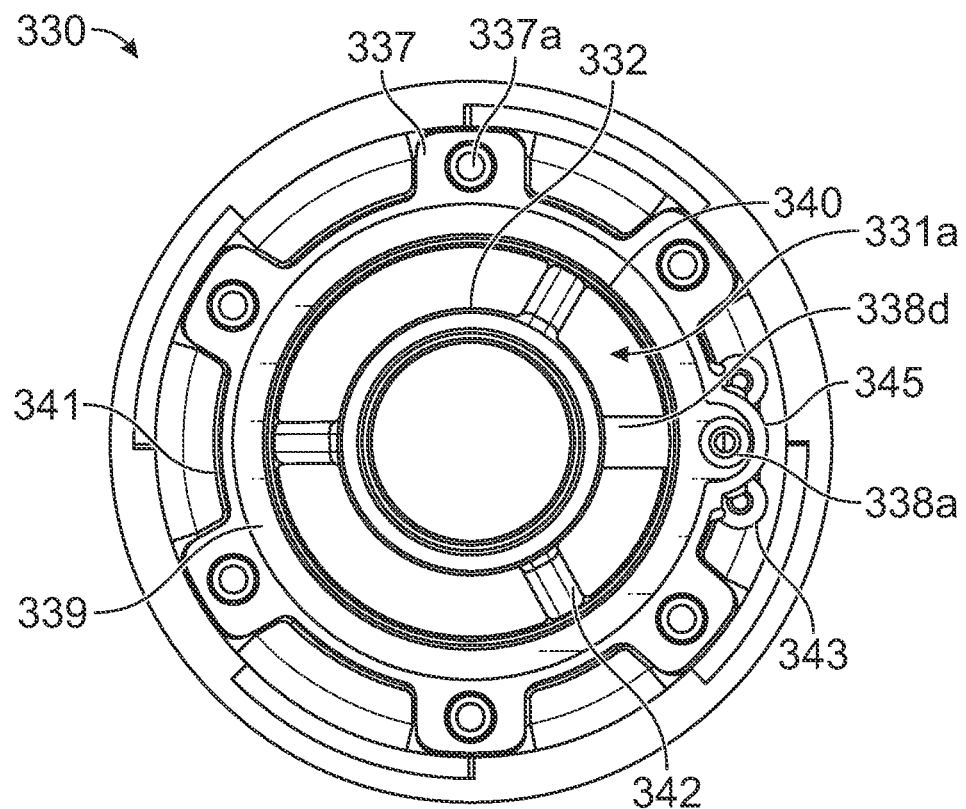
FIG. 54C is a top view of the interface cap of the control zone device of FIG. 45.
Figure 54D:
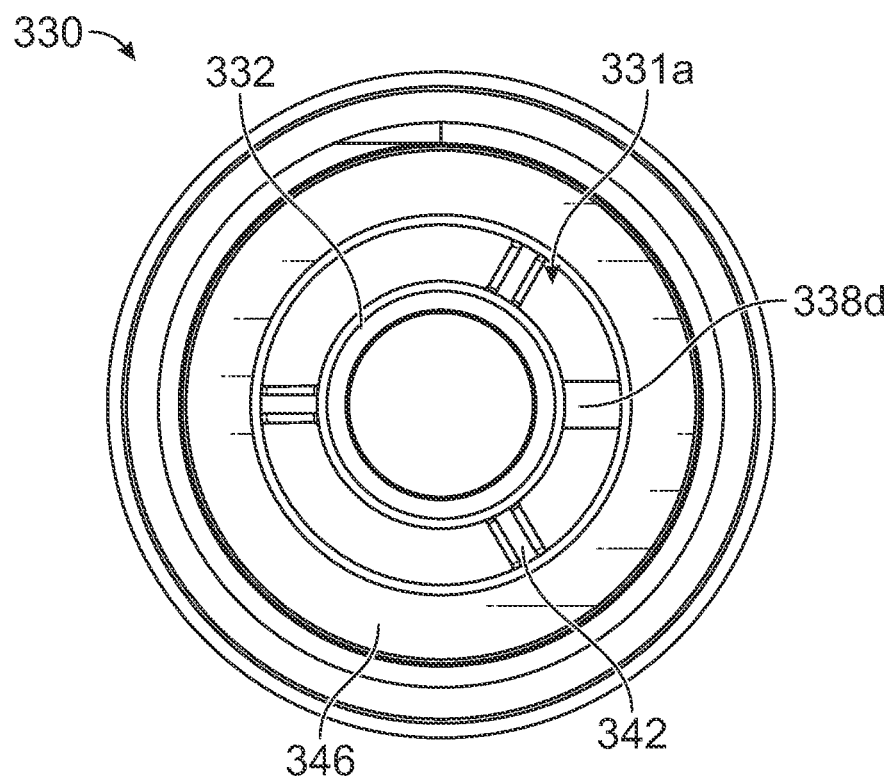
FIG. 54D is a bottom view of the interface cap of the control zone device of FIG. 45.
Figure 54E:
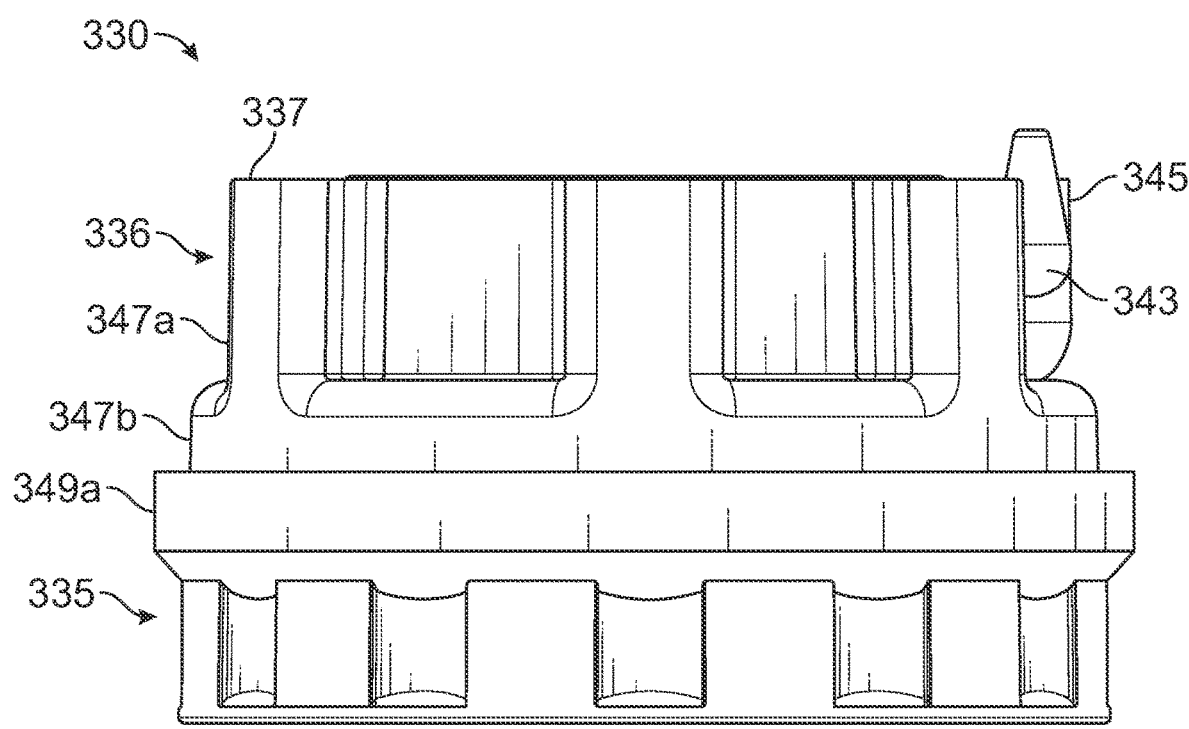
FIG. 54E is an elevation view of the interface cap of the control zone device of FIG. 45.

As illustrated in FIG. 54B, the valve seat 334 is recessed in the central passage 331a relative to the rims 340, 341 of the valve cap 336. This provides space for the diaphragm 353 to extend into the valve cap 336. The central inner tube 332 extends at least partially into the filter cap 335 of the interface cap 330. The central inner tube 332 includes a step dividing the interior into portions having different wall thickness and internal diameters. For instance, an inner diameter of the central inner tube 332 where the flow tube 315 is received may have a slightly smaller diameter than an inner diameter of the central inner tube 332 adjacent the valve seat 334 in order to snugly receive the flow tube 315.

With reference to FIGS. 54A-54D, the valve cap 336 includes a boss 345 extending radially from the top annular portion 347a. The boss 345 defines a portion of an interface cap vent passage 338. More specifically, the interface cap vent passage 338 includes an axial segment 338c extending from the interface cap vent passage inlet 338a. The vent passage 338 then forms a bend to deliver water into the central inner tube 332 via a radial segment 338d of the vent passage 338. The radial segment 338d extends to an interface cap vent passage outlet 338b located adjacent the valve seat 334.

The outer rim 341 and the annular recess 339 of the valve cap 336 extend outwardly to encompass the boss 345 and the vent passage inlet 338a. The vent passage inlet 338a projects axially in the annular recess 339. In some embodiments, the vent passage inlet 338a projects substantially level with the inner rim 340 and the outer rim 341. The vent passage inlet 338a, the outer rim 341, and the annular recess 339 are configured to cooperate with a corresponding vent hole 353b in the diaphragm 353 to help retain the diaphragm 353 in position at the vent passage inlet 338a, as discussed in more detail below.

The valve cap 336 includes opposing supports 343 flanking the boss 345. The support members 343 have a generally conical shape, with a rounded head or tip extending axially beyond the rim 341 of the interface cap 330. The diaphragm 353 includes holes 353c that receive the support members 343 to orient and hold the diaphragm 353 in position during assembly. The support members 343 further ensure that the vent passage inlet 338a is not blocked by the diaphragm 353.

Figure 54F:
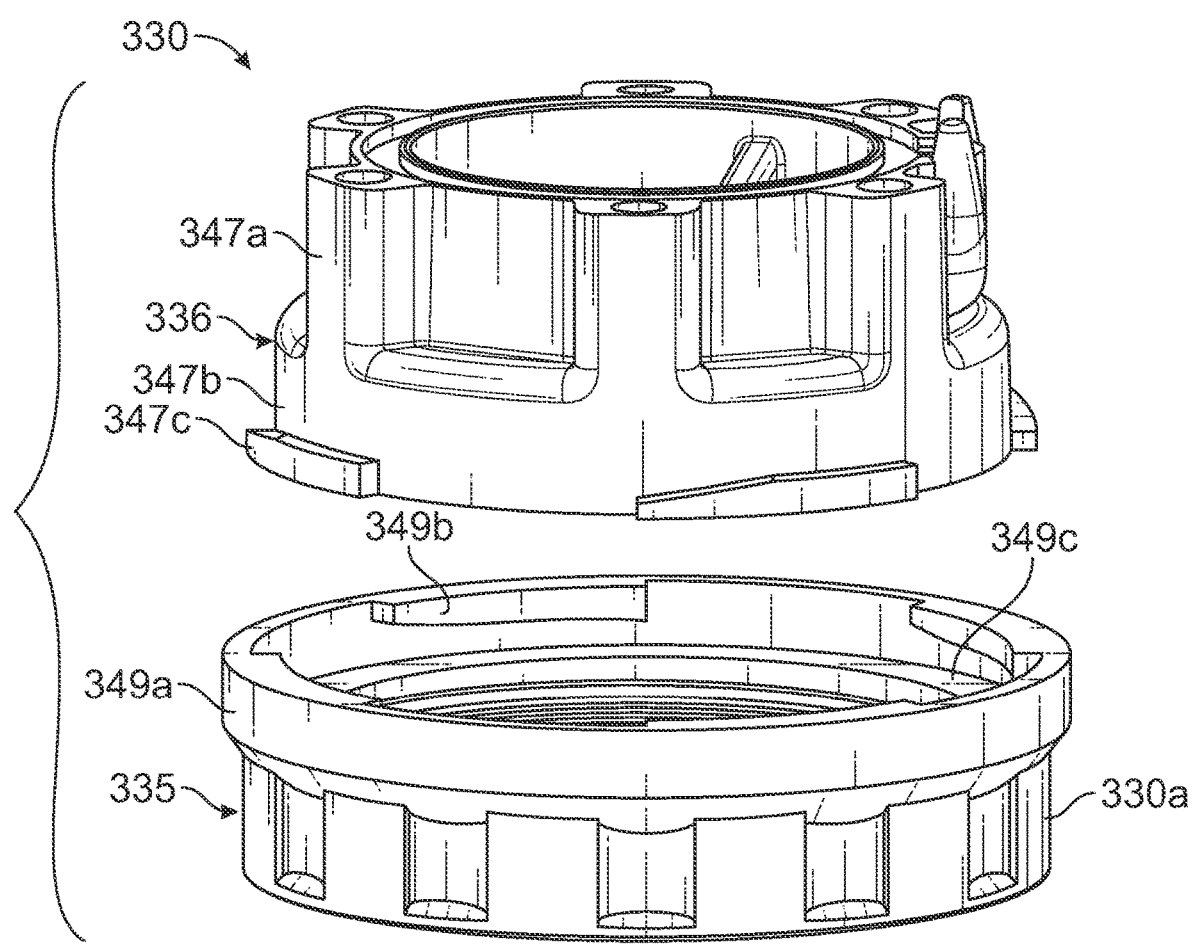
FIG. 54F is an exploded view of the interface cap of the control zone device of FIG. 45.
Figure 55A:
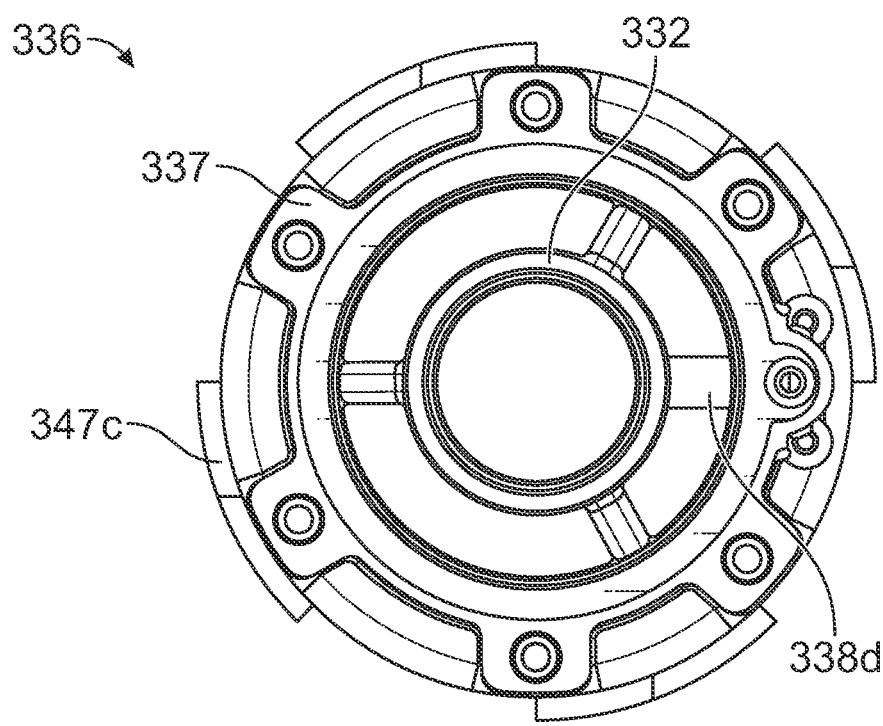
FIG. 55A is a top view of a valve cap of the interface cap of the control zone device of FIG. 45.
Figure 55B:
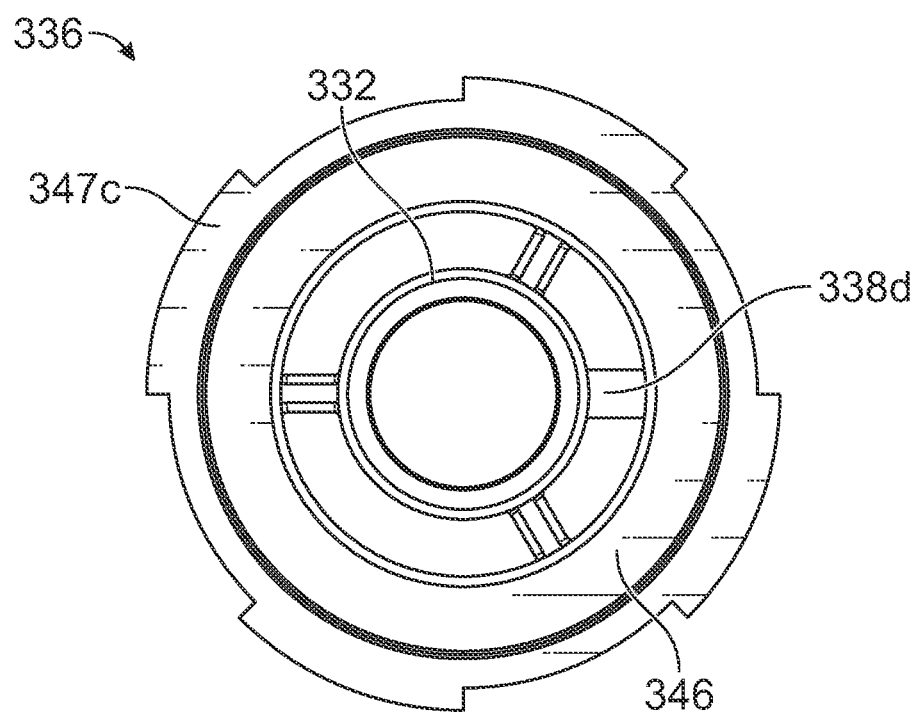
FIG. 55B is a bottom view of the valve cap of the interface cap of the control zone device of FIG. 45.
Figure 55C:
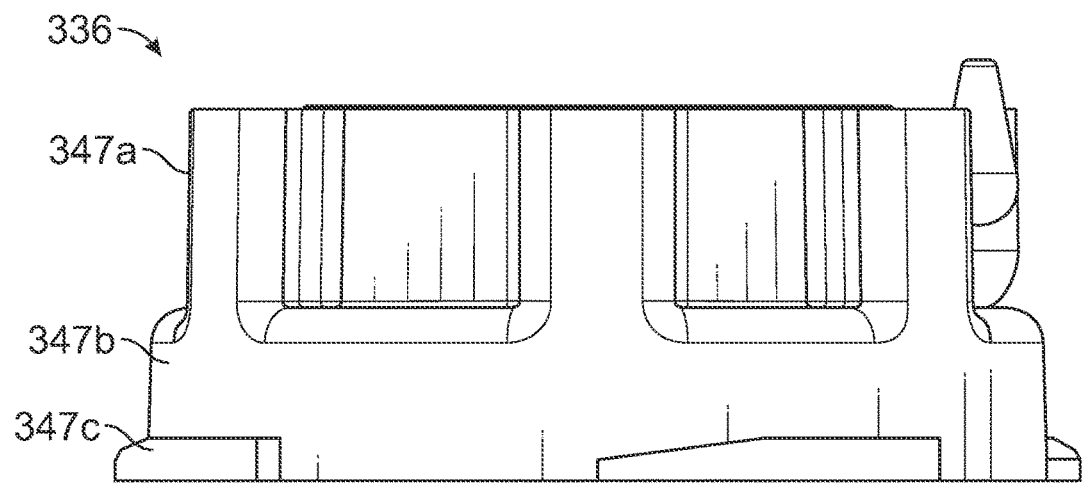
FIG. 55C is an elevation view of the valve cap of the interface cap of the control zone device of FIG. 45.
Figure 56A:
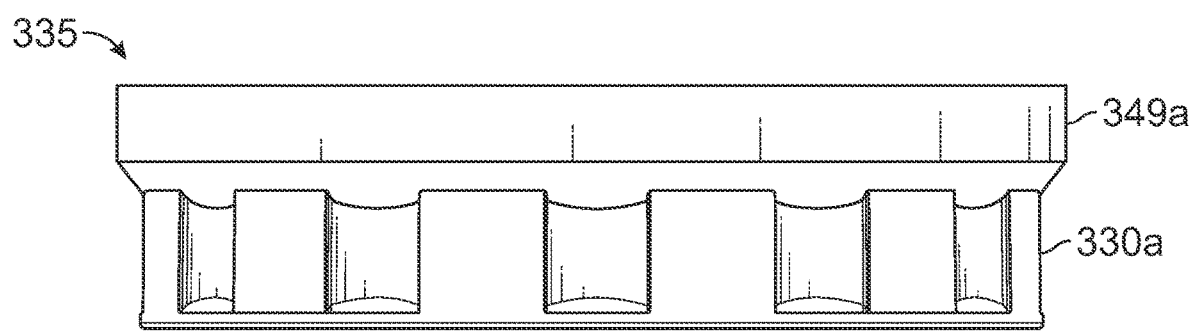
FIG. 56A is an elevation view of a filter cap of the interface cap of the control zone device of FIG. 45.
Figure 56B:
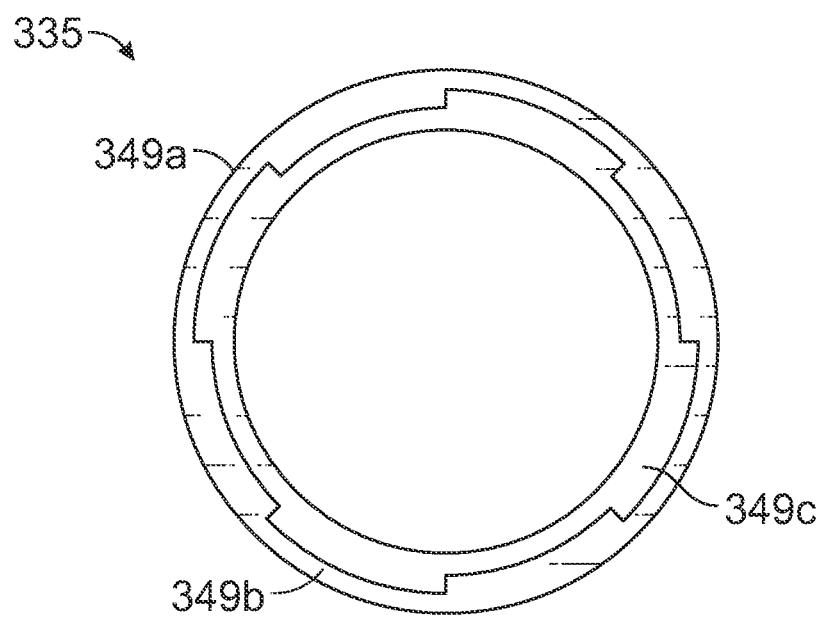
FIG. 56B is a top view of the filter cap of the interface cap of the control zone device of FIG. 45.
Figure 56C:
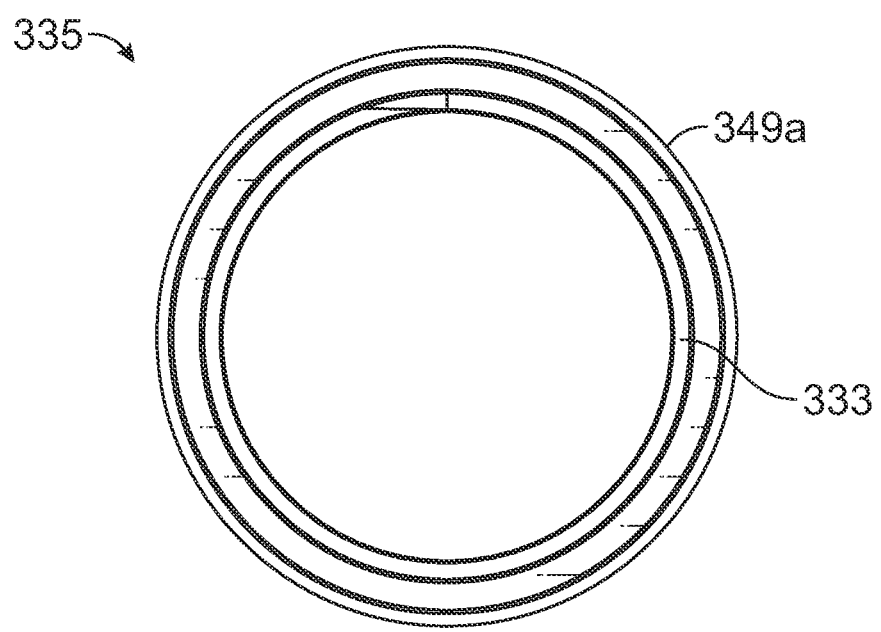
FIG. 56C is a bottom view of the filter cap of the interface cap of the control zone device of FIG. 45.

As illustrated in FIGS. 54F and 56A-C, the filter cap 335 is ring-shaped with a hollow generally cylindrical shape. The filter cap 335 may have an outer diameter that is substantially similar to the valve cap 336 or may have a larger outer diameter (FIG. 54F). The filter cap 335 includes grooves 330a extending axially about the outer periphery to facilitate gripping when turning the interface cap 330.

A rim 349a of the filter cap 335 extends radially beyond the remainder of the filter cap 335. The bayonet threads 349b extend radially inward from the rim 349a and cooperate with the bayonet threads 347c extending radially outward on the valve cap 336 to connect the filter cap 335 to the valve cap 336.

With reference to FIGS. 54B and 54F, when connected, the bayonet threads 347c of the valve cap 336 are pinned tightly between an annular inner shelf 349c of the filter cap 235 adjacent the rim portion 349a and the bayonet threads 349b of the filter cap 335. Further, the central passage 331a extends axially through the interface cap 330. At the filter cap 335, the central passage 331a is large enough to receive the main body 306 of the control zone device 300 for attachment thereto. It also is large enough to allow the filter 320 to be passed through for removal and installation while the filter cap 335 remains attached to the main body 306 and the valve cap 336 is separated from the filter cap 335.

Figure 51:
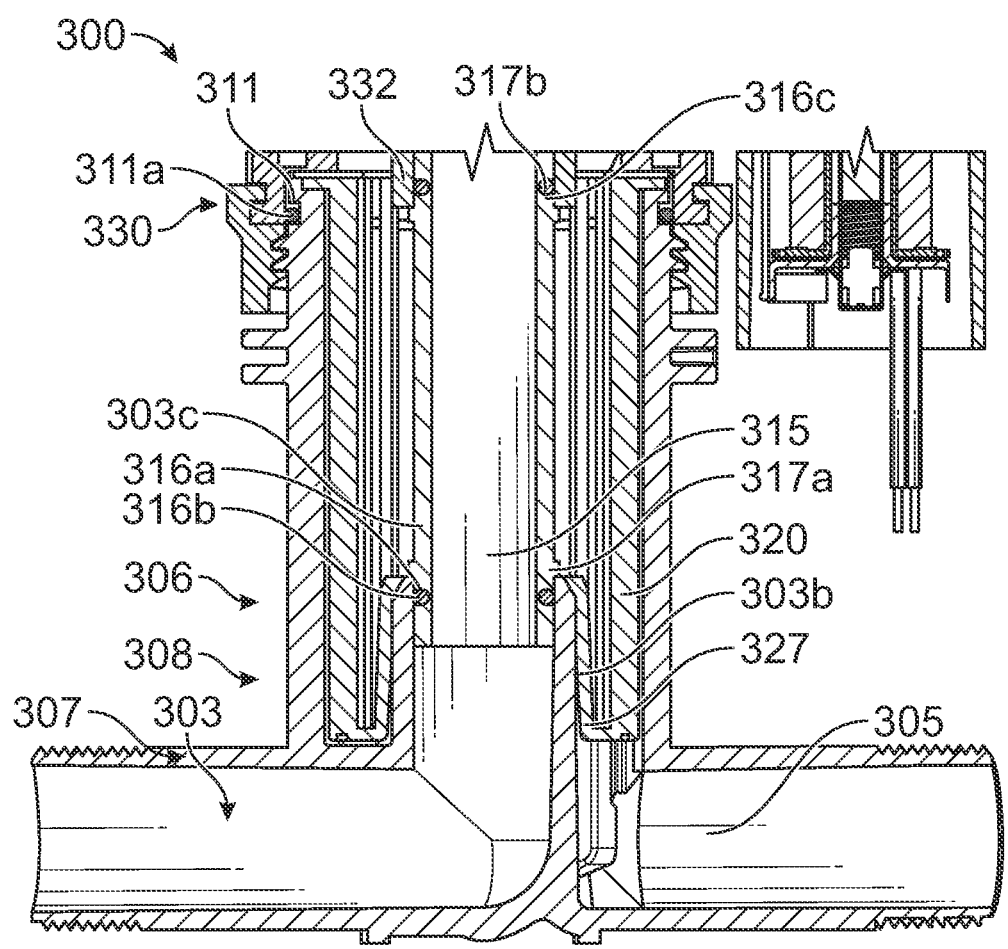
FIG. 51 is an enlarged portion of a central cross-section view of the control zone device of FIG. 45.

As illustrated, the filter cap 335 includes internal threads 333 inboard of the rim portion 349a for attachment to the main body 306 of the control zone device 300. When the interface cap 330 is attached to the main body 306, an annular wall 346 extends radially inward from the valve cap 336 and may seat on the rim 319 of the main body 306 (FIG. 52). The contact between the wall 346 and the rim 319 may contribute to sealing at the interface between the interface cap 330 and the main body 306. Alternatively, or additionally, the interface between the components is sealed via an o-ring 311a seated in an annular o-ring recess 311 adjacent the rim 319 of the main body 306 pressed against an interior surface of the bottom portion 347b of the valve cap 336 (FIG. 51).

Figure 58:
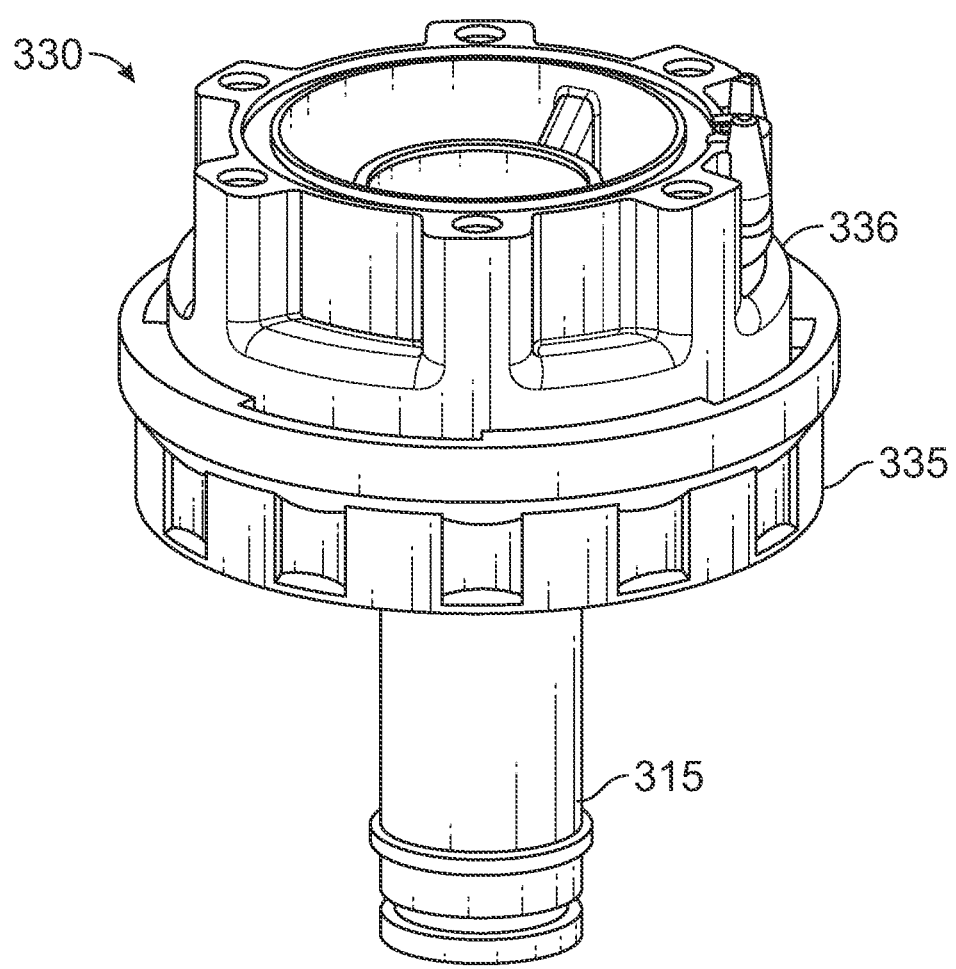
FIG. 58 is an alternative configuration of the interface cap of the control zone device of FIG. 45.

The flow tube 315 for the interface cap 330 described above is a separate component. However, as illustrated in FIG. 58, the interface cap 330 and the flow tube 315 can be a single piece. For instance, the flow tube 315 may extend from one of the components of the interface cap 330 or may be welded to the central inner tube 332.

Figure 57:
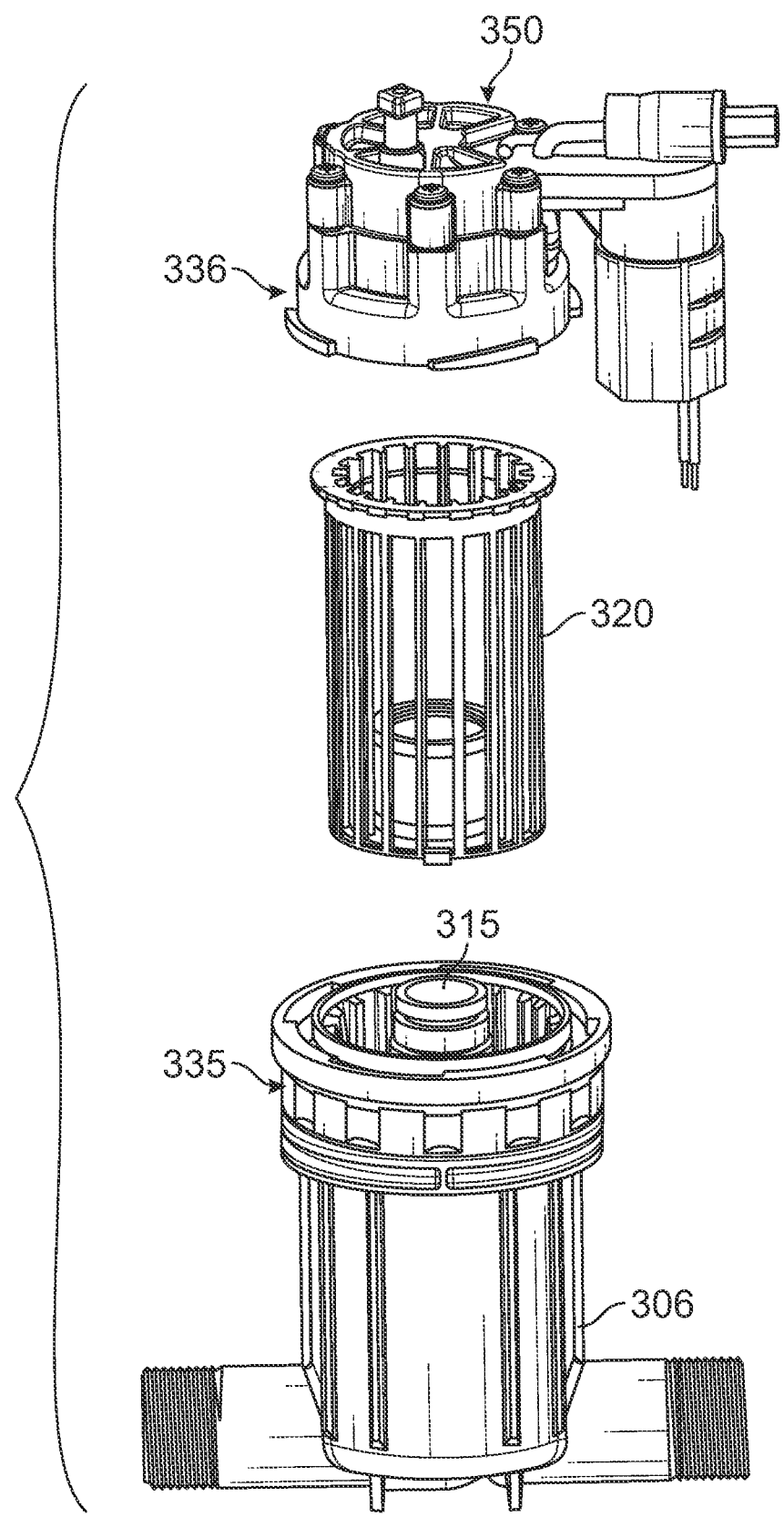
FIG. 57 is a diagrammatic illustration of the valve cap of the interface cap and valve removed from the filter cap and main body of the control zone device of FIG. 45 showing a filter being removed from the control zone device.

The manner in which the interface cap 330 attaches to the valve 350 and the main body 306 of the control zone device 300 includes the same advantages discussed above for the control zone devices 100, 200. For instance, as illustrated in FIG. 57, if a user desires to remove the filter 320 from the main body 306, for example, in order to clean or replace the filter 320, the user can simply turn the valve cap 336 a quarter to half turn to detach the valve cap 336 from the filter cap 335. There is no need to dismantle or rebuild the valve 350.

Other attachment methods, such as full threading, can also be used to removably couple the filter cap 335 to the valve cap 336. One attachment method is illustrated in FIGS. 62 and 63 for an interface cap 830. The cap 830 is similar to cap 330 and includes a valve cap 836 and a filter cap 835. The common features may not be specifically referenced in this description of cap 830 but are incorporated by reference and will be denoted with the same number except that the number will begin with a "8". The valve cap 836 includes flanges 863 extending radially outward about the perimeter of the valve cap 836 that align with corresponding flanges 867 extending radially outward about the perimeter of the filter cap 835. For instance, there may be three or more flanges 863, 867 spaced around the valve cap 836 and filter cap 835, respectively. Each flange 863, 867 may include a passage 863a, 867a for receiving a screw or other fastener 868 to couple the valve cap 836 to the filter cap 835. The flanges 867 may include a stud 867b, for example, an insert molded PEM-style stud. An o-ring face seal 869 may be included between the valve cap 836 and the filter cap 835, for example, within o-ring grooves 869a and 869b.

Interface caps 230 and 330 can both be modified to include the attachment method illustrated for cap 830. Further, in another embodiment, flanges similar to flanges 867 may be located on the main body (e.g., 106, 206, 306) of a control zone device instead of on a filter cap 835. In this configuration, the cap would be a single component, for example valve cap 236, valve cap 336, or interface cap 130, that is modified with the flanges 863 described above and coupled directly to corresponding flanges located on the main body of the device.

As shown in FIGS. 53 and 59-60B, the diaphragm 353 includes a plurality of partially rounded tabs 353d extending radially from a perimeter of the diaphragm 353. The tabs 353d each define holes that align with the passages 337a in the ribs 337 of the valve cap 336 and the passages 358a in the bosses 358 of the valve 350. Thus, when the valve 350 is attached to the valve cap 336, the screws or bolts 359 extend through the passages 358a of the valve 350 and the rounded tabs 353d of the diaphragm 353 and into the passages 337a in the ribs 337 of the valve cap 336. The screws 359 fix and clamp the perimeter of the diaphragm 353 between the valve body 352 and the valve cap 336.

The diaphragm 353 includes a primary annular bead 353e or ridge extending around a perimeter of the diaphragm 353 positioned inwardly from the tabs 353d. The annular bead 353e extends axially in both directions from the diaphragm 353. The annular bead 353e seats in the annular recesses 362, 339 of the valve body 352 and the valve cap 336 (FIGS. 59 and 54A), respectively.

The diaphragm 353 includes an additional vent passage tab 353f extending radially from the perimeter. The vent passage tab 353f defines a vent hole 353b and two additional holes 353c flanking the vent hole 353b. The hole 353b aligns with and receives and/or surrounds the vent passage inlet 338a of the interface cap 330.

A secondary annular bead 353g extends from the primary annular bead 353e to encompass the vent passage hole 353b and seats in corresponding extensions of recesses 362, 339 of the valve body 352 and the valve cap 336, respectively. As described above for the device 200, the interaction between the vent hole 353b, the valve body 352, and the interface cap 330 permits passage of fluid through the diaphragm 353 from the pressure regulator vent passage outlet 361 to the interface cap vent passage inlet 338a.

The pressure regulator 380 is identical to the pressure regulator 280. The pressure regulator 380 is in the vent flow path of the valve 350.

With reference to FIGS. 52 and 41A-42, when the pressure regulator 380 is mounted in the pressure regulator socket 364 (via threads 364a in the socket 364), an annular socket inlet chamber 360b is formed between a regulator valve body 384 and a wall 364b of the socket 364 and receives fluid from a pressure regulator socket inlet 360a. The socket 364 also has a socket outlet chamber 360c that is downstream of the pressure regulator 380 defined by a space between an inboard end of the regulator valve body 284 and a bottom of the socket 364. The outlet chamber 360c receives fluid from the pressure regulator 380 upstream of the pressure regulator socket outlet 360d on the bottom of the socket outlet chamber 360c.

As described above with respect to control zone device 200, an o-ring 389a on the regulator valve body 384 of the pressure regulator 380 provides a seal between the wall of the pressure regulator socket 364 and the regulator valve body 384 so that fluid in the socket inlet chamber 360b does not leak into the socket outlet chamber 360c. A projection or stop 364b located at the bottom of the pressure regulator socket 364 limits movement of the poppet valve 385 so that the pressure regulator socket outlet 360d is not blocked by the poppet valve 385 in its extended position (FIG. 61).

With the pressure regulator 380 in the vent flow path of the valve 350, the control zone device 300 regulates fluid pressure using the valve 350 in the same manner described with respect to control zone device 200 and provides the same advantages. With reference to FIGS. 46 and 52, fluid from the inlet 304 flows into the inlet passage 305, through the main body 306 and the filter 320, and into the interface cap 330 towards the diaphragm 353 of the valve 350. The inlet passage 305, the portion of the main body 306 containing the filter 320, and the portion of the interior of the interface cap 330 surrounding the central inner tube 332, and the flow tube 315 constitute the inflow side 397 of the control zone device 300.

When the solenoid 370 is not energized, a plunger 372 of the solenoid 370 blocks entry of fluid into the solenoid vent passage 356 of the valve 350 so that fluid cannot vent from the pressure chamber 357. That is, fluid flows from the inflow side 397 through the button filter 355 attached to the diaphragm 353 into the pressure chamber 357. Fluid pressure builds up in the pressure chamber 357 causing the diaphragm 353 to close against the valve seat 334 on the central inner tube 332 of the interface cap 330. The fluid is blocked from passing from the inflow side 397 of the device 200 to the outflow side 398.

To open the valve 350, the solenoid 370 is energized to open the solenoid vent passage 356 to vent fluid from the pressure chamber 357 to the outflow side 398 of the control zone device 300. This releases fluid pressure in the pressure chamber 357 so the pressure of the fluid on the inflow side 397 lifts the diaphragm 353 off the valve seat 334. In some embodiments, a spring 353h may be in the pressure chamber 357 between the bonnet 352 and the diaphragm 353. The spring 353h provides additional pressure to close the diaphragm 353 and to be overcome when the fluid pressure on the inflow side 397 opens the valve. The force of the spring 353h may be coordinated with the setting of the pressure regulator 380 to ensure that the valve regulates the downstream or outflow pressure to be in the desired range.

More specifically, when energized, the plunger 372 of the solenoid 370 lifts off a secondary valve seat 373 to allow fluid, which entered the solenoid bowl 365 through the pressure chamber vent passage 351, to be vented from the solenoid bowl 365 via the solenoid vent passage 356. In the illustrated configuration, the secondary valve seat 373 is on a plunger retainer 371 of the solenoid 370 in fluid communication with the solenoid vent passage 356; however, in other configurations the secondary valve seat can be located at the bottom of the solenoid bowl 365 or on other components in the bowl 365.

After the plunger 372 is lifted, the pressurized fluid from the pressure chamber 357 travels from the solenoid vent passage 356 to the pressure regulator 380. Fluid enters the pressure regulator socket inlet chamber 360b via the pressure regulator socket inlet 360a. Fluid flows next into and through pressure regulator 380 in the same manner as discussed above for pressure regulator 280. The pressure regulator 380 also controls the pressure along the vent passage in the same manner as discussed above for the pressure regulator 280 using backpressure in the socket outlet chamber 360c to increase or decrease flow from the regulator 380 into the socket outlet chamber 360c and downstream vent passages.

Regulating flow from the regulator 380 into the socket outlet chamber 360c regulates the fluid flow through the vent flow path. That is, the rate at which the pressure chamber 357 is vented is adjusted by the regulator 380. This, in turn, affects the distance the diaphragm 353 is lifted off the valve seat 334 of the interface cap 330. The distance between the diaphragm 353 and the valve seat 334 determines the pressure of fluid on the outflow side 398. This operation is the same as discussed above for valve 250.

In general, when the supply line pressure is within the preset pressure range, the pressure regulator 380 does not restrict flow in the vent path. Fluid flows into the socket outlet chamber 360c, out the socket outlet 360d, into the pressure regulator vent passage 366, into the interface vent passage inlet 338a, through the interface cap vent passage 338, and out the interface cap vent passage outlet 338b to the depressurized outflow side 398 of the control zone device 300. When fluid from the pressure chamber 357 is vented without interference from the pressure regulator 380, the diaphragm 353 lifts off the valve seat 334 to its full or standard extent. This allows the pressurized fluid from the inflow side 397 of the device 300 to pass the valve seat 334 and flow to the outflow side 398 of the device 300 with minimal pressure reduction.

When the supply line pressure is higher than the preset pressure range, the pressure regulator 380 restricts flow as discussed above for pressure regulator 280. The venting occurs at a reduced rate. The reduced venting balanced with the pressure on the inflow side 397 causes the diaphragm 353 to be lifted off the valve seat 334 to only a reduced extent. That is, the diaphragm 353 is not opened to its full extent and the reduced distance the diaphragm 353 moves from the valve seat 334 correlates with the amount of restriction created by the pressure regulator 380. This correlation depends on how far the inlet fluid pressure is above the preset range. The restriction created between the diaphragm 353 and the valve seat 334 causes a reduction in pressure at the outflow side 398 to reduce the pressure of the fluid to within the preset pressure range.

The control zone devices 100, 200, 300 also may include one or more of a variety of sensors integrated at certain locations within the devices 100, 200, 300 to sense and relay flow information to a controller. Accordingly, systems and methods for monitoring and controlling flow through the control zone devices 100, 200, 300 are also described herein.

Figure 64:
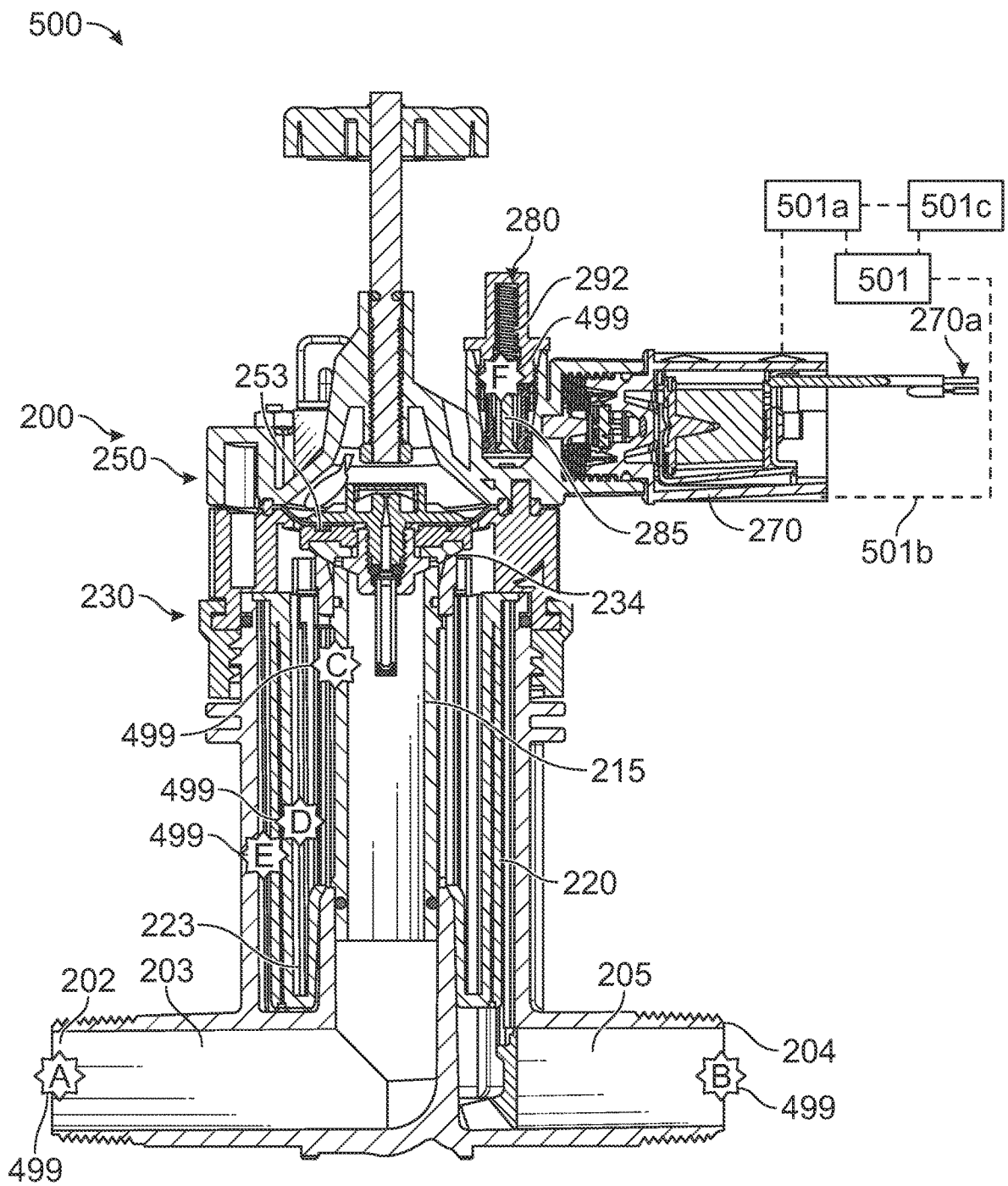
FIG. 64 is a schematic view of an exemplary system for monitoring flow using the control zone device of FIG. 22 and sensors.

FIG. 64 illustrates an exemplary system 500 showing a controller 501, a subcontroller or local controller 501a, a remote device 501c, and control zone device 200 having one or more sensors 499 approximately located at locations A, B, C, D, E, and/or F. While FIG. 64 illustrates sensors 499 used with control zone device 200, the below-described sensors 499 also can be used in similar positions in the control zone devices 100 and 300.

The sensor 499 may be a pressure sensor used in a variety of locations. For instance, a sensor at or near the inlet 202 (location A) can be used for determining available pressure when water is flowing through the valve and when water is not flowing through the valve. The sensor may be placed in the device 200 or in the conduit adjacent the inlet 202. The sensed pressure at the inlet 202 can be used to determine pressure loss as water flows through the device 200 or determine whether the valve is on or off. For example, a pressure drop (such as when compared to normal operation data) that occurs in the valve OFF state indicates a leak through the valve and in the valve ON state indicates that water is flowing through the valve.

A sensor 499 can also be placed at or near the outlet end of the device 200 (location B). The sensor may be placed in the device or in the conduit adjacent the outlet 204. This data can be used to determine available pressure after water is flowing through the device and to verify there is water pressure when the valve state is ON or no water pressure when the valve state is OFF. The data can also be used as part of a pressure loss measurement when water flows through the valve when compared to data from the sensor 499 at location A.

A sensor 499 may be a differential pressure sensor that is at a location (e.g., location C) to take measurements from both sides of the valve seat 234. For instance, the sensor 499 can be embedded in a wall of the flow tube 215 and exposed to fluid on both sides of the wall. In this configuration, the sensor 499 can determine whether the valve is working properly, i.e., that there is water pressure when the valve is supposed to be ON and no water pressure when the valve is supposed to be OFF. A sensor (e.g., a pressure differential sensor), also can be located at an upstream and downstream side of the filter 220 (e.g., locations D and E) to monitor the health of the filter 220, as described in further detail below.

In addition, a sensor 499 can be placed between the filter 220 and the valve 250 (e.g., location D) to differentiate whether a pressure loss is due to pressure loss at the valve 250 or the filter 220.

The sensor 499 also can be a flow sensor. Flow sensors can be placed in the control zone device 200 to determine, for example, whether fluid is flowing or the flow rate when a specific water dispersion device is used (e.g., a spray sprinkler, a rotor sprinkler, or a drip line). Flow sensors also can be used to track changes in flow rates to determine issues in the device 200, such as restrictions caused by the filter or valve functioning, as well as to initiate certain events. For instance, depending on the amount of flow sensed, a flow sensor signal could be used by the controller 501 to extend or reduce watering. In some cases, a high differential pressure relative to flow could activate a light or other visual indicator on the device 200 or the controller 501 to indicate the filter 220 needs to be changed, a message or other signal may be sent to a user via a smartphone to change the filter 220, and/or an increased period of watering may be initiated due to reduced flow.

The sensor 499 also may be a temperature sensor. Temperature sensors may be useful for determining timing of winterization of the irrigation system or to detect quick changes in temperature and/or initiate fire abatement. They may also be used to suspend or interrupt an irrigation event during a freeze condition. For example, a temperature sensor can be placed within the device 200 anywhere in the stream of the water to measure the temperature of the water or on an exterior surface of the device 200 to measure air temperature. By another approach a sensor 499 also can measure coil resistance in the solenoid 270 which can correlate to air temperature.

The sensors 499 described herein could use a number of different outputs, such as voltage output, current output, frequency output, duty cycle output, and other known outputs.

The data collected by sensors 499 can be relayed to the controller 501. Any number of controllers known in the art that are configured to receive the above-described sensor data may be used. In addition, a self-powered valve may be used with its own power generation unit for irrigation control, for example as disclosed in U.S. Provisional Application No. 63/437,992 filed on Jan. 9, 2023, the contents of which are incorporated by reference herein in their entirety. Sensor data also can be sent to a subcontroller or local controller 501a located near or connected to the devices 100, 200, 300. The subcontroller 501a may consolidate the signals from different sensors 499 and send the signals to the main controller 501. Consolidated information could be sent using various output forms as part of a carrier output to the main controller 501 or other communications devices. For instance, in addition to or instead of the controller 501, the information could be sent to another server, processer, or remote device (e.g., a smart phone) 501c to be accessed via a user or manager of the irrigation system.

The sensor data or other information may be transmitted between the device 200, the sensors 499, the controllers 501, 501a, or other remote devices 501c through any suitable wired or wireless modes of communication 501b, such as via a solenoid data link, or via other wireless communication methods known in the art (e.g., Blue Tooth, Wi-Fi, RFID, LoRa, Zigbee, etc.).

By one approach, the main controller 501 can send one or more signals back to the local controller 501a. For instance, the signals may include a command that was determined based on the sensor information. For instance, a command may be sent to adjust the duration of the watering period or stop watering.

Data can be collected at the controller 501 or subcontroller 501a from the sensors 499 at varying rates. For instance, data can be collected frequently (e.g., every minute or second) or less frequently (e.g., once a day, week, or month). The data collection rate also could be based on different circumstances. For instance, when the valve state is ON, the sensor data can be set to be collected more frequently than when the valve state is OFF.

In one approach, a sensor 499 may be located in the pressure regulator 280 (e.g., at location F). More specifically, for instance, a micro load sensor, such as an 8 mm load sensor, may be located at the end of the spring 292 in the pressure regulator 280 to detect the load on the spring 292. Voltage is supplied to the sensor 499 and outputs a data signal based on the load. The signal may, for instance, be sent at a 1 kHz rate. The solenoid 270 may utilize a data link, and data may be transmitted from the sensor 499 to the main irrigation controller 501 via a data link on the solenoid 270, though other forms of communication are contemplated.

The main controller 501 may read the voltage level being sent from the load cell of the sensor 499 and may monitor any increases or decreases in pressure being applied to the load cell of the sensor 499. The load cell has a baseline value when the valve state is OFF and the spring 292 has a preset compression to open and close the pressure regulator poppet valve 285 of the pressure regulator 280 and maintain a constant outlet pressure. The sensor 499 may detect the change in force the spring 292 is exerting to maintain a constant outlet pressure and may transmit the data to the controller 501 or subcontroller 501a. In this case, an increase in pressure on the spring 292 directly correlates to the poppet valve 285 decreasing flow through the poppet valve 285, which correlates to a decrease in the distance the diaphragm 253 lifts off the valve seat 234 and a decrease in flow through the main valve 250 of the device 200. A decrease in pressure detected by the controller 501 directly correlates to the poppet valve 285 increasing flow through the poppet valve 285, which may correlate to an increase in the distance the diaphragm 253 lifts off the valve seat 234 and an increase in flow through the main valve 250. Alternatively, it is also possible for a pressure sensor 499 to be located downstream of the poppet valve 285 to detect the pressure of the flow from the pressure regulator 280.

If a pressure or flow sensor 499 is also located at or near the inlet 202 (location A), inlet pressure or flow data may also be transmitted to the controller 501 and used with the pressure regulator sensor data to precisely calculate any flow increases or decreases that may signal a problem. For instance, decreased pressure or flow at the pressure regulator relative to inlet data may indicate that a filter upstream of the pressure regulator needs to be replaced (in devices in which the filter is upstream of the pressure regulator, e.g., control zone device 300). An increased pressure or flow at the pressure regulator 280 relative to the inlet data may indicate a leak in the zone. If inlet pressure data is not available, the controller 501 may be set to assume the inlet pressure is static within a certain range percentage in order to detect potential problems.

In another application, a differential pressure sensor can measure the pressure difference across the valve seat 234. For instance, the sensor 499 may be molded into the flow tube 215 with one side of the sensor 499 on the inside of the tube 215 and the other on the outside of the tube 215 (e.g., location C). The controller 501 can then determine the change in pressure from the inflow side 295 to the outflow side 296 of the device 200. The controller 501 can be set to assume that the outflow pressure adjacent the valve seat 234 is constant within a specific range since it is controlled by the pressure regulator 280. With respect to control zone devices in which the filter 220 is on the outflow side of the device, such as control zone device 200, any increase in outflow pressure detected by the sensor 499 molded into the flow tube 215 relative to the expected outflow pressure could indicate that the filter 220 needs to be cleaned.

In addition, since control zone device 200 regulates the outflow pressure to within a specific range, the distance the diaphragm 253 lifts off the valve seat 234 can be determined based on the pressure differential between the inflow side 295 and the outflow side 296. Based on the distance of the diaphragm 253 lifts off the valve seat 234, the area of flow through the valve 250 and the flow rate through the valve 250 can be determined.

In a further approach, pressure on the inflow side 295 may be calculated by measuring the position of the diaphragm 253, and this may be used to calculate the flow rate through the valve 250. For instance, the position of the diaphragm 253 may be measured by affixing a piece of metal to the diaphragm assembly, mounting a capacitance or inductance probe in the bonnet, and using the signal off the probe to as an input into a calculation that relates diaphragm position, pressure, and flow.

In either approach, sensor data can be sent from the device 200 to the controller 501, using, for example, solenoid data channels, and the controller 501 can determine and monitor the changes in flow rate. For instance, when the flow rate drops below a preset threshold, this may indicate that the filter needs to be cleaned or replaced, or may indicate other nonfunctioning components. If a higher-than-expected flow rate is detected in the device 200, this may indicate a leak somewhere in the irrigation system (e.g., at a sprinkler).

Figure 65:
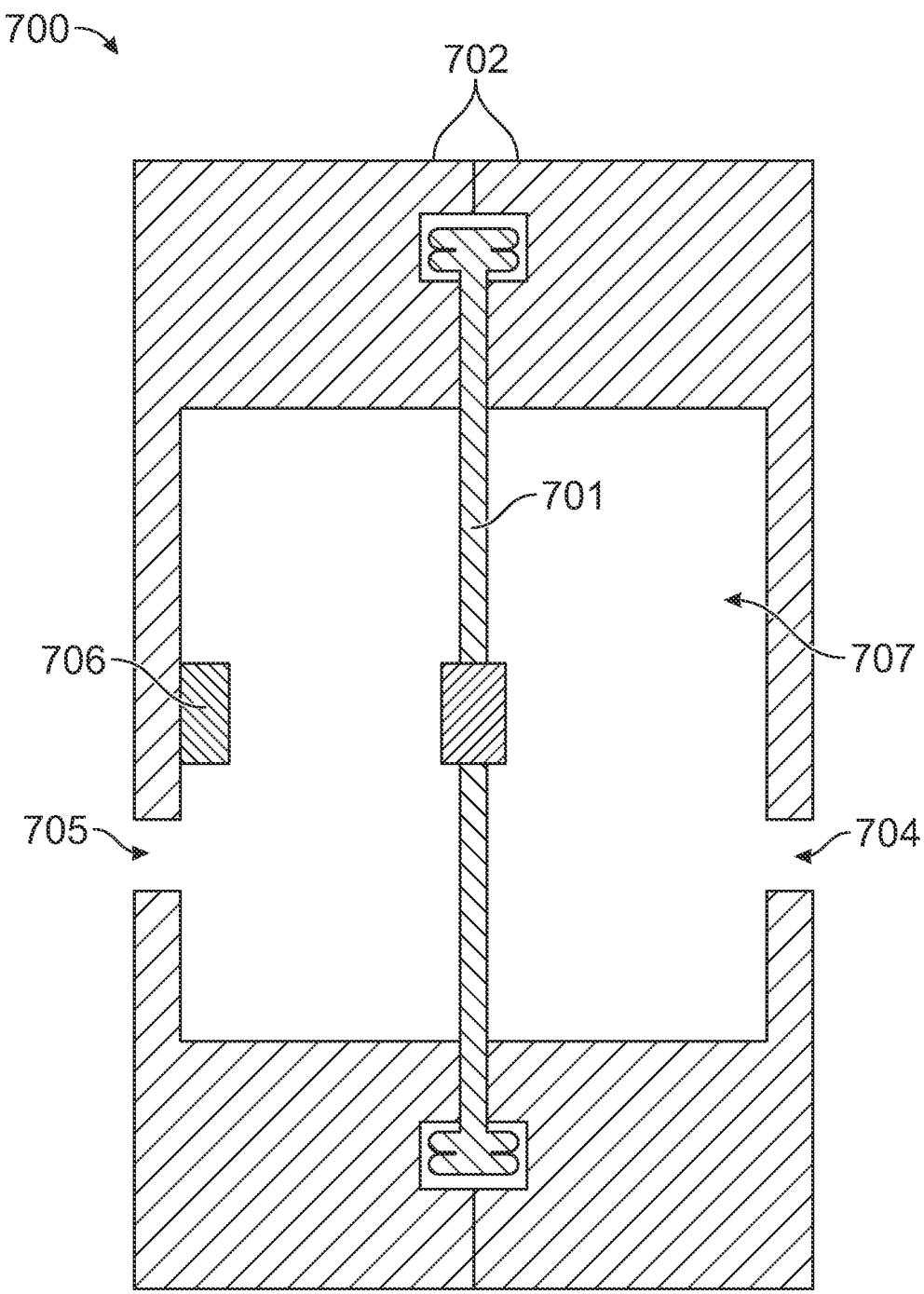
FIG. 65 is a diagrammatic view of a differential-pressure sensor.

In another approach, a differential pressure sensor 499 can indicate a clogged filter 220 when detecting a pressure drop across the filter screen 223. For instance, the sensor 700 illustrated in FIG. 65 may be placed on a filter screen 223 of the filter 220 (e.g., between locations D and E in FIG. 64). Specifically, the sensor 700 may include a diaphragm 701 enclosed by two clamshell housings 702. The diaphragm 701 may be centrally disposed in an interior 707 between the two housings 702 and configured to deflect to flip a switch 706 when a pre-determined pressure drop is detected between an upstream side 704 of the filter screen and a downstream side 705 of the filter screen. For instance, the switch 706 may be flipped when there is a pressure differential between the upstream side 704 and the downstream side 705 that indicates the filter 220 is clogged and needs to be replaced. Flipping the switch 706 could trigger a number of events. For instance, activation of the switch 706 may interrupt the common 270a (FIG. 64) and turn off the valve 250. Alternatively, activation of the switch 706 may interrupt a current coming from the controller 501 to trigger an alert, a light, or other indicator at the controller 501 that the filter 220 needs to be replaced. In addition, the switch 706 can be activated in its default state and deactivation of the switch 706 may trigger any of the above-mentioned events.

In an additional approach, a sensor 499, such as a differential pressure sensor, may be used to monitor the health of the filter 220. As the filter 220 catches debris, this debris can reduce flow through the filter 220. This can result in a pressure drop across the filter 220 which can be an indicator for filter health. The differential pressure sensor includes a pressure sensor upstream of the filter 220 and another pressure sensor downstream of the filter 220 (e.g., FIG. 64, locations D and E). The signaling from the sensors is coupled to a control, such as a main controller or processor 501, subcontroller 501a or microcontroller, circuit, etc., that interprets the signaling and can output data to be transmitted to a remote device 501c using an interface (wired or wireless interface). The data may include the signaling, data corresponding to the signaling, and/or pressure determinations based on the signal.

In this approach, a curve can be created for various levels of filter clogging so that a variable output can be determined and provided. A low-pressure differential may indicate that the filter 220 is new, while a higher pressure differential may indicate the filter 220 needs replacing. To the user, the health of the filter 220 may be displayed as a percentage and/or there may be an indication as to whether or when the filter 220 may need to be replaced.

Further, while a given pressure differential may correspond to the filter 220 being clogged at one flow rate, the same pressure differential may not correspond to the filter 220 being clogged at a different flow rate. Thus, in some embodiments the differential pressure is characterized for different flow rates for greater accuracy. For instance, a curve would be developed for each of several different flow rates. Knowledge of the flow rate together with the differential pressure measurements ensures that the proper pressure curve is used to determine filter health. Further details regarding this approach of monitoring filter health are disclosed in U.S. Provisional Application No. 63/437,992 filed on Jan. 9, 2023, the contents of which are incorporated by reference herein in their entirety.

The matter set forth in the foregoing description and accompanying drawings is offered by way of example and illustration only and not as a limitation. While certain embodiments have been shown and described, it will be apparent to those skilled in the art that additions, changes, and modifications may be made without departing from the broader aspects of the technological contribution. The actual scope of the protection sought is intended to be defined in the following claims.

What is claimed is:

1. A device comprising:
a main body including a base portion having an inlet passage and an outlet passage and a body portion extending from the base portion, the body portion in fluid communication with the inlet passage and the outlet passage and including a chamber for receiving a filter;
a valve bonnet having a solenoid bowl for attaching a solenoid and a solenoid vent passage;
a pressure regulator for regulating flow of fluid from the outlet passage;
a cap forming an interface between the body portion and the valve bonnet, the cap including a first portion attached to the body portion and a second portion attached to the valve bonnet, an interior in fluid communication with the body portion, and a cap vent passage extending through a wall of the cap; and
a diaphragm sandwiched between the valve bonnet and the cap defining a pressure chamber between the valve bonnet and the diaphragm,
wherein the solenoid vent passage of the valve bonnet and the cap vent passage of the cap fluidly communicate so that, in an operational state of the device, fluid from the pressure chamber is selectively vented into the body portion to enable moving of the diaphragm away from a valve seat.

2. The device of claim 1, wherein the pressure regulator is disposed in the outlet passage.

3. The device of claim 1, wherein the valve bonnet includes a pressure regulator socket and the pressure regulator is disposed in the pressure regulator socket.

4. The device of claim 3, wherein the pressure regulator socket is in fluid communication with the solenoid vent passage and a pressure regulator vent passage is downstream of the solenoid vent passage in the valve bonnet and in fluid communication with the cap vent passage.

5. The device of claim 1, further comprising a flow tube extending along the chamber of the main body coupled to the inlet passage or the outlet passage.

6. The device of claim 5, wherein an end of the flow tube is coupled to the inlet passage, and the flow tube defines in part an inflow passage.

7. The device of claim 5, wherein an end of the flow tube is coupled to the outlet passage, and the flow tube defines in part an outflow passage.

8. The device of claim 1, wherein the cap includes coupling elements to attach to the body portion so that the cap can be twisted off the body portion to access the chamber while remaining attached to the valve bonnet and the diaphragm.

9. The device of claim 1, wherein the cap vent passage discharges fluid into the body portion downstream of the filter.

10. The device of claim 1, wherein the diaphragm includes a valve element that engages or disengages the valve seat.

11. A device comprising:
a main body including a base portion having an inlet passage and an outlet passage and a body portion extending from the base portion, the body portion in fluid communication with the inlet passage and the outlet passage and including a chamber for receiving at least in part a filter;
a valve bonnet having a solenoid bowl for attaching a solenoid and a pressure regulator socket for attaching a pressure regulator and defining a vent passage;

a pressure regulator disposed in the pressure regulator socket;

a cap forming an interface between the body portion and the valve bonnet, the cap including a first portion attached to the body portion and a second portion attached to the valve bonnet, and having an interior in fluid communication with the body portion and the vent passage of the valve bonnet; and a diaphragm sandwiched between the valve bonnet and the cap defining a pressure chamber between the valve bonnet and the diaphragm, wherein in an operational state of the device the pressure regulator regulates pressure of fluid to be discharged from the device to within a preset pressure range by controlling a distance the diaphragm moves from a valve seat.

12. The device of claim 11, wherein the vent passage of the valve bonnet includes a solenoid portion extending from the solenoid bowl to the pressure regulator socket, and a pressure regulator portion extending from the pressure regulator socket and being in fluid communication with a cap vent passage of the cap.

13. The device of claim 12, wherein the distance the diaphragm moves from the valve seat is controlled by the pressure regulator regulating a rate fluid vents from the pressure chamber through the pressure regulator portion of the vent passage and the cap vent passage.

14. The device of claim 12, wherein the cap vent passage discharges fluid into the body portion downstream of the filter when the filter is received in the chamber.

15. The device of claim 12, wherein the cap includes coupling elements to attach to the body portion so that the cap can be twisted off the body portion to access the chamber while remaining attached to the valve bonnet and the diaphragm.

16. The device of claim 12, further comprising a pressure sensor in the pressure regulator.

17. The device of claim 12, further comprising a differential pressure sensor for monitoring a filter disposed in the chamber.

18. The device of claim 12, wherein the pressure regulator adjusts a flow rate of the fluid across the valve seat depending on inlet pressure of the fluid and the preset pressure range.

19. The device of claim 11, further comprising a flow tube extending along at least a portion of the chamber of the main body being in fluid communication with the inlet passage or the outlet passage.

20. The device of claim 19, wherein the inlet passage and the flow tube define an inflow passage through the device such that when the diaphragm moves from the valve seat fluid is permitted to flow from the inflow passage to an outflow passage of the device.

21. The device of claim 19, wherein the outlet passage and the flow tube define an outflow passage through the device such that when the diaphragm moves from the valve seat fluid is permitted to flow from an inflow passage of the device to the outflow passage.

* * * * *